United States Patent
Hartmann et al.

(10) Patent No.: US 10,431,858 B2
(45) Date of Patent: Oct. 1, 2019

(54) SYSTEMS, STRUCTURES AND MATERIALS FOR ELECTROCHEMICAL DEVICE THERMAL MANAGEMENT

(71) Applicant: Global Web Horizons, LLC, Seattle, WA (US)

(72) Inventors: Mark Hartmann, Boulder, CO (US); Joseph Kelly, Arvada, CO (US)

( * ) Notice: Subject to any disclaimer, the term of this patent is extended or adjusted under 35 U.S.C. 154(b) by 0 days.

(21) Appl. No.: 15/014,624

(22) Filed: Feb. 3, 2016

(65) Prior Publication Data

US 2016/0226114 A1   Aug. 4, 2016

Related U.S. Application Data

(63) Continuation-in-part of application No. 14/614,223, filed on Feb. 4, 2015, now Pat. No. 10,003,053.

(51) Int. Cl.
*H01G 11/18* (2013.01)
*H01G 11/78* (2013.01)
(Continued)

(52) U.S. Cl.
CPC .......... *H01M 10/625* (2015.04); *C08G 18/10* (2013.01); *C08G 18/3206* (2013.01); *C08G 18/4833* (2013.01); *C08G 18/4854* (2013.01); *C08G 18/61* (2013.01); *C08G 18/6674* (2013.01); *C08G 18/73* (2013.01); *C08G 18/755* (2013.01); *C08G 18/758* (2013.01); *C08G 18/7621* (2013.01); *C08G 18/7671* (2013.01); *C08G 18/8064* (2013.01); *C08G 63/13* (2013.01); *C09K 5/063* (2013.01); *H01G 11/18* (2013.01); *H01G 11/78* (2013.01); *H01M 2/0257* (2013.01); *H01M 2/1094* (2013.01); *H01M 10/655* (2015.04); *H01M 10/658* (2015.04); *C08K 2201/011* (2013.01);
(Continued)

(58) Field of Classification Search
CPC .................................................. H01M 10/655
See application file for complete search history.

(56) References Cited

U.S. PATENT DOCUMENTS 3,926,899 A   12/1975   Nordberg
4,154,462 A   5/1979   Golden et al.
(Continued)

FOREIGN PATENT DOCUMENTS

CN   1317602 A   10/2001
CN   1446120 A   10/2003
(Continued)

OTHER PUBLICATIONS

Definitions (Year: 2017).*
(Continued)

*Primary Examiner* — Sarah A. Slifka
*Assistant Examiner* — Brian R Ohara
(74) *Attorney, Agent, or Firm* — Neugeboren O'Dowd PC

(57) ABSTRACT

This disclosure provides casings and materials for the thermal management and protection of an electrochemical cell. The casing may also comprise a composite polymeric material for electrochemical cell thermal management, the composite polymeric material comprising a crosslinked polyether polyol phase change material configured to be in physical contact with at least a portion of an electrochemical cell.

19 Claims, 38 Drawing Sheets

(51) Int. Cl.

| | |
|---|---|
| *C09K 5/06* | (2006.01) |
| *H01M 10/625* | (2014.01) |
| *H01M 10/655* | (2014.01) |
| *H01M 10/658* | (2014.01) |
| *H01M 2/02* | (2006.01) |
| *H01M 2/10* | (2006.01) |
| *C08G 18/10* | (2006.01) |
| *C08G 18/32* | (2006.01) |
| *C08G 18/48* | (2006.01) |
| *C08G 18/61* | (2006.01) |
| *C08G 18/66* | (2006.01) |
| *C08G 18/73* | (2006.01) |
| *C08G 18/75* | (2006.01) |
| *C08G 18/76* | (2006.01) |
| *C08G 18/80* | (2006.01) |
| *C08G 63/13* | (2006.01) |

(52) U.S. Cl.
CPC ........ *H01M 2/029* (2013.01); *H01M 2220/20* (2013.01); *Y02E 60/13* (2013.01)

(56) References Cited

U.S. PATENT DOCUMENTS

| | | |
|---|---|---|
| 4,181,643 A | 1/1980 | Kreibich et al. |
| 4,259,198 A | 3/1981 | Kreibich et al. |
| 4,505,953 A | 3/1985 | Chen et al. |
| 4,708,812 A | 11/1987 | Hatfield |
| 4,756,958 A | 7/1988 | Bryant et al. |
| 4,851,291 A | 7/1989 | Vigo et al. |
| 4,871,615 A | 10/1989 | Vigo et al. |
| 4,908,166 A | 3/1990 | Salyer |
| 4,908,238 A | 3/1990 | Vigo et al. |
| 5,120,349 A | 6/1992 | Stewart et al. |
| 5,156,911 A | 10/1992 | Stewart |
| 5,254,354 A | 10/1993 | Stewart |
| 5,254,380 A | 10/1993 | Salyer |
| 5,366,801 A | 11/1994 | Bryant et al. |
| 5,432,210 A | 7/1995 | Bogan, Jr. |
| 5,433,953 A | 7/1995 | Tsuei et al. |
| 5,565,132 A | 10/1996 | Salyer |
| 5,589,194 A | 12/1996 | Tsuei et al. |
| 5,718,835 A | 2/1998 | Momose et al. |
| 5,804,297 A | 9/1998 | Colvin et al. |
| 5,814,407 A | 9/1998 | Richard et al. |
| 5,866,663 A | 2/1999 | Brookhart et al. |
| 5,885,475 A | 3/1999 | Salyer |
| 5,897,952 A | 4/1999 | Vigo et al. |
| 5,929,164 A | 7/1999 | Zhang |
| 5,969,070 A | 10/1999 | Waymouth et al. |
| 5,985,309 A | 11/1999 | Edwards et al. |
| 6,001,904 A | 12/1999 | Matzinger et al. |
| 6,004,662 A | 12/1999 | Buckley |
| 6,015,570 A | 1/2000 | Tucci et al. |
| 6,025,287 A | 2/2000 | Hermann |
| 6,040,085 A | 3/2000 | Cheu et al. |
| 6,063,312 A | 5/2000 | Mannheimer |
| 6,169,142 B1 | 1/2001 | Nakano et al. |
| 6,207,738 B1 | 3/2001 | Zuckerman et al. |
| 6,319,599 B1 | 11/2001 | Buckley |
| 6,379,753 B1 | 4/2002 | Soane et al. |
| 6,380,336 B1 | 4/2002 | Soane et al. |
| 6,387,492 B2 | 5/2002 | Soane et al. |
| 6,408,256 B1 | 6/2002 | Hittle et al. |
| 6,468,689 B1 | 10/2002 | Al-Hallaj et al. |
| 6,472,476 B1 | 10/2002 | Soane et al. |
| 6,485,530 B1 | 11/2002 | Soane et al. |
| 6,497,732 B1 | 12/2002 | Soane et al. |
| 6,497,733 B1 | 12/2002 | Ware, Jr. et al. |
| 6,503,976 B2 | 1/2003 | Zuckerman et al. |
| 6,517,648 B1 | 2/2003 | Bouchette et al. |
| 6,517,933 B1 | 2/2003 | Soane et al. |
| 6,544,594 B2 | 4/2003 | Linford et al. |
| 6,566,544 B1 | 5/2003 | Waymouth et al. |
| 6,599,327 B2 | 7/2003 | Soane et al. |
| 6,607,564 B2 | 8/2003 | Soane et al. |
| 6,607,994 B2 | 8/2003 | Soane et al. |
| 6,617,267 B2 | 9/2003 | Soane et al. |
| 6,617,268 B1 | 9/2003 | Offord et al. |
| 6,620,515 B2 | 9/2003 | Feng et al. |
| 6,644,395 B1 | 11/2003 | Bergin |
| 6,660,667 B2 | 12/2003 | Zuckerman et al. |
| 6,679,924 B2 | 1/2004 | Ware, Jr. et al. |
| 6,699,266 B2 | 3/2004 | Lachenbruch et al. |
| 6,716,526 B2 | 4/2004 | Weston et al. |
| 6,787,624 B2 | 9/2004 | Coates et al. |
| 6,793,856 B2 | 9/2004 | Hartmann et al. |
| 6,815,486 B2 | 11/2004 | Bhagwagar et al. |
| 6,822,062 B2 | 11/2004 | Mackenzie et al. |
| 6,830,782 B2 | 12/2004 | Kanazawa |
| 6,855,410 B2 | 2/2005 | Buckley |
| 6,855,422 B2 | 2/2005 | Magill et al. |
| 6,921,431 B2 | 7/2005 | Evans et al. |
| 6,942,944 B2 | 9/2005 | Al-Hallaj et al. |
| 7,053,163 B1 | 5/2006 | Tian et al. |
| 7,074,490 B2 | 7/2006 | Feng et al. |
| 7,081,501 B2 | 7/2006 | Okawa et al. |
| 7,105,047 B2 | 9/2006 | Simmons et al. |
| 7,119,154 B2 | 10/2006 | Coates et al. |
| 7,135,424 B2 | 11/2006 | Worley et al. |
| 7,160,612 B2 | 1/2007 | Magill et al. |
| 7,205,067 B2 | 4/2007 | Godevais et al. |
| 7,241,497 B2 | 7/2007 | Magill et al. |
| 7,244,497 B2 | 7/2007 | Hartmann et al. |
| 7,268,243 B2 | 9/2007 | Coates et al. |
| 7,270,910 B2 | 9/2007 | Yahnker et al. |
| 7,300,994 B2 | 11/2007 | Coates et al. |
| 7,433,794 B1 | 10/2008 | Berdichevsky et al. |
| 7,464,455 B2 | 12/2008 | Du et al. |
| 7,560,523 B2 | 7/2009 | Coates et al. |
| 7,569,630 B2 | 8/2009 | Ma et al. |
| 7,666,500 B2 | 2/2010 | Magill et al. |
| 7,685,697 B2 | 3/2010 | Du et al. |
| 7,790,283 B2 | 9/2010 | Hartmann et al. |
| 7,790,810 B2 | 9/2010 | Coates et al. |
| 7,879,933 B2 | 2/2011 | Hanssen |
| 7,931,979 B2 | 4/2011 | Choi et al. |
| 7,952,326 B2 | 5/2011 | Johnson et al. |
| 8,130,496 B2 | 3/2012 | Dong et al. |
| 8,221,910 B2 | 7/2012 | Hartmann et al. |
| 8,273,474 B2 | 9/2012 | Al-Hallaj et al. |
| 8,404,341 B2 | 3/2013 | Hartmann et al. |
| 8,492,042 B2 | 7/2013 | Givens et al. |
| 8,587,945 B1 * | 11/2013 | Hartmann ......... H05K 7/20454 361/679.53 |
| 8,758,925 B2 | 6/2014 | Choi et al. |
| 8,963,497 B2 | 2/2015 | Yang et al. |
| 8,997,332 B2 | 4/2015 | Du et al. |
| 9,099,762 B2 | 8/2015 | Yang et al. |
| 9,112,248 B2 | 8/2015 | Johnson et al. |
| 9,151,545 B2 | 10/2015 | Soukhojak et al. |
| 10,003,053 B2 | 6/2018 | Hartmann et al. |
| 2001/0052193 A1 | 12/2001 | Payet et al. |
| 2002/0009473 A1 | 1/2002 | Tebbe |
| 2002/0068152 A1 | 6/2002 | Heath et al. |
| 2002/0120988 A1 | 9/2002 | Soane et al. |
| 2002/0122890 A1 | 9/2002 | Linford et al. |
| 2002/0152560 A1 | 10/2002 | Soane et al. |
| 2002/0155348 A1 | 10/2002 | Gitto |
| 2002/0155771 A1 | 10/2002 | Soane et al. |
| 2002/0160675 A1 | 10/2002 | Linford et al. |
| 2002/0164473 A1 | 11/2002 | Buckley |
| 2002/0189024 A1 | 12/2002 | Soane et al. |
| 2002/0190408 A1 | 12/2002 | Houston et al. |
| 2002/0193028 A1 | 12/2002 | Zuckerman et al. |
| 2003/0008078 A1 | 1/2003 | Soane et al. |
| 2003/0013369 A1 | 1/2003 | Soane et al. |
| 2003/0027962 A1 | 2/2003 | Wagener et al. |
| 2003/0035951 A1 | 2/2003 | Magill et al. |
| 2003/0051295 A1 | 3/2003 | Soane et al. |
| 2003/0054141 A1 | 3/2003 | Worley et al. |
| 2003/0068482 A1 | 4/2003 | Koch et al. |

(56) References Cited

U.S. PATENT DOCUMENTS

| | | |
|---|---|---|
| 2003/0079302 A1 | 5/2003 | Soane et al. |
| 2003/0082439 A1 | 5/2003 | Sakakibara |
| 2003/0101518 A1 | 6/2003 | Linford et al. |
| 2003/0101522 A1 | 6/2003 | Linford et al. |
| 2003/0102080 A1 | 6/2003 | Malik |
| 2003/0104134 A1 | 6/2003 | Linford et al. |
| 2003/0143180 A1 | 7/2003 | Giroud et al. |
| 2003/0145397 A1 | 8/2003 | Ware, Jr. et al. |
| 2003/0151030 A1 | 8/2003 | Gurin |
| 2004/0011989 A1 | 1/2004 | Lin et al. |
| 2004/0024110 A1 | 2/2004 | Hamersky et al. |
| 2004/0026659 A1 | 2/2004 | Lin |
| 2004/0029472 A1 | 2/2004 | Lin |
| 2004/0033743 A1 | 2/2004 | Worley et al. |
| 2004/0043212 A1 | 3/2004 | Grynaeus et al. |
| 2004/0044128 A1 | 3/2004 | Lin et al. |
| 2004/0048541 A1 | 3/2004 | Offord et al. |
| 2004/0055093 A1 | 3/2004 | Offord et al. |
| 2004/0058006 A1 | 3/2004 | Barry et al. |
| 2004/0192835 A1 | 9/2004 | Steidl et al. |
| 2004/0206941 A1 | 10/2004 | Gurin |
| 2004/0258922 A1 | 12/2004 | Willett et al. |
| 2004/0260085 A1 | 12/2004 | Kriesel et al. |
| 2005/0046182 A1 | 3/2005 | Trapp et al. |
| 2005/0077208 A1 | 4/2005 | Miller et al. |
| 2005/0106392 A1 | 5/2005 | Sano et al. |
| 2005/0175560 A9 | 8/2005 | Ferrari |
| 2005/0191487 A1 | 9/2005 | Magill et al. |
| 2005/0208286 A1 | 9/2005 | Hartmann et al. |
| 2005/0208300 A1 | 9/2005 | Magill et al. |
| 2005/0233145 A1 | 10/2005 | Abe et al. |
| 2005/0281979 A1 | 12/2005 | Toas et al. |
| 2006/0009589 A1 | 1/2006 | Haering et al. |
| 2006/0037150 A1 | 2/2006 | Offord et al. |
| 2006/0043328 A1 | 3/2006 | Hunt et al. |
| 2006/0073377 A1 | 4/2006 | Al-Hallaj et al. |
| 2006/0101997 A1 | 5/2006 | Py et al. |
| 2006/0178475 A1 | 8/2006 | Bentley et al. |
| 2006/0188582 A1 | 8/2006 | Naylor Da Rocha Gomes |
| 2006/0277933 A1 | 12/2006 | Smith et al. |
| 2006/0286319 A1 | 12/2006 | Magill et al. |
| 2007/0026228 A1 | 2/2007 | Hartmann et al. |
| 2007/0049714 A1 | 3/2007 | Coates et al. |
| 2007/0051773 A1 | 3/2007 | Ruchert et al. |
| 2007/0079825 A1 | 4/2007 | Sera et al. |
| 2007/0104745 A1 | 5/2007 | Stewart et al. |
| 2007/0120927 A1 | 5/2007 | Snyder et al. |
| 2007/0165990 A1 | 7/2007 | Magill et al. |
| 2007/0173154 A1 | 7/2007 | Hartmann et al. |
| 2007/0212967 A1 | 9/2007 | Grynaeus et al. |
| 2007/0241303 A1 | 10/2007 | Zhong et al. |
| 2007/0287008 A1 | 12/2007 | Hartmann et al. |
| 2008/0193653 A1* | 8/2008 | Oh .................. B01J 13/14 |
| | | 427/340 |
| 2008/0193761 A1 | 8/2008 | Naylor Rocha Gomes et al. |
| 2008/0214854 A1 | 9/2008 | Coates et al. |
| 2009/0004556 A1 | 1/2009 | Al-Hallaj et al. |
| 2009/0035557 A1 | 2/2009 | Hartmann et al. |
| 2009/0192278 A1 | 7/2009 | Coates et al. |
| 2010/0011338 A1 | 1/2010 | Lewis |
| 2010/0012883 A1 | 1/2010 | Hartmann et al. |
| 2010/0015430 A1 | 1/2010 | Hartmann et al. |
| 2010/0015869 A1 | 1/2010 | Hartmann et al. |
| 2010/0016513 A1 | 1/2010 | Hartmann et al. |
| 2010/0029882 A1 | 2/2010 | Coates et al. |
| 2010/0035492 A1 | 2/2010 | Colin |
| 2010/0036077 A1 | 2/2010 | Coates et al. |
| 2010/0264353 A1 | 10/2010 | Hartmann et al. |
| 2010/0273041 A1 | 10/2010 | Lawall et al. |
| 2011/0039467 A1 | 2/2011 | Xu |
| 2011/0070474 A1 | 3/2011 | Lee et al. |
| 2011/0073331 A1 | 3/2011 | Xu |
| 2011/0126399 A1 | 6/2011 | Smith et al. |
| 2011/0287298 A1 | 11/2011 | Park et al. |
| 2011/0305935 A1 | 12/2011 | Yoon |
| 2012/0152297 A1 | 6/2012 | Mitchell et al. |
| 2012/0225290 A1 | 9/2012 | Hartmann et al. |
| 2013/0026978 A1 | 1/2013 | Cooley et al. |
| 2013/0040526 A1 | 2/2013 | Hartmann et al. |
| 2013/0115506 A1 | 5/2013 | Wayne et al. |
| 2013/0130078 A1 | 5/2013 | Schaefer et al. |
| 2014/0043754 A1 | 2/2014 | Hartman et al. |
| 2014/0079978 A1 | 3/2014 | Al-Hallaj et al. |
| 2014/0106198 A1 | 4/2014 | Guha et al. |
| 2014/0154532 A1 | 6/2014 | Chellew |
| 2014/0154533 A1 | 6/2014 | Schaefer et al. |
| 2014/0265565 A1 | 9/2014 | Cooley et al. |
| 2014/0370354 A1* | 12/2014 | Yang .................. H01M 10/625 |
| | | 429/120 |
| 2015/0044517 A1 | 2/2015 | Mikhaylik et al. |
| 2015/0218913 A1 | 4/2015 | Cooley et al. |
| 2015/0155220 A1 | 6/2015 | Nguyen et al. |
| 2015/0167636 A1 | 6/2015 | Al-Garni et al. |
| 2015/0197678 A1 | 7/2015 | Han et al. |
| 2015/0243952 A1 | 8/2015 | Ka et al. |
| 2015/0295157 A1 | 10/2015 | Tatry et al. |
| 2015/0303444 A1 | 11/2015 | Wang |
| 2016/0099442 A1* | 4/2016 | Kanayama .......... H01M 2/0262 |
| | | 429/175 |

FOREIGN PATENT DOCUMENTS

| | | |
|---|---|---|
| CN | 1252025 C | 4/2006 |
| CN | 101189385 A | 5/2008 |
| DE | 19826712 A1 | 12/1999 |
| DE | 19913353 A1 | 9/2000 |
| DE | 19957900 A1 | 6/2001 |
| EP | 92269 A1 | 10/1983 |
| EP | 1275769 A1 | 1/2003 |
| EP | 1484378 A1 | 12/2004 |
| EP | 1783169 A2 | 5/2007 |
| EP | 1871948 A2 | 1/2008 |
| EP | 2181481 A1 | 5/2010 |
| ES | 2298056 A1 | 5/2008 |
| FR | 2691969 A1 | 12/1993 |
| JP | 05-163485 A | 12/1991 |
| JP | 04163370 A | 6/1992 |
| JP | 04219349 B2 | 8/1992 |
| JP | 05156570 A2 | 6/1993 |
| JP | 05156576 A | 6/1993 |
| JP | 5214672 A2 | 8/1993 |
| JP | 6041818 A2 | 2/1994 |
| JP | 2006200417 A2 | 7/1994 |
| JP | 06234840 A2 | 8/1994 |
| JP | 07-053917 A | 9/1996 |
| JP | 08-246227 A | 9/1996 |
| JP | 08311716 A1 | 11/1996 |
| JP | 11247069 A2 | 9/1999 |
| JP | 11350240 A2 | 12/1999 |
| JP | 2000313895 A | 11/2000 |
| JP | 2001172866 A2 | 6/2001 |
| JP | 2002087953 A | 3/2002 |
| JP | 2002317329 A | 10/2002 |
| JP | 2002348780 A2 | 12/2002 |
| JP | 2003020568 A2 | 1/2003 |
| JP | 2003027337 A2 | 1/2003 |
| JP | 2003520871 A | 7/2003 |
| JP | 2003246931 A | 9/2003 |
| JP | 2003268358 A2 | 9/2003 |
| JP | 2003268359 A2 | 9/2003 |
| JP | 2003268679 A2 | 9/2003 |
| JP | 2003293223 A2 | 10/2003 |
| JP | 2004003087 A | 1/2004 |
| JP | 2004011032 A2 | 1/2004 |
| JP | 2004026971 A | 1/2004 |
| JP | 2004027189 A2 | 1/2004 |
| JP | 2004043676 A | 2/2004 |
| JP | 2004510068 A | 4/2004 |
| JP | 2004161885 A2 | 6/2004 |
| JP | 2004324023 A | 11/2004 |
| JP | 2005036097 A2 | 2/2005 |
| JP | 2005503497 A | 2/2005 |
| JP | 2007137971 A2 | 6/2007 |
| JP | 2008522056 A | 6/2008 |

(56) References Cited

FOREIGN PATENT DOCUMENTS

| JP | 537028 T2 | 9/2008 | |
|---|---|---|---|
| JP | 2009524542 A | 7/2009 | |
| JP | 5005215 B2 | 8/2012 | |
| JP | 5239716 B2 | 7/2013 | |
| JP | 05331754 B2 | 10/2013 | |
| JP | 2018514052 | 5/2018 | |
| KR | 20040071118 A | 8/2004 | |
| PT | 0103265 A | 10/2006 | |
| TW | 587110 B | 5/2004 | |
| WO | 9324534 A1 | 12/1993 | |
| WO | 09825710 A1 | 6/1998 | |
| WO | 9825710 A1 | 6/1998 | |
| WO | 9833761 A1 | 8/1998 | |
| WO | 9949124 A2 | 9/1999 | |
| WO | 0106054 A1 | 1/2001 | |
| WO | 0135511 A2 | 5/2001 | |
| WO | 0154809 A1 | 8/2001 | |
| WO | 0212607 A2 | 2/2002 | |
| WO | 0224789 A2 | 3/2002 | |
| WO | 2003027365 A1 | 4/2003 | |
| WO | 03076547 A1 | 9/2003 | |
| WO | 2004007631 A1 | 1/2004 | |
| WO | 2004098767 A1 | 11/2004 | |
| WO | 2005017247 A2 | 2/2005 | |
| WO | 2005040300 A1 | 6/2005 | |
| WO | 2005097935 A1 | 10/2005 | |
| WO | 2006005491 A1 | 1/2006 | |
| WO | 2006013165 A1 | 2/2006 | |
| WO | 2006098851 A2 | 9/2006 | |
| WO | 2006117702 A2 | 11/2006 | |
| WO | 2007040395 A1 | 4/2007 | |
| WO | 2007082559 A1 | 7/2007 | |
| WO | 2007130709 A2 | 11/2007 | |
| WO | 2008014164 A1 | 1/2008 | |
| WO | 2008041191 A2 | 4/2008 | |
| WO | 2008061885 A2 | 5/2008 | |
| WO | 2008135208 A1 | 11/2008 | |
| WO | 2010008908 A1 | 1/2010 | |
| WO | 2010008909 A1 | 1/2010 | |
| WO | 2010008910 A1 | 1/2010 | |
| WO | 2010142502 A1 | 12/2010 | |
| WO | 2012121848 A2 | 9/2012 | |
| WO | 2014107498 A1 | 7/2014 | |
| WO | 2014192723 A1 | 12/2014 | |
| WO | 2014197675 A2 | 12/2014 | |
| WO | WO-2014192723 A1 * | 12/2014 | .......... H01M 2/0262 |
| WO | 2015035406 A1 | 3/2015 | |
| WO | 2015058376 A1 | 4/2015 | |
| WO | 2015095107 A1 | 6/2015 | |
| WO | 2015102708 A2 | 7/2015 | |
| WO | 2005117232 A2 | 12/2015 | |

OTHER PUBLICATIONS

Overview of Crosslinking and protein modifications, protein biology resource library (Year: 2017).*
Definitions (Year: 2018).*
Young, Lee W., "International Search Report and Written Opinion re Application No. PCT/US16/16360", dated Jun. 10, 2016, p. 18, Published in: WO.
Young, Lee W., "International Search Report and Written Opinion re Application No. PCT/US16/16358", dated Jun. 10, 2016, p. 14, Published in: WO.
Young, Lee W., "Invitation to Pay Additional Fees re Application No. PCT/US16/16360", dated Apr. 14, 2016, p. 2, Published in: WO.
Young, Lee W., "Invitation to Pay Additional Fees re Application No. PCT/US16/16358", dated Apr. 7, 2016, p. 2, Published in: WO.
Beijer, Gijsbertus, "International Preliminary Report on Patentability re Application No. PCT/US09/04550", dated Jan. 18, 2011, p. 8, Published in: WO.
Young, Lee W., "International Search Report and Writtion Opinion re Application No. PCT/US09/4550", dated Oct. 8, 2009, p. 10, Published in: US.
Beijer, Gijsbertus, "International Preliminary Report on Patentability re Application No. PCT/US09/048551", dated Jan. 18, 2011, p. 5, Published in: WO.
Young, Lee W., "International Search Report and Written Opinion re Application No. PCT/US09/48551", dated Oct. 8, 2009, p. 12, Published in: US.
Honda, Masashi, "International Preliminary Report on Patentability re Application No. PCT/US09/048555", dated Jan. 18, 2011, p. 6, Published in: WO.
Young, Lee W., "International Search Report and Written Opinion re Application No. PCT/US09/048555", dated Oct. 30, 2009, p. 12, Published in: US.
Honda, Masashi, "International Preliminary Report on Patentability re Application No. PCT/US09/048557", dated Jan. 18, 2011, Published in: WO.
Young, Lee W., "International Search Report and Written Opinion re Application No. PCT/US09/048557", dated Oct. 6, 2009, p. 11, Published in: US.
Nakamura, Yukari, "International Preliminary Report on Patentability re Application No. PCT/US10/058351", dated Oct. 16, 2012 , p. 7, Published in: WO.
Young, Lee. W., "International Search Report and Written Opinion re Application No. PCT/US12/25234", dated May 30, 2012, p. 8, Published in: PCT.
Hartmann, M., et al., "Specification for related PCT Patent Application No. PCT/US07/71373 filed", Jun. 15, 2012, Published in: PCT.
Wong, Kathy, "International Search Report and Written Opinion re Application No. PCT/US10/058351", dated Feb. 24, 2011, Published in: AU.
Wittmann-Regis, Agnes, "International Preliminary Report on Patentability re Application No. PC/TUS2012/025234", dated Feb. 13, 2014, p. 6, Published in: CH.
Meng, Q., et al., "A Temperature-Regulating Fiber made of PEG-Based Smart Copolymer", "Solar Energy Materials & Solar Cells", 2008, p. 1245-1252, No. 92, Publisher: Elsevier B.V.
Piel, C., "Polymerization of Ethene and Ethene-co-a-Olefin: Investigations on Short- and Long-Chain Branching and Structure-Proper", "Dissertation to the University of Hamburg", 2005, p. 159, Publisher: U. Hamburg, Published in: DE.
Doring et al., "Innovative Flame Retardants in E&E Applications", "2nd Edition", Jun. 2009, p. 36, Publisher: Phosphorus, Inorganic & Nitrogen Flame Retardants Association.
Rakotomalala, et al., "Recent Developments in Halogen Free Flame Retardants for Epoxy Resins for Electrical and Electronic Applications", 2010, p. 28 Publisher: Institute of Technical Chemistry, Karlsruhe Institute of Technology, Published in: DE.
Neugeboren, Craig A., "Response to Office Action re U.S. Appl. No. 12/486,396", dated Jan. 2, 2014, p. 8, Published in: US.
Neugeboren, Craig A., "Response to Aug. 11, 2010 Office Action re U.S. Appl. No. 12/174,609", dated Feb. 11, 2011, p. 20, Published in: US.
Neugeboren, Craig A., "Response to Office Action re U.S. Appl. No. 13/525,676", dated Feb. 25, 2014, p. 10, Published in: US.
Neugeboren, Craig A., "Response to Office Action re U.S. Appl. No. 11/078,656", dated Mar. 2, 2012, p. 11, Published in: US.
Neugeboren, Craig A., "Response to Office Aciton re U.S. Appl. No. 12/185,908", dated May 1, 2013, p. 15, Published in: US.
Gruber, Stephen S., "Response to Office Action re U.S. Appl. No. 13/040,692", dated May 6, 2013, p. 12, in: US.
Nuegeboren, Craig A., "Response to Office Action re U.S. Appl. No. 13/525,676", dated Jun. 20, 2013, p. 8, Published in: US.
Gruber, Stephen S., "Response to Office Action re U.S. Appl. No. 11/078,656", dated Jul. 30, 2013, p. 18, Published in: US.
Gruber, Stephen S., "Response to Office Action re U.S. Appl. No. 13/040,692", dated Sep. 18, 2013, p. 9, Published in: US.
Gruber, Stephen S., "Response to Office Action re U.S. Appl. No. 11/078,656", dated Oct. 15, 2012, p. 15, Published in: US.
Gruber, Stephen S., "Office Action re U.S. Appl. No. 11/078,656", dated Dec. 12, 2013, p. 8, Published in: US.
Gruber, Stephen S., "Response to office Action re U.S. Appl. No. 13/786,813", dated Dec. 13, 2013, p. 12, Published in: US.

(56) References Cited

OTHER PUBLICATIONS

Zonghua, Ren, "Response to Chinese Office Action re Application No. 200680007727.6", dated Jun. 21, 2010, p. 12, Published in: CN.
Aoki, Atsushi, "Response to Japanese Office Action re Application No. 2008500731", dated Apr. 24, 2012, p. 6, Published in: JP.
Koreana Patent Firm, "Response to Korean Office Action re Application No. 2007-7023012", dated Feb. 20, 2013, p. 2, Published in: KR.
Neugeboren, Craig A., "Response to Office Action re U.S. Appl. No. 11/078,656", dated Dec. 19, 2011, p. 11, Published in: US.
Neugeboren, Craig A., "Response to Restriction Requirement and Amendment re Aug. 10, 2010 Office Action, U.S. Appl. No. 12/174,607", dated Dec. 9, 2010, p. 7, Published in: US.
Percival, Shane, "Response to Jul. 5, 2012 Office Action re Taiwan Patent Application No. 095108055", dated Dec. 26, 2012, p. 6, Published in: US.
Rhodia PPMC, "Tolonate and Rhodocoat Product Specifications", Jun. 2004, p. 4, Published in: US.
Rojas, G., "ADMET Linear-Low Density Polyethylene: Synthesis, Characterization and Thermal Behavior of Precisely and Irregularly Se", "Dissertation to the University of Florida", 2008, p. 198 Publisher: U. FLA., Published in: US.
Rose, J. M., et al., "Living Polymerization of a-Olefins with an a-Diimine Ni(II) Catalyst: Formation of Well-Defined Ethylene-Propylene Copo", "J. Am. Chem. Soc.", 2006, pp. 4186-4187, vol. 128, No. 13, Publisher: Am. Chem. Soc'y, Published in: US.
Sanitized, "Silica/quat Sanitized T 99-19", "Webpage found at http://www.sanitized.com/en/business-partners/trademark-products/active-ingredients/silicaquat-t-99-19.html downloaded", Aug. 30, 2012, p. 2, Publisher: Sanitized, Published in: US.
Clariant, "Welcome to Textile Chemicals: Sanitized Silver", "Webpage found at http://www.clariant.com/C12571C400483A/vw-WebPagesByID downloaded", Aug. 30, 2012, p. 1, Publisher: CLARIANT, Published in: US.
Alkan, Cemil et al., "Polyurethanes as solid-solid phase change materials for thermal energy storage", "Solar Energy", Apr. 11, 2012, pp. 1761-1769, No. 86.
Hartmann, M., et al., "Specification for related U.S. Appl. No. 12/185,908 filed", Aug. 5, 2008, p. 44 Published in: US.
Stephens, C.H., et al., "Comparison of Propylene/Ethylene Copolymers Prepared with Different Catalysts", "Published online in Wiley InterScience (www.interscience.wiley.com)", 2006, p. 8, Publisher: Wiley Periodicals, Inc., Published in: US.
Anslyn and Dougherty, "Stereochemistry", "Modem Physical Organic Chemistry", 2005, p. 55, Publisher: University Science Books.
Su, J.C., et al., "A Novel Solid-Solid Phase Change Heat Storage Material with Polyurethane Block Copolymer Structure", "Energy Conversion and Management", pp. 3185-3191, vol. 47, No. (2006), Published in: US.
Sumitomo Seika Chemicals Co, Ltd., "PEO Water-Soluble Thermoplastic Resin", Website located at https://www.sumitomoseika.co.jp/documents/pc_PEO_applications.pdf, Oct. 4, 2012, p. 1.
Sworen, J.C., "Modeling Linear-Low Density Polyethylene: Copolymers Containing Precise Structures", "Dissertation to the University of Florida", 2004, p. 219, Publisher: U. FLA., Published in: US.
Taiwan IPO, "Taiwanese Office Action re ROC Patent Application No. 095108055", dated Jul. 3, 2012, p. 10, Published in: TW.
Wang, Daisy, "Response to Taiwan Office Action re Application No. 095108055", dated Jan. 17, 2013, p. 8, Published in: TW.
Thomson Research Associates, "Adding Value through Antimicrobial Product Protection: Ultra-Fresh—time tested performance", "Webpage located at http://www.ultra-fresh.com/home.php downloaded", Jul. 12, 2012, p. 2, Publisher: Thomson Research Associates, Published in: US.
Xiaowei, Gao, "Chinese Office Action re Application No. 201080066869.6", dated May 11, 2015, p. 10, Published in: CN.
Chenggong, Jia, "Chinese Office Action re Application No. 200980132232.X", dated Jun. 4, 2013, p. 7, Published in: CN.
Xiaowei, Gao, "Chinese Office Action re Application No. 201080066869.6", dated Jul. 1, 2014, p. 13, Published in: CN.

Wei, Su, "Chinese Office Action re Application No. 200780003506.6", dated Jul. 9, 2010, p. 14, Published in: CN.
Chenggong, Jia, "Chinese Office Action re Application No. 200980132054.0", dated Aug. 7, 2014, p. 7, Published in: CN.
Wei, Su, "Chinese Office Action re Application No. 200780003506.6", dated Aug. 31, 2011, p. 8, Published in: CN.
Haiqing, Li, "Chinese Office Action re Application No. 201210440162.8", dated Sep. 16, 2014, p. 12, Published in: CN.
Chenggong, Jia, "Chinese Office Action re Application No. 200980132232.X", dated Nov. 1, 2012, p. 53, Published in: CN.
Zonghua, Ren, "Response to Chinese Office Action re Application No. 200780003506.6", dated Jan. 20, 2011, p. 6, Published in: CN.
Neugeboren, Craig, "Response to Chinese Office Action dated Apr. 28, 2012 re Application No. 300780003506.6", dated Aug. 21, 2012, p. 3, Published in: US.
Neugeboren, Craig, "Reponse to Chinese Office Action dated Aug. 31, 2011 re Application No. 300780003506.6", dated Oct. 26, 2011, p. 3, Published in: US.
Neugeboren, Craig, "Reponse to Chinese Office Action Jul. 9, 2010 re Application No. 300780003506.6", dated Dec. 21, 2010, p. 5, Published in: US.
Huang, Shuhui, "Response to Chinese Office Action re Application No. 2012104401628", dated Mar. 31, 2015, p. 8, Published in: CN.
Chenggong, Jia, "Response to Chinese Office Action re Application No. 200980132054.0", dated Apr. 24, 2014, p. 6, Published in: CN.
Zonghua, Ren, "Response to Chinese Office Action re Patent Application No. 200680007727.6", dated Jun. 4, 2012, p. 7, Published in: CN.
Domski, G.J., et al., "Living alkene polymerization: New methods for the precision synthesis of polyolefins", "Prog. Polym. Sci.", Nov. 2006, p. 30-92, vol. 32, No. (2007), Publisher: Elsevier Ltd., Published in: US.
Dow, "Dow Elastomers: ENGAGE Product Selection Guide", "Webpage located at http://www.dow.com/elastomers/lit/engage_lit.html downloaded Jul. 10, 2012", Mar. 2012, p. 4, Publisher: The Dow Chemical Company, Published in: US.
Dow, "Dow Elastomers: AFFINITY Product Selection Guide", "Webpage located at http://www.dow.com/elastomers/lit/affinity_lit.htm downloaded Jul. 10, 2012", Nov. 2010, p. 4, Publisher: The Dow Chemical Company, Published in: US.
Dow Corning, "Dow Coming 8650 Polymer and Dow Corning BY16/876 Product Information Sheet", May 6, 2005, p. 2, Published in: US.
Dupont, "DuPont Elvaloy resins", "Webpage found at http://www2.dupont.com/Elvaloy/en_US downloaded", Oct. 19, 2012, p. 1, Publisher: DuPont, Published in: US.
Eldridge, J.E., et al, "Studies of the Cross-Linking Process in Gelatin Gels. III. Dependence of Melting Point on Concentration and Molecular We", Nov. 1954, p. 992-995, vol. 58, Publisher: U. Wis., Published in: US.
Schwalm, Reinhold, "US Coatings—Basics, Recent Development and New Applications", 2007, p. 316, Publisher: Elvsevier Science.
Chen, Changzhong et al, "Synthesis and performances of novel solidsolid phase change materials", Dec. 2, 2014, p. 9, Publisher: Applied Energy, Published in: CN.
Dupont, "Elvaloy AC Resins", "Webpage located at http://www2.dupont.com/Elvaloy/en_US/products/elvaloy_ac_resins.html downloaded Jul. 12, 2012", 2012, p. 2, Publisher: DuPont, Published in: Us.
Masson, Patrick, "Communication pursuant to Article 94(3) EPC re Application No. 06 735 750.9-2102", dated Feb. 8, 2012, p. 3, Published in: EP.
Lorenz, Markus, "Response to Communication Pursuant to Article 94(3) EPC", dated Aug. 13, 2012, p. 21, Published in: EP.
Lorenz, Markus, "Response to EP Office Action re Application No. 08022533.7", dated Nov. 16, 2010, p. 29, Published in: EP.
Lorenz, Markus, "Response to European Office Action re Application No. 08022532.9", dated Nov. 16, 2010, p. 22, Published in: EP.
U.S. Environmental Protection Agency, "Ultra Violet and Electron Beam (UV/EB) Cured coatings, Inks, and Adhesives", Jul. 2001, p. 99, Published in: US.
Masson, Patrick, "European Office Action re Application No. 10 182 697.2-1302", dated Nov. 18, 2013, p. 3, Published in: EP.

(56) References Cited

OTHER PUBLICATIONS

Hu, Ji, et al., "Study on Phase Change Characteristics of PET-PEG Copolymers", "Journal of Macromolecular Science", Feb. 23, 2006, pp. 615-621, vol. B:Physics, No. 45, Published in: US.
Hollender, C., "European Search Report re Application No. 09798539", dated Jun. 5, 2014, p. 4, Published in: EP.
Hollender, C., "Extended European Seach Report re Appl. No. PCT/US2009/048551", dated Jun. 13, 2014, p. 8, Published in: EP.
Holldender, C., "Extended European Search Report re Application No. PCT/US2009/048555", dated Jun. 25, 2014, p. 8, Published in: EP.
Hollender, C., "European Search Report re Application No. 080225331", dated Dec. 4, 2009, p. 7, Published in: EP.
Hollender, C., "European Search Report re Application No. 08022532.9", dated Dec. 4, 2009, p. 6, Published in: EP.
Magrizo, Simeon, "European Search Report re Application No. 12754849.3", dated Jul. 21, 2015, p. 7, Published in: EP.
Exxonmobil, "Specialty Elastomers: Exact plastomers", "Webpage located at http://www.exxonmobilchemical.com/Chem-English/brands/exact-plastomers.aspx?ln=productsservices downloaded Jul. 10, 2012", p. 1, Publisher: ExxonMobil Chemical, Published in: US.
Fan, W., et al., "Alternating Stereospecific Copolymerization of Ethylene and Propylene with Metallocene Catalysts", "J. Am. Chem. Soc.", Sep. 8, 2001, pp. 9555-9563, vol. 2001, No. 123, Publisher: Am. Chem. Soc'y, Published in: US.
Feldman, Dorel, "Polymer Nanocomposites: Flammability", Jun. 2013, p. 10, Published in: CA.
Flack, et al., "A mathematical model for spin coating of polymer resists", 1984, p. 9.
Fujita, T., et al., "Polymerization of Alkenes", "Comprehensive Organometallic Chemistry III", 2007, p. 691-734, No. 11.20, Publisher: Elsevier, Ltd.
Galbraikh, et al., "Chemical Transformations of Cellulose", Oct. 11, 1973, p. 44, Published in: RU.
Goodman, et al., "Stereochemistry of Polymers and Biopolymers", "Polytechnic School of Brooklyn", 1966, p. 27, Publisher: Polymer Research Institute, Published in: US.
Halosource Corporate, "Applications", "Webpage found at http://www.haloshield.com/how/applications downloaded", Aug. 30, 2012, p. 1 Publisher: HaloSource, Inc., Published in: US.
Hartmann, et al, "Specification for related U.S. Appl. No. 12/174,607, filed Jul. 16, 2008", Jul. 16, 2008, p. 71, Published in: US.
Hartmann, et al, "Specification for related U.S. Appl. No. 12/174,609, filed Jul. 16, 2008", , p. 68, Published in: US.
Hartmann, Mark, "Declaration of Mark Hartmann Under 37 C.F.R. 1.132", Feb. 11, 2011, p. 10, Published in: US.
Hexion Specialty Chemicals, "Heloxy Modifier 68 Technical Data Sheet", 2005, p. 4, Published in: US.
Hutchison, et al., "Photoinitian of Vinyl Polymerization by Aromatic Carbonyl Compounds", Jul. 23, 1973, p. 38, Published in: UK.
Idemitsu Technofine Co., Ltd., "Specification for Airtechno Fabric", p. 3.
Ineos Oxide, "Methoxy Polyethylene Glycols Technical Data Sheet", Known to exist as early as Nov. 3, 2015, p. 4.
Ivin, K.J., et al., "Olefin Metathesis and Metathesis Polymerization", 1997, p. 184, Publisher Academic Press, Published in: US.
Jenkem Technology USA, "PEG Products", "Website located at http://www.jenkemusa.com/products", Known to exist as early as Nov. 4, 2015, p. 7.
Matsunami, Yumiko, "Japanese Office Action re Application No. 2011-518769", dated Jan. 27, 2015, p. 10, Published in: JP.
Masashi, Inoue, "Japanese Office Action re Application No. 2008-552584", dated Jan. 29, 2013, p. 5, Published in: JP.
Hayashi, Yasushi, "Japanese Office Action re Application No. 2011-508662", dated Mar. 11, 2014, p. 8, Published in: JP.
Ryuichirou, Kawano, "Japanese Office Action re Application No. 2013-504882", dated Mar. 11, 2014, p. 5, Published in: JP.
Yamazaki, T., "Japanese Office Action re Application No. 2011-518770", dated May 29, 2013, p. 9, Published in: JP.
Kaga Naoto, "Japanese Office Action re Application No. 2013-086016", dated Jun. 23, 2015, p. 4, Published in: JP.
Matsumoto, Hiroshi, "Japanese Office Action re Application No. 2014-196365", dated Jul. 24, 2015, p. 8, Published in: JP.
Ieki, Masami, "Japanese Office Action re Application No. 2013-161059", dated Jul. 29, 2014, p. 6, Published in: JP.
Miyazaki, Daisuke, "Japanese Office Action re Application No. 2013-086016", dated Aug. 5, 2014, p. 6, Published in: JP.
Yoshizawa, Eiichi, "Japanese Office Action re Application No. 2011-518769", dated Aug. 25, 2015, p. 6, Published in: JP.
Ichinomiya, Rie, "Japanese Office Action re Application No. 2008-500731", dated Sep. 10, 2013, p. 4, Published in: JP.
Masashi, Inoue, "Japanese Office Action re Application No. 2008-552584", dated Oct. 4, 2011, p. 5, Published in: JP.
Ichinomiya, Rie, "Japanese Office Action re Application No. 2008-500731", dated Oct. 16, 2012, p. 12, Published in: JP.
Ryuchiro, Kawano, "Japanese Office Action re Application No. 2013-504882", dated Nov. 18, 2014, p. 6, Published in: JP.
Nakamura, Yusuke, "Japanese Office Action re Application No. 2012-539986", dated Dec. 2, 2014, p. 10, Published in: JP.
Neugeboren, Craig, "Reponse to Japanese Office Action re Application No. 2008-552584", dated Apr. 3, 2012, Published in: US.
Percival, Shane, "Response to Japanese Office Action re Application No. 2008-500731", dated Apr. 12, 2012, p. 10, Published in: JP.
Ichinomiya, Rie, "Response Japanese Office Action re Application No. 2008-500731", dated Apr. 16, 2013, p. 19, Published in: JP.
Koga, Tetsuji, "Response to Japanese Office Action re Application No. 2011-518770", dated Nov. 7, 2013, p. 2, Published in: JP.
Seiwa, "Response to Japanese Office Action re Application No. 2013-086016", dated Feb. 4, 2015, p. 4, Published in: JP.
Seiwa, "Response to Japanese Office Action re Application No. 2014-003397", dated May 28, 2015, p. 3, Published in: JP.
Koga, Tetsuji, "Response to Japanese Office Action re Application No. 2011-518769", dated Jun. 3, 2014, p. 14, Published in: JP.
Fukui, M., "Japanese Office Action re Application No. 2011-518769", dated Nov. 28, 2013, p. 12, Published in: JP.
Fukui, M., "Japanese Office Action re Application No. 2011-518771", dated Nov. 28, 2013, p. 8, Published in: JP.
Ichinomiya, Rie, "Japanese Office Action re Patent Application No. 2008-500731", dated Oct. 5, 2012, p. 12, Published in: JP.
Kakuchi, et al., "Chiral Polymers", "Encyclopedia of Polymer Science and Technology", 2009, p. 32, Publisher: John Wiley & Sons, Inc., Published in: US.
Outlast, "KLIMEO Competitive Fabric and Outlast Testing Results", Jan. 15, 2003 , p. 55.
Lee, Jae-Woong, "Korean Office Action re Application No. 2013-7027992", dated Feb. 6, 2014, p. 13, Published in: KR.
Lee, Geun-Wan, "Korean Office Action re Application No. 2014-7016979", dated Feb. 13, 2015, p. 10, Published in: KR.
Lee, Jae-Woong, "Korean Office Action re Application No. 2008-7020916", dated Apr. 26, 2013, p. 12, Published in: KR.
Lee, Geun-Wan, "Korean Office Action re Application No. 2014-7016979", dated Aug. 14, 2014, p. 5, Published in: KR.
Shim, Yoo-Bong, "Korean Office Action re Application No. 2007-7023012", dated Aug. 22, 2012, Published in: KR.
Kraton Performance Polymers, Inc., "Kraton Polymers", Oct. 19, 2012, p. 3.
Kumar, A., "Morphology, Crystallization and Melting Behavior of Statistical Copolymers of Propylene with Ethylene, 1-Butene, 1-Hexen", "Dissertation for Virginia Polytechnic Institute and State University", Jun. 21, 2001, p. 129, Publisher: Va. Poly. Inst., Published in: US.
Kuraray Co., Ltd., "What is SEPTON?", 2004, p. 1.
Laysan Bio, Inc., "Products", "Website located at http://laysanbio.com/index.php?submenu=Products&src=gendocs&link=Products_new&category=Main&gclid=CMHF1fOf98gCFYM-aQodp80BKg", Known to exist as early as Nov. 4, 2015, p. 2.
Mulcahy, Peter D., "Office Action re U.S. Appl. No. 11/078,656", dated Jan. 5, 2012, p. 12, Published in: US.
Neugeboren, Craig, "Response to Office Action re U.S. Appl. No. 11/342,279", dated Feb. 8, 2010, p. 14, Published in: US.
Boyle, Robert C., "Office Action Re Patent U.S. Appl. No. 12/174,607", dated Feb. 14, 2011, p. 17, Published in: US.

(56) References Cited

OTHER PUBLICATIONS

Boyle, Robert C., "Office Action re U.S. Appl. No. 12/486,396", dated Feb. 17, 2012, p. 15, Published in: US.
Boyle, Robert C., "Office Action re U.S. Appl. No. 12/486,396", dated Feb. 27, 2014, p. 19, Published in: US.
Salvatore, Lynda, "Office Action re U.S. Appl. No. 13/235,676", dated Mar. 4, 2013, p. 10, Published in: US.
Boyle, Robert C., "Office Action re U.S. Appl. No. 12/486,396", dated Mar. 8, 2011, p. 10, Published in: US.
Mulcahy, Peter D., "Office Action re U.S. Appl. No. 11/078,656", dated Mar. 29, 2013, p. 25, Published in: US.
Mulcahy, Peter D., "Office Action re U.S. Appl. No. 11/078,656", dated Mar. 31, 2014, p. 31, Published in: US.
Clariant, "Your Universally Applicable Polymer Functional Chemicals Division", 2007, p. 36, Publisher: Clariant International Ltd, Functional Chemicals Division, Published in: CH.
Clariant International, Ltd, "Raw Material Selection of Polyurethanes", 2014, p. 4.
Clariant, "Colour Chronicle", "Colour Chronicle 2", Oct. 2011, p. 28 No. 2, Publisher: Clariant Chemicals (India) Limited Publication, Published in: IN.
Chenggong, Jia, "Chinese Office Action re Application No. 200980132054.0", dated Jan. 16, 2014, p. 7, Published in: CN.
Chenggong, Jia, "Chinese Office Action re Application No. 200980132239.1", dated Jan. 23, 2014, p. 6, Published in: CN.
Jianfei, Cao, "Chinese Office Action re Patent Application No. 200680007727.6", dated Feb. 21, 2012, p. 8, Published in: CN.
Chenggong, Jia, "Chinese Office Action re Application No. 200980132239.1", dated Mar. 5, 2013, p. 22, Published in: CN.
Chenggong, Jia, "Chinese Office Action re Application No. 200980132054.0", dated Apr. 23, 2013, p. 22, Published in: CN.
Wei, Su, "Chinese Office Action re Application No. 200780003506.6", dated Apr. 28, 2012, p. 7, Published in: CN.
Boyle, Robert C., "Office Action re U.S. Appl. No. 12/174,609", dated Apr. 6, 2011, p. 35, Published in: US.
Korean Patent Firm, "Korean Office Action re Application No. 2007-7023012", dated Apr. 23, 2013, p. 11, Published in: KR.
Salvatore, Lynda, "Office Action re U.S. Appl. No. 12/185,908", dated Apr. 26, 2012, p. 7, Published in: US.
Yamazaki, "Japanese Office Action re U.S. Appl. No. 2011-518770", dated May 29, 2013, p. 9, Published in: JP.
Gugliotta, Nicole T., "Office Action re U.S. Appl. No. 13/779,035", dated Jun. 1, 2015, p. 9, Published in: US.
Salvatore, Lynda, "Office Action re U.S. Appl. No. 12/185,908", dated Jun. 9, 2014, p. 50, Published in: US.
Salvatore, Lynda, "Office Action re U.S. Appl. No. 12/762,119", dated Jun. 10, 2011, p. 29, Published in: US.
Gugliotta, Nicole, "Office Action re U.S. Appl. No. 11/342,279", dated Jun. 11, 2010, p. 28, Published in: US.
Mulcahy, Peter D., "Office Action re U.S. Appl. No. 11/078,656", dated Jun. 13, 2012, p. 19, Published in: US.
Boyle, Robert C., "Office Action re U.S. Appl. No. 12/174,607", dated Jun. 14, 2013, p. 39, Published in: US.
Boyle, Robert C., "Office Action re U.S. Appl. No. 12/174,609", dated Jun. 17, 2013, p. 42, Published in: US.
Boyle, Robert C., "Office Action re U.S. Appl. No. 12/486,396", dated Jul. 2, 2013, p. 25, Published in: US.
Salvatore, Lynda, "Office Action re U.S. Appl. No. 13/525,676", dated Jul. 17, 2014, p. 14, Published in: US.
Rea, Christine, "Office Action re U.S. Appl. No. 13/040,692", dated Jul. 18, 2013, p. 86, Published in: US.
Gugliotta, Nicole T., "Office Action re U.S. Appl. 11/342,279", dated Aug. 6, 2009, p. 18, Published in: US.
Gugliotta, Nicole, "Office Action re U.S. Appl. No. 12/193,296", dated Aug. 8, 2012, p. 23, Published in: US.
Boyle, Robert C., "Office Action re U.S. Appl. No. 12/174,607", dated Aug. 10, 2010, p. 9, Published in: US.
Boyle, Robert C., "Office Action re U.S. Appl. No. 12/174,609", dated Aug. 11, 2010, p. 22, Published in: US.
Salvatore, Lynda, "Office Action re U.S. Appl. No. 12/185,908", dated Aug. 16, 2013, p. 13, Published in: US
Boyle, Robert C., "Office Action re U.S. Appl. No. 12/486,396", dated Sep. 9, 2011, p. 48, Published in: US.
Gugliotta, Nicole, "Office Action re U.S. Appl. No.I 11/342,279", dated Sep. 16, 2011, p. 28, Published in: US.
Gugliotta, Nicole, "Office Action re U.S. Appl. No. 12/193,296", dated Sep. 19, 2011, p. 19, Published in: US.
Mosser, Kathleen M., "Office Action re U.S. Appl. No. 12/908,303", dated Sep. 23, 2011, p. 16, Published in: US.
Salvatore, Lynda, "Office Action re U.S. Appl. No. 13/525,676", dated Sep. 25, 2013, p. 61, Published in: US.
Mulcahy, Peter D, "Office Action re U.S. Appl. No. 11/078,656", dated Sep. 27, 2011, p. 19, Published in: US.
Salvatore, Lynda, "Office Action re U.S. Appl. No. 12/185,908", dated Nov. 8, 2012, p. 36, Published in: US.
Mulcahy, Peter D., "Office Action re U.S. Appl. No. 11/078,656", dated Dec. 4, 2013, p. 10, Published in: US.
Rea, Christine, "Office Action re U.S. Appl. No. 13/040,692", dated Dec. 6, 2012, p. 50, Published in: US.
Boyle, Robert C., "Office Action re U.S. Appl. No. 12/174,607", dated Dec. 13, 2010, p. 2, Published in: US.
Gugliotta, Nicole T., "Office Action re U.S. Appl. No. 11/342,279", dated Dec. 27, 2010, p. 49, Published in: US.
Boyle, Robert C., "Office Action re U.S. Appl. No. 12/174,607", dated Sep. 23, 2011, p. 21, Published in: US.
Neugeboren, Craig, "Response to Office Action re U.S. Appl. No. 12/486,396", dated Jan. 9, 2012, p. 8, Published in: US.
Neugeboren, Craig, "Response to Office Action re U.S. Appl. No. 12/174,609", dated Feb. 11, 2011, p. 20, Published in: US.
Neugeboren, Craig A., "Response to Office Action re U.S. Appl. No. 12/185,908", dated Feb. 11, 2014, p. 15, Published in: US.
Neugeboren, Craig, "Response to Office Action re U.S. Appl. No. 12/193,296", dated Mar. 19, 2012, p. 20, Published in: US.
Neugeboren, Craig, "Response to US Office Action re U.S. Appl. No. 12/185,908", dated May 29, 2012, p. 8, Published in: US.
Neugeboren, Craig, "Response to Office Action re U.S. Appl. No. 11/342,279", dated Jun. 23, 2011, p. 11, Published in: US.
Neugeboren, Craig, "Response to Office Action re U.S. Appl. No. 12/174,607", dated Jul. 28, 2011, p. 20, Published in: US.
Neugeboren, Craig, "Response to Office Action re U.S. Appl. No. 12/174,609", dated Aug. 4, 2011, p. 20, Published in: US.
Neugeboren, Craig, "Response to Office Action re U.S. Appl. No. 12/486,396", dated Aug. 5, 2011, p. 2, Published in: US.
Neugeboren, Craig, "Response to Office Action re U.S. Appl. No. 12/486,396", dated Aug. 17, 2012, p. 6, Published in: US.
Gruber, Stephen S., "Reponse to Office Action re U.S. Appl. No. 12/193,296", dated Nov. 8, 2012, p. 8, Published in: US.
Neugeboren, Craig, "Response to office Action re U.S. Appl. No. 12/762,119", dated Nov. 28, 2011, p. 12, Published in: US.
Neugeboren, Craig, "Response to Office Action re U.S. Appl. No. 12/174,607", dated Dec. 13, 2011, p. 13, Published in: US.
Neugeboren, Craig, "Response to Office Action re U.S. Appl. No. 12/174,607", dated Dec. 21, 2010, p. 7, Published in: US.
Oakley, G. W., "Solid-State Olefin Metathesis", "Dissertation for the University of Florida", 2004, p. 157, Publisher: U. FLA., Published in: US.
Neugeboren, Craig, "Preliminary Amendment re U.S. Appl. No. 12/193,296", dated Jun. 28, 2011, p. 6, Published in: US.
Young, Lee W., "International Search Report and Written Opinion re Application No. PCT/US07/61081", dated Jul. 21, 2008, p. 12, Published in: PCT.
Nickitas-Etienne, Athina, "International Preliminary Report on Patentability re Application No. PCT/US09/048548", dated Jan. 18, 2011, p. 8, Published in: CH.
Young, Lee W., "Internartional Search Report and Written Opinion re Application No. PCT/US09/48548", dated Oct. 30, 2009, p. 15, Published in: US.
Hartmann, et al, "Specification of U.S. Appl. No. 11/078,656", filed Mar. 11, 2005, p. 41, Published in: US.
Hartmann, et al, "Specification of U.S. Appl. No. 13/040,692", filed Mar. 4, 2011, p. 64, Published in: US.

(56) References Cited

OTHER PUBLICATIONS

Aldrich Chemical Co., "Olefin Metathesis", "ChemFiles", 2009, p. 12 vol. 9, No. 6, Publisher: sigma-adrich.com, Published in: US.

Meisei Chemical Works, Ltd, "Water-Soluble Thermoplastics", "Website located at http://www.meisei-chem.co.ip/english/products/alkox/alkox_er.html", Jan. 1, 2015, p. 4.

Atiqullah, M., et al., "Synthesis of Functional Polyolefins using Metallocenes: A Comprehensive Review", "Polymer Reviews, downloaded Aug. 30, 2012", Apr. 19, 2010, p. 178-230, vol. 50, No. 2, Publisher: King Fahd University of Petroleum & Minerals, Published in: US.

BASF, Inc., "Specification Sheet for Laromer Grades", Sep. 2007, p. 4, Published in: US.

Baughman, T.W., "Functionalized Ethylene Copolymers and Materials Via Olefin Metathesis Polymerization", "Dissertation to the University of Florida", 2006, p. 204, Publisher: U. FLA., Published in: US.

Berda, Eric B., "ADMET Amphiphiles", "Dissertation to the University of Florida", 2008, p. 149, Publisher: U. FLA., Published in: US.

Broadpharm, "PEG Linkers", Website located at http://www.broadpharm.com/products.php?gclid=CPC3rbqd98gCFQaOaQodQBMOKA, Known to exist as early as Nov. 4, 2015, p. 1.

Young, Lee W., "Invitation to Pay Additional Fees re Application No. PCT/US16/16358", Apr. 7, 2016, p. 2, Published in: WO.

Meini, Stefano, "Supplementary European Search Report Re Application No. 16747186.1-1108 / 3254331 PCT/US2016016360", dated Jun. 7, 2018, p. 9, Published in: EP.

Mohri, Mineko, "International Prelimanary Report on Patentability Re: PCT/US2016/016360", dated Aug. 17, 2017, p. 15, Published in: WO.

Ohara, Brian, "Final Office Action Regarding U.S. Appl. No. 14/614,223", dated Jun. 15, 2017, p. 35, Published in: US.

Ohara, Brian, "Office Action Regarding U.S. Appl. No. 14/614,223", dated Jan. 17, 2017, p. 102, Published in: US.

Otero, Vanessa, "Response to Office Action dated Jan. 17, 2017 Re: U.S. Appl. No. 14/614,223", filed Apr. 17, 2017, p. 16, Published in: US.

Otero, Vanessa, "Response to Final Office Action dated Jun. 15, 2017 Re: U.S. Appl. No. 14/614,223", filed Aug. 15, 2017, p. 15, Published in: US.

European Patent Office, Office Action Regarding European Patent Application No. 16747186.1', Jan. 29, 2019, p. 6, Published in: EU.

\* cited by examiner

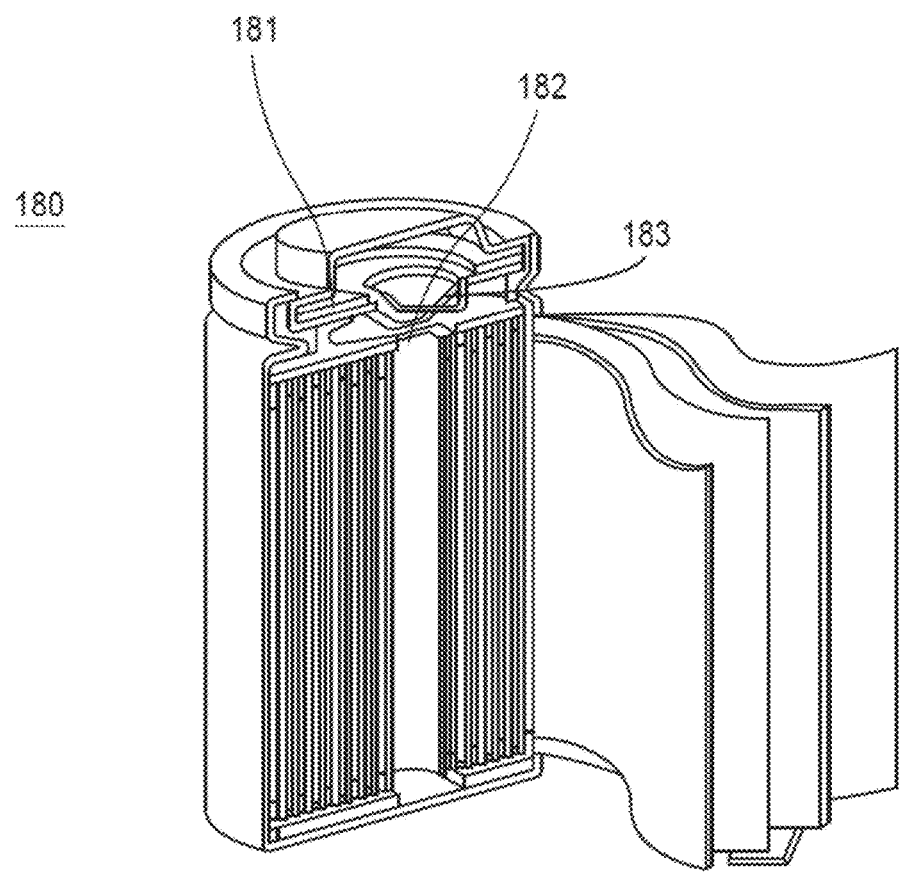

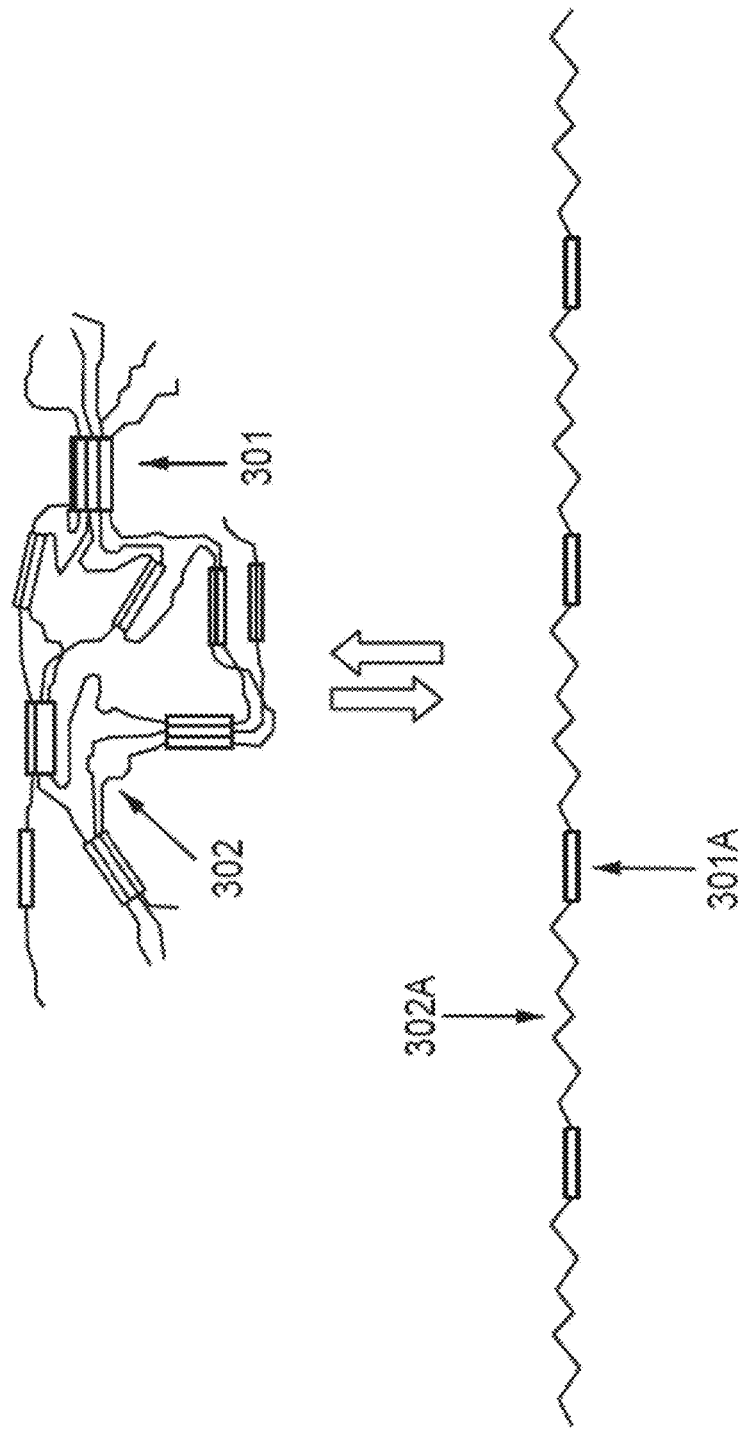

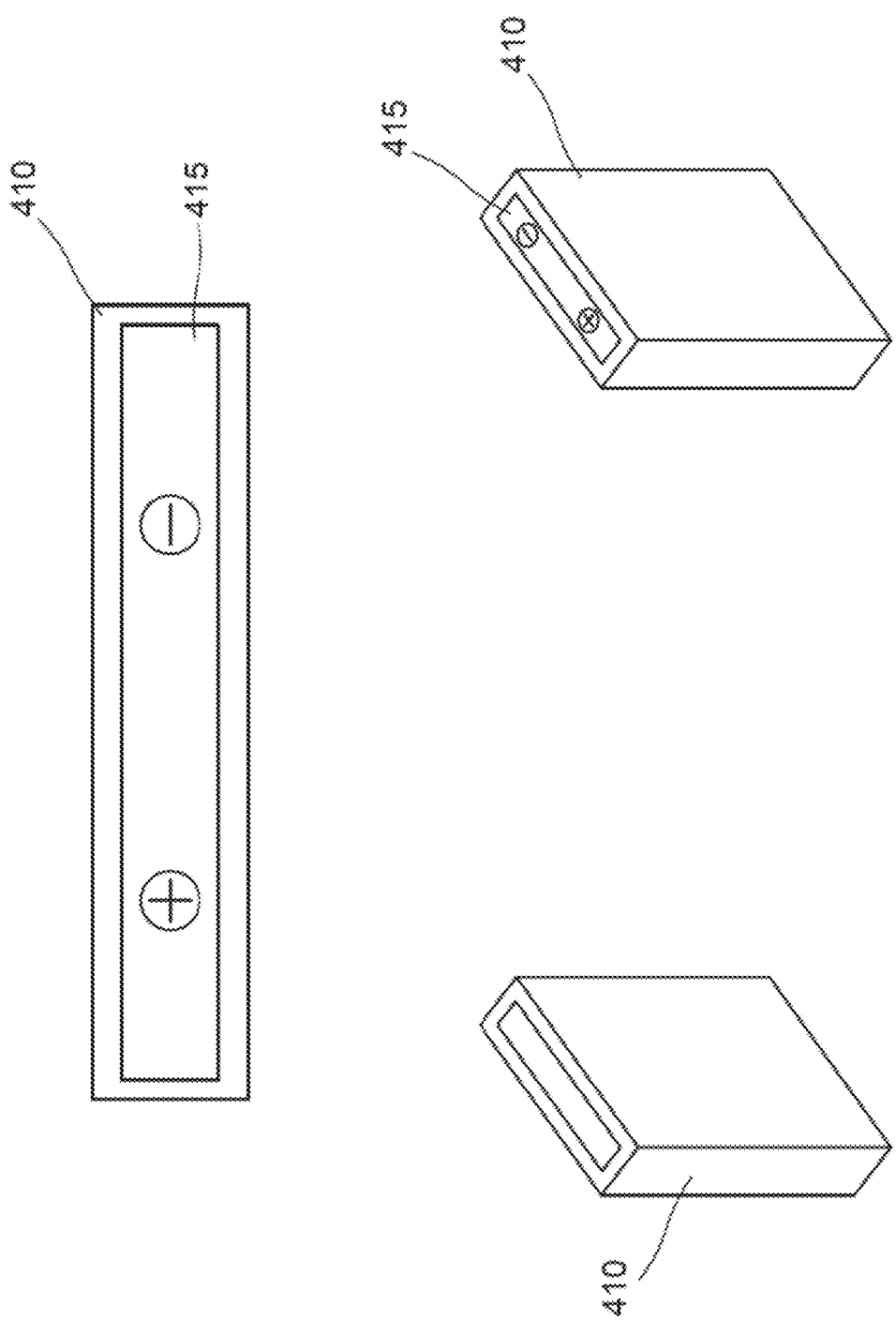

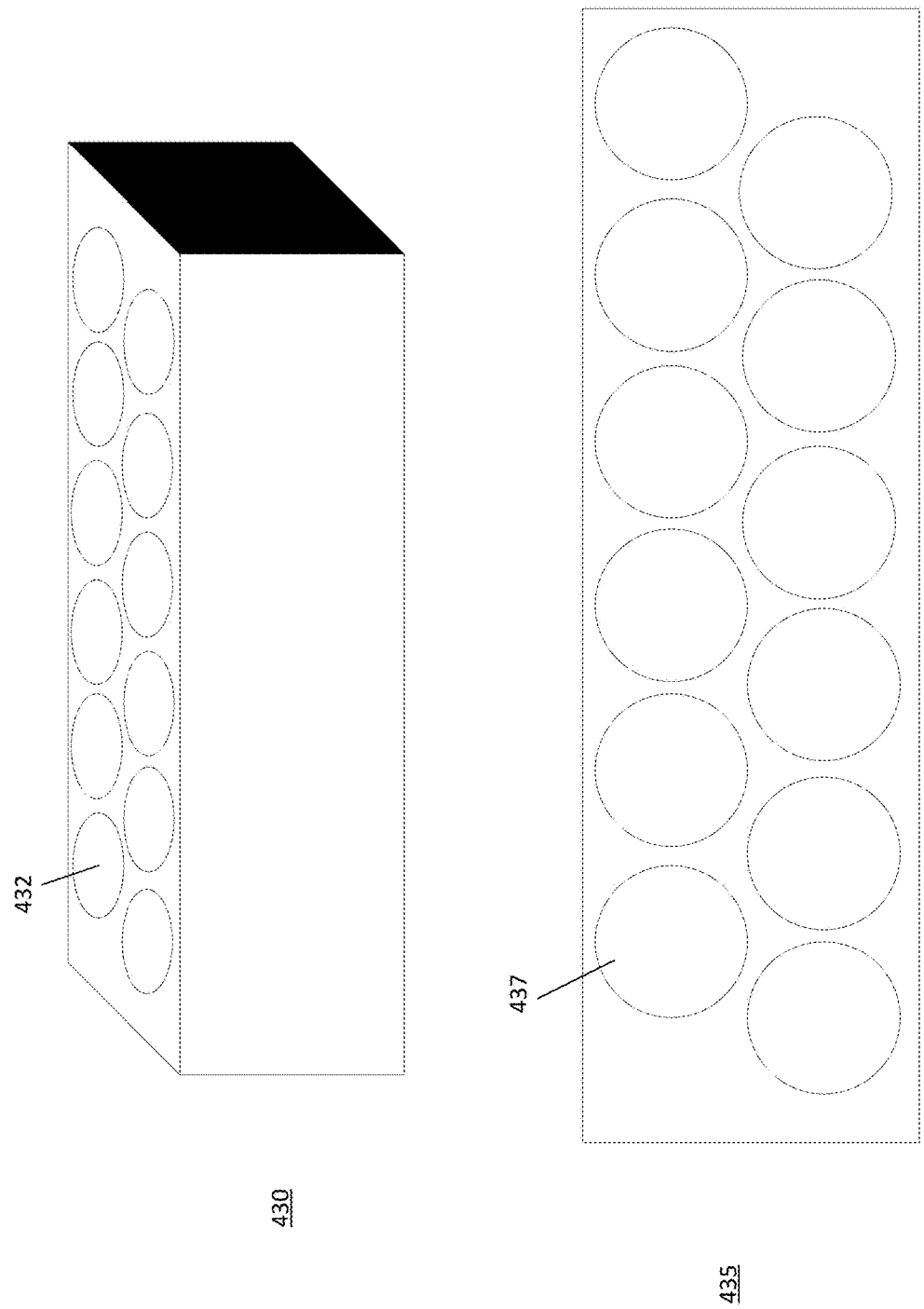

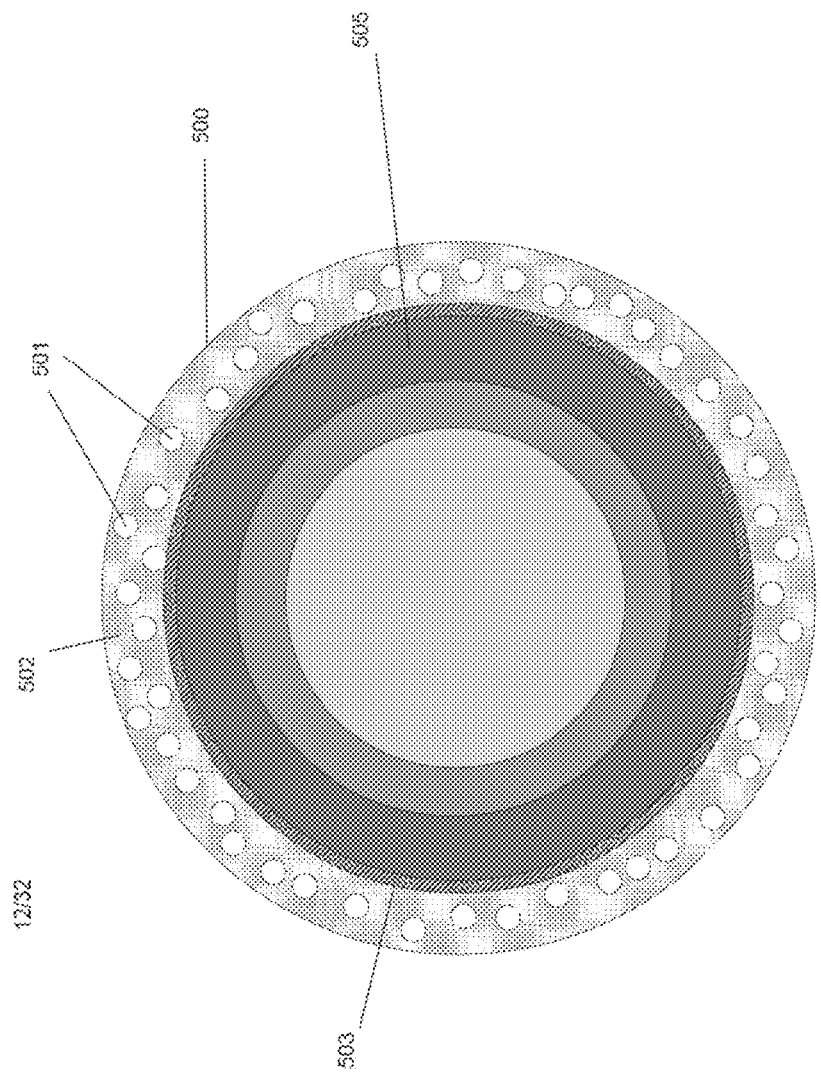

SYSTEMS, STRUCTURES AND MATERIALS FOR ELECTROCHEMICAL DEVICE THERMAL MANAGEMENT

CROSS REFERENCE TO RELATED APPLICATIONS

This application is a continuation-in-part of U.S. patent application Ser. No. 14/614,223 filed Feb. 4, 2015 and entitled "SYSTEMS, STRUCTURES AND MATERIALS FOR ELECTROCHEMICAL DEVICE THERMAL MANAGEMENT," the entire disclosure of which is hereby incorporated by reference for all proper purposes, as if fully set forth herein.

FIELD OF THE DISCLOSURE

In general, the present disclosure relates to systems, structures and compositions used to enhance the performance and safety of electrochemical devices by managing their thermal properties.

BACKGROUND OF THE DISCLOSURE

Demand continues to grow for electrochemical devices, such as batteries and capacitors, that can power portable electronics, power tools, components of vehicles, and entire vehicles themselves. Many modern battery and electric double layer capacitor systems (EDLCS), in which multiple battery or capacitor cells can be packed near each other, have high power and energy density requirements for operation. As an example, Lithium-ion (Li ion), Li ion polymer, and Li ion liquid batteries have become the popular choice for a wide range of applications, especially in portable electronics and electric vehicles because of their energy density, high voltage, and negligible memory effects. However, larger power demands and increasing cell density of Li ion battery packs result in higher operating temperatures, especially under peak loads. Li ion batteries, as well as most other types of commercial electrochemical cell chemistries, are susceptible to degrading or aging at high temperatures, which leads to rapid loss of capacity over subsequent charge/discharge cycles as well as reduced overall power output.

It is well known that the heat given off by batteries during charge and discharge has detrimental effects on the performance and longevity of the batteries. It is known that this heat can create safety hazards as well. Similar concerns exist regarding other kinds of electrochemical cells. Regarding battery performance and longevity, an increase in operational heat can reduce such performance and longevity even if the heat is not severe enough to create a safety hazard. For example, an increase in just 10 to 20 degrees Celsius can result in a drastic reduction in battery life. External heat conditions can degrade a battery, but in addition, the repeated charge and discharge of a battery itself in operation can cause drastic thermal escalation. In the prior art, there currently exist a number of insulators that attempt to mitigate large temperature escalation during charge and discharge, thereby relieving performance degradation over life of the battery and increasing the safety of the battery system. There are also existing battery cell covers and sleeves that have mechanical properties that protect cells from external damage. The existing covers, sleeves, and insulators have varying degrees of effectiveness.

Existing commercial battery cells and packs utilize various passive and active cooling systems in order to manage temperature fluctuations generated by both ambient conditions and cell operation. Both active and passive thermal management systems rely on thermal transfer of heat away from the cell's surface, thereby inhibiting core temperature rise and limiting material degradation. The effectiveness of regulating core temperatures is both a function of the ability to efficiently transfer heat away from the cell surface and the inherent thermal properties of the battery materials. Active cooling methods include forced air convection, fluidized cooling, and heat pipes, which rely on pumps, fans, radiators, and connections to function. The equipment required for these systems can be bulky, heavy, and expensive. While active cooling methods are effective in shuttling heat away from a surface, especially during significant thermal generation, their size and complexity are prohibitive in many applications, such as in portable electronics and tools.

Regarding the safety hazards associated with battery heat, it is well known that overheated cells can cause fires and explosions, and subsequently produce toxic products and gases, especially if certain cells or their components come in direct contact with each other. Battery safety has become increasingly important as the number of consumer devices that rely on batteries has increased. Consumers increasingly come in physical contact with batteries in their phones, laptops, and other portable devices. Additionally, many vehicle components and entire vehicles are now powered by batteries, and the safety requirements of batteries in those applications are especially high. For example, battery packs used to power components of airplanes must be extremely fire resistant, due to the danger associated with fires on airplanes. As another example, electric vehicles powered by battery packs have the risk of damage to the battery packs due to impacts from collisions. One problem is that overheating can cause a phenomenon known as thermal runaway, wherein the overheating of one cell can cause other nearby cells to overheat, and the combined effect exponentially increases the temperature of many cells at once, which can lead to fires or explosions. To simply prevent cells from physically contacting each other, sleeves made of various materials, such as PVC and cardboard have been used, though many such materials have little to no heat-resistant effects. There exists a need for electrochemical cell casings or sleeves that offer improved protection and thermal management over the prior art.

SUMMARY OF THE DISCLOSURE

Exemplary embodiments are summarized below. These and other embodiments are more fully described in the Detailed Description section. It is to be understood, however, that there is no intention to limit the disclosure to the forms described in this Summary of the Disclosure or in the Detailed Description. One skilled in the art can recognize that there are numerous modifications, equivalents and alternative constructions that fall within the spirit and scope of the disclosure as expressed in the claims.

In one aspect, a casing for the thermal management and protection of an electrochemical cell is provided. The casing may comprise an inner surface configured to be in physical contact with at least a portion of an outer surface of an electrochemical cell. The inner surface may be substantially solid at room temperature. The casing may also comprise a polymer matrix which itself comprises two or more temperature management materials. At least one of the two or more temperature management materials may comprise a microencapsulated phase change material having a latent heat of at least 5 Joules per gram and a transition temperature between 0° C. and 100° C., and at least one other of the two or more temperature management materials may comprise an elastomeric material. The polymer matrix may be substantially homogeneous.

In another aspect, another casing for the thermal management and protection of an electrochemical cell is provided. The casing may comprise an inner surface configured to be in physical contact with at least a portion of an outer surface of an electrochemical cell. The inner surface may be substantially solid at room temperature. The casing may also comprise a polymer matrix, which itself comprises two or more temperature management materials. At least one of the two or more temperature management materials may comprise a polymeric phase change material having a latent heat of at least 5 Joules per gram and a transition temperature between 0° C. and 100° C., and at least one other of the two or more temperature management materials may comprise an elastomeric material. The polymer matrix may be substantially homogeneous.

In other aspects, a container for the thermal management and protection of an electrochemical cell pack, configured to be in physical contact with a plurality of electrochemical cells, is provided. The container may be substantially solid at room temperature. The casing may also comprise a polymer matrix which itself comprises two or more temperature management materials. At least one of the two or more temperature management materials may comprise a microencapsulated phase change material having a latent heat of at least 5 Joules per gram and a transition temperature between 0° C. and 100° C., and at least one other of the two or more temperature management materials may comprise an elastomeric material. The polymer matrix may be substantially homogeneous.

Another aspect provides a portable electrochemical-cell-powered device, which comprises one or more electrochemical cells and a casing for one or more of the electrochemical cells. The casing may comprise an inner surface configured to be in physical contact with at least a portion of an outer surface of an electrochemical cell. The inner surface may be substantially solid at room temperature. The casing may also comprise a polymer matrix which itself comprises two or more temperature management materials. At least one of the two or more temperature management materials may comprise a microencapsulated phase change material having a latent heat of at least 5 Joules per gram and a transition temperature between 0° C. and 100° C., and at least one other of the two or more temperature management materials may comprise an elastomeric material. The polymer matrix may be substantially homogeneous.

Yet another aspect provides a vehicle, comprising at least one component powered by an electrochemical pack and a container configured to be in physical contact with a plurality of electrochemical cells. The container may be substantially solid at room temperature. The casing may also comprise a polymer matrix which itself comprises two or more temperature management materials. At least one of the two or more temperature management materials may comprise a microencapsulated phase change material having a latent heat of at least 5 Joules per gram and a transition temperature between 0° C. and 100° C., and at least one other of the two or more temperature management materials may comprise an elastomeric material. The polymer matrix may be substantially homogeneous.

Yet other aspects of the disclosure provide a casing for the thermal management of an electrochemical cell. The casing may comprise an inner surface configured to be in physical contact with at least a portion of an outer surface of an electrochemical cell, and a composite polymeric phase change material comprising a polyether polyol and one or more branching or crosslinking agents. When the branching agent or crosslinking agent is reacted with the polyether polyol, the branching agent or crosslinking agent may change a length of a chain of the polyether polyol and may change an original melting point and latent heat of the polyether polyol.

Another aspect provides a composite polymeric material for electrochemical cell thermal management. The composite polymeric material may comprise a crosslinked polyether polyol phase change material configured to be in physical contact with at least a portion of an electrochemical cell.

In another aspect, the disclosure provides a casing for electrochemical cell thermal management. The casing may comprise a substantially homogeneous crosslinked polyether polyol phase change material, and one or more receptacles configured to receive one or more electrochemical cells.

Further, another aspect of the disclosure provides a casing for one or more electrochemical cells. The casing may comprise a unitary structure comprised of a substantially homogeneous crosslinked polyether polyol phase change material, the unitary structure having one or more openings configured to retain the one or more electrochemical cells in thermal contact with the crosslinked polyether polyol phase change material.

Many additional aspects and embodiments are described herein as would be recognized by one of ordinary skill in the art.

BRIEF DESCRIPTION OF THE DRAWINGS

Various objects and advantages and a more complete understanding of the present disclosure are apparent and more readily appreciated by reference to the following Detailed Description and to the appended claims, when taken in conjunction with the accompanying Drawings wherein:

FIG. 1E shows a high level diagram of a cylindrical battery cell and its internal protection components;

FIG. 3 shows a high level view of an elastomer;

FIG. 4B shows an empty rectangular casing, and rectangular or prismatic cells in rectangular casings in accordance with an embodiment of the present disclosure.

FIG. 4D shows additional rectangular embodiments of casings that can retain multiple electrochemical cells in accordance with the present disclosure.

FIG. 5A shows a top view of a sleeve embodiment of the casing surrounding a battery cell;

Figure 1A:
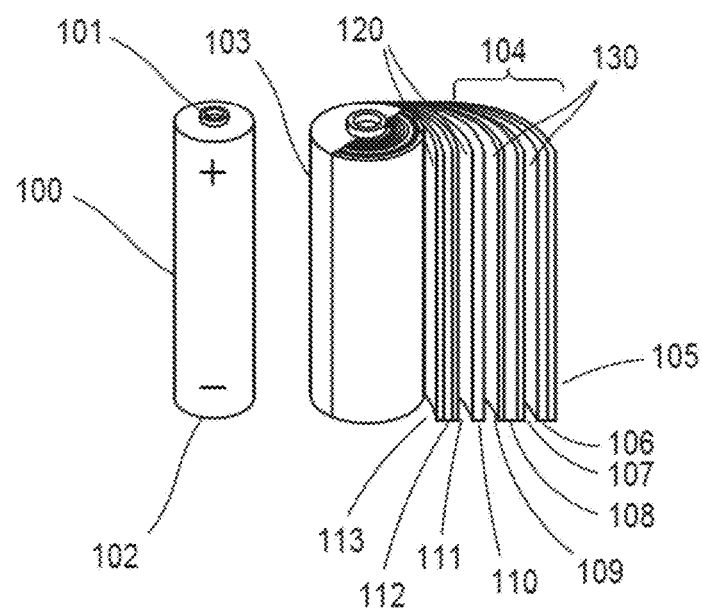
FIG. 1A shows a diagram of a single cylindrical battery cell.

Other embodiments and aspects are disclosed herein, including various figures and process descriptions described and illustrated throughout the specification.

DETAILED DESCRIPTION

Throughout this specification, references are made to the use of various materials, combinations, chemical formulations and other aspects that may be used in various combinations to form one or more materials, end products, or compositions in accordance with aspects of the present disclosure. It should be understood, both to one of skill in the art as well as the examining divisions in the United States Patent Office and Patent Offices throughout the world, that each of the lists of materials, examples, and other embodiments are included herein in order to teach one of skill in the art that they may be combined into various alternative embodiments, without requiring specific claim permutations of these individual features. The claims as presented herein, as well as any potential future amendments to those claims, may include one or more combinations of these materials, ranges and other alternatives without departing from the spirit and scope of the disclosure described herein. In particular it is contemplated that one of skill in the art would recognize and find adequate support in the written description for any combination of the features disclosed herein, whether described in a single example or embodiment, or described in different sections of the written description. The description of these various examples and options is specifically drafted to comply with 35 U.S.C. § 112 of the United States Patent Laws, Article 123(2) of the European Patent Laws as well as other similar national country laws relating to the adequacy of the written description.

It should be clearly understood that by providing examples of specific compositions and methods in the later part of this description, applicant does not intend to limit the scope of the claims to any of those specific compositions. To the contrary, it is anticipated that any combination of the functional groups, phase change materials, and articles described herein may be utilized to achieve the novel aspects of the present disclosure. The claims are not intended to be limited to any of the specific compounds described in this disclosure or any disclosure incorporated herein.

The present disclosure provides various descriptions of materials, apparatuses, devices, systems, methods, and methods of manufacturing relating to the thermal management of electrochemical cells. Electrochemical cells are a broad category, well-known types of which include batteries and capacitors. The terms "electrochemical cell," "battery," "capacitor," and their plurals and variants may be used interchangeably throughout the disclosure. The term "cell" is often used to refer to a single enclosed electrochemical cell containing, but not limited to, electrodes, such as an anode and cathode, and electrolyte, and used to denote a device that can generate electrical energy from one or multiple chemical interactions or facilitate one or multiple chemical interactions from electrical energy. Numerous types of batteries are known, and certain popular commercially-available batteries will be depicted for the purposes of illustration and reference throughout this disclosure. Numerous types of capacitors are known, and certain popular commercially available capacitors, such as electric double-layer capacitors, or supercapacitors, will also be depicted throughout this disclosure. The term "pack" (often, "battery pack") is also often used to refer to a group of enclosed cells which have terminals that are linked together. For the purposes of this disclosure, the term "cell" will be used to refer to a single electrochemical cell (e.g., a battery or capacitor cell), and the term "pack" will be used to refer to an arrangement of multiple cells that have connected terminals. The term "electrochemical devices" will be used to refer more broadly to one or more electrochemical cells, which may or may not be arranged in a pack. Though many examples throughout this disclosure may refer to battery cells specifically in certain applications, it is to be understood that those examples are not limiting, and may be applicable to other types of electrochemical cells as well without departing from the scope of this disclosure. Examples of specific configurations of cells and packs with which aspects of the present disclosure may be utilized will be discussed later in this disclosure.

One problem with existing materials for managing the thermal properties of electrochemical devices is that they are not necessarily constructed for impact resistance. Another problem with existing materials is that they are not designed to fit electrochemical devices tightly. The latter problem is due in part to the fact that electrochemical devices come in multiple sizes and shapes, and even within a given configuration there is considerable size variation. For instance, 18650 lithium-ion cells are widely available and come in a size that is nominally 18.6 mm in diameter×65.2 mm in length, but the diameter can vary by 0.5-1 mm depending on the manufacturer. Such size variation can create problems; if any air gaps exist between the surface of the cell and the sleeve, the air gaps act as insulators, and can actually increase the temperature of the cell, as will be discussed in greater detail throughout this disclosure.

Passive systems of cooling typically refer to the use of materials to transfer heat away from heat sources. In contrast with earlier-described active systems, passive systems are typically simple in design and eliminate the need for mechanical equipment and additional capacity to power them. One effective kind of passive system for managing heat dissipation involves the use of latent heat storage materials, often known as phase change materials. However, application of phase change materials in commercial cells and battery packs has been minimal due to deficiencies in the presently available material properties. These deficiencies lead to poor thermal transfer/storage and rigid application requirements. The use of phase change materials (PCMs) in various industries to store and release heat is known. PCMs are latent heat storage materials that absorb and store thermal heat during a change in material phase. The use of various forms and compositions of PCMs (micro-encapsulated or raw), their methods of manufacture and applications thereof have been widely disclosed in fields such as textiles and fabrics, building insulation, and electronics. For example, see U.S. Pat. No. 8,587,945, "Systems Structures and Materials for Electronic Device Cooling," incorporated herein by reference in its entirety. Further, the use of PCMs to manage the thermal properties of batteries are known. For example, see U.S. Pat. No. 7,270,910, "Thermal Management Systems for Battery Packs," which discloses PCMs dispersed within a gel for cooling batteries. Also, see U.S. Pat. No. 6,942,944, "Battery System Thermal Management," which discloses filling spaces within battery packs entirely with PCMs. However, the systems, compositions, or methods previously disclosed do not adequately address the problems of varying battery sizes, air gaps, the need for varying sizes of the materials themselves, ease of use and transport, waterproofing, corrosion resistance, fire resistance, and impact resistance. Further, the thermal management performance of the existing compositions themselves can be improved. Therefore, there exists a need to remedy these deficiencies.

It is known that good thermal management materials should have high thermal conductivity, high specific heat capacity, high latent heat capacity, high polytropic heat capacity, low coefficient of thermal expansion, low air content, good gap-filling, good surface wetting and adhesion, and good rheology.

One aspect of the present disclosure is that one or more PCMs can be dispersed within a matrix of another temperature management material (TMM) and formed as a tight casing or sleeve around an individual electrochemical cell. Throughout the disclosure, a TMM casing that contains one or more dispersed PCMs may be referred to as a PCM-TMM casing or sleeve, or alternatively as a TMM-PCM casing or sleeve. In some embodiments, the terms PCM-TMM or TMM-PCM may refer to casings or sleeves that are mostly comprised of PCMs, with very little non-PCM TMM, or vice versa. In some embodiments, wherein the electrochemical cell is cylindrical, the sleeve may be open at both ends to allow the exposure of the cell's positive and negative terminals. In other embodiments, for example, wherein the electrochemical cell is prismatic or pouch-shaped and both terminals are located at one end, the sleeve or other casing may be closed at one end.

Another aspect of the present disclosure is that the sleeve or casing may be solid at room temperature and at substantially all temperature ranges of normal electrochemical device operation (excluding, for example, prolonged exposure to fire). A benefit of forming a tight sleeve of made of one or more PCMs dispersed within a TMM matrix that is solid is that the sleeve may be easily transported and applied to individual cells. Known properties of solid TMMs with dispersed PCMs include that they are non-corrosive, non-toxic, and chemically inert, making them easy to handle. As a result, there is greater flexibility regarding when and where a sleeve may be applied within the manufacturing process of an electrochemical cell or of an end product containing an electrochemical device. For example. A battery cell manufacturer itself could apply the sleeve, or the end product manufacturer could apply the sleeve. End users who own electrochemical devices could even apply the sleeve on used electrochemical devices to prolong the devices' capacities and lives.

Another aspect of the present disclosure is that a solid sleeve may be formed as an individual-cell-sized unit or as a sleeve pre-formed to fit a configuration of a particular electrochemical device. Examples of such configurations will be discussed in greater detail throughout this disclosure. A benefit to an individual-cell-sized sleeve is that it can be removed and replaced if it is damaged by heat or impact, even if other cells or sleeves in a pack are not damaged. An individually-sized sleeve can also be implemented by a wide range of users and industries, because the number of sleeves required can be scaled up and down. For these benefits, individual-cell-sized sleeves made of materials such as plastic, PVC, or metal have been used in the prior art. However, PCMs have not been used in the solid sleeve configuration. PCM-filled gels have also been used in the prior art. This solid sleeve provides an advantage over using a PCM-filled gel to provide thermal management within a battery pack, for example, as discussed in U.S. Pat. No. 7,270,910, previously referenced in this disclosure. A PCM gel can be difficult to transport and apply, and may be limited to application within certain steps in the manufacturing process. A gel would necessarily need to be enclosed within a container surrounding an electrochemical cell or pack, and such a container would likely need to be specifically manufactured for a particular configuration of an electrochemical device.

Similarly, an individual-cell-sized sleeve can have advantages over simply filling the interstitial air spaces between within the cells of an electrochemical pack with PCM that is sometimes solid and sometimes liquid, as described in U.S. Pat. No. 6,942,944, referenced earlier in this disclosure. For example, filling interstitial spaces in an electrochemical pack likely requires using injection or pouring in the manufacturing process, which would limit the application to certain steps in the manufacturing process. Such application of PCM is not as versatile or scalable as an individual solid sleeve.

A pre-formed integral set of sleeves configured for specific electrochemical packs could also provide advantages. For example, a set of individual sleeves can be attached to each other during manufacturing so as to allow multiple cells to share the same structural material. An integral set of sleeves may comprise 8 sleeves in a row, or 64 sleeves in a block, as just two non-limiting examples. It may be beneficial to manufacture sleeves in these configurations for particular commercial applications, such as standard battery pack sizes used in a particular kind of consumer electronic device.

Another aspect of the disclosure is that the solid sleeve may have elastomeric properties. That is, the matrix TMM itself and/or the PCM itself may stretch in order to ensure close contact with individual battery cells, even if a "standard" sized commercial battery cell has a slight variance in size from other standard cells. In addition, these elastomeric properties can include thermal elasticity and rebound, or memory. That is, as the heat of the electrochemical cell itself changes and causes physical expansion and contraction of the cell, the sleeve can expand and contract with it in order to keep close contact. There are several advantages to of this kind of elastomeric property. One advantage is the reduction of air gaps between the sleeve and the cell surface, which can be accomplished due to the elastomeric properties by maintaining very close contact. Reducing air gaps is an advantage because air is a poor conductor of heat away from a heat source. If air is trapped between a battery cell and any surrounding material, the air gap can act as insulation and actually cause an electrochemical cell to get hotter than it would if there were no surrounding material. Currently, plastic, PVC, and metal sleeves are used to protect and insulate electrochemical devices. Not only are these materials inferior to PCMs in terms of heat dissipating properties, but they additionally do not have elastomeric properties that minimize the effect of air gaps. As these materials expand and contract and lose contact with the cell surface, air gaps can actually increase, and the heat surrounding the cell can increase, thereby further contributing to the degradation of the cell and the sleeve over time.

Yet another aspect of the disclosure is that TMMs and or PCMs comprising gels or greases may be used in conjunction with the solid sleeve in order to facilitate the application of the sleeve and to increase the contact between the sleeve and the cell. Because the gels and greases are in a liquid state, they may expand and contract and flow to areas between the cell and the sleeve that may have tiny gaps. The combination of the elastomeric sleeve and the gels or greases further diminishes the presence of air gaps. Another benefit of the tight fit accomplished by the elastomeric properties and/or gels and greases is that the contact between the outside of a cell and the TMM can provide homogeneity in the overall temperature of the cell. That is, some cells can normally generate hot spots, meaning one part of the cell is much hotter than another. Such hot spots can lead to cell degradation. The PCM-TMM sleeve in close contact can dissipate the heat generated by a hot spot to the PCM-TMM directly in contact with the hot spot and transfer it to PCM-TMM that is not directly in contact with the hot spot. As a result, the temperature of and around the entire cell can remain substantially homogeneous.

Another aspect of the disclosure is that a PCM-TMM casing can keep cells warm in extreme cold weather environments. It is known that extreme cold can cause battery cells to discharge more quickly and to lose capacity because the internal chemistry of the cell is disrupted. Because PCMs are latent-heat storage materials, they can insulate articles from the loss of heat and increase the temperature that would be necessary to produce detrimental effects. In some embodiments, layers of PCMs that provide protection from extreme cold can be combined with layers that dissipate excess heat. Various ranges of PCM properties necessary for insulating electrochemical devices from extreme cold will be described throughout the disclosure. Alternatively, a TMM casing may primarily contain a PCM for the purposes of absorbing excess heat, but may also include one-way insulation such as a reflective layer or reflective insulation for protection from excess cold.

Yet another aspect of the disclosure is that the sleeve or casing may have corrosion resistant, waterproof, fire-retardant or impact-resistant properties. These aspects may comprise additives to the PCM, the TMM, or both. The advantages of such properties in applications for battery cells and battery packs will be discussed in further detail in this disclosure.

Another aspect of the disclosure provides a sleeve or casing comprising a particular kind of PCM-TMM that comprises a crosslinked polyether polyol in a uniform, substantially homogenous composition throughout the entirety of the sleeve or casing structure. These crosslinked polyether polyols may comprise polyethylene glycols (PEG) or polyethylene oxides (PEO) to form shape-stable, moldable, and machinable casings with latent heat storage properties and fire resistant properties. Various chain extenders may be reacted with the polyether polyols in order to achieve the crosslinking, which allows for adjustment of the chain length, and therefore the mol. wt. of the polyether polyols. Numerous embodiments and the advantages thereof will be described in further detail in this disclosure.

Many aspects of the disclosure relate to thermal conductivity. Thermal conductivity, or the rate of heat transfer across a material and expressed as watts per meter kelvin (W/(m·K)) or $W·m^{-1}·K^{-1}$, is controlled by the flow of free electrons or crystal lattice vibrations (phonons). In metals, conductivity is primarily due to free electrons, whereas for nonmetals it is mainly due to phonon transport. Thermal conductivity can vary dependent on type of materials, temperature, material phase, impurities, etc. For instance, the change in thermal conductivity that occurs when ice (thermal conductivity of 2.18 W/(m·K) at 0° C.) melts into liquid water (thermal conductivity of 0.58 W/(m·K) at 0° C.). Another example is for pure crystalline substances can exhibit different thermal conductivities along different crystal axes, due to differences in phonon coupling along a given crystal axis. The thermal conductivity of plastics depends strongly on the degree of crystallinity in polymers (Anisotropicity of crystalline polymers). This is mostly due to phonon transport (flowing lattice vibrational energy) that is efficient along the crystalline axis but reduced substantially in amorphous areas or by various scattering processes in the other directions.

Definitions

The following definitions apply to various elements described with respect to various aspects of the disclosure. These definitions may likewise be expanded upon herein.

As used herein, the term "monodisperse" refers to being substantially uniform with respect to a set of properties. Thus, for example, a set of microcapsules that are monodisperse can refer to such microcapsules that have a narrow distribution of sizes around a mode of the distribution of sizes, such as a mean of the distribution of sizes. A further example is a set of polymer molecules with similar molecular weights.

As used herein, the term "latent heat" refers to an amount of heat absorbed or released by a material as it undergoes a transition between two states. Thus, for example, a latent heat can refer to an amount of heat that is absorbed or released as a material undergoes a transition between a liquid state and a crystalline solid state, a liquid state and a gaseous state, a crystalline solid state and a gaseous state, two crystalline solid states or crystalline state and amorphous state or any combination thereof.

As used herein, the term "transition temperature" refers to an approximate temperature at which a material undergoes a transition between two states. Thus, for example, a transition temperature can refer to a temperature at which a material undergoes a transition between a liquid state and a crystalline solid state, a liquid state and a gaseous state, a crystalline solid state and a gaseous state, two crystalline solid states or crystalline state and amorphous state. A temperature at which an amorphous material undergoes a transition between a glassy state and a rubbery state may also be referred to as a "glass transition temperature" of the material or combination thereof.

As used herein, the term "phase change material" refers to a material that has the capability of absorbing or releasing heat to adjust heat transfer at or within a temperature stabilizing range. A temperature stabilizing range can include a specific transition temperature or a range of transition temperatures. This allows for the adjustment of heat transfer or thermal conductivity within this transition range. In some instances, a phase change material can be capable of inhibiting heat transfer during a period of time when the phase change material is absorbing or releasing heat, typically as the phase change material undergoes a transition between two states. This action is typically transient and will occur until a latent heat of the phase change material is absorbed or released during a heating or cooling process. Heat can be stored or removed from a phase change material, and the phase change material typically can be effectively "recharged" by a source that emits or absorbs heat. For certain implementations, a phase change material can be a mixture of two or more materials. By selecting two or more different materials and forming a mixture, a temperature stabilizing range can be adjusted for any desired application. The resulting mixture can exhibit two or more different transition temperatures or a single modified transition temperature when incorporated in the articles described herein.

As used herein, the term "polymer" refers to a material that includes a set of macromolecules. Macromolecules included in a polymer can be the same or can differ from one another in some fashion. A macromolecule can have any of a variety of skeletal structures, and can include one or more types of monomeric units. In particular, a macromolecule can have a skeletal structure that is linear or non-linear. Examples of non-linear skeletal structures include branched skeletal structures, such as those that are star branched, comb branched, or dendritic branched, and network skeletal structures. A macromolecule included in a homopolymer typically includes one type of monomeric unit, while a macromolecule included in a copolymer typically includes two or more types of monomeric units. Examples of copolymers include statistical copolymers, random copolymers, alternating copolymers, periodic copolymers, block copolymers, radial copolymers, and graft copolymers. In some instances, a reactivity and a functionality of a polymer can be altered by addition of a set of functional groups, such as acid anhydride groups, amino groups and their salts, N-substituted amino groups, amide groups, carbonyl groups, carboxy groups and their salts, cyclohexyl epoxy groups, epoxy groups, glycidyl groups, hydroxy groups, isocyanate groups, urea groups, aldehyde groups, ester groups, ether groups, alkenyl groups, alkynyl groups, thiol groups, disulfide groups, silyl or silane groups, groups based on glyoxals, groups based on aziridines, groups based on active methylene compounds or other b-dicarbonyl compounds (e.g., 2,4-pentandione, malonic acid, acetylacetone, ethylacetone acetate, malonamide, acetoacetamide and its methyl analogues, ethyl acetoacetate, and isopropyl acetoacetate), halo groups, hydrides, or other polar or H bonding groups and combinations thereof. Such functional groups can be added at various places along the polymer, such as randomly or regularly dispersed along the polymer, at ends of the polymer, on the side, end or any position on the crystallizable side chains, attached as separate dangling side groups of the polymer, or attached directly to a backbone of the polymer. Also, a polymer can be capable of cross-linking, entanglement, network formation, ionic bonding, covalent bonding or hydrogen bonding in order to increase its mechanical strength or its resistance to degradation under ambient or processing conditions. As can be appreciated, a polymer can be provided in a variety of forms having different molecular weights, since a molecular weight of the polymer can be dependent upon processing conditions used for forming the polymer. Accordingly, a polymer can be referred to as having a specific molecular weight or a range of molecular weights. As used herein with reference to a polymer, the term "molecular weight" can refer to a number average molecular weight, a weight average molecular weight, or a melt index of the polymer.

Examples of polymers (including those polymers used for crosslinkers and binders) include polyhydroxyalkonates, polyamides, polyamines, polyimides, polyacrylics (e.g., polyacrylamide, polyacrylonitrile, and esters of methacrylic acid and acrylic acid), polycarbonates (e.g., polybisphenol A carbonate and polypropylene carbonate), polydienes (e.g., polybutadiene, polyisoprene, and polynorbornene), polyepoxides (e.g. bisphenol A, bisphenol F, multifunctional glycidyl based epoxies either cross-linked or uncrosslinked with amines, acids, alcohols, etc.), polyesters (e.g., polycaprolactone, polyethylene adipate, polybutylene adipate, polypropylene succinate, polyesters based on terephthalic acid, and polyesters based on phthalic acid), polyethers (e.g., polyethylene glycol or polyethylene oxide, polybutylene glycol, polypropylene oxide, polyoxymethylene or paraformaldehyde, polytetramethylene ether or polytetrahydrofuran, and polyepichlorohydrin), polyfluorocarbons, formaldehyde polymers (e.g., urea-formaldehyde, melamine-formaldehyde, and phenol formaldehyde, can be in their monomeric or polymeric forms, can have some degree of hydroxyl methylation, etherification, and/or alkylation), natural polymers (e.g., polysaccharides, such as cellulose, chitan, chitosan, and starch; lignins; proteins; and waxes), polyolefins (e.g., polyethylene, polypropylene, polybutylene, polybutene, and polyoctene), polyphenylenes, silicon-containing polymers (e.g., polydimethyl siloxane, polyalkyl siloxanes and polycarbomethyl silane), polyurethanes, polyvinyls (e.g., polyvinyl butyral, polyvinyl alcohol, esters and ethers of polyvinyl alcohol, polyvinyl acetate, polystyrene, polymethylstyrene, polyvinyl chloride, polyvinyl pryrrolidone, polymethyl vinyl ether, polyethyl vinyl ether, and polyvinyl methyl ketone), polyacetals, polyarylates, alkyd-based polymers (e.g., polymers based on glyceride oil), copolymers (e.g., polyethylene-co-vinyl acetate and polyethylene-co-acrylic acid, styrene-butadiene, or any combination of the above), and mixtures thereof. The term polymer is meant to be construed to include any substances that become available after the filing of this application and that exhibit the general polymeric properties described above.

As used herein, the term "chemical bond" and its grammatical variations refer to a coupling of two or more atoms based on an attractive interaction, such that those atoms can form a stable structure. Examples of chemical bonds include covalent bonds and ionic bonds. Other examples of chemical bonds include hydrogen bonds and attractive interactions between carboxy groups and amine groups.

As used herein, the term "covalent bond" means a form of chemical bonding that is characterized by the sharing of pairs of electrons between atoms, or between atoms and other covalent bonds. Attraction-to-repulsion stability that forms between atoms when they share electrons is known as covalent bonding. Covalent bonding includes many kinds of interactions, including σ-bonding, π-bonding, metal-metal bonding, agostic interactions, and three-center two-electron bonds.

As used herein, the term "ionic bond" or "electrovalent bond" means a bond formed through electrostatic attraction between oppositely charged ions. For example, between a positively charged cation and a negatively charged anion. Ionic bonds can be formed between a metal such as Na, Fe, Ag, etc. and a nonmetal, or between two metals, or between two non-metals such as ammonia and acids. Ionic compounds can conduct electricity when molten, in a solid or in solution.

As used herein, the term "molecular group" and obvious variations thereof, refers to a set of atoms that form a portion of a molecule. In some instances, a group can include two or more atoms that are chemically bonded to one another to form a portion of a molecule. A group can be neutral on the one hand or charged on the other, e.g., monovalent or polyvalent (e.g., bivalent) to allow chemical bonding to a set of additional groups of a molecule. For example, a monovalent group can be envisioned as a molecule with a set of hydride groups removed to allow chemical bonding to another group of a molecule. A group can be neutral, positively charged, or negatively charged. For example, a positively charged group can be envisioned as a neutral group with one or more protons (i.e., H+) added, and a negatively charged group can be envisioned as a neutral group with one or more protons removed. A group that exhibits a characteristic reactivity or other set of properties can be referred to as a functional group, reactive function or reactive functional groups. Examples of reactive functional groups include those such as acid anhydride groups, amino groups, N-substituted amino groups and their salts, amide groups, carbonyl groups, carboxy groups and their salts, cyclohexyl epoxy groups, epoxy groups, glycidyl groups, hydroxy groups, isocyanate groups, urea groups, aldehyde groups, ester groups, ether groups, alkenyl groups, alkynyl groups, thiol groups, disulfide groups, silyl or silane groups, groups based on glyoxals, groups based on aziridines, groups based on active methylene compounds or other b-dicarbonyl compounds (e.g., 2,4-pentandione, malonic acid, acetylacetone, ethylacetone acetate, malonamide, acetoacetamide and its methyl analogues, ethyl acetoacetate, and isopropyl acetoacetate), halo groups, hydrides, or other polar or H bonding groups and combinations thereof.

As used herein the term "Melt flow index" or MFI is a measure of the ease of flow of the melt of a polymer. In academic terms the melt flow is defined as the mass of polymer, in grams, flowing in ten minutes through a capillary of a specific diameter and length by a pressure applied via prescribed alternative gravimetric weights for alternative prescribed temperatures. The method is described in the similar standards ASTM D1238 and ISO 1133.

As used herein, "Molecular Weight Polydispersity" (a polydispersity index (PDI)), is a measure of the distribution of molecular mass in a given polymer sample. The PDI calculated is the weight average molecular weight divided by the number average molecular weight. It indicates the distribution of individual molecular masses in a batch of polymers. The PDI has a value equal to or greater than 1, but as the polymer chains approach uniform chain length, the PDI approaches unity (1). For some natural polymers PDI is almost taken as unity. The PDI from polymerization is often denoted as:

$$PDI = M_w/M_n$$

Mn is more sensitive to molecules of low molecular mass, while Mw is more sensitive to molecules of high molecular mass. A polymer material is denoted by the term polydisperse if its chain lengths vary over a wide range of molecular masses.

As used herein, "Stereochemistry" means the study of the relative spatial arrangement of atoms within molecules. One branch of stereochemistry is the study of chiral molecules. Stereochemistry is also known as 3D chemistry. Examples, explanations, descriptions and definitions of various stereochemical nomenclature and naming regimes can be found in Chapter 6 "Stereochemistry" in "Modern Physical Organic Chemistry" by Anslyn and Dougherty, ©2005, University Science Books.

Polymer stereochemistry descriptions of atactic, syndiotactic, isotactic, cis- and trans-, R- and S-, L-, D- and Meso- will be used.

As used herein, "Polymerization" is a process of reacting monomer molecules together in a chemical reaction to form three-dimensional networks or polymer chains. Many forms of polymerization and different systems exist to categorize them are known in the art.

As used herein, "Rheology" is the characterization of the flow of matter while "viscosity" is the measure of resistance to flow or deformation. Viscosity can be measured by various means and characterized as a melt flow index (MFI) or centipoise (cps), usually at a given temperature or shear rate.

As used herein, the term "thermal conductivity" ("k" and also denoted as λ, or κ), is the property of a material's ability to conduct heat and is measured in W/m·K. Thermal conductivity is defined as the quantity of heat (Q) transmitted through a unit thickness (L) in a direction normal to a surface of unit area (A) due to a unit temperature gradient (ΔT) under steady state conditions and when the heat transfer is dependent only on the temperature gradient. In equation form this becomes the following:

Thermal Conductivity=heat×distance/(area×temperature gradient)

$$\lambda = Q \times L/(A \times \Delta T)$$

Generally, in low conducting materials k<0.1 W/m·K. In good conducting materials k=0.1-10 W/m·K. In highly conducting materials k>10 W/m·K. In accordance with aspects of the present disclosure, the thermal management and heat dissipation material preferably has a k value of >0.5 W/m·K. In another embodiment k>1.0 W/m·K and it yet another embodiment k is >10 W/m·K.

As used herein, the term "heat dissipation" refers to the movement or spreading of heat from a high temperature environment to a low temperature environment, e.g. moving heat from a warm battery to cooler ambient air. Methods to dissipate heat can be accomplished by using high thermal conductivity materials such as metallic or ceramic heat spreaders, heat spreader plates, heat sinks, heat pipes, heat exchangers, loop pipes, liquid cold pipes, heat fins, fans, circulating coolants or a combination thereof. Further examples are products such as those supplied by Thermo Cool Corp., Thermacore Inc., etc.

General Composition of Electrochemical Devices

Aspects of the disclosure described herein may be used in connection with a wide variety of electrochemical cells and packs that generate heat to the detriment of the performance of the electrochemical cells and packs themselves. While reference is made herein to such common, commercially available cells such as the lithium-ion 18650 type and other cylindrical batteries, the same features may be incorporated into virtually any electrochemical cells or packs that require, or could benefit from, thermal management during operation. Lithium-ion cells configured in the prismatic format (e.g., the square or rectangular type that power mobile communication devices) or pouch format (e.g., those without metal outer cans for certain electronic devices) are examples of shapes that can utilize aspects of the present disclosure. Additionally, electrochemical cells classified as batteries of lithium-based and non-lithium-based compositions, such as lithium-ion polymer, lithium metal, solid-state lithium-ion, nickel-based cells including nickel-cadmium (NiCd), nickel-metal-hydride (NiMH), nickel-iron (NiFE), Nickel-zinc (NiZn), lead acid, zinc-air molten-salt batteries including sodium-sulfur, sodium-nickel chloride (Na—NiCl2), and magnesium-antimony (MgSB), may also utilize aspects of the present disclosure. Furthermore, electrochemical devices classified as electrochemical capacitors such as electric double-layered capacitors, pseudocapacitors, and hybrid capacitors can utilize aspects of the present disclosure. Further, it is contemplated that other existing and yet-to-be-developed battery cells and battery packs such as lithium-sulfur (Li/S), lithium-air, sodium-air, dual carbon, fluoride-ion, potassium-ion, sodium-ion will be able to utilize aspects of the present disclosure. The previously enumerated electrochemical cells and packs are currently used in fully electric automobiles, in components of fossil-fuel automobiles, aircraft components, power tools, laptops, mobile phones, mobile computing devices, household appliances, and entertainment systems. Any heat-generating electrochemical cell or pack can benefit from the increased or more stable performance characteristics resulting from utilizing aspects of the present disclosure.

In general, aspects of the disclosure relate to incorporating a casing of a phase change material containing substance onto, over or otherwise near a heat-producing individual electrochemical cell or pack so that heat is pulled away from the cell or pack and stored and/or dissipated through some form of heat transfer substrate to the ambient environment. Described below are specific examples of the constructions of certain cells and packs that can utilize a phase change material substance and structure and different embodiments of such a composition as used in these electrochemical cells and packs FIG. 1A shows a general representation of a lithium-ion battery 100 that includes a positive terminal 101 and a negative terminal 102. A standard, commercially-available cylindrical lithium-ion 18650 cell 100 has a nominal voltage of 3.7V and capacity of 1.5 Ah. Though particular reference is made to a specific configuration of a cylindrical lithium-ion cell in FIG. 1A, and to a specific configuration of a prismatic lithium-ion cell in FIG. 1B, these references are exemplary only and novel aspects of the disclosure are not to be construed as limited to applying only to these specific kinds of cells. The specific configurations and layers of lithium-ion battery cells and electric double-layer capacitors disclosed specifically herein are for the purpose of demonstrating how known battery and other electrochemical cell configurations can produce heat generally, typically in ranges that may be mitigated by embodiments of the present disclosure, and to demonstrate in context the challenges of protecting an individual cell or an entire pack.

FIG. 1A also shows a view of the layers that a lithium-ion cell, (e.g., a commercially-available 18650 cell) can contain at 103. Various layers of the battery cell as shown at 104 can allow movement an electrolyte between positive and negative electrodes, (i.e., an anode and a cathode). In the example depicted in FIG. 1A, an anode 120 can be comprised of carbon. Its components will be described presently. A cathode 130 can be comprised of lithium manganese oxide. Its components will also be described presently. Those skilled in the art will appreciate that a wide variety of materials may be used for anodes and cathodes, and that the materials listed herein are just examples. Current developments in anode and cathode technology may result in anodes and cathodes comprised of polymers or even organic molecule chains. It is contemplated that embodiments of the present disclosure may be used in conjunction with cells containing these types of compositions.

The electrolyte in this particular example is not visually depicted because it may flow between the various layers depicted at 104. Examples of electrolytes in lithium-ion batteries include various lithium salts in organic solvent. Now turning to the layers depicted in FIG. 1A, and moving from the outermost layer to the innermost layer, the first layer is the cell can 105, which can be comprised of metal, as is commonly found in cylindrical configurations. Other materials are contemplated, such as plastics or polymers, such as those used in many prismatic configurations. Alternatively, the outer layer can be comprised of a thin metallic or plastic sheet as is commonly used in pouch configurations. Next is a first separator layer 106, which can comprise a polymer sheet. Those skilled in the art will appreciate that a separator can comprise various types of materials, as long as they are suited to separate the cathode from a metallic exterior and prevent an electrical short.

Next is the cathode 130, which comprises the first cathode layer 107, second cathode layer 108, and third cathode layer 109. The first and third cathode layers 107 and 109 can comprise a lithium-metal-oxide, such as lithium permanganate, lithium manganese oxide, or variations thereof represented by the chemical formula $Li_{(1+x)}Mn_2O_4$, A cathode in other types of lithium-ion batteries can comprise, for example, lithium-cobalt ($LiCoO_2$), lithium-phosphate ($LiFePO_4$), or lithium-NMC ($LiNiMnCoO_2$). The second cathode layer 108 can comprise aluminum (Al). 108. The next layer is a second separator 110. The second separator 109 can comprise the same or similar material as the first separator 106, such as polymer, and its function is to separate the anode and cathode and prevent an electrical short. Next is the anode 120, which can comprise a first carbon (C) layer 111, then a copper layer (Cu) 112 and a second carbon layer (C) 113.

Figure 1B:
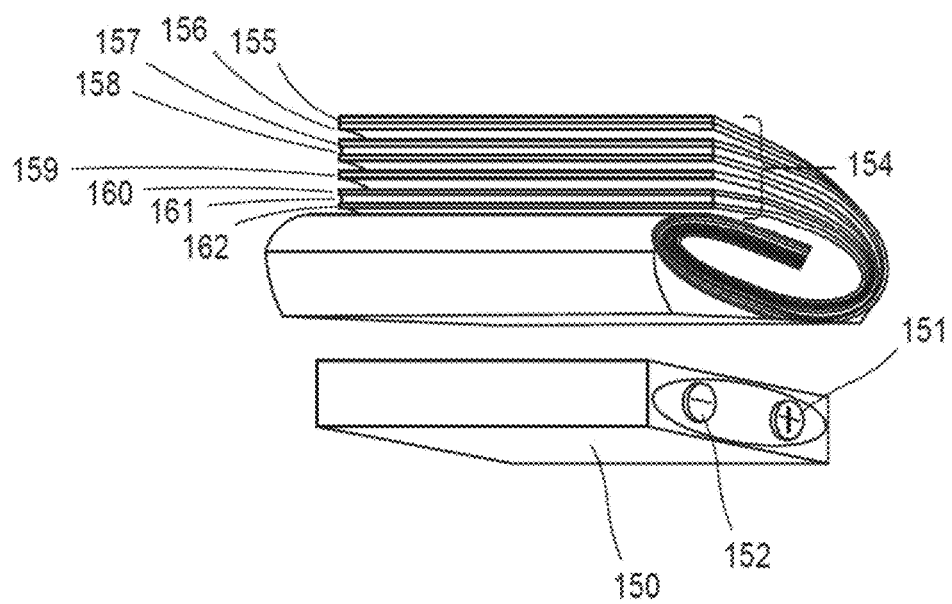
FIG. 1B shows a diagram of a single prismatic battery cell.

FIG. 1B shows a prismatic-shaped lithium-ion battery 150 with a positive terminal 151 and an adjacent negative terminal 152. Commercially available prismatic lithium-ion cells can have voltages that include a range between 2.5V and 4.2V, and capacity around 1.2 Ah. Generally, the construction of the layers of a prismatic lithium-ion cell can be very similar to that of a cylindrical cell. In FIG. 1B, the layers of the prismatic cell include a cell can 155, a separator 156, an anode 157, an aluminum layer 158, a separator 159, and the cathode, which can be comprised of a first carbon layer 160, a copper layer 161, and a second carbon layer 162.

Figure 1C:
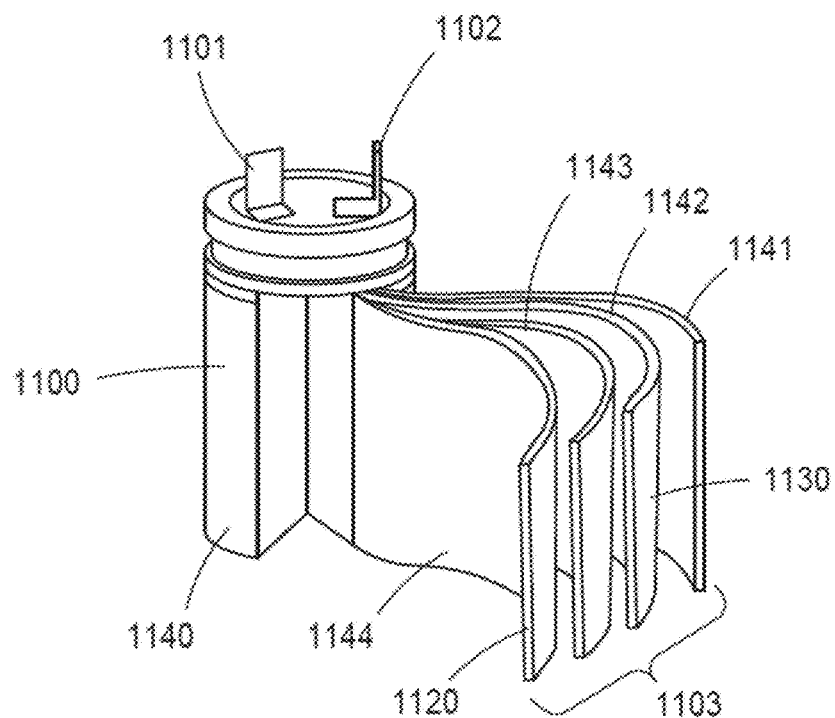
FIG. 1C shows a diagram of a single cylindrical capacitor cell.

FIG. 1C shows a general representation of an electrochemical capacitor 1100 that includes a positive terminal 1101 and a negative terminal 1102. A standard, commercially-available cylindrical electrochemical capacitor cell 1100 has a nominal voltage of 2.8V, a capacitance of 3400-Farad. Though particular reference is made to a specific configuration of a cylindrical electrochemical capacitor in FIG. 1C, and to a specific configuration of a prismatic electrochemical capacitor in FIG. 1D, these references are exemplary only and novel aspects of the disclosure are not to be construed as limited to applying only to these specific kinds of cells. The specific configurations and layers of electrochemical capacitor cells disclosed herein are for the purpose of demonstrating how known electrochemical capacitor cell configurations can produce heat in ranges that may be mitigated by embodiments of the present disclosure, and to demonstrate in context the challenges of protecting a electrochemical capacitor cell or pack.

FIG. 1C also shows a view of the layers that an electrochemical capacitor cell, (e.g., a commercially-available Maxwell K2™) cell can contain at 1103. Various layers of the electrochemical capacitor cell as shown at 1103 can allow movement an electrolyte between positive and negative electrodes, (i.e., an anode and a cathode). In the example depicted in FIG. 1C, an anode 1120 can be comprised of porous carbon. Its components will be described presently. A cathode 1130 can also be comprised of porous carbon. Its components will also be described presently. Those skilled in the art will appreciate that a wide variety of materials may be used for anodes and cathodes, and that the materials listed herein are just examples. Current developments in anode and cathode technology may result in anodes and cathodes comprised of polymers or even organic molecule chains. It is contemplated that embodiments of the present disclosure may be used in conjunction with cells containing these types of compositions.

The electrolyte in this particular example is not visually depicted because it may flow between the various layers depicted at 1103. Examples of electrolytes in electrochemical capacitors include various lithium-ion salts such as lithium hexafluorophosphate as well as quaternary/alkyl ammonium salts such as tetraethylammonium tetrafluoroborate or triethyl-methyl-tetrafluoroborate in organic solvents such as acetonitrile, propylene carbonate, tetrahydrofuran, diethyl carbonate, and y-butyrolactone. Also aqueous electrolytes such as solutions of sulfuric acid, potassium hydroxide, quaternary phosphonium salts, sodium perchlorate, lithium perchlorate, and lithium hexafluoride arsenate are other examples of electrolytes used in electrochemical capacitors. Ionic liquids, both pure and mixed with organic solvents such as stated above are another example of electrochemical capacitor electrolytes. The outside of an electrochemical capacitor can comprise a cell can 1140, which can be comprised of metal, as is commonly found in cylindrical configurations. Other materials are contemplated, such as plastics or polymers, such as those used in many prismatic configurations. Alternatively, the outer layer can be comprised of a thin metallic or plastic sheet as is commonly used in pouch configurations.

Now turning to the layers depicted in FIG. 1C, and moving from the outermost layer to the innermost layer, the first layer is first separator layer 1141, which can comprise a polymer sheet. Those skilled in the art will appreciate that a separator can comprise various types of materials, as long as they are suited to separate the cathode from a metallic exterior and prevent an electrical short. Next is the negative electrode, or cathode 1142. Next is a second separator layer 1143, followed by a positive electrode, or anode 1144. Electrodes of capacitors generally can be comprised of a high surface area and porous material such as activated carbon, carbon aerogel, graphite, graphene, graphene, carbon nanotubes, carbide-derived carbon and carbon fiber-cloth for electric double-layer type capacitor. Pseudocapacitor electrodes can comprise of the same carbon materials as listed above as well as metal oxides and sulfides such as ruthenium oxide, iron oxide, iridium oxide, manganese oxide, iridium oxide, titanium sulfides, and conductive polymers such as polyaniline, polyacetylene, polypyrrole, and polythiophene. Hybrid capacitor electrodes can comprise of the above mentioned materials from the above description of electric double-layer and pseudocapacitor electrode materials as well as battery intercalation material such as a lithium ion material mentioned for rechargeable lithium-ion batteries such as lithium permanganate, lithium manganese oxide, or variations thereof represented by the chemical formula $Li_{(1+x)}Mn_2O_4$. A cathode in other types of capacitors can comprise, for example, lithium-cobalt ($LiCoO_2$), lithium-phosphate ($LiFePO_4$), or lithium-NMC ($LiNiMnCoO_2$). Those skilled in the art will appreciate that a positive and negative electrode can comprise various types of materials, and that an electrochemical capacitor can be assembled with similarly composed electrodes in a symmetric format or with dissimilar electrode compositions in an asymmetric format.

Figure 1D:
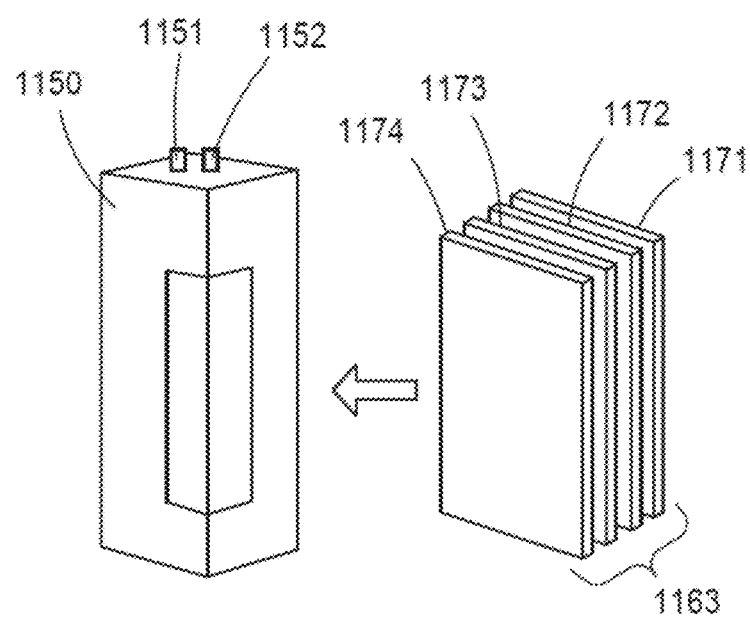
FIG. 1D shows a diagram of a single prismatic capacitor cell.

FIG. 1D shows a prismatic capacitor cell 1150 with a positive terminal 1151 and a negative terminal 1152. Like the cylindrical capacitor cell 1100, the prismatic capacitor cell 1150 can be comprised of layers 1163. The layers 1163 can include a cathode 1171, a first separator layer 1172, an anode 1173, and second separator layer 1174. The separator layers 1172 and 1174 may be comprised of any of the above-referenced materials as the separator materials 1141 and 1143 in FIG. 1C. Similarly, the anode 1173 and the cathode 1171 may be comprised of any of the above-referenced materials as the electrodes 1142 and 1144 in FIG. 1C.

It is known in the art that individual electrochemical cells such as the cylindrical battery cell 100 in FIG. 1A and the cylindrical capacitor cell 1100 in FIG. 1C, and the prismatic cell 150 in FIG. 1B generate heat during charge and discharge. It is known that for a lithium-ion cell, consistent operating temperatures about 60° C. can rapidly decrease the capacity of the cell. Illustrations of this phenomenon will be discussed further in this disclosure. Chemical reactions within each cell increase not only the temperature but also the internal pressure. Each cell can have several internal components that can mitigate heat and pressure buildup to prevent unsafe conditions such as fires or explosions. These internal components include temperature switches for high current, safety vents for high pressure, and a circuit-interrupt device for overcharging. High current, high pressure, and overcharging can occur during ordinary operating conditions of a battery. Additionally, extreme current buildup and electrical shorts can occur as a result of the manufacturing process. In some instances, microscopic metallic particles can inadvertently get mixed into the layers of a cell. In another instance, the separators may be unintentionally spaced unevenly. Either of these manufacturing defects can cause too much current to build up and create a significant electrical short, which can cause the internal battery temperature to heat up rapidly and cause a fire or explosion.

Turning now to FIG. 1E, shown is a cell specifically depicting exemplary internal protection components common to many lithium-ion cells. Cell 180 contains three internal safety features. The first is a Positive Thermal Coefficient (PTC) device 181. In general, the PTC device 181 prevents overheating by shutting off excessive current buildup. The second is a circuit interrupt device (CID) 182, which prevents overcharging that would lead to a buildup in internal pressure. In the case of too much pressure buildup, the third safety feature is a gas release vent 183, which, as the name describes, allows gas to vent out through a hole near the top of the cell.

Those skilled in the art can appreciate that the layers and safety components of lithium-ion battery cells specifically described herein are delicate and susceptible to damage by impact. Similarly, other kinds of internal protection components that exist in other types of electrochemical cells generally can also be delicate and susceptible to damage by impact. Dents or punctures, for example, can cause the safety components to fail and allow overheating of a cell. They can also cause damage to the separator layers and allow the anode and cathode to come into contact with each other, which can cause an electrical short and fire.

Figure 2A:
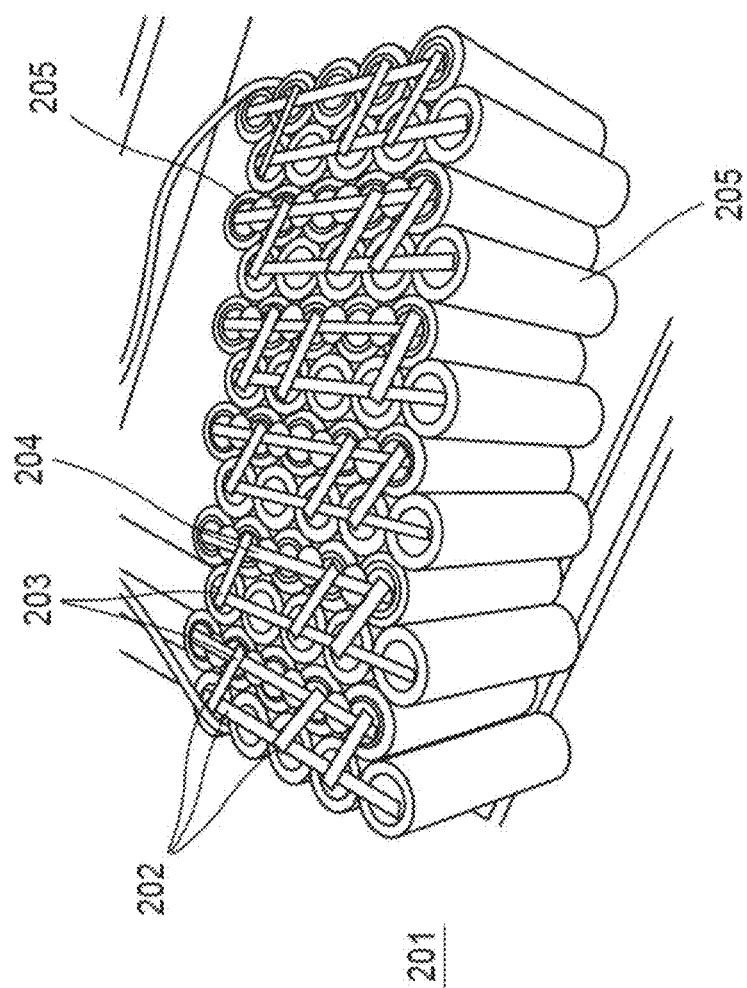
FIGS. 2A-2D show prior art battery packs in casings.

Referring now to FIGS. 2A, 2B, 2C, and 2D, shown are individual cylindrical cells associated in packs to create higher voltage and/or current-handling capacity than any single cell. Terminals can be connected in series in order to reach the desired total voltage (V) or in parallel to reach the desired capacity (Ah) for batteries and energy for capacitors. FIG. 2A shows an exemplary prior art vehicle battery pack 201. The cells of the battery pack 201 are shown with terminal connectors 202 connecting the positive terminals 203 of some cells to the negative terminals 204 of neighboring cells, as is known in the art, in order to create a battery pack with increased voltage as compared to the voltage of individual cells. In FIG. 2A, each individual cell is encased in a sleeve comprising a plastic or PVC material.

Figure 2B:
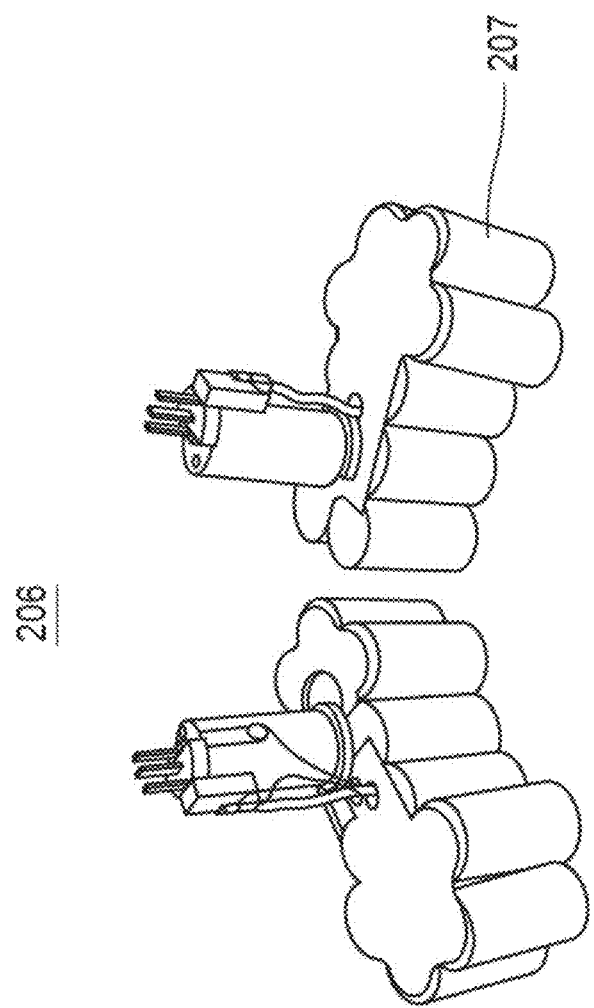

FIG. 2B depicts an arrangement of individual cells in an exemplary prior art power tool battery pack 206. Like the vehicle battery pack of FIG. 2A, each cell has a terminal that is linked to at least one other cell's terminal, though those connections are not all shown. In FIG. 2B, each individual cell is encased in a sleeve 207 comprising cardboard material. Sleeves of cardboard, plastic, PVC, and metal have commonly been used in the prior art because they offer some minimal level of protection against internal and external heat sources, but more importantly because their mechanical properties protect against punctures and dents. As discussed earlier, the delicate internal composition of individual cells can easily be damaged by physical forces such as drops, collisions, and punctures.

Figure 2C:
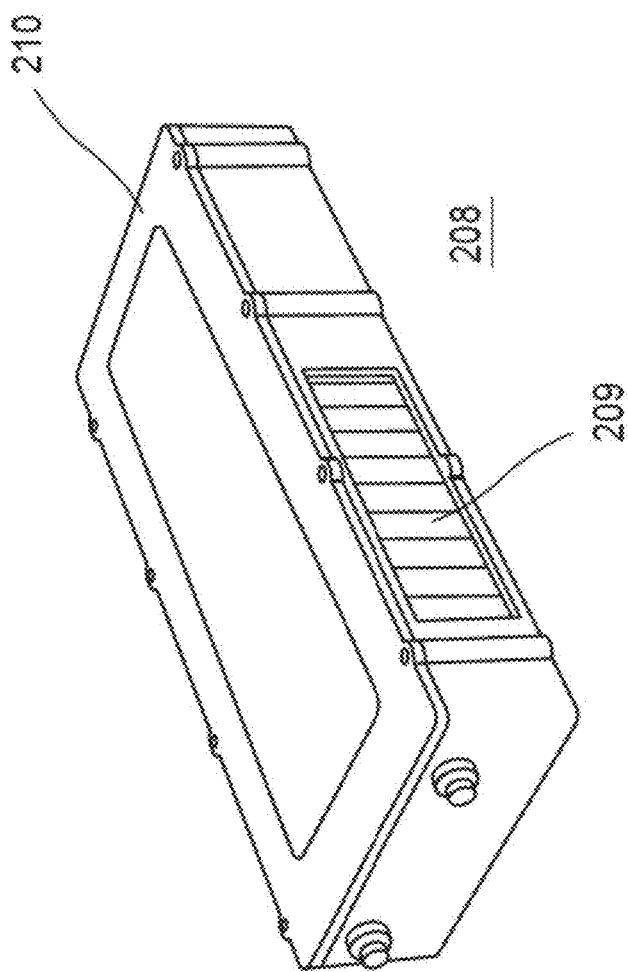

FIG. 2C shows another exemplary prior art vehicle battery pack 208. Though not shown, the individual cells are linked to each other in a similar manner as in FIG. 2A. Each individual cell is encased in a sleeve 209 comprising a plastic, PVC, or metal material. In addition, the entire battery pack is enclosed in a housing 210. The housing 210 can protect the battery pack 208 from impact and separation, and may provide ease of use for transport and installation, and may also serve other functions not immediately apparent from the figure, such as electronic management of cell performance. For example, many battery packs contain external protection circuits that cut off voltage to individual cells if their voltages or temperatures get too high. Because protection circuits monitor each individual cell, battery packs containing dozens of cells can be complex and expensive to manufacture. Further, the protection circuits inhibit excessive voltage only from outside sources, such as a faulty charger or an external electrical short.

Figure 2D:
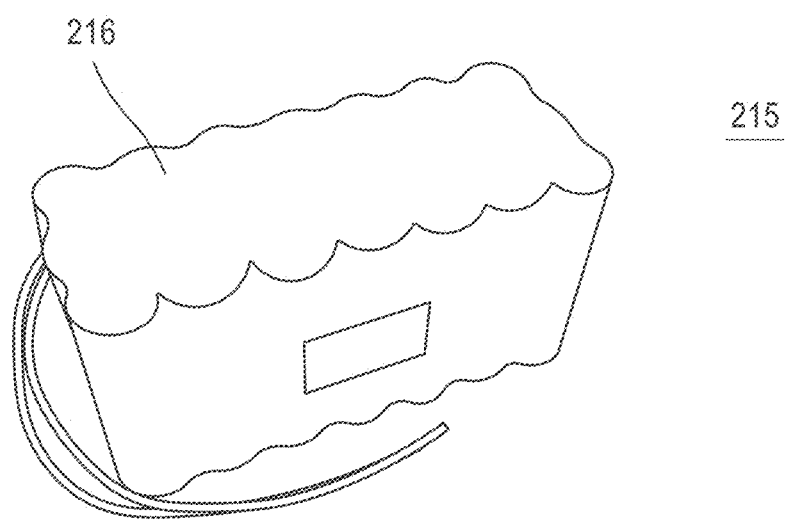

FIG. 2D shows another exemplary prior art pack 215 that is shrink-wrapped in a plastic or PVC-type film 216. Like the prior art packs shown in FIGS. 2A-2C, the individual terminals of the cells may be linked together to increase voltage, capacity, or energy. Shrink-wrapping is commonly used in the prior art to hold individual cells in a particular configuration, but because plastic and PVC-type films are typically used in shrink-wrapping applications, the thermal management and mechanical protection properties of these films are minimal.

In sum, individual cells face detrimental effects from heat from both internal and external sources. The internal sources include the heat generated from normal charge and discharge as well as any manufacturing defects that can cause current buildup and internal shorts (i.e., thermal runaway of an individual cell). External sources include physical stresses such as ambient heat (caused by events such as leaving a mobile device in the sun), extreme cold, and physical impact. External sources can also include excessive applied voltage, such as that caused by a faulty charger or an external electrical short. The most extreme external heat source can be the thermal runaway and fire of another cell, which can in turn cause the thermal runaway of other cells within a pack.

Various embodiments of the present disclosure comprise elastomers and materials whose properties may be referred to as elastomeric. FIG. 3 depicts high level views of an elastomer, which may be comprised of block copolymers with "hard" (or rigid) segments 301 and 301A and "soft" (or flexible) segments 302 and 302A. The hard segments can combine to provide hardness, rigidity, stiffness, toughness, stability and chemical resistance. The hard segments can be made of high glass transition temperature materials, crystallizable materials where the segments will form stable crystalline domains, or functional crosslinkable materials in which formed crosslinks will hold the domains stable and rigid. The crosslinks may be through hydrogen bonding. The soft segments are generally in an amorphous or rubbery phase and not aligned or interacting with other soft segments. This allows the segments to be flexible, free moving and have good elongation characteristics. The soft segments can be comprised of low glass transition temperature materials, amorphous (non-crystalline) materials, and can generally have low or no crosslinking. The hard or soft segments can be of different or the same chemical makeup. For example, a polypropylene elastomer can consist of syndio or isotactic polypropylene segments allowing for hard crystalline segments compared to the soft segment of randomly or atactic polymerized polypropylene. The segments can have different melting points due to the different phases or crystalline structures. Depending on the soft segment or hard segment concentration, chemistry, molecular weight, etc., the polymer can have a continuous hard phase with a dispersed soft phase, or a continuous soft phase with dispersed hard phase if the hard segments are in low concentration. The morphology developed during polymer or part production, the miscibility of the phases, the size of the dispersed phases and their characteristics strongly affect the final properties of the polymer. In certain embodiments of the disclosure, the above-mentioned compositions can result in desirable hardness properties suitable for protecting an electrochemical cell from denting or puncturing by an outside force. For example, the compositions may result in a Shore A hardness of greater than 85 and a Shore D hardness of greater than 25, per ASTM D2240. Additionally, the above-mentioned compositions may result in desirable elasticity properties suitable for expanding and contracting with a particular electrochemical cell or pack. For example, the compositions may result in a flex modulus of greater than 15 pounds per square inch and a break elongation of greater than 20%.

Figure 4A:
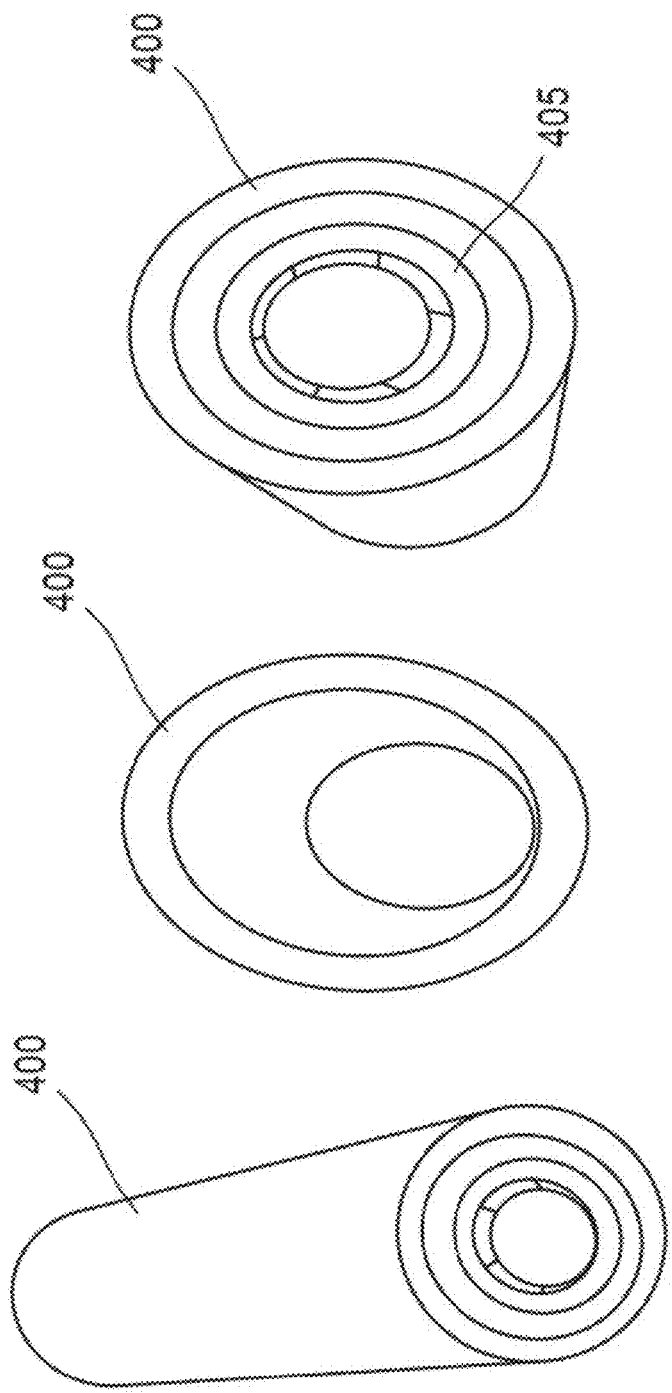
FIG. 4A shows an empty cylindrical casing and cells in cylindrical casings in accordance with an embodiment of the present disclosure.

Turning now to FIG. 4A, shown is an embodiment of the disclosure in which a sleeve 400 encases a standard lithium-ion 18650 battery cell 405. The solid sleeve 400 can comprise one or more PCMs within a TMM matrix. Various materials can be used in the construction of a solid sleeve in accordance with the present disclosure, and examples of such materials are described in greater detail throughout the disclosure. It is contemplated that sleeves of similar configurations may be of various sizes in other embodiments, in order to fit other sizes of batteries and other electrochemical cells.

FIG. 4B shows an embodiment of the disclosure in which a rectangular casing 410 encases a rectangular or prismatic electrochemical cell 415. Various materials can be used in the construction of a solid sleeve in accordance with the present disclosure, and examples of such materials are described in greater detail throughout the disclosure. It is contemplated that sleeves of similar configurations may be of various sizes in other embodiments, in order to fit other sizes of batteries and other electrochemical cells. In the embodiment shown, at least one end of the rectangular casing 410 is open to allow the exposure of the terminals. The opposite end may be closed.

Figure 4C:
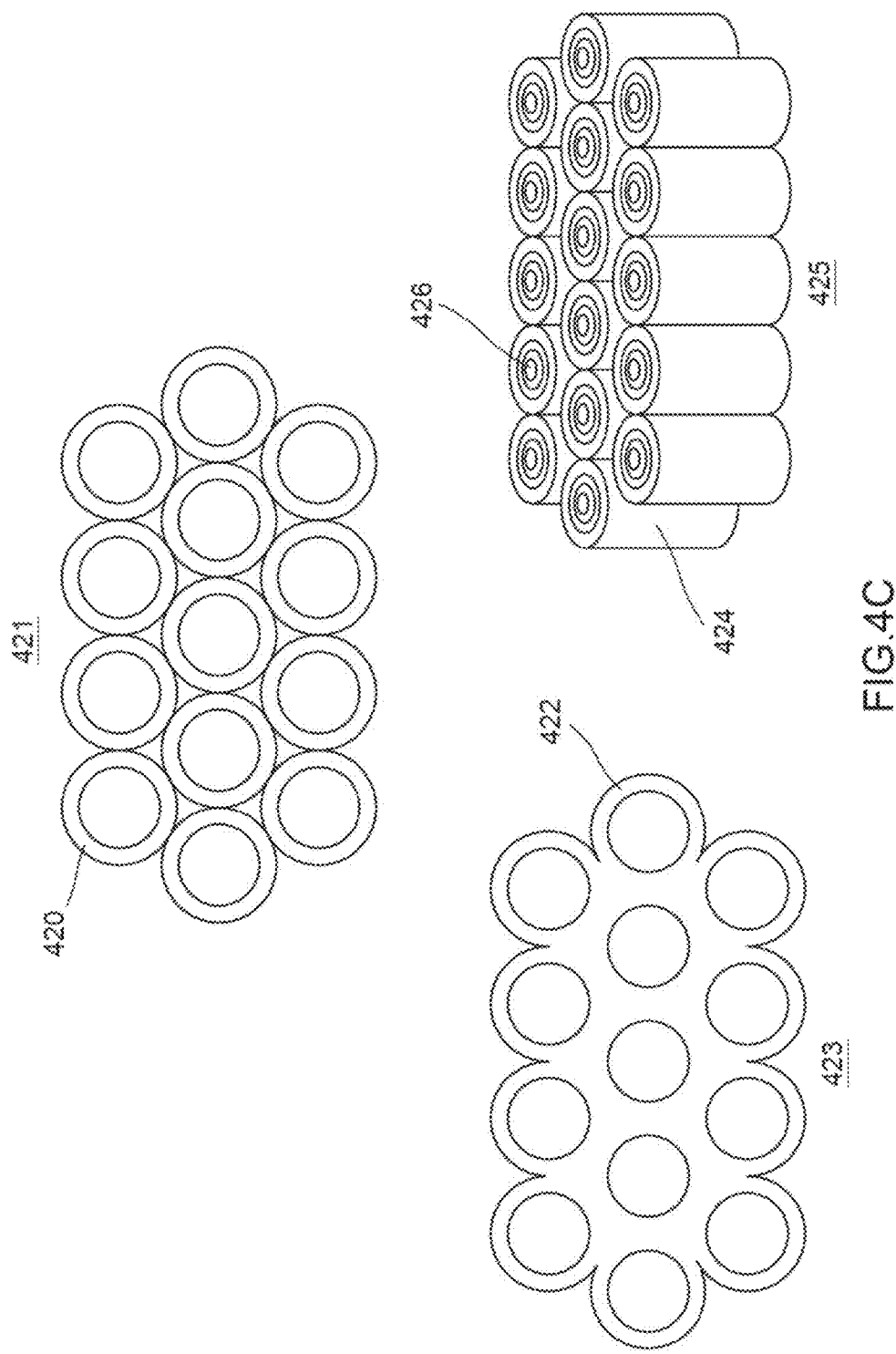
FIG. 4C shows various embodiments of casings that can hold multiple electrochemical cells in accordance with the present disclosure.

FIG. 4C depicts embodiments of casings for packs of electrochemical cells. A casing 421 may comprise multiple individual sleeves 420 which are attached to each other, forming complete cylinders of PCM-TMM material around each cell. This configuration possibly can create interstitial spaces between each individual sleeve 420, which may be left empty to allow dissipation into the ambient environment, or which may be filled with another thermal conductive filler. A casing 425 shows the casing 421 containing multiple battery cells 426 with individual sleeves 424. In another embodiment, a casing 423 may be entirely preformed to fit a certain number of cells in a pack. Each cell may be encased by an individual casing section 422, but the entire casing 423 may not have any interstitial air spaces. That is, the casing 423 may have PCM-TMM material in all of the space between each individual cell. It is contemplated that various shapes and sizes of the pack casings depicted in FIG. 4C may be used without departing from the scope of the present disclosure.

FIG. 4D shows additional embodiments of electrochemical cell casings that are rectangular in shape and which are configured to receive and retain a plurality of electrochemical cells. A side perspective view shows the rectangular casing 430 with a plurality of receptacles 432 that has smooth surfaces on each side. A top view shows the rectangular casing 435 with the plurality of receptacles 437 spaced out fairly uniformly.

FIG. 5A shows an exemplary top view of an electrochemical cell 505 encased in a sleeve 500 in a similar fashion to the exemplary sleeve 400 depicted in FIG. 4A, with certain features drawn in an enlarged manner for the purposes of illustration. The sleeve 500 can specifically comprise a polymer matrix. The polymer matrix may comprise an elastomeric thermal management material (TMM) 502 that is blended with one or more PCMs 501. PCMs 501 as depicted in FIG. 5A are represented as spherical and dispersed non-uniformly throughout the elastomeric TMM 502. However this depiction of PCMs 501 is for purposes of illustration only; in actual embodiments, the PCM 501 may be non-spherical, may be dispersed uniformly, and may be larger or smaller in relation to the depiction. Additionally, the thickness of the sleeve 500 in relation to the battery cell 505 is not necessarily to scale. The elastomeric TMM 502 may comprise polyolefin copolymers such as copolymers of polyethylene with any $C_3$-$C_{30}$ $\alpha$-olefin, or vinyl acetate, other vinyl monomers such as styrene or its analogues, acrylate or methacrylate monomers, vinyl ether monomers, vinyl ester monomers, acrylonitriles, rubbers and copolymers made from isoprene, butyl, etc., or combinations, blends, mixtures thereof. The polymers or copolymers can be random or block copolymers.

The elastomeric TMM 502 can comprise a polymer elastomer made from polyesters, silicon rubbers or polyurethanes. Non-inclusive examples of these are Hytrel® polyesters from DuPont®, Kraton® SEBS, SEPS, SBS or SIS block copolymers, Septon™ and other elastomers by Kuraray Co., Spandex® type polyurethanes and RTV or LTV type silicon rubbers. To further improve the elastomeric properties of the polymer matrix, the matrix (i.e., the elastomeric TMM 502 and the PCMs 501) can be crosslinked for improved elastomeric properties with 0.05-1.0 crosslink per polymeric chain.

Because of the range of temperatures within which lithium-ion cells generate heat in normal operation, the sleeve 500 may contain at least one PCM 501 with transition temperature in some embodiments between 0-100° C., and in other embodiments specifically between 40-80° C. The PCM may have >10 J/g latent heat content in some embodiments and in other embodiments specifically >60 J/g. In yet other embodiments, the PCM may have a higher transition temperature range, such as between 25° C. and 140° C., and a latent heat of >2 J/g. In the example of FIG. 5 the PCM 501 is a microencapsulated PCM (mPCM) but can also be a raw or otherwise unencapsulated PCM such as a pPCM (polymeric PCM) or an fpPCM (functional polymeric PCM). In some embodiments, there may be more than one type of PCM within the sleeve 500. In other embodiments, a substantially homogenous composite polymeric PCM may comprise the entire sleeve.

Because of the need for close contact between the sleeve 500 and the outer surface of the battery cell 505, the elastomeric polymer matrix can have good thermal elasticity properties characterized by low coefficient of thermal expansion (CTE) and high fatigue or creep resistance. In the embodiment depicted, these values can be a CTE of <200 ppm (per ASTM E228) and no fatigue failure (per ASTM D7791, Method A, 2 Hz, 2 mPa, Stress, sinusoidal wave.) Such properties can minimize the likelihood of air gaps forming or expanding between the sleeve 500 and the cell 505 over time as the cell 505 undergoes charge/discharge cycles.

Still referring to FIG. 5A, a gel layer 503 may be used, as discussed previously in this disclosure, to fill any air gaps between the sleeve 500 and the cell 505. The gel 503 may also act as a lubricant and facilitate the application of the sleeve 500. The gel 503 may be characterized as a grease or a wax in certain embodiments. Though the gel 503 as depicted in FIG. 5 is a relatively thick layer, it is depicted as such for illustration and is not necessarily to scale. The gel 503 may be a lower molecular weight version of the same polymer matrix, TMM, and/or PCM blends that comprise the sleeve 500. In comparison to the properties of the sleeve 500, the gel 503 may have a higher percentage of conductivity additives (i.e., graphene, graphite, carbon fibers, metals, etc.) to improve the thermal transport.

As previously discussed, impact resistance can protect the internal components of the cell 505 from damage. In the embodiment depicted, the sleeve 500 can have hardness and stiffness properties that enable such protection. Additionally, the hardness and stiffness properties can prevent deformation of empty sleeves from stacking during shipping. Therefore, the sleeve 500 may have a Shore A hardness of >85 and a Shore D hardness >25 (per ASTM D2240). Additionally, the sleeve 500 may have a flex modulus of >15 psi (per ASTM D790) and a break elongation >20% (per ASTM D638). The foregoing properties of the sleeve 500 as described herein may be accomplished by one or more of the chemical structures described throughout this disclosure.

Figure 5B:
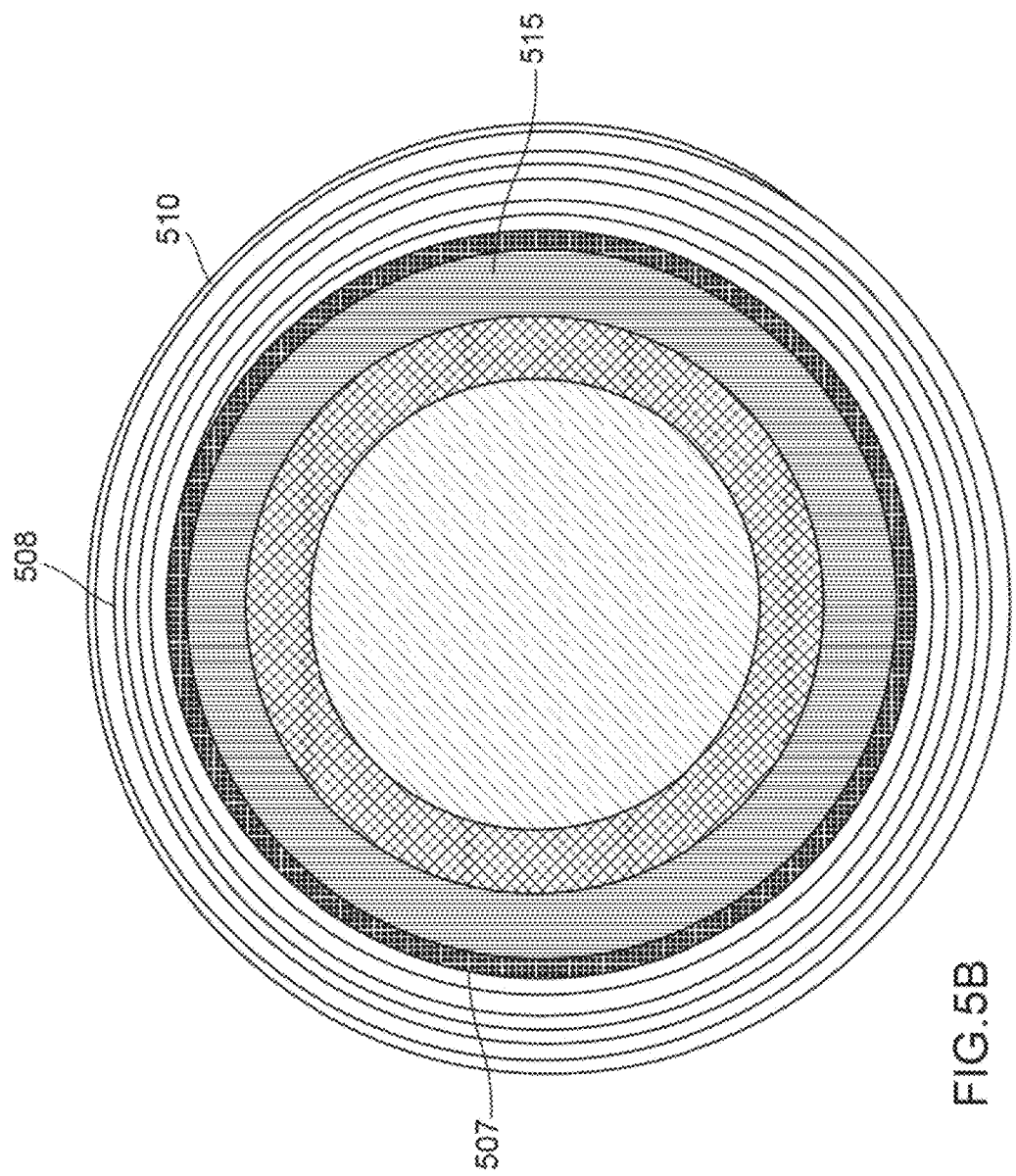
FIG. 5B shows a top view of a tape embodiment of the casing surrounding a battery cell.

Another embodiment of the disclosure may be achieved as depicted in FIG. 5B. FIG. 5B shows a battery cell 515 that is similar to battery cells 405 and 505 of FIGS. 4A and 5A, respectively. A battery casing sleeve 510 in the embodiment depicted can be applied to the cell 515 as a film or tape wrapped around the cell 515 multiple times. A layer of the film or tape is depicted at 508. The film or tape may be comprised of a polymer matrix with similar properties as described with reference to the sleeve 500 in FIG. 5, but may be thinner. The film or tape may be tapered in thickness at one or more of its ends in order to facilitate application. Any of the materials disclosed herein which may be used to comprise sleeve 500 in FIG. 5 may also be used to comprise the film or tape.

An adhesive 507 may be used to initially attach the first layer of film or tape to the outside of the cell 515. The adhesive 507 may be comprised of lower molecular weight versions of the TMM or PCM of the film or tape itself. The adhesive 507 may be a backing to the film or tape itself, such that each wrapping of the film or tape around the circumference of the cell 515 results in a layer of adhesive and the polymer matrix. The adhesive may have similar thermal management properties as the polymer matrix itself. It is contemplated that certain compositions of the polymer matrix film or tape may have intrinsic "sticky" or "tacky" properties, such that no additional adhesive material is required to layer the film or tape onto itself. The film or tape may also have "shrink wrap" properties, such that the film or tape is supplied in an oriented form (polymer chains are aligned) and when heated the film or tape will shrink (due to polymer chains randomizing), adhere and fill any air gaps either within the tape/film layers or at the battery surface. An advantage to the film or tape embodiment of the sleeve 510 is that the thickness of the sleeve can be adjusted for the particular application. That is, higher-heat generating applications can use more film or tape to manage the thermal properties of the cells used therein. Device manufacturers or end users could customize the thermal management as required. Various embodiments of film and tape applications, including compositions and methods of manufacturing thereof, are fully disclosed in the co-owned and co-pending application entitled "Thermal Management Films Containing Phase Change Materials," U.S. patent application Ser. No. 14/614,236, filed on Feb. 4, 2015, which is incorporated herein by reference in its entirety.

For the purposes of this disclosure, the term "temperature management material (TMM)" may refer to any single material or composition of multiple materials that have some temperature management properties. For example, an entire sleeve can be said to be made of temperature management material, or just a gel by itself can be a temperature management material. Certain materials that have relatively low effectiveness for regulating temperature in comparison to other materials with which they are combined may be referred to as "thermal conductive fillers." That is, these fillers have some temperature management properties, but they may be included in a mixture because their other properties are beneficial; properties such as energy conduction, mechanical strength, fire resistance, rheology, viscosity, elasticity, etc. These thermal conductive fillers may be liquid or solid. PCMs may be referred to as temperature management materials themselves, but will generally not be referred to as thermal conductive fillers because they have exceptional temperature management qualities. As will be described in further detail below, there are various types of PCMs.

Figure 6A:
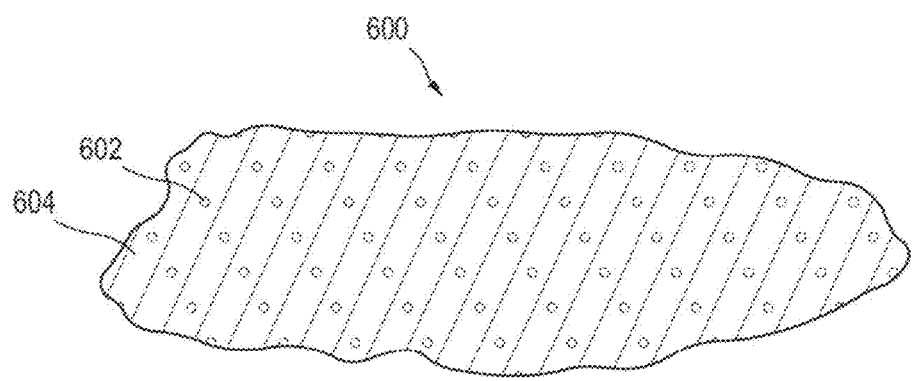
FIGS. 6A-6C show embodiments of thermal management material in accordance with some embodiments of the present disclosure.
Figure 6B:
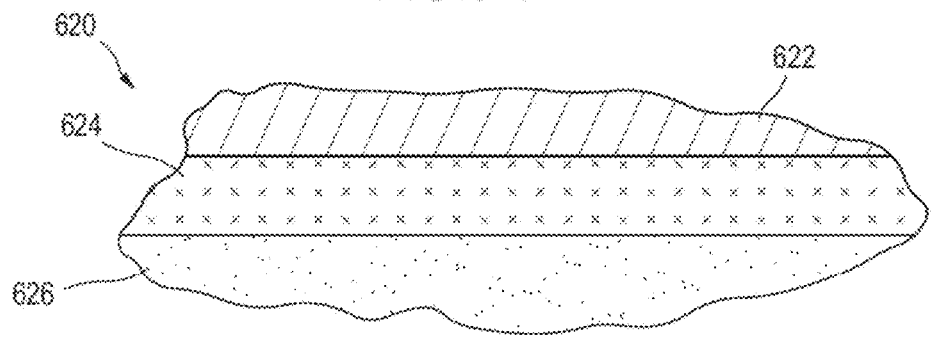
Figure 6C:
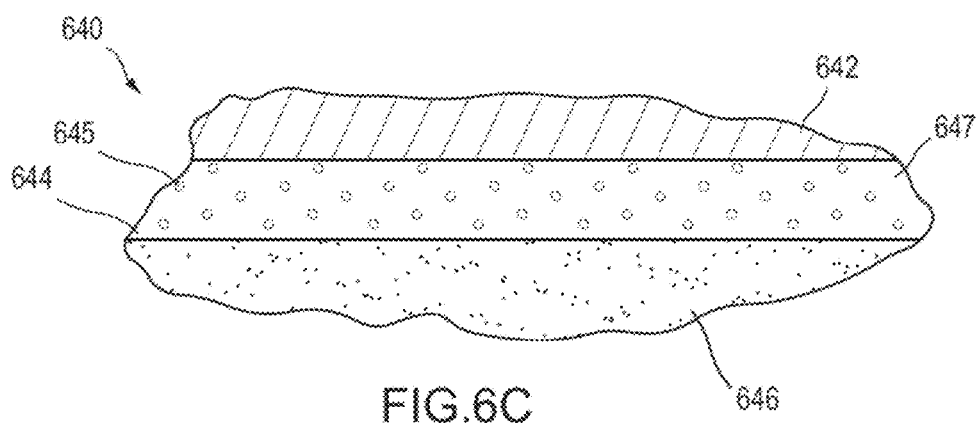

FIGS. 6A-6C show various embodiments of an elastomeric temperature management material in various arrangements with PCMs that may be used to form embodiments of the disclosure in matrix forms and layered forms. FIG. 6A shows a uniform mixture (or matrix) 600 of a PCM 602 and an elastomeric TMM 604. In the example of FIG. 6A, the PCM 602 is a microencapsulated PCM (mPCM) but can also be a raw or otherwise unencapsulated PCM such as a pPCM (polymeric PCM) or an fpPCM (functional polymeric PCM). However the phase change material is incorporated into the matrix 600, in the example of FIG. 6A, the matrix is a uniform substance with some level of homogeneity to the material. There are no specific layers within the example of FIG. 6A.

With reference to FIG. 6B, a layered composition 620 is shown that includes several layers. The layered composition may form a part of a sleeve such as the sleeve 500 depicted in FIG. 5A. For example, a one of the layers depicted in FIG. 6B may be the innermost or outermost layer of a sleeve. Alternatively, all the layers depicted in FIG. 6B could be disposed completely within a sleeve, having no contact with a battery cell or the ambient environment. In FIG. 6B, a layer 622 is formed from a thermal conductive filler such as an elastomeric TMM, a layer 624 is formed from a first phase change material, and a layer 626 is formed from a second phase change material. The layers 624 and 626 may each be any of an mPCM, pPCM, or fpPCM or the layers 624 and 626 may be combinations or blends of one or more of these types of phase change materials. In addition, each of layer 624 and 626 can utilize any of the PCM materials discussed herein in various combinations that may be necessary to fit a specific temperature control scenario. For example, certain electrochemical cells may generate more heat, or have a steeper heating curve profile and thus warrant the use of PCMs that have higher latent heat values or higher PCM loading requirements in order to effectively manage the temperature changes that occur in those electrochemical cells. Other applications may have more subtle temperature change profiles and may not demand PCMs with such large latent heat values and can thus utilize lower loading amounts.

With reference to FIG. 6C, another layered composition 640 is shown that also includes several layers. A layer 642 is formed from an elastomeric TMM, a layer 644 is formed from a first phase change material, and a layer 646 is formed from a second phase change material. As with the example of FIG. 6B, the layers 644 and 646 may each be any of an mPCM, pPCM, or fpPCM or the layers 644 and 646 may be combinations or blends of one or more of these types of phase change materials. In addition, each of layer 644 and 646 can utilize any of the PCM materials discussed herein in various combinations that may be necessary to fit a specific temperature control scenario. In the embodiment and example of FIG. 6C, layer 644 is shown utilizing microcapsules 645. These microcapsules may be within a polymeric binder 647 (with or without its own PCM and latent heat qualities).

FIGS. 7A-15B will be discussed later in this disclosure.

Figures 16A, 16B, 16C:
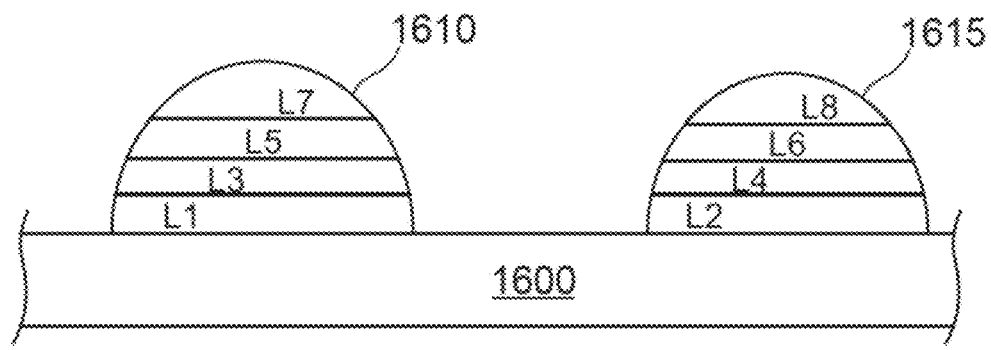
FIGS. 16A-16C show various layering embodiments that may be used in connection with aspects of the present disclosure.

FIGS. 16A-16C show other layering options that may be utilized in constructing the structure (e.g., sleeve or tape) for temperature management and heat dissipation. As exemplified in FIGS. 16A-16C, any combination of these different layers are also possible. In FIGS. 16A-16C, each of L1 through L8 represent different layers within a sleeve 500 or 510 or different regions within a discrete portion of a sleeve 500 or 510. It should be understood that many different combinations of these layers are possible and it is not intended to limit the disclosure to any of the physical structures depicted by FIGS. 16A-16C. These are merely representative of several of the possibilities.

Use of PCMs and Other Thermal Management Materials

The sections above describe various compositions and other materials that may be used in connection with the electrochemical cells and packs that may benefit from the temperature control and thermal management aspects of the present disclosure. However, by referring to any of the specific structural embodiments or any of the precise and specific chemical compositions (above or further in this disclosure), it is not intended to limit the scope of the claims to any one in particular. To the contrary, the specification is arranged such that one of skill in the art could combine one or more of the cells and battery packs described herein with one or more of the chemical compositions described herein in order to create a configuration that worked for a specific purpose.

While the above description of phase change technology and the different types of chemicals and other materials useful in temperature regulation is generally applicable and relevant to aspects and embodiments of the present disclosure, there are other aspects and unique features that find particular relevance in electrochemical cell thermal management applications.

Thermal Management Materials (TMM) for Electrochemical Cell Temperature Control

PCMs are very advantageous for use as thermal management materials in electrochemical cells and packs in that the high crystallinity allows for a combination of good thermal conductivity, high latent heat capacity and energy absorption all leading to improved heat management, lower heat buildup, lower rate of degradation of the cell, and lower likelihood of thermal runaway.

Air is a very poor thermal conductor and therefore air spaces or air gaps anywhere within the TMM is not preferred. Air gaps such as between the individual cells and thermal management materials, cracks or voids within the TMM, voids or gaps between particles and the TMM composite or matrix material, etc. are all problematic for good thermal conductivity. For example, sliding a sleeve or wrapping a tape around a battery requires that two solid surfaces be brought together into intimate contact. Unfortunately, no matter how well prepared, solid surfaces are never really flat or smooth enough to permit intimate contact. All surfaces have a certain roughness due to microscopic hills and valleys. Superimposed on this surface roughness is a macroscopic non-planarity in the form of a concave, convex or twisted shape. As two such surfaces are brought together, only the hills of the surfaces come into physical contact. The valleys are separated and form air-filled gaps. Since air is a poor conductor of heat, it should be replaced by a more conductive material to increase the joint conductivity and thus improve heat flow across the thermal interface. Adding to the difficulty of creating contact between solid surfaces, certain characteristics of electrochemical cells create additional problems. For example, even standard-sized commercially available batteries, such as a lithium-ion 18650, may vary slightly in size from one manufacturer to another. Therefore, standard-sized battery sleeves may not fit certain batteries as well as others.

Additionally, the batteries themselves go through multiple cycles of heating and cooling, resulting in the slight expansion and contraction of the cell itself. It follows that any material in close contact with the battery will also go through multiple cycles of expansion and contraction, and any materials that do not have good elastomeric properties might lose contact over time. The thermal management materials should have good rheological characteristics and surface wetting to have good "gap-filling" properties, i.e. the ability to flow, wetout and fill gaps, crevices, cracks, etc. to reduce air gaps and improve thermal movement. These TMM flow properties can be formulated into the material through the use of additives or designed into the TMM molecules. TMMs can also be used in a liquid form such as a gel or a grease to maintain contact between a solid TMM and the battery.

TMMs should also have good adhesive, tack, or bonding properties to prevent the loosening of contact between the TMM and the battery cells when the device being powered is dropped, damaged, impacted or exposed to high or low temperatures.

For electrochemical cell and pack applications, TMMs should also have good impact and puncture resistance. As discussed previously, overheated cells in direct contact with each other can cause thermal runaway, leading to fires and explosions. Additionally, an electrochemical cell damaged by impact or puncture can easily be ignited itself, and can cause further ignition and explosions of nearby cells or other combustible materials. Electrochemical packs in vehicles can create a risk of fires if the vehicles are involved in collisions and the packs are impacted. The presence of combustible components in vehicles makes the necessity for physical protection of electrochemical cells and packs apparent.

Current electrochemical device thermal management materials have many disadvantages such as poor latent heat properties, poor heat sink properties in the appropriate temperature range, poor gap/void filling properties, poor rheology, etc.

FIGS. 17-20 show graphs that illustrate the benefits of using aspects of the present disclosure in connection with battery cells and the ability of embodiments of the present disclosure to moderate the buildup of heat during various charging, discharging, and cycling functions of cells.

Figure 17:
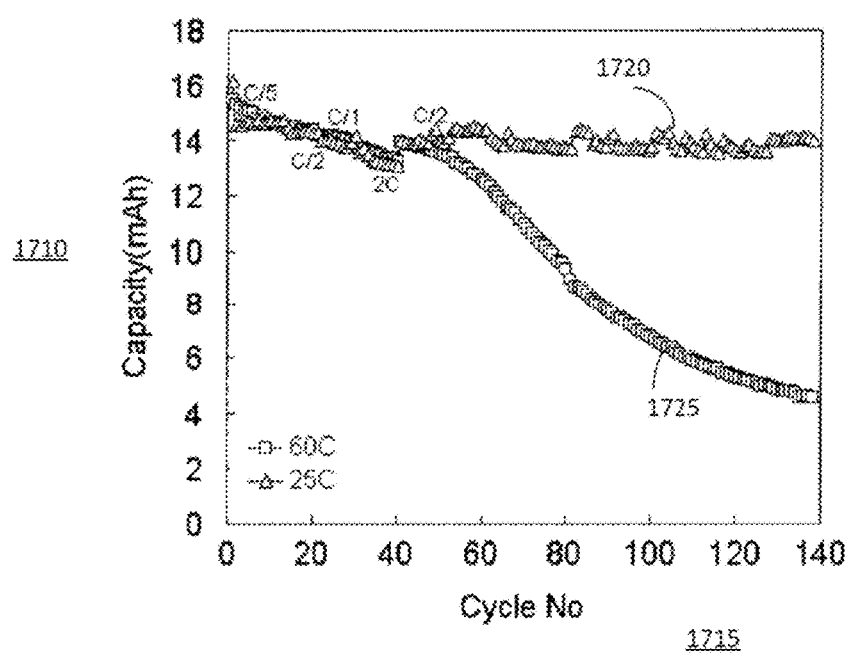
FIG. 17 is a graph that illustrates the degradation of capacity in battery cells over time.

FIG. 17 is a graph that illustrates the degradation of capacity in lithium-ion 18650 cells over a number of cycles in relation to temperature. In the experiment represented by this graph, the y-axis at 1710 shows a cell's capacity as measured by milliampere hours (mAh), from 0-18. The x-axis at 1715 shows the number of cycles each cell cycles through in the experiment, from 0-140. The graph line at 1720 represents the capacity of a cell as it cycles through up to 140 cycles while its temperature is maintained at 25° C. The graph line at 1725 shows the capacity of a cell as it cycles through up to 140 cycles while its temperature is maintained at 60° C. As illustrated by the graph line at 1720, the cell at 25° C. only experienced minimal degradation—from about 16 mAh to 14 mAh over 140 cycles. In comparison, the cell at 60° C. experienced significant degradation—from about 16 mAh to about 5 mAh over 140 cycles. This graph illustrates that there are performance and longevity benefits to be gained by lowering the temperature of a lithium-ion 18650 cell throughout cycles.

Figure 18:
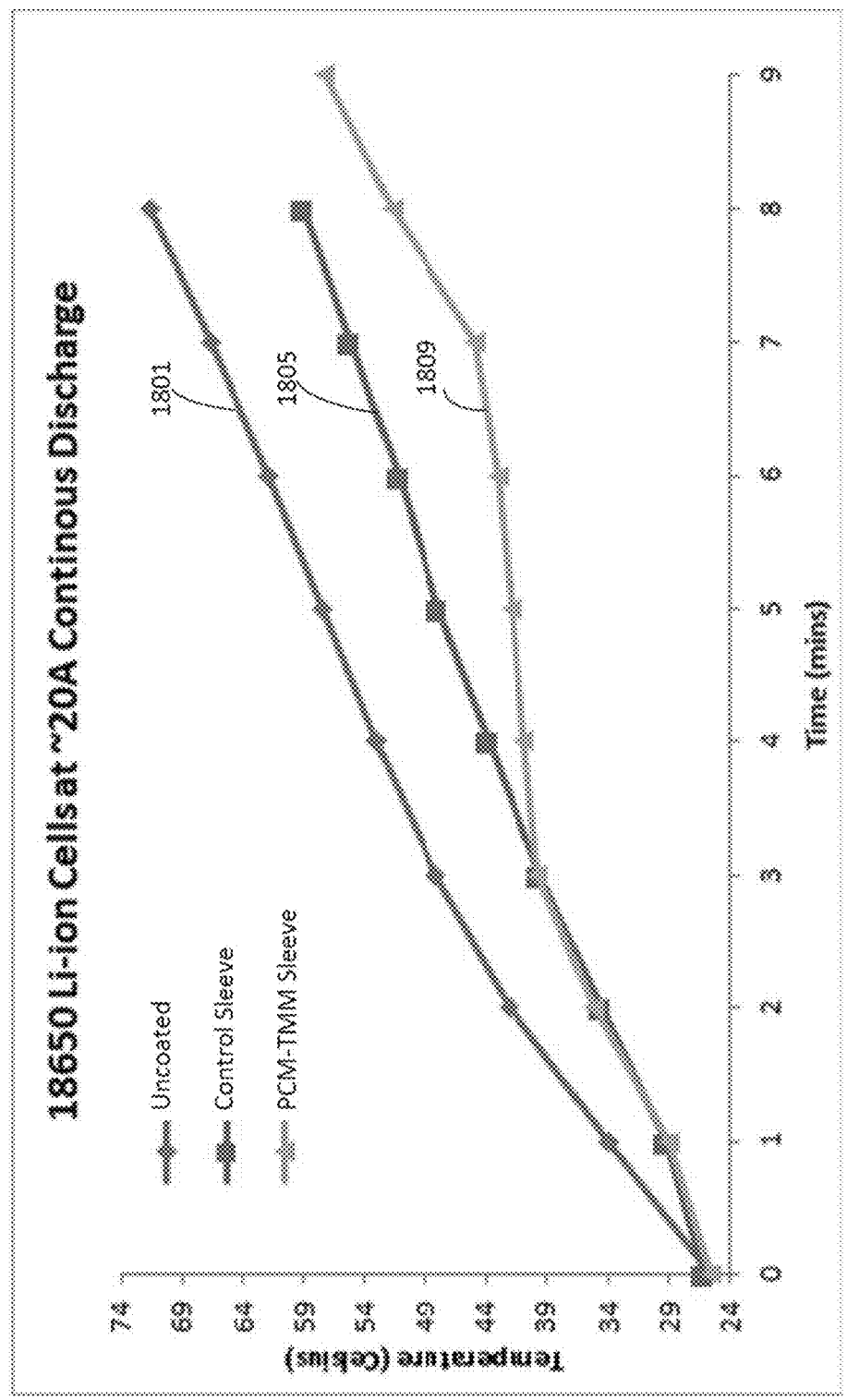
FIG. 18 is a graph illustrating how an embodiment of the disclosure reduced operating temperatures of cells being discharged.

FIG. 18 is a graph illustrating how a PCM-containing TMM formulation was able to reduce operating temperatures of cells being discharged. For ease of reference, the PCM-containing TMM sleeves used in these experiments will be referred to as PCM-TMM sleeves. In the experiment represented by this graph, three individual lithium-ion 18650 cells were discharged at a continuous rate of 20 A for a period of eight minutes, the time being represented on the x-axis. To test the effectiveness of PCM-TMM sleeves to manage surface temperatures of lithium-ion batteries in particular, a single 20 A discharge testing regime was undertaken using a resistive load tester. This tester contained a circuit in which two resistors of 0.33Ω were wired in parallel and connected to a battery holder containing the lithium-ion battery. Testing was started and stopped manually via a circuit interrupt switch. Voltage was monitored throughout the test via a digital multimeter with leads attached to the terminals of the battery holder. All tests began with an open circuit potential of 4.1V for each battery and stopped once closed circuit voltage reached 2.4V. The surface temperatures of each cell were monitored via an infrared camera as well as a thermocouple attached to a digital readout to directly measure cell surface temperatures. Temperature measurements were taken every minute from the start to the end of each test.

Each battery had different temperature controls. A first battery cell was uncoated, meaning it had no sleeve surrounding it. Its temperature profile is represented on the graph as "uncoated." A second cell was encased in a control polymer sleeve, meaning that the polymer did not have specifically optimized thermal management qualities and did not contain any PCMs. The particular polymer used in this control sleeve was epoxy, which has been used in the prior art to physically protect battery cells. Its temperature profile is represented on the graph as "control sleeve." The control (epoxy only) sleeve and PCM-TMM sleeve were formed around the battery using an epoxy composite. The control sleeve was only epoxy and no PCM, whereas the PCM-TMM sleeve contained 45% microencapsulated docosane (an mPCM). Both sleeves weighed approximately 12 grams.

As shown in the graph of FIG. 18, the results show that the temperature of the PCM-TMM sleeved batteries, shown at graph line 1809, reached an average temperature of 50° C. at 8 minutes. In comparison, the control sleeved cells reached an average end of discharge surface temperature of 57° C., shown at graph line 1805. The uncoated cell, shown at graph line 1801, reached a temperature of nearly 72° C. after eight minutes of continuous discharge.

Figure 19:
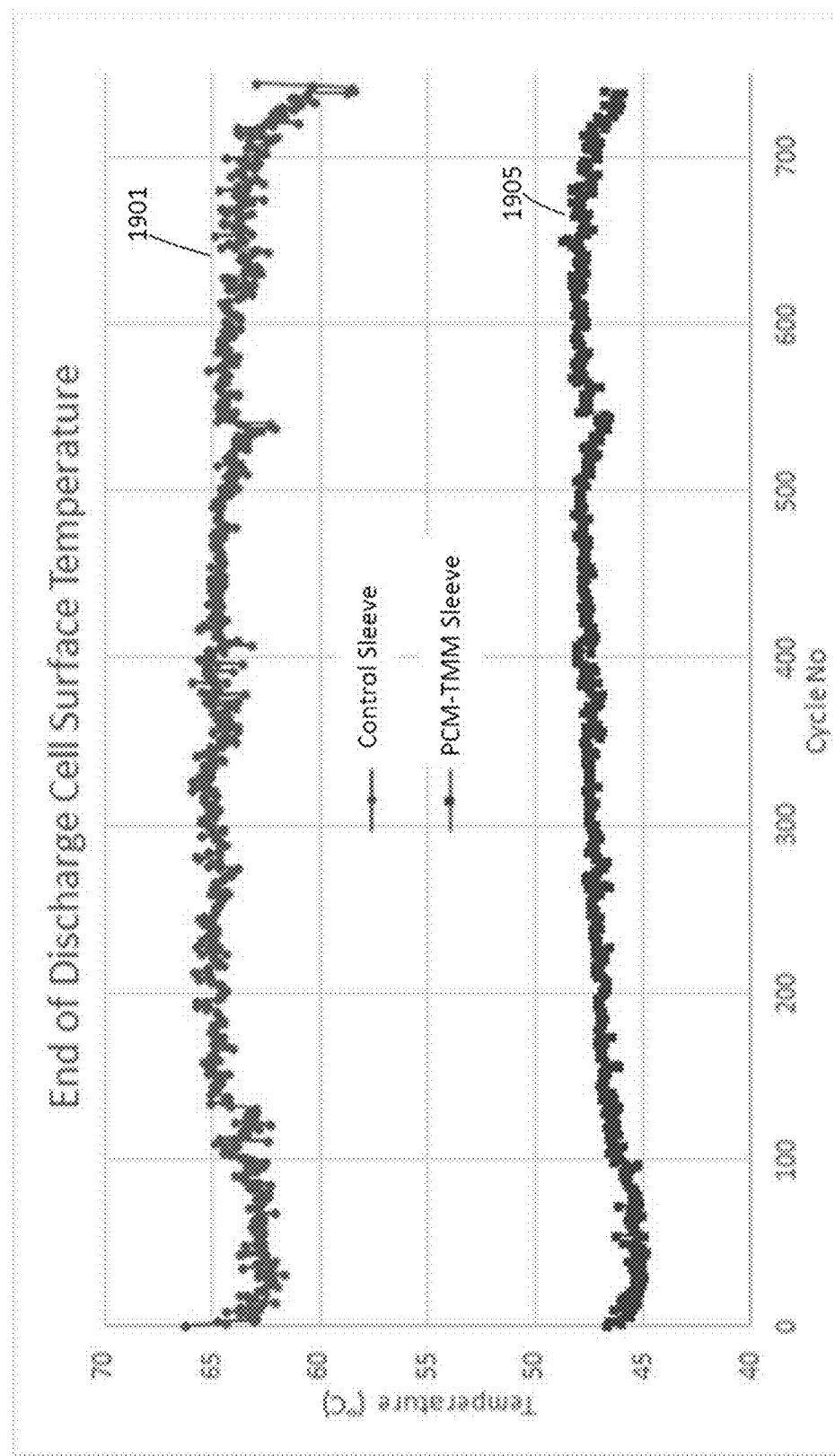
FIG. 19 is a graph illustrating the surface temperatures of cells in an experiment testing an embodiment of the disclosure.
Figure 20:
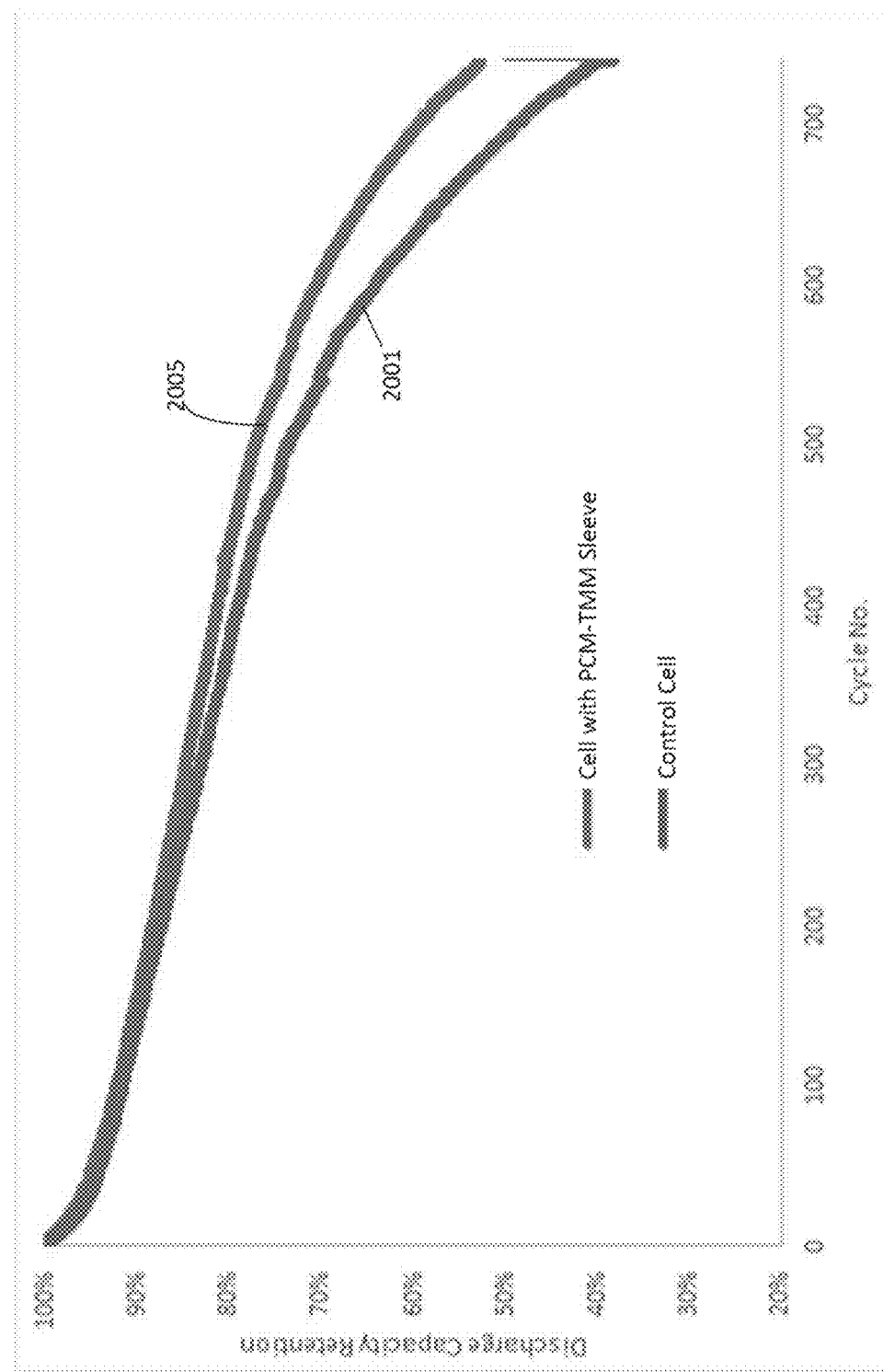
FIG. 20 is a graph illustrating the discharge capacity retention of cells in the experiment illustrated in FIG. 19.

FIGS. 19 and 20 show the results of a different experiment, which used battery charge and discharge testing, undertaken to evaluate the temperature management properties of a PCM-TMM sleeve and the effect of temperature management (e.g., lower temperatures) on battery capacity retention. An 18650 Li-ion battery with a 1.95 Ah rated capacity was encased in a PCM-TMM sleeve and compared to an 18650 Li-ion control battery without a sleeve. Both batteries underwent 700 charge and discharge cycles. Battery surface temperatures and battery charge and discharge capacity were measured. The PCM-TMM sleeve was comprised of 50% microencapsulated docosane in 50% polyolefin copolymer elastomer. The sleeve weighed 7.3 grams and fit snugly around the cell. The control cell and the PCM-TMM-sleeved cell were tested on separate battery holders with thermocouples attached to the surface of each cell. For the PCM-TMM-sleeved cell, the thermocouple was placed underneath the sleeve in order to measure the cell surface temperature directly. A computer controlled galvanostat/potentiostat with precise voltage and current control was used to compare the charge and discharge capacity retention behavior between the control cell and the PCM-TMM-sleeved cells. The results of the discharge capacity retention will be described presently with reference to FIG. 20. This instrument was also used to determine the phase change reliability via real-time monitoring of attached thermocouples attached to the surface of each cell. Phase change reliability refers to the capacity of the PCM to be cycled indefinitely without losing its temperature management properties. That is, a PCM with good phase change reliability is capable of absorbing heat, melting, releasing heat, and crystallizing over and over again.

The testing protocol consisted of the following steps: First, the cells rested for one minute before charging at 1.95 A until the voltage of each cell reached 4.2V. Next, the cells trickle charged until the current of each cell dropped below 0.25 A. Next, the cells rested for 2 minutes before discharging at 20 A until voltage of 2.5V was achieved by each cell. Next, the cells rested for 15 minutes before looping back to the charge cycle. This series of steps was repeated 700 times. FIG. 19 shows the end of discharge surface temperature for the control and PCM-TMM-sleeved cell after each cycle along two graph lines. The temperature of the control cell is depicted by graph line 1901 and the temperature of the PCM-TMM-sleeved cell is depicted by graph line 1905. The data, represented on the graph of FIG. 19, shows that the PCM-TMM sleeve kept the battery surface approximately 17° C. cooler for each cycle.

FIG. 20 shows the discharge capacity retention of the control cell and the PCM-TMM-sleeved cell over the 700 cycles of charge and discharge. The graph line at 2001 depicts the discharge capacity retention of the control cell, and the graph line at 2005 depicts the discharge capacity retention of the PCM-TMM-sleeved cell. As shown by the data, the discharge capacity of the PCM-TMM-sleeved cell remains greater than the discharge capacity of the control cell during all cycles, and the difference between the two cells becomes greater as the number of cycles increases. The difference demonstrates that lower battery temperatures lead to less battery degradation and longer life, as shown by the higher retention in discharge capacity of the PCM-TMM-sleeved cell.

It is contemplated that different types of cells, and cells used in different applications (i.e., higher voltage, higher discharge, longer time periods, more frequent cycles) than the cells and applications in these experiments may require different formulations of PCM-containing TMMs. Various ways of achieving the desired thermal management properties for particular cells and applications are discussed throughout this disclosure. The specific formulations of PCM-TMM sleeves described in the experiments of FIGS. 17-20 are merely exemplary embodiments of the disclosure, and should not be construed as limiting the scope of the disclosure.

As described in general terms above and in the definition section, the term "phase change material" refers to a material that has the capability of absorbing or releasing heat to adjust heat transfer at or within a temperature stabilizing range. A temperature stabilizing range can include a specific transition temperature or a range of transition temperatures. In some instances, a phase change material can be capable of inhibiting heat transfer during a period of time when the phase change material is absorbing or releasing heat, typically as the phase change material undergoes a transition between two states. This action is typically transient and will occur until a latent heat of the phase change material is absorbed or released during a heating or cooling process. Heat can be stored or removed from a phase change material, and the phase change material typically can be effectively recharged by a source of heat or cold. For certain implementations, a phase change material can be a mixture of two or more materials. By selecting two or more different materials and forming a mixture, a temperature stabilizing range can be adjusted for any desired application. The resulting mixture can exhibit two or more different transition temperatures or a single modified transition temperature when incorporated in the articles described herein.

PCMs that can be used include various organic and inorganic substances. Organic PCMs may be preferred for the embodiments disclosed herein. Examples of phase change materials include hydrocarbons (e.g., straight-chain alkanes or paraffinic hydrocarbons, branched-chain alkanes, unsaturated hydrocarbons, halogenated hydrocarbons, and alicyclic hydrocarbons), alkanes, alkenes, alkynes, arenes, hydrated salts (e.g., calcium chloride hexahydrate, calcium bromide hexahydrate, magnesium nitrate hexahydrate, lithium nitrate trihydrate, potassium fluoride tetrahydrate, ammonium alum, magnesium chloride hexahydrate, sodium carbonate decahydrate, disodium phosphate dodecahydrate, sodium sulfate decahydrate, and sodium acetate trihydrate), waxes, oils, water, fatty acids (caproic acid, caprylic acid, lauric acid, myristic acid, palmitic acid, stearic acid, arachidic acid, behenic acid, lignoceric acid and cerotic acid, etc.), fatty acid esters (methyl caprylate, methyl caprate, methyl laurate, methyl myristate, methyl palmitate, methyl stearate, methyl arachidate, methyl behenate, methyl lignocerate, etc.), fatty alcohols (capryl alcohol, lauryl alcohol, myristyl alcohol, cetyl alcohol, stearyl alcohol, arachidyl alcohol, behenyl alcohol, lignoceryl alcohol, ceryl alcohol, montanyl alcohol, myricyl alcohol, and geddyl alcohol, etc.), dibasic acids, dibasic esters, 1-halides, primary alcohols, secondary alcohols, tertiary alcohols, aromatic compounds, clathrates, semi-clathrates, gas clathrates, anhydrides (e.g., stearic anhydride), ethylene carbonate, methyl esters, polyhydric alcohols (e.g., 2,2-dimethyl-1,3-propanediol, 2-hydroxymethyl-2-methyl-1,3-propanediol, ethylene glycol, polyethylene glycol, pentaerythritol, dipentaerythritol, pentaglycerine, tetramethylol ethane, neopentyl glycol, tetramethylol propane, 2-amino-2-methyl-1,3-propanediol, monoaminopentaerythritol, diaminopentaerythritol, and tris(hydroxymethyl)acetic acid), sugar alcohols (erythritol, D-mannitol, galactitol, xylitol, D-sorbitol), polymers (e.g., polyethylene, polyethylene glycol, polyethylene oxide, polypropylene, polypropylene glycol, polytetramethylene glycol, polypropylene malonate, polyneopentyl glycol sebacate, polypentane glutarate, polyvinyl myristate, polyvinyl stearate, polyvinyl laurate, polyhexadecyl methacrylate, polyoctadecyl methacrylate, polyesters produced by polycondensation of glycols (or their derivatives) with diacids (or their derivatives), and copolymers, such as polyacrylate or poly(meth)acrylate with alkyl hydrocarbon side chain or with polyethylene glycol side chain and copolymers including polyethylene, polyethylene glycol, polyethylene oxide, polypropylene, polypropylene glycol, or polytetramethylene glycol), metals, and mixtures thereof. Any combination of natural alcohols, natural fatty acids, sugars, celluloses and natural glycols can be combined to yield PCMs. General formulas such as the following, where m or n can be 0-100:

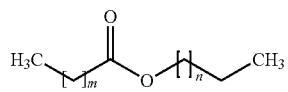

Polymerized alcohols such as polyvinyl alcohol, polyglycerols (mol. wt. of 100-10,000) or multifunctional alcohols esterified with various fatty acids.

Paraffinic PCMs may be a paraffinic hydrocarbons, that is, hydrocarbons represented by the formula $C_nH_{n+2}$, where n can range from about 10 to about 44 carbon atoms. PCMs useful in the disclosure include paraffinic hydrocarbons having 13 to 50 carbon atoms. For example, the melting point of a homologous series of paraffin hydrocarbons is directly related to the number of carbon atoms as shown in the following table:

| Paraffinic Hydrocarbon | No. of Carbon Atoms | Melting Point (° C.) |
|---|---|---|
| n-Octacosane | 28 | 61.4 |
| n-Heptacosane | 27 | 59.0 |
| n-Hexacosane | 26 | 56.4 |
| n-Pentacosane | 25 | 53.7 |
| n-Tetracosane | 24 | 50.9 |
| n-Tricosane | 23 | 47.6 |
| n-Docosane | 22 | 44.4 |
| n-Heneicosane | 21 | 40.5 |
| n-Eicosane | 20 | 36.8 |
| n-Nonadecane | 19 | 37.1 |
| n-Octadecane | 18 | 28.2 |
| n-Heptadecane | 17 | 22.0 |
| n-Hexadecane | 16 | 18.2 |
| n-Pentadecane | 15 | 10.0 |
| n-Tetradecane | 14 | 5.9 |
| n-Tridecane | 13 | −5.5 |

Use of Polymeric Phase Change Materials (PPCMs) and Functional Polymeric Phase Change Materials (FP-PCMs) as TMMs Reactive Functional Groups Examples of suitable reactive functional groups include functional groups such as acid anhydride groups, amino groups, N-substituted amino groups and their salts, amide groups, imine groups, imide groups, azide groups, azo groups, amine-formaldehyde groups, carbonyl groups, carboxy groups and their salts, cyclohexyl epoxy groups, epoxy groups, glycidyl groups, hydroxy groups, isocyanate groups, cyanate groups, urea groups, aldehyde groups, ketone groups, ester groups, ether groups, alkenyl groups, alkynyl groups, thiol groups, disulfide groups, silyl or silane groups, halogenated leaving groups, peroxide groups, salt groups, groups based on glyoxals, groups based on aziridines, groups based on active methylene compounds or other b-dicarbonyl compounds (e.g., 2,4-pentandione, malonic acid, acetylacetone, ethylacetone acetate, malonamide, acetoacetamide and its methyl analogues, ethyl acetoacetate, and isopropyl acetoacetate), halo groups, hydrides, or other polar or H bonding groups and combinations thereof.

Further details of the variety of examples of reactive functions and functional groups that may be used in accordance with one or more aspects of the present disclosure can be found in commonly owned U.S. Pat. Nos. 8,404,341 and 8,221,910, the details of which have been incorporated by reference into this disclosure. It should be clearly understood that by providing examples of specific compositions and methods in the later part of this description, applicant does not intend to limit the scope of the claims to any of those specific composition. To the contrary, it is anticipated that any combination of the functional groups, polymeric phase change materials, and articles described herein may be utilized to achieve the novel aspects of the present disclosure. The claims are not intended to be limited to any of the specific compounds described in this disclosure or any disclosure incorporated herein.

Polymeric Phase Change Materials and Reactivity

Several publications referenced herein deal with polymeric PCMs (pPCM), which present an intermediate case between the solid-liquid PCMs and the solid-solid PCMs. pPCMs are solid both prior to phase change and after it. The difference is in their degree of structure. At lower temperatures, that degree is greater than that at the elevated temperature, so that at a temperature of phase change, pPCM converts from the more structured form into its less structured one. Typically, in the more structured form, some sections of the polymer are better aligned and more closely compacted. The better aligned sections resemble crystallites. Therefore, the phase change on heating pPCM is also referred to as change from a more crystallized form to a less crystallized form. Differently put, at the elevated temperatures (above the transition temperature), pPCMs are essentially amorphous. At the lower temperatures (below the transition temperature) they have a degree of crystallinity. Similarly, the changes on heat absorption and on heat release could be referred to as decrystallization and recrystallization, respectively. The related enthalpy could also be referred to as enthalpy of decrystallization.

Typically, pPCMs have sections that are capable of being better aligned and more closely compacted. Such sections could be referred to as crystallizable sections. In some embodiments, the functional polymeric PCM described herein in accordance with various aspects of the present disclosure comprises at least one such crystallizable section. According to an embodiment of the disclosure, the polymer comprises a backbone and side chains. Preferably, the side chains form a crystallizable section.

Functional Polymeric Phase Change Materials (fpPCMs)

As used here, the term "reactive function" means a chemical group (or a moiety) capable of reacting with another chemical group to form a covalent or an electrovalent bond, examples of which are given above. In some embodiments such reaction is feasible at relatively low temperatures, e.g. below 300, in other embodiments, below 200° C., in other embodiments, below 100° C., and at conditions suitable for electrochemical device applications. As used herein the term "carrying a function" and obvious variations of this term, means having a function bound to it, e.g. covalently or electrovalently.

The reactive function could be placed on (carried on or covalently bound or electrovalently bonded to) any part of the fpPCM molecule, e.g. on a side chain, along the backbone chain or on at least one of the ends of the backbone chain or side chain. According to various embodiments of the disclosure, the fpPCM comprises multiple reactive functions and those functions are spread at substantially regular intervals, stereospecifically (i.e. isotactic, syndiotactic, or atactic, etc.) or randomly along the molecule, e.g. along the backbone chain. Any combination of these is also possible.

The molecular weight of an fpPCM in some embodiments may be of at least 500 Daltons, and in other embodiments, specifically of at least 2000 Daltons. In some embodiments the weight of the crystallizable section forms at least 20%, in other embodiments at least 50%, and in other embodiments at least 70% of the total weight of the fpPCM. Mol. wts. can range from 500 Daltons to millions of Daltons, as exemplified by the use of ultra-high mol. wt. polyethyelene (UHMWPE)

The molecular weight can be monodisperse or polydisperse where all the polymer molecules are the same molecular weight or different molecular weights as defined by the polydispersity. Mn is the number average molecular wt., Mw is weight average molecular wt. and the molecular wt. polydispersity (Pd) is defined by Mn/Mw. A Pd of 1.0 means all polymer molecules are monodisperse and have the same molecular weight. Aspects of a composition constructed in accordance with the present disclosure have a Pd of between 1.0-100, in some embodiments between 1.0-10.0, and in yet other embodiments, between 1.0-5.0.

Aspects of the present disclosure pertain to utilizing a PCM with a single phase change temperature or multiple such temperatures. According to one embodiment, a fpPCM has at least one phase change temperature in the range between −10° C. and 300° C. In other embodiments, the range is between 10° C. and 100° C. In these embodiments, the fpPCM may have a phase change enthalpy of at least 25 J/g. According to another embodiment, an fpPCM has a transition temperature in the range of 0° C. to 100° C., and in other embodiments, specifically between 40° C.-80° C. According to another embodiment, an fpPCM has a transition temperature between −60° C. and 60° C. In some instances, a phase change material can have a latent heat that is at least about 1 Joule per gram, at least about 5 Joules per gram (J/g), at least about 10 J/g, at least about 20 J/g, at least about 30 J/g, at least about 40 J/g, at least about 50 J/g, at least about 60 J/g, at least about 70 J/g, at least about 80 J/g, at least about 90 J/g, or at least about 100 J/g. Thus, for example, the phase change material can have a latent heat from about 5 J/g to about 400 J/g, 10 J/g to about 100, J/g, 20 J/g to about 100 J/g, from about 60 J/g to about 400 J/g, from about 80 J/g to about 400 J/g, or from about 100 J/g to about 400 J/g.

The phase change at each of the temperatures has its own enthalpy, so that according to some of the embodiments, the composition used has a single phase change enthalpy and, according to other embodiments, multiple such enthalpies. As used herein, the term "overall phase change enthalpy" refers to the enthalpy of phase change in the case of a structure with a single phase change temperature and to the combined enthalpies in case of multiple phase change temperatures. According to an embodiment of the disclosure, the composition has an overall phase change enthalpy of at least 2.0 Joules/gram (J/g).

An fpPCM used in accordance with various aspects of the present disclosure can have a designed stereospecificty. The fpPCM can be atactic, isotactic or syndiotactic. The fpPCM can be L-, D- or Meso-.

According to an embodiment of the disclosure, the fpPCM may have hydrophilic side chains. According to the same or another embodiment of the disclosure the fpPCM may have hydrophobic side chains. Examples of side chains or monomers which can provide these side chains are in the table below.

| Long Chain Group Containing Monomers | |
|---|---|
| R = | Monomers |
| Long chain n-alkyl crystallizible segments | $CH_2=CR'CO_2(CH_2)_nCH_3$ R' = $CH_3$ or H, n = 10-25 Long chain n-alkyl acrylates or methacrylates such as stearyl acrylate or stearyl methacrylate, $CH_2=CH-O-(CH_2)_nCH_3$, n = 10-25 Long chain n-alkyl vinyl ethers such as stearyl vinyl ether, $CH_2=CH-O-CO-(CH_2)_nCH_3$, n = 10-25, Long chain n-alkyl vinyl esters such as vinyl stearate, $CH_2=C-CO-(CH_2)_nCH_3$, n = 10-25, Long chain n-alkyl vinyl ketoness, $CH_2=CH-(CH_2)_nCH_3$, n = 4-25 Long chain n-alkyl olefins such as undecene, |

Long Chain Group Containing Monomers

| R = | Monomers |
|---|---|
| Long chain crystallizible glycol segments | or any other long chain n-alkyl containing unsaturated polymerizable monomer<br>$CH_2=CR'CO_2(CH_2CH_2O)_nOX$ R' = $CH_3$ or H, n = 1-1,000, X = $CH_3$ or H<br>Glycol based acrylates or methacrylates such as polyethyleneglycol methacrylate, polyethyleneglycol acrylate,<br>$CH_2=CH-(CH_2)_m-O-((CH_2)_nO)_zOX$ m = 0-4, n = 1-10, z = 1-1000, X = $CH_3$ or H<br>Glycol based vinyl ethers such as polyethyleneglycol monovinyl ether<br>$CH_2=CH-O-CO-((CH_2)_nO)_zOX$ n = 1-10, z = 1-1000, X = $CH_3$ or H glycol based vinyl esters such as polyethyleneglycol monovinyl ester or any unsaturated polymerizable hydroxyl functional monomer |

In addition other crystallizable sections of pPCMs are contemplated, including radicals of fatty acids, radicals of long-chain dicarboxylic acids, radicals of fatty alcohols, radicals of dialcohols, polyester-polycarboxylic or as previously described.

While each of the fpPCM molecules carries at least one reactive function, large fpPCM molecules may carry multiple reactive functions. According to an embodiment an fpPCM carries at least one reactive function per 1,000,000 Daltons of the molecular weight and in some embodiments, two reactive functions.

In various embodiments, the functions are shown along the backbone, but that is only one option. As indicated above, the functions could also be placed at the end(s) of the backbone, on the side chains and any combination of those. Each fpPCM may have a single or multiple reactive functions. fpPCM may also carry multiple reactive functions of a similar chemical nature or a combination of reactive functions of different chemical nature.

As indicated, the reactive function of the fpPCM should be capable of forming covalent or electrovalent bonds with various substrates that may form outer surfaces electrochemical devices. Substrates can include materials that comprise a battery or other electrochemical device surface, casing, box, container, or package. Examples of reactive functions capable of forming covalent bonds are acid anhydride groups, amino groups, N-substituted amino groups and their salts, amide groups, imine groups, imide groups, azide groups, azo groups, amine-formaldehyde groups, carbonyl groups, carboxy groups and their salts, cyclohexyl epoxy groups, epoxy groups, glycidyl groups, hydroxy groups, isocyanate groups, cyanate groups urea groups, aldehyde groups, ketone groups, ester groups, ether groups, alkenyl groups, alkynyl groups, thiol groups, disulfide groups, silyl or silane groups, halogenated leaving groups, peroxide groups, salt groups, groups based on glyoxals, groups based on aziridines, groups based on active methylene compounds or other b-dicarbonyl compounds (e.g., 2,4-pentandione, malonic acid, acetylacetone, ethylacetone acetate, malonamide, acetoacetamide and its methyl analogues, ethyl acetoacetate, and isopropyl acetoacetate), halo groups, hydrides, or other polar or H bonding groups and combinations thereof. fpPCMs capable of forming covalent bonds are disclosed in commonly assigned U.S. Pat. No. 8,404,341, the teaching of which is incorporated herein by reference in its entirety. Examples of reactive functions capable of forming electrovalent bonds are acid functions, basic functions, positively charged complexes and negatively charged complexes. fpPCM capable of forming electrovalent bonds such as disclosed in commonly assigned U.S. Pat. No. 8,221,910, the teaching of which is incorporated herein by reference in its entirety. For example, the following are examples of suitable reactive functional groups:

According to one embodiment, the fpPCM may carry reactive functions as its end group or groups. Examples of such FP-PCMs are α,ω-diglycidyl polyesters, α,ω-diglycidyl ethers, α,ω-diisocyanates, α,ω-diureas, α,ω-dialkenes, α-glycidyl polyesters, α-glycidyl ethers, α-ureas and α-isocyanates. (See e.g. the structures depicted in FIGS. 7-10)

Hydrocarbons—Functional groups that vary based upon the number and order of π bonds impart different chemistry and polarity. Each listing below contains C—H bonds, but each one differs in type (and scope) of reactivity.

| Chemical class | Group | Formula | Structural Formula |
|---|---|---|---|
| Alkene | Alkenyl | $R_2C=CR_2$ | 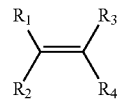 |
| Alkyne | Alkynyl | RC≡CR' | 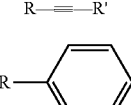 |
| Benzene derivative | Phenyl | $RC_6H_5RPh$ | 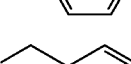 |
| Toluene derivative | Benzyl | $RCH_2C_6H_5RBn$ | 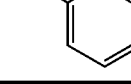 |

Groups containing halogens—Haloalkanes are a class of molecule that is defined by a carbon-halogen bond. This bond can be relatively weak (in the case of an iodoalkane) or quite stable (as in the case of a fluoroalkane). In general, with the exception of fluorinated compounds, haloalkanes readily undergo nucleophilic substitution reactions or elimination reactions. The substitution on the carbon, the acidity of an adjacent proton, the solvent conditions, etc. all can influence the outcome of the reactivity.

| Chemical class | Group | Formula | Structural Formula |
|---|---|---|---|
| haloalkane | halo | RX | R—X |
| fluoroalkane | fluoro | RF | R—F |
| chloroalkane | chloro | RCl | R—Cl |
| bromoalkane | bromo | RBr | R—Br |
| iodoalkane | iodo | RI | R—I |

Groups containing oxygen—Compounds that contain C—O bonds each possess differing reactivity based upon the location and hybridization of the C—O bond, owing to the electron-withdrawing effect of $sp^2$ hybridized oxygen and the donating effects of $sp^3$ hybridized oxygen.

| Chemical class | Group | Formula | Structural Formula |
|---|---|---|---|
| Acyl halide | Halo-formyl | RCOX | 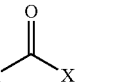 |

-continued

| Chemical class | Group | Formula | Structural Formula |
|---|---|---|---|
| Alcohol | Hydroxyl | ROH | R—O—H |
| Ketone | Carbonyl | RCOR' | $R^1$—C(=O)—$R^2$ |
| Aldehyde | Aldehyde | RCHO | R—C(=O)—H |
| Carbonate | Carbonate ester | ROCOOR | $R_1$—O—C(=O)—O—$R_2$ |
| Carboxylate | Carboxylate | RCOO⁻ | R—C(=O)—O⁻ ↔ R—C(—O⁻)=O |
| Carboxylic acid | Carboxyl | RCOOH | R—C(=O)—OH |
| Ether | Ether | ROR' | R—O—R' |
| Ester | Ester | RCOOR' | R—C(=O)—OR' |
| Hydroperoxide | Hydroperoxy | ROOH | R—O—O—H |
| Peroxide | Peroxy | ROOR | R—O—O—R' |

Groups containing nitrogen—Compounds that contain Nitrogen in this category may contain C—O bonds, such as amides.

| Chemical class | Group | Formula | Structural Formula |
|---|---|---|---|
| Amide | Carboxamide | RCONR₂ | R—C(=O)—N(R")R' |
| Amines | Primary amine | RNH₂ | R—N(H)H |
| | Secondary amine | R₂NH | R—N(H)R' |
| | Tertiary amine | R₃N | R—N(R")R' |
| | 4° ammonium ion | R₄N⁺ | $R_1$,$R_2$,$R_3$,$R_4$—N⁺ |
| Imine | Primary ketimine | RC(=NR)R' | R—C(=N—H)R' |
| | Secondary ketimine | RC(=NR)R' | R—C(=N—R")R' |
| | Primary aldimine | RC(=NH)H | R—C(=N—H)H |
| | Secondary aldimine | RC(=NR')H | R—C(=N—R')H |
| Imide | Imide | RC(=O)NC(=O)R' | $R_1$—C(=O)—N($R_2$)—C(=O)—$R_3$ |
| Azide | Azide | RN₃ | R—N=N⁺=N⁻ |
| Azo compound | Azo (Diimide) | RN₂R' | R—N=N—R' |
| Cyanates | Cyanate | ROCN | R—O—C≡N |
| | Isocyanide | RNC | R—N⁺≡C⁻ |
| Isocyanates | Isocyanate | RNCO | R—N=C=O |
| | Isothiocyanate | RNCS | R—N=C=S |
| Nitrate | Nitrate | RONO₂ | R—O—N⁺(=O)—O⁻ |
| Nitrile | Nitrile | RCN | R—C≡N |
| Nitrite | Nitrosooxy | RONO | R—O—N=O |

-continued

| Chemical class | Group | Formula | Structural Formula |
|---|---|---|---|
| Nitro compound | Nitro | RNO$_2$ | R—N$^+$(=O)O$^-$ |
| Nitroso compound | Nitroso | RNO | R—N=O |
| Pyridine derivative | Pyridyl | RC$_5$H$_4$N | (4-pyridyl, 3-pyridyl, 2-pyridyl structures) |

Groups containing phosphorus and sulfur—Compounds that contain sulfur and phosphorus exhibit unique chemistry due to their varying polarity and ability to form more bonds than nitrogen and oxygen, their lighter analogues on the periodic table.

| Chemical class | Group | Formula | Structural Formula |
|---|---|---|---|
| Phosphine | Phosphino | R$_3$P | R$_1$R$_2$R$_3$P |
| Phosphodiester | Phosphate | HOPO(OR)$_2$ | HO—P(=O)(O—R$_1$)(O—R$_2$) |
| Phosphonic acid | Phosphono | RP(=O)(OH)$_2$ | R—P(=O)(OH)$_2$ |
| Phosphate | Phosphate | ROP(=O)(OH)$_2$ | R—O—P(=O)(OH)$_2$ |
| Sulfide or thioether | | RSR' | R—S—R' |
| Sulfone | Sulfonyl | RSO$_2$R' | R—S(=O)$_2$—R' |
| Sulfonic acid | Sulfo | RSO$_3$H | R—S(=O)$_2$—OH |
| Sulfoxide | Sulfinyl | RSOR' | R—S(=O)—R' |
| Thiol | Sulfhydryl | RSH | R—S—H |
| Thiocyanate | Thiocyanate | RSCN | R—S—C≡N |
| Disulfide | Disulfide | RSSR' | R—S—S—R' |

Other chemical classes include Organosilanes, Siloxides, Silyl halides, Silyl hydrides, Hydrosilylation, Silenes, Siloles, and Hypercoordinated silicon.

According to another embodiment, the functional polymeric phase change material may also be chemically bound to the substrate. Binding may be one of covalent binding, electrovalent binding, direct binding, or binding via a connecting compound. According to another embodiment, binding is such as the one resulting from a reaction between a reactive function of the fpPCM and a reactive function of the substrate, preferably the binding is a result of such reaction. The substrate can be selected from the group consisting of plastic or polymeric layers such as plastic films, plastic sheets, laminates or combinations of above, metals, composites, other polymers, carbons, ceramics, glass, fiberglass or other known materials used in the construction of outer surfaces of electrochemical devices and containers for such devices. Examples of such outer surfaces include battery and electrochemical cell walls, casings, covers, boxes, protective layers, containers, and packages.

The fpPCM can be implemented as a coating, laminate, infusion, treatment or ingredient in a coating, laminate, infusion, treatment that is formed adjacent to, on or within the substrate using any suitable coating, laminating, infusion, etc. technique. During use, the fpPCM can be positioned so that it is adjacent to the outer surface of an electrochemical device, thus serving as an inner coating. It is also contemplated that the fpPCM can be positioned so that it is exposed to an outside environment, thus serving as an outer coating. The fpPCM covers at least a portion of the substrate. Depending on characteristics of the substrate or a specific coating technique that is used, the fpPCM can penetrate below the top surface and permeate at least a portion of the substrate. While two layers are described, it is contemplated that the article can include more or less layers for other implementations. In particular, it is contemplated that a third layer can be included so as to cover at least a portion of a bottom surface of the substrate. Such a third layer can be implemented in a similar fashion as the fpPCM or can be implemented in another fashion to provide different functionality, such as water repellency, stain resistance, stiffness, impact resistance, etc.

In one embodiment, the fpPCM may be blended with a binder which may also contain a set of microcapsules that are dispersed in the binder. The binder can be any suitable material that serves as a matrix within which the fpPCM and possibly also the microcapsules are dispersed, thus offering a degree of protection to the fpPCM and microcapsules against ambient or processing conditions or against abrasion or wear during use. For example, the binder can be a polymer or any other suitable medium used in certain coating, laminating, or adhesion techniques. For certain implementations, the binder may be a polymer having a glass transition temperature ranging from about −110° C. to about 100° C., and in some embodiments specifically from about −110° C. to about 40° C. While a polymer that is water soluble or water dispersible can be advantageous, a polymer that is water insoluble or slightly water soluble can also be used as the binder for certain implementations.

The selection of the binder can be dependent upon various considerations, such as its affinity for the fpPCM, PCM and/or microcapsules or the substrate, its ability to modify heat transfer, its breathability, its flexibility, its elasticity, its softness, its water absorbency, its coating-forming ability, its resistance to degradation under ambient or processing conditions, and its mechanical strength. For example, the selection of a binder can influence the hardness, stiffness, break elongation, and flex modulus of the TMM structure (e.g., the sleeve or the wrapped tape). As discussed previously, it may be desirable in certain embodiments that a sleeve structure have a Shore A hardness of >85 and a Shore D hardness of >25 (per ASTM D2240). Additionally, it may be desirable that a sleeve structure have a Flex Modulus of >15 psi (per ASTM D790) and a break elongation of >20% (per ASTM D638). The selection of a binder may be one way to achieve these properties. In particular, for certain implementations, the binder can be selected so as to include a set of functional groups, acid anhydride groups, amino groups, N-substituted amino groups and their salts, amide groups, imine groups, imide groups, azide groups, azo groups, amine-formaldehyde groups, carbonyl groups, carboxy groups and their salts, cyclohexyl epoxy groups, epoxy groups, glycidyl groups, hydroxy groups, isocyanate groups, cyanate groups urea groups, aldehyde groups, ketone groups, ester groups, ether groups, alkenyl groups, alkynyl groups, thiol groups, disulfide groups, silyl or silane groups, halogenated leaving groups, peroxide groups, salt groups, groups based on glyoxals, groups based on aziridines, groups based on active methylene compounds or other b-dicarbonyl compounds (e.g., 2,4-pentandione, malonic acid, acetylacetone, ethylacetone acetate, malonamide, acetoacetamide and its methyl analogues, ethyl acetoacetate, and isopropyl acetoacetate), halo groups, hydrides, or other polar or H bonding groups and combinations thereof.

These functional groups can allow chemical bonding to a complementary set of functional groups included in either of, or any of, the fpPCM, the PCM, the thermal conductive particles, the microcapsules and the substrate, thereby enhancing durability of the article during processing or during use. Thus, for example, the binder can be a polymer that includes a set of epoxy groups, which can chemically bond to a set of carboxy groups included in the fpPCM, PCM, the thermal conductive particles, and/or the microcapsules. As another example, the binder can be a polymer that includes a set of isocyanate groups or a set of amino groups, which can chemically bond with those carboxy groups included in the fpPCM, PCM, the thermal conductive particles, microcapsules, or substrate.

In some instances, a set of catalysts can be added when forming the coating composition. Such catalysts can facilitate chemical bonding between complementary functional groups, such as between those included in the binder and those included in the microcapsules. Examples of materials that can be used as catalysts include boron salts, hypophosphite salts (e.g., ammonium hypophosphite and sodium hypophosphite), phosphate salts, tin salts (e.g., salts of $Sn^{+2}$ or $Sn^{+4}$, such as dibutyl tin dilaurate and dibutyl tin diacetate), and zinc salts (e.g., salts of $Zn^{+2}$). A desirable amount of a tin salt or a zinc salt that is added to the coating composition can range from about 0.001 to about 1.0 percent by dry weight, such as from about 0.01 to about 0.1 percent by dry weight. A desirable amount of a boron salt or a phosphate salt that is added to the coating composition can range from about 0.1 to about 5 percent by dry weight, such as from about 1 to about 3 percent by dry weight. Other examples of materials that can be used as catalysts include alkylated metals, metal salts, metal halides, and metal oxides, where suitable metals include Li, Be, Na, Mg, K, Ca, Rb, Sr, Ti, V, Mn, Fe, Co Ni, Cu Zn Ga, Ge As, Se, Al, Y, Zr, Nb, Mo, Ru, Rh, Pd, Ag, Cd, In, Sn, Sb, Te, Cs, Ba, La, Hf, Ta, W, Re, Os, Jr, Pt, Au, Hg, Tl, Pb, Bi, Po, A Ra, Ac, Ce, Nd, Pm, Sm, Eu, Gd, Tb, Dy, Ho, Er, Tm, Yb, Lu, Th, Pa, U, Pu, etc. These metals and their compounds can be used singly or blended. Organic acids and bases, such as those based on sulfur (e.g., sulfuric), nitrogen (e.g., nitric), phosphorous (e.g., phosphoric), or halides (e.g., F, Cl, Br, and I), can also be used as catalyst. Further examples of materials that can be used as catalysts include acids such as citric acid, itaconic acid, lactic acid, fumaric acid, and formic acid.

Bonds between substrate, functional phase change material, binder, PCM, the thermal conductive particles, and/or microcapsules are, according to various embodiments, covalent, electrovalent or various combinations of those. Binding could be direct or indirect, e.g. via a connecting compound. According to some embodiments, the connecting compound is selected from a group consisting of functional polymeric phase change material and microcapsules. According to another or the same embodiment, the functional polymeric phase change material may form a binder for at least a portion of a second PCM.

According to another embodiment, the reactive function of the fpPCM can be converted into another reactive function, which is more suitable for reacting with particular substrates.

According to another embodiment, the reactive function of the fpPCM could be of various chemical nature. For example, reactive functions capable of reacting and forming covalent or electrovalent bonds with reactive functions of various substrates, e.g. metals, plastics, components of an external wall of an electrochemical cell, external components of an electrochemical pack, and thermal interface materials.

According to another embodiment of the disclosure, the reactive function can be any of the following: 1) glycidyl or epoxy such as from glycidyl methacrylate or glycidyl vinyl ether; 2) anhydride such as from maleic anhydride or itaconic anhydride; 3) isocyanate such as from isocyanato methacrylate, TMI® from Cytec Ind. or blocked isocyanates such as 2-(0-[1'-methylproplyideneamino]carboxyamino) ethyl methacrylate; 4) amino or amine-formaldehyde such as from N-methylolacrylamide; and 5) silane such as from methacryloxypropyltriethoxysilane. Such reactive functions can react with OH functional groups of cellulosic based materials; with hydroxyl or carboxyl groups of polyester based materials and with amide functional groups of nylon functional resins.

According to still another embodiment of the disclosure, the reactive function may be a double bond, capable of binding to another double bond, providing a cross-linking point, a polymerization point, etc. The above described reactions, linking or crosslinking reactions can be triggered by any energy such as light, UV, IR, heat, thermal, plasma, sound, microwave, radiowave, pressure, x-ray, gamma, or any form of radiation or energy. They can be triggered by chemical reactions such as by the use of free radical, anionic or cationic catalysts or initiators.

The reactive function of the fpPCM can assume a positive charge and bind electrovalently with a negative charge on the substrate. According to another embodiment, the reactive function can assume a negative charge and bind electrovalently with a positive charge on the substrate. According to another embodiment, the reactive functions of both the substrate and the fpPCM and/or microcapsule may be negatively charged and binding is via a multivalent cation, which acts as a cross-linker. According to still another embodiment, the reactive functions of both the substrate and the fpPCM and/or microcapsule may be positively charged and binding is via a multivalent anion, which acts as a cross-linker. The cross-linking multivalent cation, anion or both could be organic or inorganic.

Use of Crosslinked Polyether Polyol as PCM Casing

In addition to embodiments comprising a PCM of one composition and a TMM of a different composition, this disclosure also provides embodiments of a sleeve or casing comprising a uniform, substantially homogenous polymeric composition of a crosslinked polyether polyol throughout the entirety of the sleeve or casing structure. These crosslinked polyether polyols may comprise polyethylene glycols (PEG) or polyethylene oxides (PEO) to form shape-stable, moldable, and machinable casings with latent heat storage properties and fire resistant properties. It is known in the art that PEO are essentially very high mol. wt. versions of PEG, and that both polymers have the same chemistry. In general, PEG refers to oligomers and polymers with a molecular mass of less than 20,000 g/mol, and PEO refers to oligomers and polymers with a molecular mass of over 20,000 g/mol. Throughout this disclosure, embodiments that refer to either a PEG or PEO alone may be understood to include both (or either) PEGs and PEOs, unless otherwise specified. As known in the art, a polyol refers to a compound with multiple hydroxyl groups available for reactions. PEGs and PEOs are among these polyols (preferably, they are diols, containing two hydroxyl groups) and are known as polyether polyols. Other polyols with more or fewer hydroxyl groups, and other specific types of polyether polyols, may also be utilized in various embodiments without departing from the present disclosure.

Although PEGs and PEOs have been used as PCMs in the prior art, certain limitations, such as susceptibility to thermal degradation, have limited their use in certain applications, such as those requiring higher transition temperatures. However, when PEGs/PEOs have their chains extended or are crosslinked, the system mol. wt. increases, which allows their transition temperatures to change in correlation with their mol. wt., crosslink density, additive type or amount, and other formulation variables. A number of other advantages can also be achieved by chain extending and/or crosslinking throughout the disclosure, the terms chain extending and crosslinking may be used interchangeably, because both types of reactions can be used to achieve the desired properties of embodiments of the disclosure. PEG/PEO chains in accordance with embodiments of the present disclosure. For example, crosslinked polyether polyols, once cured, may form a shape-stable material that can withstand machining and milling in order to form a custom-shaped casings and housings for different configurations of electrochemical cells and packs. For example, embodiments of the disclosure may be formed in substantially rectangular housings or casing comprising a plurality of openings configured to retain electrochemical cells, as shown in FIG. 4D.

Another benefit of utilizing crosslinked polyether polyols as a thermal management material is that the shape of such crosslinked polyether polyol composites are stable enough to withstand the expansion and contraction of electrochemical cells during their thermal cycling, and may maintain close contact with the cells throughout the cycles even without the incorporation of elastomeric materials as described throughout this disclosure. A further benefit is that the composites themselves can be used to form the entire housing or casing because they are solid-solid PCMs, meaning they do not become liquid when melted, and therefore do not leak. As a result, a separate housing or container is not required; the cured crosslinked polyether polyol itself can be used to form an entire casing. Throughout the disclosure, a casing comprising unitary structure made out of a crosslinked polyether polyol may be alternatively referred to as a latent heat storage (LHS) casing. Though all the PCM materials described in the present disclosure is capable of storing latent heat, casings comprising crosslinked polyether polyols may be referred to as LHS casings to differentiate from embodiments of the disclosure comprising multiple types of polymeric PCM and TMM materials.

Yet another benefit of crosslinked polyether polyol composites as electrochemical cell casings is that the composites may be inherently fire-retardant; in some embodiments, the fire-retardant properties are high enough to pass the UL-94 (Standard for Tests for Flammability of Plastic Materials for Parts in Devices and Appliances, http://ulstandards.ul.com/standard/?id=94_6, UL LLC) flammability test with a rating of V0. In some embodiments, this fire-retardant rating may be achieved even without the use of any fire retardant additives of the type described throughout this disclosure. In other embodiments, composites may achieve ratings of V1 or V2 without the addition of fire-retardant additives. In yet other embodiments, fire-retardant additives may be added to improve the flame resistance that the composites could otherwise achieve.

Because many of the embodiments of crosslinked polyether polyol casings are fire-resistant PCMs, another benefit they provide is the prevention of thermal runaway of electrochemical cell packs. In one aspect, the PCM properties of the casings themselves cool the electrochemical cells to prevent individual cells from overheating to the point of combustion themselves. However, as described earlier in this disclosure, sometimes uncontrollable factors, such as manufacturing defects or puncturing, can cause the thermal runaway of one electrochemical cell despite good thermal management. In such cases, the flame-resistance of the casing itself can prevent the thermal runaway from spreading to other electrochemical cells. For example, in order to meet the UL-94 rating standard of V0, a material must not have flaming combustion for more than ten seconds, or glowing combustion for more than 30 seconds, even when a flame is applied directly to the material for a certain period of time. As a result of being flame resistant to at least this degree, materials of the present disclosure can, in many cases, be exposed to a combusting electrochemical cell until all the materials of the cell have been fully exhausted. The casing materials may be exposed without catching fire themselves, all the while insulating other cells against the heat, thereby effectively extinguishing a combusting cell.

Yet another benefit of using the casings comprised of crosslinked polyether polyols is that the temperature management properties can help electrochemical cells charge faster than they otherwise could be without temperature management materials. Many applications of electrochemical cells (such as mobile device batteries and automobile batteries) now require faster charging due to demands by manufacturers and consumers. However, faster charging typically results in higher temperatures and potential overheating. Because casings of the present disclosure can keep temperatures of electrochemical cells cool despite fast charging, applications can achieve faster charging for longer periods of time while keeping the cells cool. This cooling minimizes the risk of overheating and enables faster charging when a cell is retained in a casing of the present disclosure than when a cell is not retained in any temperature management material.

Various chain extenders may be reacted with the polyether polyols in order to achieve the crosslinking, which allows for adjustment of the chain length, and therefore the mol. wt. of the polyether polyols. In many embodiments, types of isocyanates may be used as crosslinkers or chain extenders. In particular, certain embodiments utilize diisocyanates such as hexamethylene diisocyanate (HDI) and 4,4'-diphenylmethane diisocyanate (MDI), toluene diisocyanate (TDI), methylene dicyclohexyl diisocyanate or hydrogenated MDI (HMDI), or isophorone diisocyanate (IPDI), depicted below:

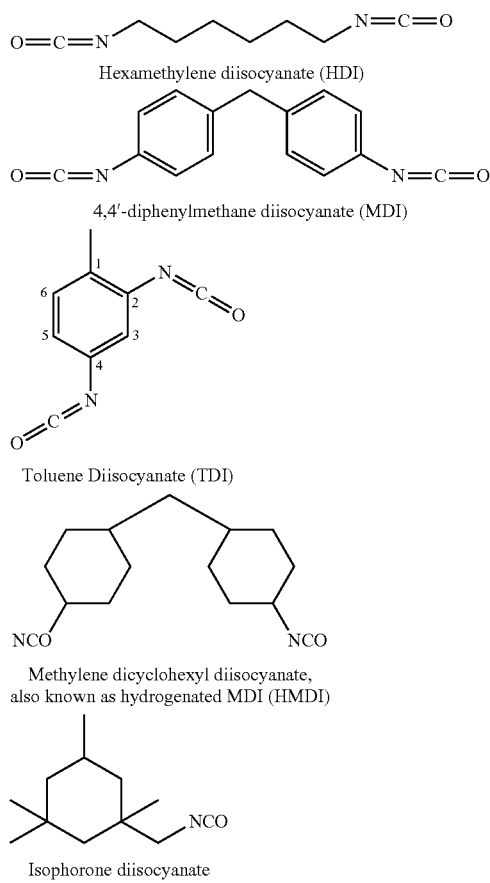

As shown in the above molecular diagrams, all isocyanates have an R—NCO reactive group, and diisocyanates have two R—NCO groups. Throughout several of the following tables and charts, isocyanates and diisocyanates may be abbreviated simply as "NCO." In general, the combination of a diisocyanate and a polyether polyol, in the presence of a reactant, will combine to extend the chain of the polyether polyol as depicted below:

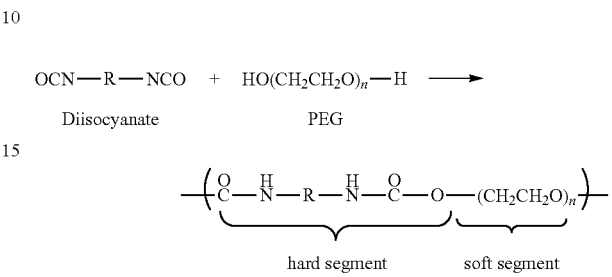

The extent to which the chains of the PEG or PEO will be extended and/or crosslinked in various embodiments is dependent on several factors, including what kind of diisocyanate is used and in what ratios the diisocyanate and PEG/PEO are combined. In various embodiments, the ratio of diisocyanate to polyether polyol may be between 0.5:1 and 1.5:1. The various ratios also affect the viscosity, crystallinity, melting points, and latent heat of the resulting composites. The multiple examples of embodiments of the present disclosure listed in the tables below demonstrate the relationships between the diisocyanate/polyether polyol combinations, their ratios, and the resulting physical properties of the composites.

In addition to utilizing diisocyanates as primary crosslinkers and chain extenders of the polyether polyols, other branching agents and chain extenders may also be reacted with the composite. Some are themselves polyol blends. These may include butanediol (BDO), polytetramethylene glycol (PTMG), and various types of polyetheramines. One such polyetheramine used in the experiments listed in the tables below includes bis(3-aminopropyl)polyethylene glycol with a mol. wt. of 1500 (known commercially as NPEG1500), but other types of polyetheramines may also be used. Other branching agents and chain extenders that may be used include, but are not limited to, Jeffamines® from Huntsman International LLC. Alternatively, isocyanate prepolymers, such as those known commercially as Bayhydur® and Desmodur® from Covestro AG, and Silmer NCO from Siltech Corp. may also be used. These branching agents and chain extenders can be used in a number of combinations and ratios to achieve precise control of the polyether polyol.

In some embodiments of the crosslinked polyether polyol composite, a relatively low mol. wt. PEG may be combined with a dianhydride in order to achieve crosslinking and changes in melting point and latent heat. Examples of dianhydrides reacted with PEGs, and their respective physical properties, are depicted in Table 4 below. It is contemplated that the following dianhydrides, as well as others, may be used in PEG/dianhydride embodiments of the present disclosure:

| Dianhydrides | |
|---|---|
| 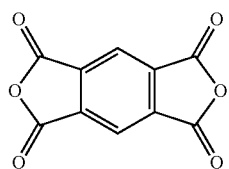 [SMILES: O=c1oc(=O)c2cc3c(=O)oc(=O)c3cc12] | Benzene-1,2,4,5-tetracarboxylic dianhydride, PMDA, Pyromellitic dianhydride |
| 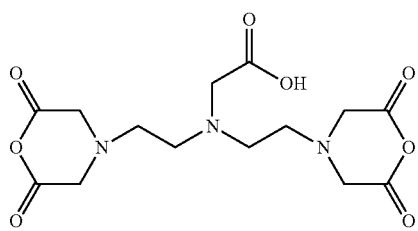 [SMILES: O=C(O)CN(CCN1CC(=O)OC(=O)C1)CCN1CC(=O)OC(=O)C1] | N,N-Bis[2-(2,6-dioxomorpholino)ethyl]glycine, DTPA dianhydride, Diethylenetriaminepentaacetic dianhydride |
| 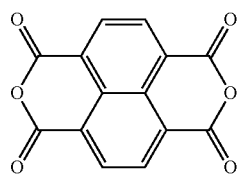 [SMILES: O=C1OC(=O)c2ccc3c4c(ccc1c24)C(=O)OC3=O] | 1,4,5,8-Naphthalenetetracarboxylic dianhydride, NTCDA |
| 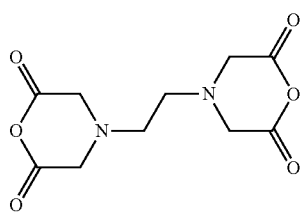 [SMILES: O=C1CN(CCN2CC(=O)OC(=O)C2)CC(=O)O1] | 4,4'-Ethylenebis(2,6-morpholinedione), EDTA dianhydride, Ethylenediaminetetraacetic dianhydride |
| 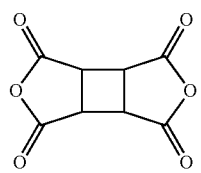 [SMILES: O=C1OC(=O)C2C1C1C(=O)OC(=O)C21] | 1,2,3,4-Cyclobutanetetracarboxylic dianhydride, Cyclobutanetetracarboxylic acid dianhydride, Cyclobutanetetracarboxylic dianhydride, Maleic anhydride cyclic dimer |
| 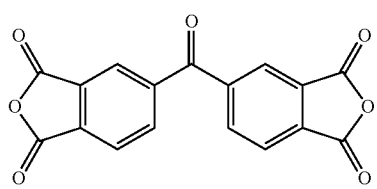 [SMILES: O=C(c1ccc2c(c1)C(=O)OC2=O)c1ccc2c(c1)C(=O)OC2=O] | 4,4'-Carbonyldiphthalic anhydride, Benzophenone-3,3',4,4'-tetracarboxylic dianhydride |
| 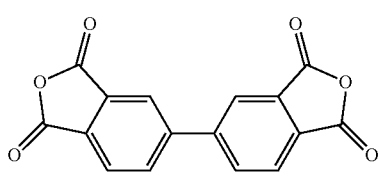 [SMILES: O=C1OC(=O)c2cc(-c3ccc4c(c3)C(=O)OC4=O)ccc21] | 3,3',4,4'-Biphenyltetracarboxylic dianhydride |

-continued

| Dianhydrides | |
|---|---|
| 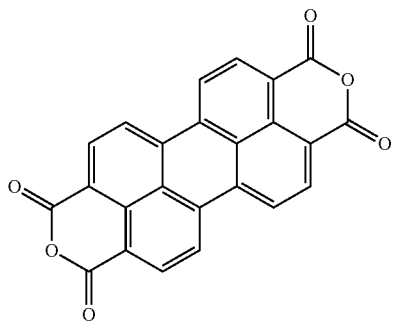 [SMILES: O=C1OC(=O)c2ccc3c4ccc5c6c(ccc(c7ccc1c2c73)c64)C(=O)OC5=O] | PTCDA, Pigment Red 224, Perylene-3,4,9,10-tetracarboxylic dianhydride |
| 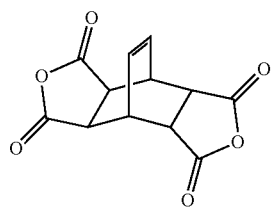 [SMILES: O=C1OC(=O)C2C3C=CC(C12)C1C(=O)OC(=O)C31] | Bicyclo[2.2.2]oct-7-ene-2,3,5,6-tetracarboxylic dianhydride |
| 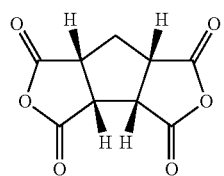 [SMILES: O=C1OC(=O)[C@H]2C[C@H]3C(=O)OC(=O)[C@H]3[C@@H]12] | cis-1,2,3,4-Cyclopentanetetracarboxylic dianhydride, or other stereoisomer |
| 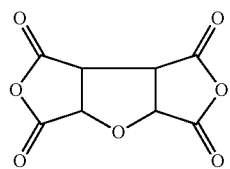 [SMILES: O=C1OC(=O)C2C1OC1C(=O)OC(=O)C12] | Tetrahydrofuran-2,3,4,5-tetracarboxylic dianhydride |
| 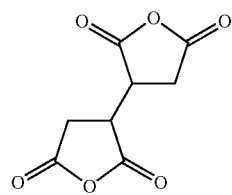 [SMILES: O=C1CC(C2CC(=O)OC2=O)C(=O)O1] | Meso-Butane-1,2,3,4-tetracarboxylic dianhydride, or other isomers |
| 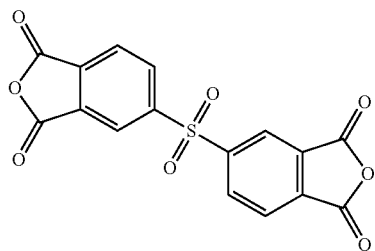 [SMILES: O=C1OC(=O)c2cc(S(=O)(=O)c3ccc4c(c3)C(=O)OC4=O)ccc21] | 3,3',4,4'-Diphenylsulfonetetracarboxylic dianhydride |
| 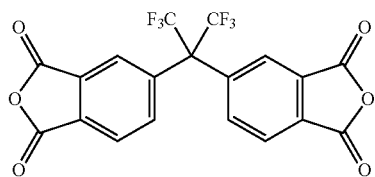 [SMILES: O=C1OC(=O)c2cc(C(c3ccc4c(c3)C(=O)OC4=O)(C(F)(F)F)C(F)(F)F)ccc21] | 2,2'-Bis-(3,4-Dicarboxyphenyl) hexafluoropropane dianhydride, 6FDA |

Dianhydrides

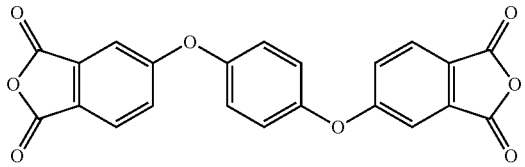 [SMILES: O=C1OC(=O)c2cc(Oc3ccc(Oc4ccc5c(c4)C(=O)OC5=O)cc3)ccc21]

HQDA; HYDROQUINONE DIPHTHALIC ANHYDRIDE; 4,4'-(p-Phenylenedioxy)bis[phthalic anhydride]; 4,4'-(4,1-Phenylenedioxy)bis[phthalicanhydride]; 1,4-Bis(3,4-dicarboxyphenoxy)benzene dianhydride; 1,4-Bis(3,4-dicarboxyphenoxy)benzene dianhydride(HQDPA); 1,4-Diphenoxybenzene-3',4',3'',4''-tetracarboxylic acid anhydride

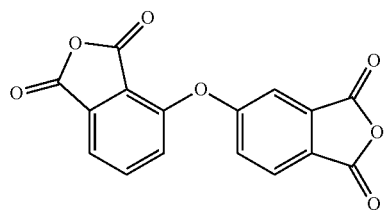 [SMILES: O=C1OC(=O)c2cc(Oc3cccc4c3C(=O)OC4=O)ccc21]

2,3,3',4'-Diphenyl ether tetracarboxylic acid dianhydride

In addition to any of the above-mentioned combinations of polyols and crosslinkers, chain extenders, and/or branching agents, composite polymers of the present disclosure may also contain various types and concentrations of thermal conductivity additives. Though the crosslinked polyether polyols themselves already possess good thermal conductivity properties (given the properties of such phase change materials), the addition of particular thermally conductive materials can enhance such properties even further. Examples of thermal conductivity additives that may be used with crosslinked polyether polyol composites of the present disclosure include natural graphite, vein graphite, amorphous graphite, flake graphite, expandable flake graphite, synthetic graphite, surface enhanced graphite (SEFG), nano graphite, graphene, cokes, carbon, activated carbon, carbon black, surface modified graphite/graphene (wherein the surface contains oxides, hydroxyls, carboxyls, and amines), ceramics (e.g., boron nitride, aluminum nitride, etc.), and metal flakes (e.g., aluminum, copper, etc.)

The following tables show numerous embodiment combinations of crosslinked polyether polyols that were combined in experiments and measured to determine their physical properties. The tables are divided into different types of combinations of polyether polyols, crosslinkers, chain extenders, branching agents, and additives in order to illustrate relationships between combinations of reactants and the resulting physical properties of their composites.

In order to determine the effects of the various reactants on the physical properties of each of these experimental composite materials, the same procedures were used to create the composites and then to measure them. Each composite material was created using a batch polymerization process. All blending and reactions were done under a dry $N_2$ atmosphere. Alcohols or amines were blended and melted, and then isocyanate or anhydride reactants were added and mixed. The vessels in which the reactants were mixed were then sealed and held at a temperature of approximately 70° C. The composites were then let to cool and then visually inspected.

In order to measure the transition temperatures and latent heat of each composite material, a differential scanning calorimeter was used. Each composite sample, once prepared as described above, was held in a hermetically sealed aluminum sample pan. The testing was conducted under a constant $N_2$ flow. First, the samples were cooled to −10° C., and then isothermally held at that temperature for four minutes. Then, the samples were heated from −10° C. to 80° C. at 5° C. per minute. Then the samples were isothermally held at 80° C. for one minute. Next, the samples were cooled from 80° C. to −10° C. at 5° C. per min. This cycle of cooling and heating was repeated twice for each sample. Data from the second melt peak and the second crystallization peak were recorded for each sample.

Thermal conductivity properties of each sample were also measured using a thermal conductivity sensor known as a C-Therm TCi analyzer from C-Therm Technologies Ltd. Sample disc were made that were 1-2 mm bigger than the sensor and a minimum of 5 mm thick. A small amount of thermal grease was applied to the sensor to provide a consistent and complete interface with the surface of the sample discs. The sample was run either using a setting known as the C-Therm "ceramics" internal test method if the material was anticipated to have conductivity of >1.1 W/m·K, or using a setting known as the C-Therm "polymers" internal test method if the material was anticipated to have conductivity of <1.1 W/m·K. Sample disc were made that were 1-2 mm bigger than the sensor and a minimum of 5 mm thick. A small amount of thermal grease was applied to the sensor to provide a consistent and complete interface with the surface of the sample discs. Each sample was tested ten times, and the average measurement of the tests is listed in each table.

Though numerous experimental combinations of composites according to the disclosure are shown in the tables below, these are only a few of the many possible combinations. This disclosure contemplates any kind of polyether polyol that is crosslinked, chain extended, and/or branched in order to achieve the thermal management benefits described herein. This disclosure should not be construed to be limited to the examples listed below.

TABLE 1

PROPERTIES OF DIISOCYANATE AND POLYOL TYPE COMPOSITES AND EFFECT OF REACTANT RATIO

| | Exp. # | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| PEG 1000 | X | X | X | X | X | | | | | | | | | | | | |
| PEG 6000 | | | | | | X | X | X | X | X | | | | | | | |
| PEG 10K | | | | | | | | | | | X | X | X | X | X | | |
| Terathane ® 1800 PTMG | | | | | | | | | | | | | | | | X | X |
| HMDI | | X | | | | | X | | | | | X | | | | X | X |
| MDI | | | X | | | | | X | | | | | X | | | | |
| IPDI | | | | X | | | | | X | | | | | X | | | |
| TDI | | | | | X | | | | | X | | | | | X | | |
| NCO:OH Ratio | 0:1 | 1:1 | 1:1 | 1:1 | 1:1 | 0:1 | 1:1 | 1:1 | 1:1 | 1:1 | 0:1 | 1:1 | 1:1 | 1:1 | 1:1 | 1:2 | 1:1.3 |
| Melt Pk (2nd) | 32 | 28 | 26 | 23 | 27 | 57 | 60 | 58 | 57 | 57 | 60 | 58 | 58 | 59 | 57 | 27 | 27 |
| Melt J/g (2nd) | 153 | 109 | 99 | 93 | 70 | 176 | 176 | 169 | 166 | 161 | 179 | 171 | 170 | 169 | 162 | 78 | 39 |
| Cryst. pk | 31 | 26 | 24 | 20 | 4 | 47 | 47 | 45 | 41 | 41 | 50 | 49 | 48 | 47 | 46 | 6 | 1 |
| Cryst. J/g | 155 | 113 | 105 | 92 | 66 | 177 | 177 | 170 | 165 | 164 | 184 | 173 | 170 | 168 | 162 | 74 | 46 |
| UL94 FR | V0 | V0 | V0 | V0 | V0 | V0 | V0 | V0 | V0 | V0 | V0 | V0 | V0 | V0 | V0 | Fail | Fail |

Table 1, shown above, shows various combinations of relatively low to relatively high mol. wt. PEGs (rows 1-4; PEG 1000, PEG 6000, PEG10K, and Terathane® 1800 PTMG) each combined solely with one type of diisocyanate (rows 6-10; HMDI, MDI, IPDI, TDI). Each type of the first three PEGs was measured as a control without being reacted with a diisocyanate (Cols. 1, 6, and 11). Then, each PEG was reacted with a different diisocyanate. Each reaction had a ratio of polyol to diisocyanate of 1:1. As seen, the transition temperatures and latent heats of the composites differ from those of the polyols alone, and the different types of diisocyanates used result in differing physical properties. Notably, the PEG materials by themselves, and each of the combinations of PEG and diisocyanates in a 1:1 ratio resulted in a fire retardancy rating of V0. However, the combinations of HDMI and Terathane® in ratios of 1:2 and 1:1.3, which resulted in significantly lower melting points and latent heats, also resulted in failing fire-retardancy tests. The above table shows how the type of diisocyanates and the ratios of the reactants can both be used to adjust to desired physical properties.

TABLE 2

PROPERTIES OF ISOCYANATE, ISOCYANATE TYPE, POLYOL TYPE, POLYOL COMPOSITES AND EFFECTS OF REACTANT RATIO

| | Exp. # | | | | | | | | | | | | |
|---|---|---|---|---|---|---|---|---|---|---|---|---|---|
| | 18 | 19 | 20 | 21 | 22 | 23 | 24 | 25 | 26 | 27 | 28 | 29 | 30 |
| PEG 2000 | X | | X | | | | | | | | | | |
| PEG 3000 | | X | | X | X | X | X | X | X | X | | | |
| PEG 6000 | | | | | | | | | | | X | X | X |
| BDO | | | | | | | | | | X | | | X |
| HMDI | | | | X | X | X | | | | | | | |
| MDI | | | | | | | | | X | X | | X | X |
| Desmodur DN | X | X | | | | | | | | | | | |
| Silmer NCO C50 | | | | | | | X | | | | | | |
| Silmer NCO Di100 | | | | | | | | X | | | | | |
| NCO:BDO:PEG Ratio | 1.2:0:1 | 1.2:0:1 | 1.2:0:1 | 1.2:0:1 | 1.5:0:1 | 1.1:0:1 | 1.1:0:1 | 0:0:1 | 1:0:1 | 2:1:1 | 0:0:1 | 1:0:1 | 2:1:1 |
| Melt Pk (2nd) | 37.3 | 49.4 | 44.5 | 53.3 | 34.0 | 43.2 | 48.1 | 50.4 | 47.9 | 44.4 | 57.1 | 56.9 | 55.4 |
| Melt J/g (2nd) | 77 | 90 | 89 | 121 | 61 | 74 | 99 | 145 | 99 | 79 | 132 | 133 | 130 |
| Cryst. pk | 13.0 | 27.9 | 24.0 | 34.8 | 14.5 | 22.5 | 26.9 | 23.0 | 24.4 | 2.8 | 36.0 | 31.1 | 25.8 |
| Cryst. J/g | 77 | 92 | 85 | 121 | 68 | 77 | 101 | 144 | 98 | 75 | 127 | 129 | 128 |

Table 2 shows a second set of experiments in which three different mol. wts. of PEG (rows 1-3; PEG 2000, PEG 3000, and PEG 6000) were combined with an aliphatic diol (row 4; butanediol BDO) and/or diisocyanate (rows 5-6; HMDI and MDI) and/or multifunctional or branched isocyanate crosslinkers/chain extenders (rows 7-9, Desmodur® DN, Silmer® NCO C50, Silmer® NCO Di100). As seen, varying the reactants and their ratios allows for the adjustment of melting point, transition temperatures, and latent heat capacities to suit particular applications.

TABLE 3

PROPERTIES OF DIISOCYANATE, POLYOL TYPE AS A RESULT OF REACTANT RATIO

| | Exp. # | | | | | | | | | | | | | | | |
|---|---|---|---|---|---|---|---|---|---|---|---|---|---|---|---|---|
| | 31 | 32 | 33 | 34 | 35 | 36 | 37 | 38 | 39 | 40 | 41 | 42 | 43 | 44 | 45 | 46 |
| PEG 1500 | X | X | | | | | | | X | X | | | | | | |
| PEG 2000 | | | X | X | | | | | | | X | X | | | | |
| PEG 3000 | | | | | X | X | | | | | | | X | X | | |
| PEG 4000 | | | | | | | X | X | | | | | | | X | X |
| HMDI | | | | | | | | | X | X | X | X | X | X | X | X |
| MDI | X | X | X | X | X | X | X | X | | | | | | | | |
| NCO:OH Ratio | 1:1 | 1.25:1 | 1:1 | 1.25:1 | 1:1 | 1.25:1 | 1:1 | 1.25:1 | 1:1 | 1.25:1 | 1:1 | 1.25:1 | 1:1 | 1.25:1 | 1:1 | 1.25:1 |
| Melt Pk (2nd) | 38.0 | 28.0 | 42.7 | 36.0 | 50.3 | 45.2 | 53.0 | 51.0 | 46.5 | 37.0 | 50.0 | 44.0 | 53.8 | 51.5 | 57.4 | 54.5 |
| Melt J/g (2nd) | 70 | 46 | 86 | 61 | 103 | 69 | 108 | 87 | 96 | 60 | 105 | 81 | 126 | 96 | 129 | 105 |
| Cryst. pk | −2.5 | −6.0 | 19 | 5.0 | 28.6 | 21.9 | 31 | 30.8 | 26.5 | 15.0 | 29.5 | 25.0 | 35.0 | 32.5 | 37.0 | 36.0 |
| Cryst. J/g | 70 | 22 | 90 | 84 | 110 | 92 | 119 | 111 | 99 | 68 | 107 | 93 | 127 | 118 | 137 | 119 |
| UL94 FR | V0 | V0 | V0 | V0 | V0 | V0 | V0 | V0 | V0 | V0 | V0 | V0 | V0 | V0 | V0 | V0 |

Table 3 shows that transition temperatures and latent heat can be adjusted simply by using different ratios of particular polyols (rows 1-4; PEG 1500, PEG 2000, PEG 3000, and PEG 4000) to particular diisocyante crosslinkers/chain extenders (rows 6-7; HMDI and MDI). As shown, each type of PEG in the experiment was reacted with each of two diisocyanates, HMDI and MDI, but in ratios of 1:1 and 1.25:1. In general, when the ratio of PEG to diisocyanate was 1.25:1, the melting points and latent heat capacities were lower than in the same reactant combinations of ratios of 1:1. As in earlier experiments, each composition achieved a fire resistance rating of V0.

TABLE 4

PROPERTIES OF DIANHYDRIDE, POLYOL TYPE, OR DIAMINE TYPE COMPOSITES

| | Exp. # | | | | | | |
|---|---|---|---|---|---|---|---|
| | 47 | 48 | 49 | 50 | 51 | 52 | 53 |
| PEG 400 | X | X | | | | | |
| PEG 1000 | | | X | X | X | | |
| NPEG 1500 | | | | | | X | X |
| PMDA | | X | | X | | | |
| EDTA dianhydride | | | | | X | | X |
| Anhydride:OH or Anhydride:NH | 0:1 | 1:1 | 0:1 | 1:1 | 1:1 | 0:1 | 1:1 |
| Melt Pk (2nd) | 8.5 | 1.2 | 44.2 | 32.7 | 34.2 | 52.2 | 40.6 |
| Melt J/g (2nd) | 110 | 2 | 139 | 25 | 89 | 159 | 61 |
| Cryst. Pk | −18.7 | −25.6 | 23.7 | 5.4 | 18.8 | 21.2 | 17.6 |
| Cryst. J/g | 113 | 4 | 150 | 23 | 31 | 155 | 11 |

Table 4 shows the properties of composites in alternative embodiments of the disclosure; namely, amine or hydroxyl functional polyols (rows 1-3; PEG 400, PEG 1000, and NPEG 1500; NPEG 1500 is a diamine) can be crosslinked and/or chain extended with dianhydrides (rows 5-6, PDMA, EDTA dianhydride). As shown, the melting points and latent heat values of the crosslinked composites are all lower compared to their respective polyols alone. The results also show that slightly different physical properties of the PCM composites may be achieved by using different dianhydride reactants.

TABLE 5

PROPERTIES OF DIISOCYANATE, POLYOL TYPE AND THERMAL CONDUCTIVITY ADDITIVE COMPOSITES

| | Exp. # | | | | | | | | | | | | |
|---|---|---|---|---|---|---|---|---|---|---|---|---|---|
| | 53 | 54 | 55 | 56 | 57 | 58 | 59 | 60 | 61 | 62 | 63 | 64 | 65 |
| PEG 6000 | X | X | X | X | X | X | X | X | X | X | X | X | X |
| MDI | X | X | X | X | X | X | X | X | X | X | X | X | X |
| Graphite flake | | | X | X | X | | | | | | | | |
| Nano Graphite | | | | | | X | X | X | | | | | |
| Graphene | | | | | | | | | X | X | | | |
| SEFG | | | | | | | | | | | X | X | |
| Boron Nitride | | | | | | | | | | | | | X | X |
| NCO:OH | 1:1 | 1:1 | 1:1 | 1:1 | 1:1 | 1:1 | 1:1 | 1:1 | 1:1 | 1:1 | 1:1 | 1:1 | 1:1 |
| Wt. % Additive | 0 | 10 | 20 | 30 | 5 | 10 | 20 | 10 | 20 | 20 | 30 | 30 | 40 |
| Melt Pk (2nd) | 56.9 | 55.8 | 55.5 | 55.4 | 56.4 | 56.1 | 55.2 | 55.4 | 52.4 | 54.5 | 54.3 | 55.1 | 54.2 |
| Melt J/g (2nd) | 133 | 121 | 105 | 85 | 135 | 126 | 95 | 125 | 101 | 107 | 91 | 89 | 78 |
| Cryst. pk | 31.1 | 29.8 | 29.9 | 30.5 | 31.0 | 30.9 | 30.8 | 30.1 | 29.5 | 29.1 | 28.9 | 29.5 | 29.5 |
| Cryst. J/g | 129 | 122 | 104 | 90 | 133 | 126 | 91 | 122 | 105 | 107 | 92 | 92 | 75 |
| Thermal Conductivity (W/m · K) | 0.22 | 0.52 | 0.88 | 1.12 | 0.65 | 1.31 | 2.94 | 1.66 | 3.21 | 0.91 | 1.45 | 1.96 | 2.87 |

Table 5 shows the resulting physical properties of crosslinked polyether polyols according to embodiments of the disclosure combined with various types and concentrations of thermal conductivity additives. In these experiments, PEG 6000 was combined with MDI diisocyanate and several types of thermal conductivity additives (rows 5-10; graphite flake, nano graphite, graphene, surface enhanced graphite, and Boron Nitride). The thermal conductivity additives generally increased thermal conductivity as measured by W/m·K, and generally, higher concentrations of a particular additive in a composite increased the thermal conductivity compared to lower concentrations of the same material. In several cases, (e.g., experiment numbers 56, 59, 60, 61, 64, and 65) the embodiment composites yielded greater than 1.5× improved thermal conductivity as compared to the PEG/diisocyanate combinations alone.

TABLE 6

PROPERTIES OF DIISOCYANATE, POLYOL TYPE AND FR ADDITIVE COMPOSITES

| | Exp. # | | | | | | | | |
|---|---|---|---|---|---|---|---|---|---|
| | 66 | 67 | 68 | 69 | 70 | 71 | 72 | 73 | 74 |
| PEG 2000 | X | | X | | X | | X | | X |
| PEG 6000 | | X | | X | | X | | X | |
| BDO | | | X | X | X | X | X | X | |
| MDI | | | X | X | X | X | X | X | X |
| Desmodur DN | X | X | | | | | | | |
| Expandable Graphite Flake | X | X | | | | | | | |
| AP760 | | | | | | | X | X | |
| Firemaster2100R:ATO | | | | | X | X | | | |
| NCO:BDO:PEG Ratio | 1.2:0:1 | 1.2:0:1 | 2:1:1 | 2:1:1 | 2:1:1 | 2:1:1 | 2:1:1 | 2:1:1 | 0.6:0:1 |
| Wt. % Additive | 5 | 5 | 0 | 0 | 20 | 20 | 15 | 15 | 0 |
| Melt Pk (2nd) | 37.5 | 48.9 | 39.9 | 55.1 | 33.6 | 52.6 | 37.4 | 54.9 | 38.9 |
| Melt J/g (2nd) | 71 | 85 | 69 | 131 | 54 | 99 | 59 | 105 | 146 |
| Cryst. pk | 13.4 | 28.3 | 9.3 | 26.1 | 5.2 | 25.2 | 8.8 | 26.8 | 18.5 |
| Cryst. J/g | 71 | 88 | 71 | 119 | 55 | 105 | 59 | 108 | 152 |
| UL94 FR | V1 | V1 | Fail | Fail | V0 | V0 | V1 | V1 | V0 |

Table 6 shows experiments in which one or more polyols (rows 1-3; PEG 2000, PEG 6000, BDO) were reacted with various multifunctional crosslinkers (rows 5-9; MDI, Desmodur® DN. Some of the resulting composites were further combined with a fire retardant additive (rows 11-13; expandable graphite flake, Exolit®AP760 Ammonium Polyphosphate, Firemaster® 2100R Decabromodiphenyl ethane:ATO (antimony trioxide)). These materials can be obtained from companies such as Clariant Inc., Chemtura Corp., etc. As shown, certain crosslinked polyol composites failed a flammability test without any fire retardant additives (experiment numbers 68 and 69), but the same composites achieved a fire retardancy rating of V0 with the addition of a fire retardant additive (experiment numbers 70 and 71). The results show that various levels of fire retardancy can sometimes be achieved by certain embodiments of crosslinked polyether polyol composites, but that those properties can be further enhanced with the addition of fire retardant additives.

FIGS. 21-24 illustrate experiments conducted to measure both the thermal management properties of electrochemical cell casings comprised of the crosslinked polyether polyols of the present disclosure, as well as the performance benefits of the electrochemical cells that were achieved by using such a material for thermal management.

Figure 21:
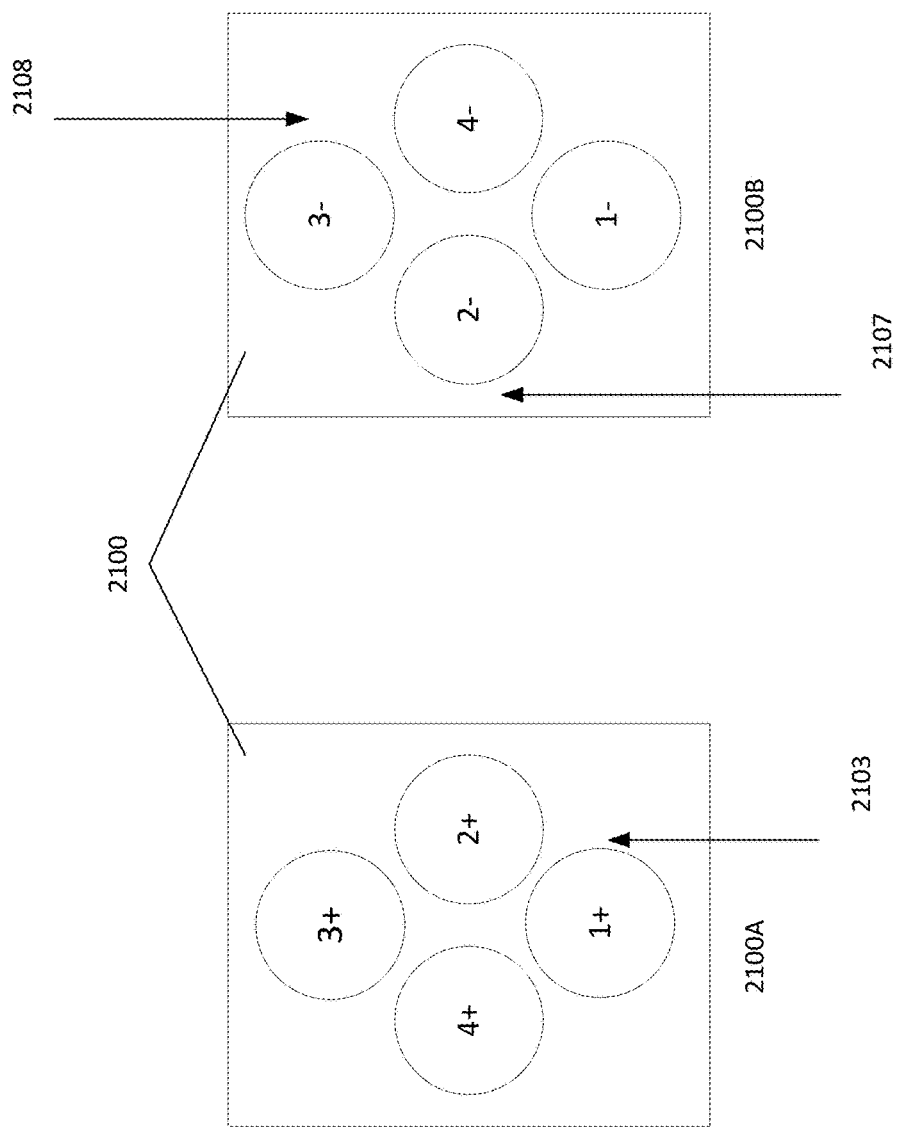
FIG. 21 is a diagram of an experiment to test performance characteristics of electrochemical cells when charged and discharged within a temperature management casing of the present disclosure.

FIG. 21 is a diagram of four electrochemical cells, labeled 1, 2, 3, and 4 disposed in a housing 2100, the housing being comprised of a composite polymeric crosslinked polyether polyol according to the present disclosure. For the purposes of this disclosure, the terms "housing" and "casing" may be used interchangeably. The view 2100A on the left depicts a top view of the positive terminals of each electrochemical cell, and accordingly, each cell is labeled 1+, 2+, 3+, and 4+. The view 2100B on the right is a bottom view of the same electrochemical cells shown in the left view, and depicts the negative terminals of the electrochemical cells. Accordingly, each cell is labeled 1−, 2−, 3−, and 4−. In the experiment to test the performance properties of the casing, the four electrochemical cells (which were 1.5 Ah Li-ion 18650 cells) were connected in parallel and connected to a battery tester. The testing program comprised the steps of resting the cells for one minute, then charging them at 6 A until the voltage reached 4.2V, then trickle charging the cells until the current dropped to 0.25 A. Then, the cells were allowed to rest for 30 seconds, after which time the cells were discharged at 80 A until the voltage reached 2.5V. After that, the cells were allowed to rest for ten minutes before restarting the charging step of the cycle. This cycle of charge and discharge was repeated 1000 times. In order to test the temperature the surface of the cells, thermocouples were placed at the locations shown in FIG. 21. Thermocouple location 2103 was near cell 1, thermocouple location 2107 was near cell 2, and thermocouple location 2108 was near cell three. Though the depth of the thermocouple placement is not apparent from the diagram, the thermocouples were placed midway between the positive and negative terminals of the cells.

In addition to the testing of the electrochemical cells contained within the housing, the same test was performed on a control cell that was not covered by any casing at all. The following graphs compare the measurements taken from the control cell and one or more of the cells (which may be referred to as "experimental cells") housed in the casing 2100.

Figure 22:
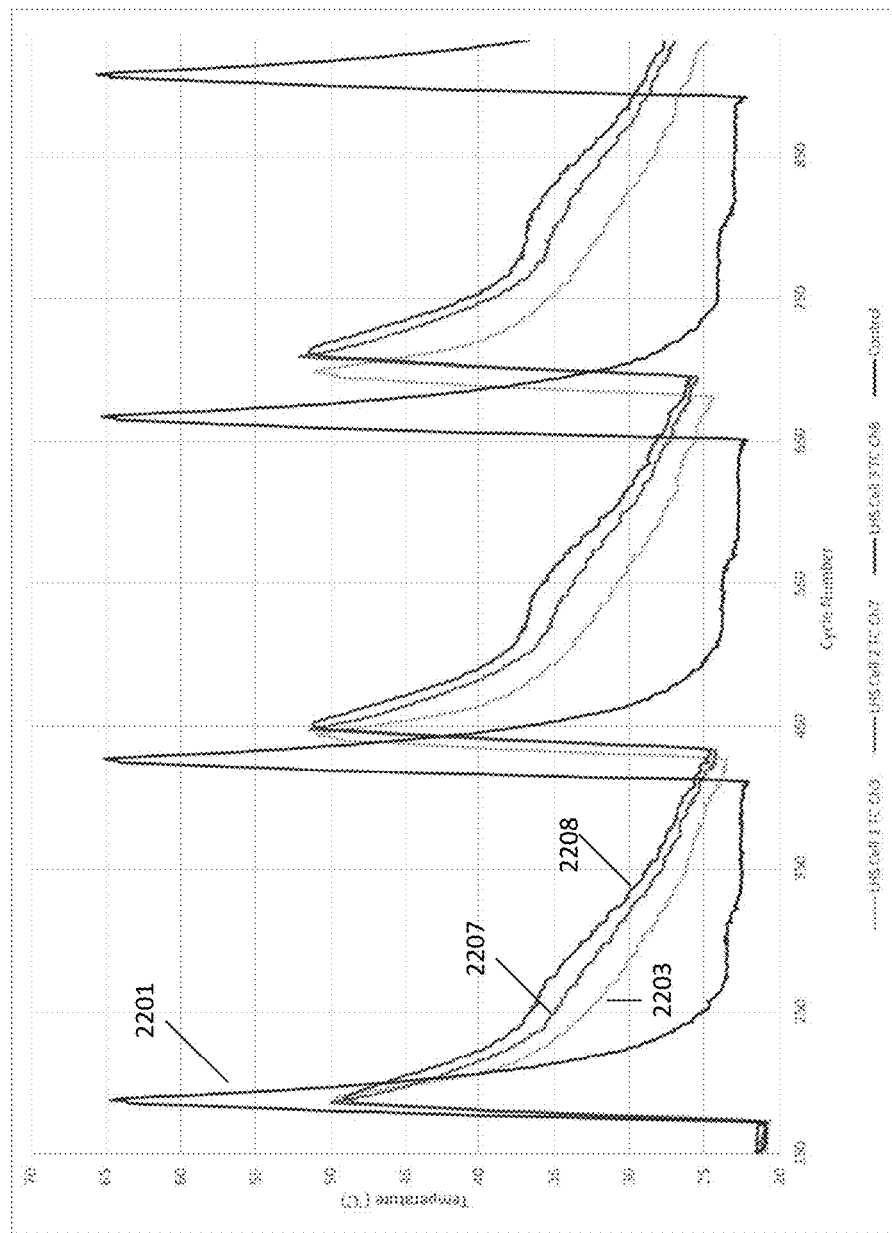
FIG. 22 is a graph showing the temperatures of the cells of FIG. 21 during the experiment.

FIG. 22 shows the outer surface temperatures reached by each of the control cell (line 2201), experimental cell 1 (line 2203), experimental cell 2 (line 2207), and experimental cell 3 (line 2208). As shown, the cell surface temperature for the control cell reached up to 65° C., while the experimental cells only reached up to about 52° C.

Figure 23:
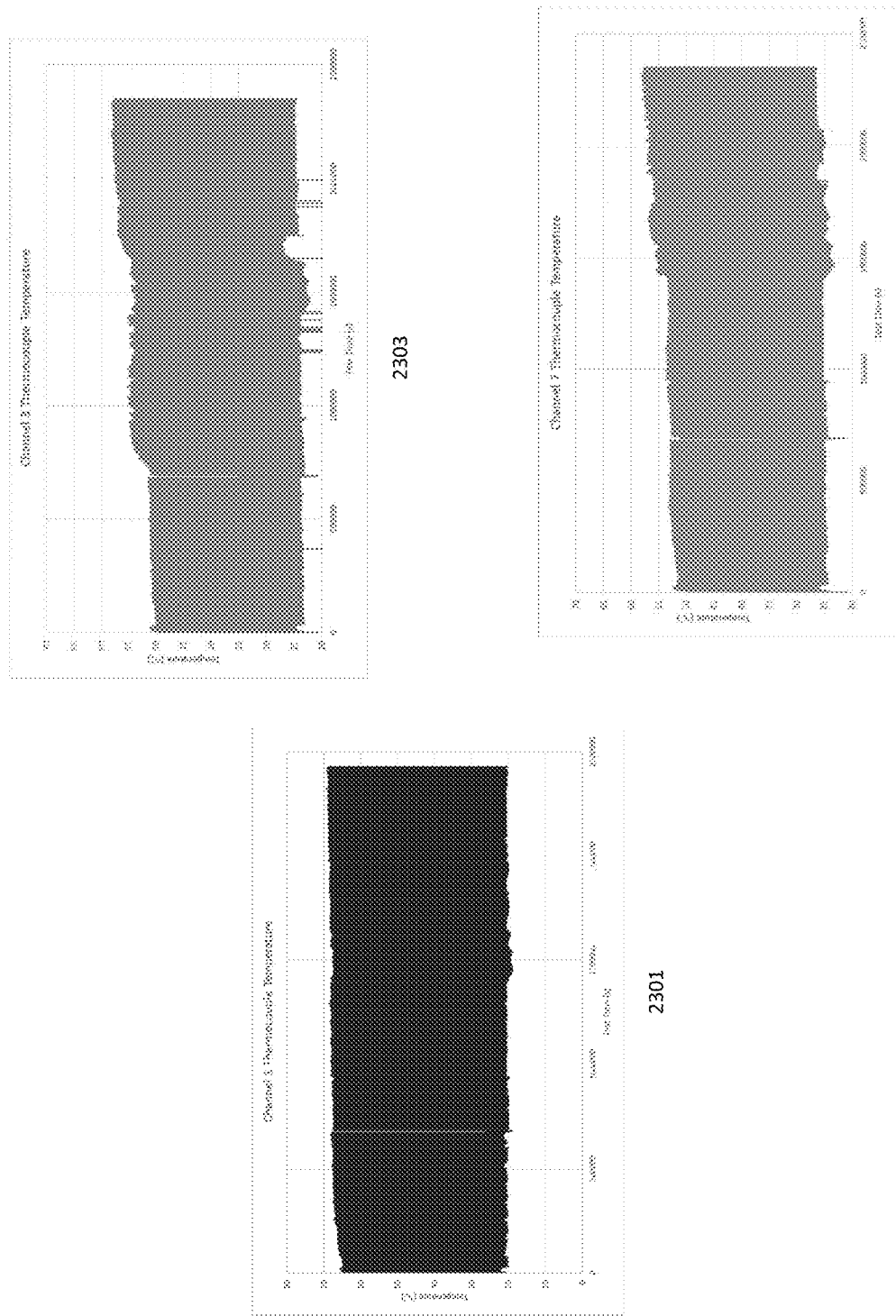
FIG. 23 is another graph showing the temperatures of the cells of FIG. 21 during the experiment.

Similarly, FIG. 23 shows the temperatures of the control cells and each of the experimental cells over time. Table 2301 shows that the control cell initially reached temperatures of approximately 65° C. and rose to nearly 70° C. over time. In contrast, experimental cells 1 and 2 shown in tables 2303 and 2307 only initially reached temperatures of approximately 50° C. and did not exceed 57° C.

Figure 24:
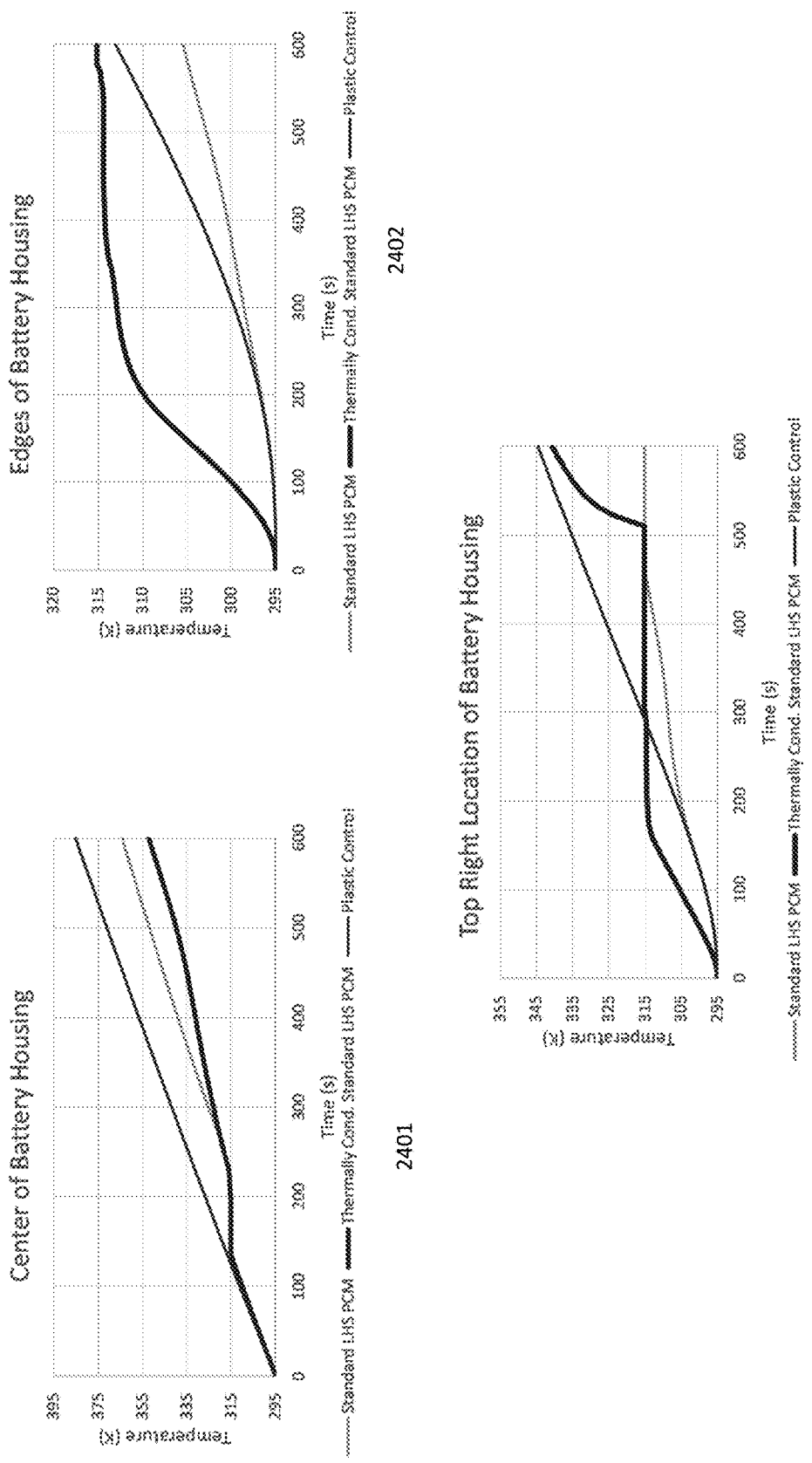
FIG. 24 shows graphs illustrating the temperatures at various locations in casings with different thermal conductivity properties.

As previously discussed with reference to Table 6 above, many embodiments of composite polymeric casings of the present disclosure may have thermal conductivity additives that increase the thermal conductivity properties of the casings. FIG. 24 shows the results of thermal modeling simulations performed to measure the thermal conductivity of one such embodiment containing one or more thermal conductivity additives described in this disclosure. For ease of reference, this embodiment will be referred to as the "thermally conductive housing" in describing the tests in FIG. 24. The thermally conductive housing was compared to a different PCM-TMM embodiment of the present disclosure without thermal conductivity additive (a "PCM-TMM housing"), and a plastic control housing with negligible thermal management properties. In these tests, he computer simulation produced the temperature of the three different housings at three different locations in the housings. The first graph 2401 shows the temperature of the center of the housings, with the plastic control housing reaching a temperature of over 380K, while the PCM-TMM housing without thermal conductivity additives reached a temperature of only 360K, and the thermally conductive housing reached less than 355K. It is contemplated that material at the center of any of the housings is likely to reach the highest temperature of any other location in the housing because it is surrounded by cells from multiple directions.

The second graph 2402 of FIG. 24 shows that when measuring the temperatures at the edges of the battery housings, the edges of the thermally conductive housing increased in temperature quickly and sharply as compared to the more gradual temperature increases of the edges of both the plastic control housing and the PCM-TMM housing. The second graph 2402 illustrates that due to the thermal conductivity properties of the thermally conductive housing, more heat can be dissipated and distributed throughout a greater quantity of the phase change material. The fact that the temperature is higher at the edges of the thermally conductive housing indicates that temperatures at other locations of the thermally conductive housing are likely lower than they would have been if heat had not been transferred so efficiently out toward the edges of the housing.

The third graph 2403 of FIG. 24 shows that the thermally conductive housing allows for highly effective utilization of the PCM's transition temperature even in a corner of a battery casing. As shown, the thermally conductive housing reaches its transition temperature more quickly than the PCM-TMM housing and remains there for a longer period of time.

Figure 25:
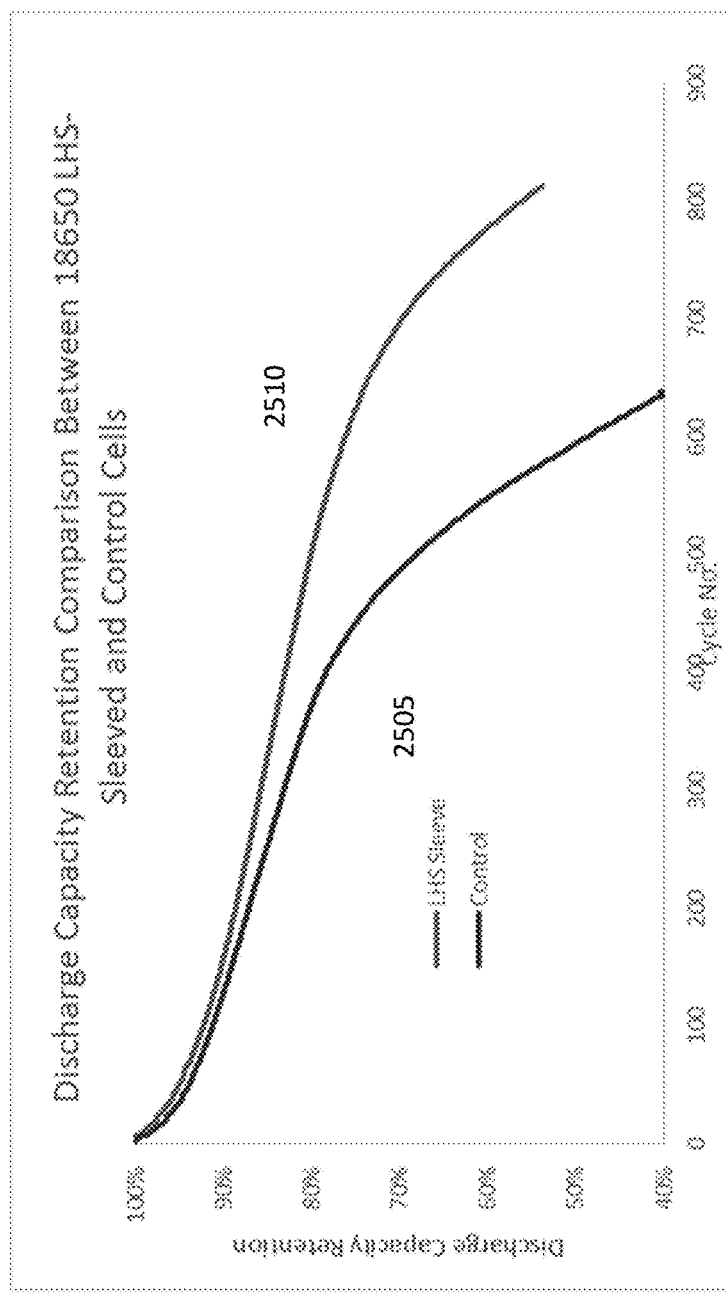
FIG. 25 a graph showing the discharge retention capacity of a cell in a casing according to an embodiment of the present disclosure compared to that of a control cell with no casing.

FIG. 25 shows a separate experiment testing the discharge capacity retention of an electrochemical cell batteries contained in a casing according to the present disclosure housing of as compared to an electrochemical cell without a casing over the course of over 800 cycles. As shown, the control cell, with its discharge capacity depicted by the line 2505, lost more discharge capacity as compared to the experimental cells contained in the housing, depicted by the line 2510. After approximately 400 cycles, the control cell lost discharge capacity even more significantly over time.

Any of the combinations of the polyols, crosslinkers, chain extenders, branching agents, catalysts, and or additives described in the tables above may be combined in the desired ratios in order to adjust the properties of transition temperature, melting point, latent heat, thermal conductivity, and fire resistance required by a particular application.

In view of the above tables, graphs, and descriptions, embodiments of the present disclosure provide a composite polymeric material for electrochemical cell management, the composite polymeric material comprising a crosslinked polyether polyol phase change material. In many embodiments, the material may be configured to be in physical contact with at least a portion of an electrochemical cell. The composite polymeric material may also be formed into a casing for electrochemical cells, the casing comprising a unitary structure comprised of a substantially homogeneous crosslinked polyether polyol phase change material, the unitary structure having one or more openings configures to retain the one or more electrochemical cells in thermal contact with the crosslinked polyether polyol phase change material.

In some embodiments, the composite polymeric material may comprise one of a crosslinking agent or a chain extending agent and a polyol in a ratio of between approximately 0.5:1 and 1.5:1. In some embodiments, the polyol may comprise either a linear or a branched polyol. Further, in some embodiments, the crosslinking agent or chain extending agent may be branched or linear. Many embodiments of the composite polymeric material may have a transition temperature of between 25° C. and 140° C., and in some embodiments specifically between 45° C. and 60° C. The material may have a latent heat of greater than 2 Joules per gram, and in many embodiments, specifically between 70 and 100 Joules per gram. The various embodiments may comprise a solid-solid PCM and may be machinable, moldable, and/or fire resistant. The casing comprising the composite polymeric material may, when used in conjunction with one or more electrochemical cells during a plurality of charge and discharge cycles of the one or more electrochemical cells, extends the discharge capacity life of the one or more electrochemical cells as compared to the original discharge capacity life of the one or more electrochemical cells.

In certain embodiments, the casing may comprise a thermal conductivity additive. In such embodiments, the crosslinked polyether polyol comprising the thermal conductivity additive may have a thermal conductivity of greater than 1.5 times the thermal conductivity of the crosslinked polyether polyol alone. In some embodiments, in order to create the crosslinked polyether polyol, the polyol and the crosslinking agent or branching agent may be reacted using a catalyst. Some embodiments may further comprise one or more of a water scavenger additive, an antioxidant additive, or a fire-retardant, examples of which are described throughout the disclosure.

Examples of fpPCM Structures

Figure 7:
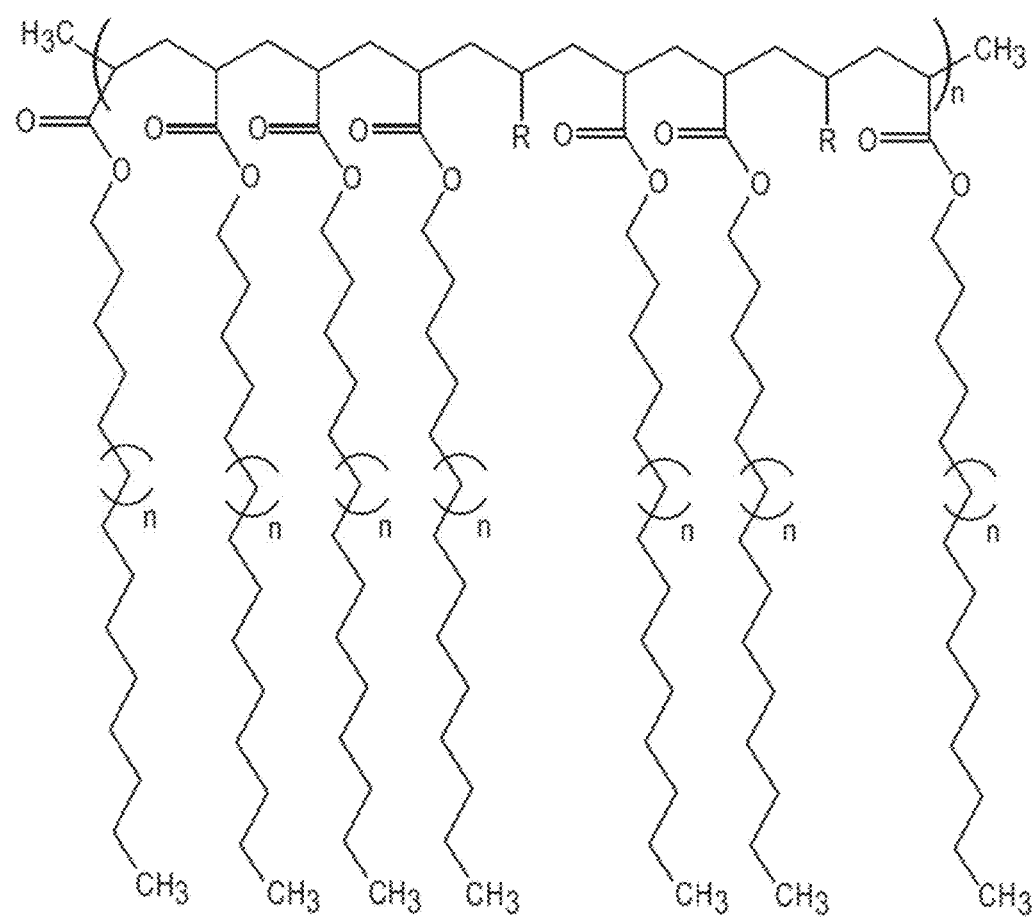
FIGS. 7-10D show various embodiments of functional polymeric phase change materials.
Figure 7A:
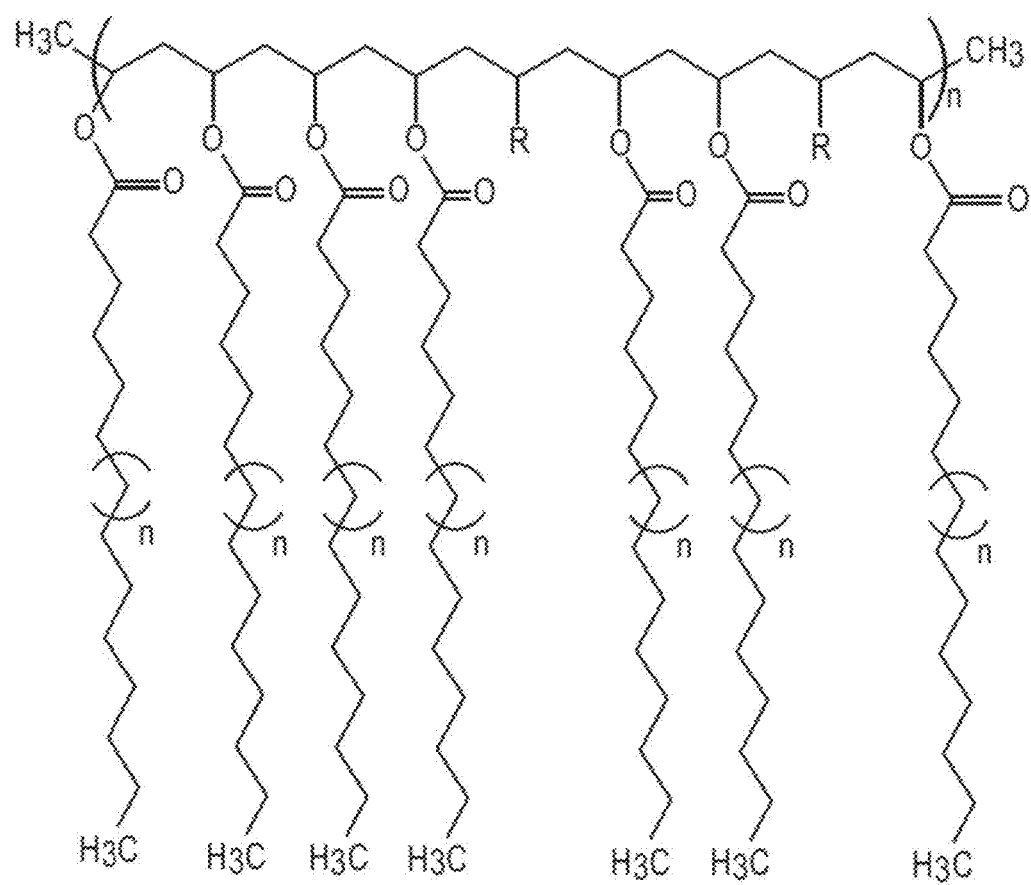
Figure 7B:
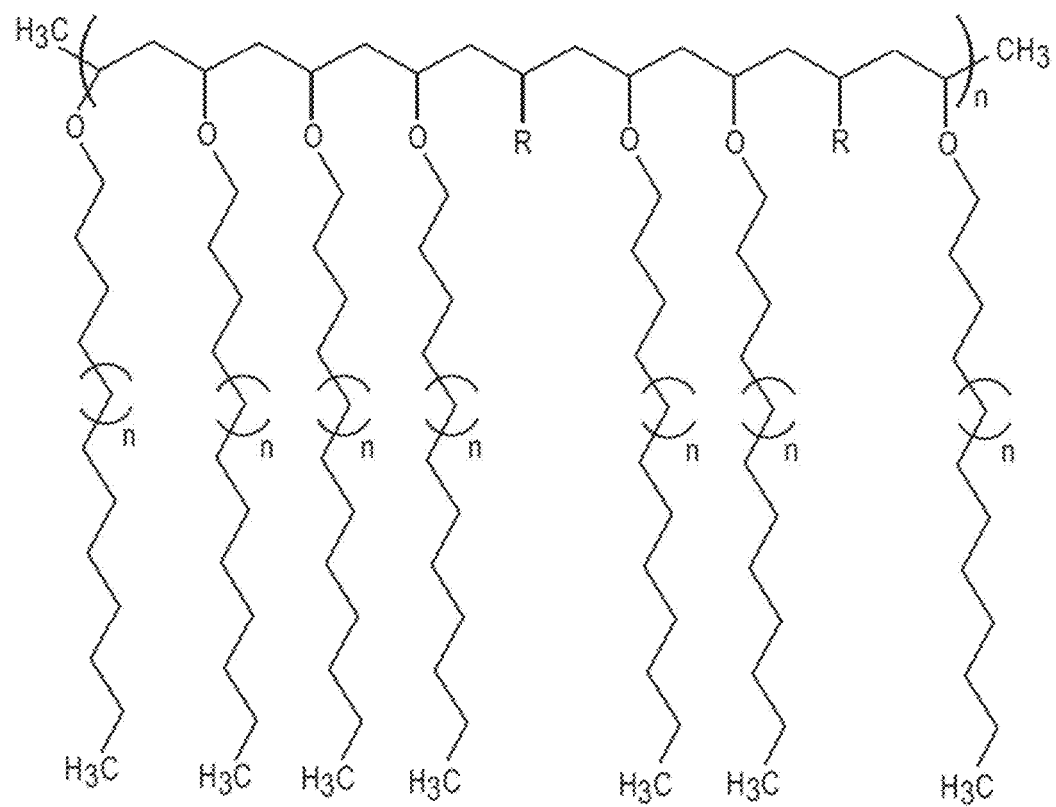
Figure 7C:
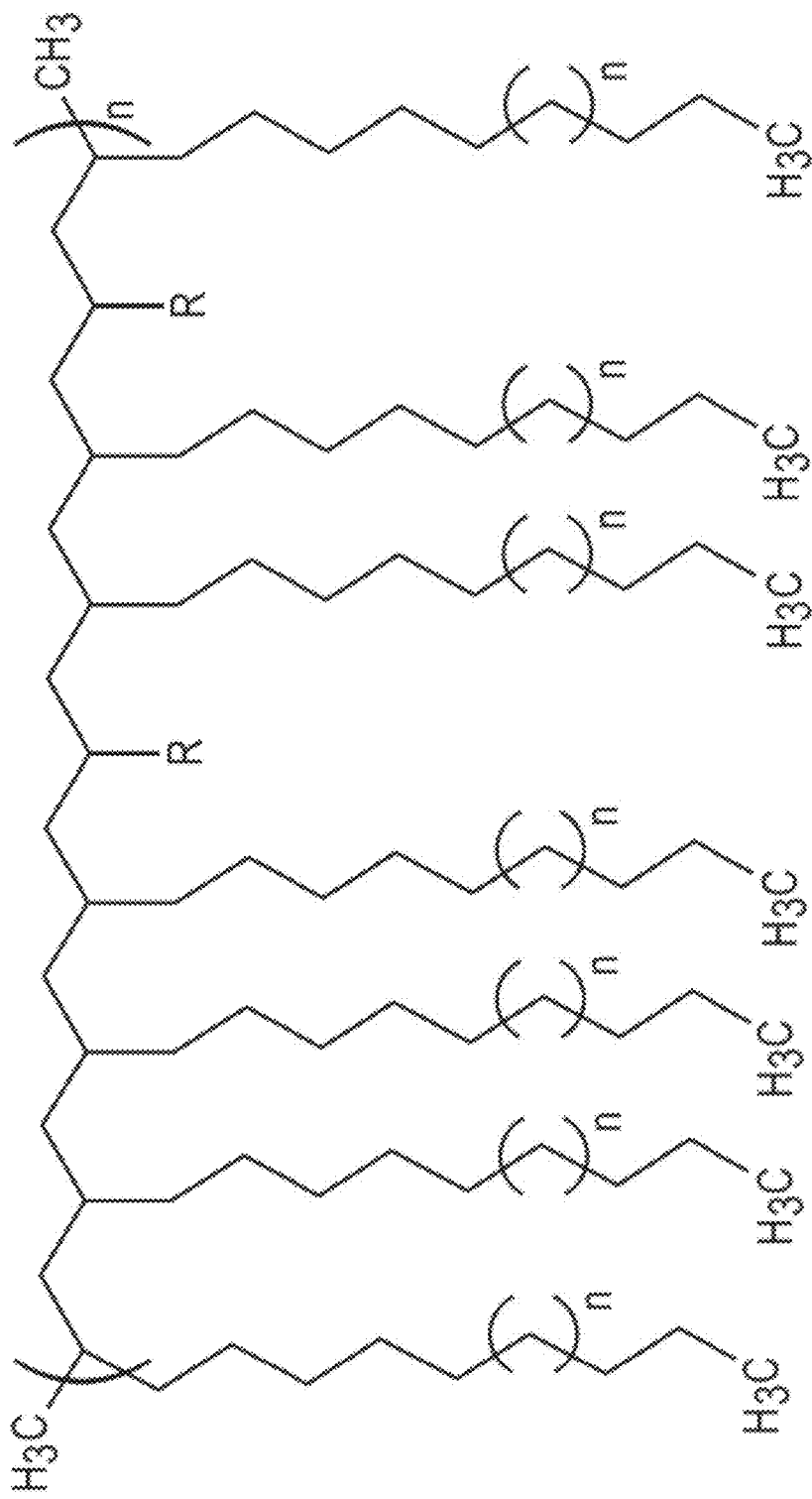

FIGS. 7-10D are schematic drawings of fpPCMs used in accordance with various aspects of the present disclosure. Both are composed of a backbone chain and side chains. The fpPCM in FIG. 7 represent long chain alkyl polyacrylate or polymethacrylate, and 7A-7C where 7A is long chain alkyl vinyl esters, 7B is long chain vinyl ethers and 7C is long chain alkyl olefins.

Figure 8:
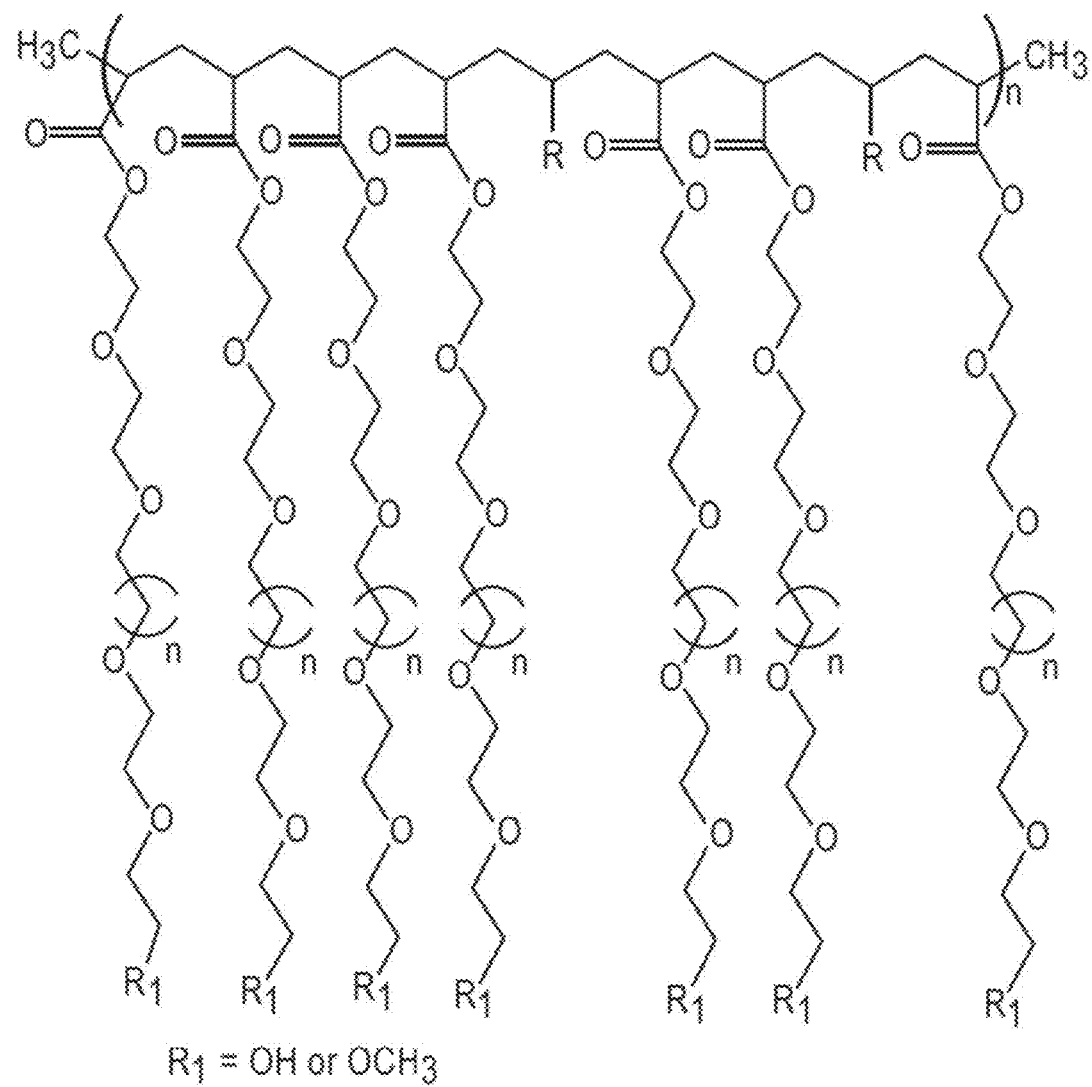
Figure 8A:
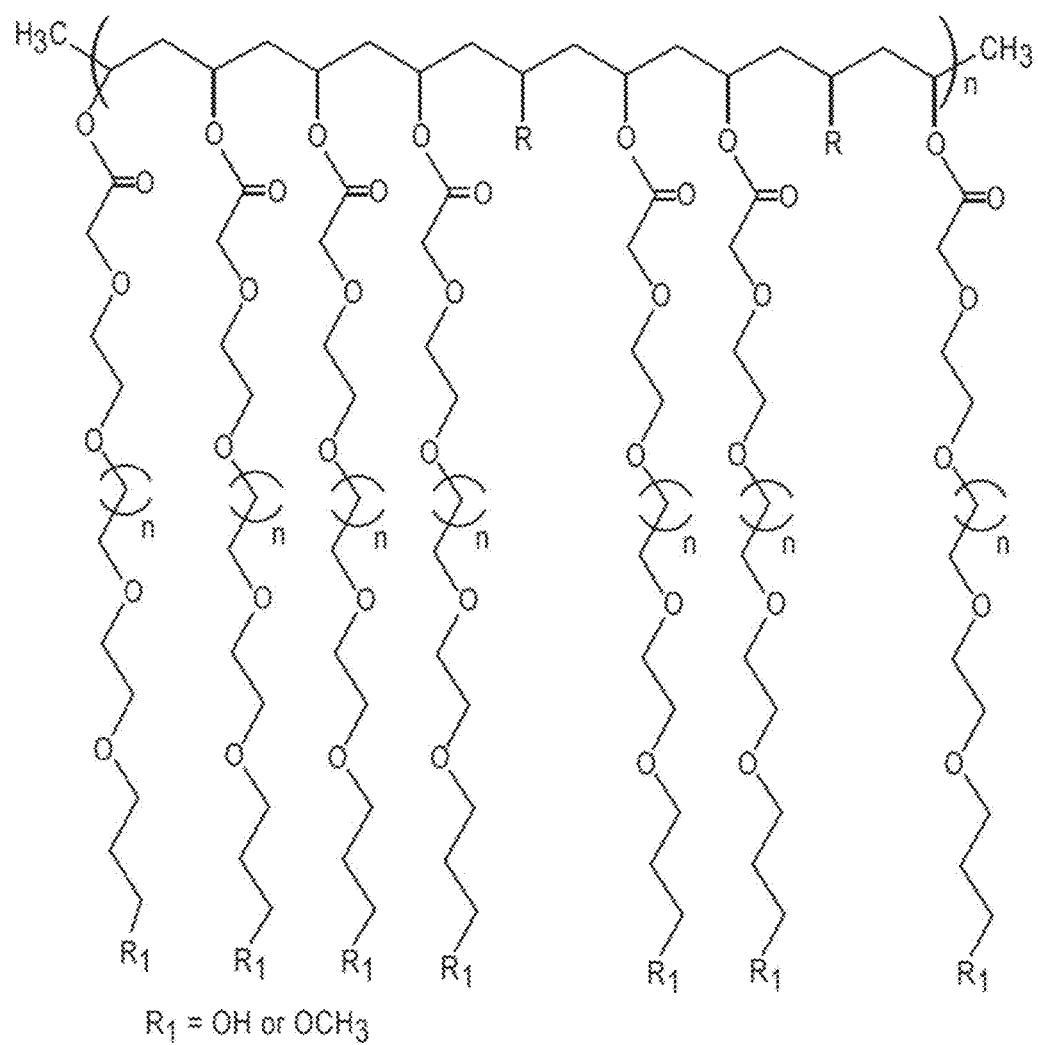
Figure 8B:
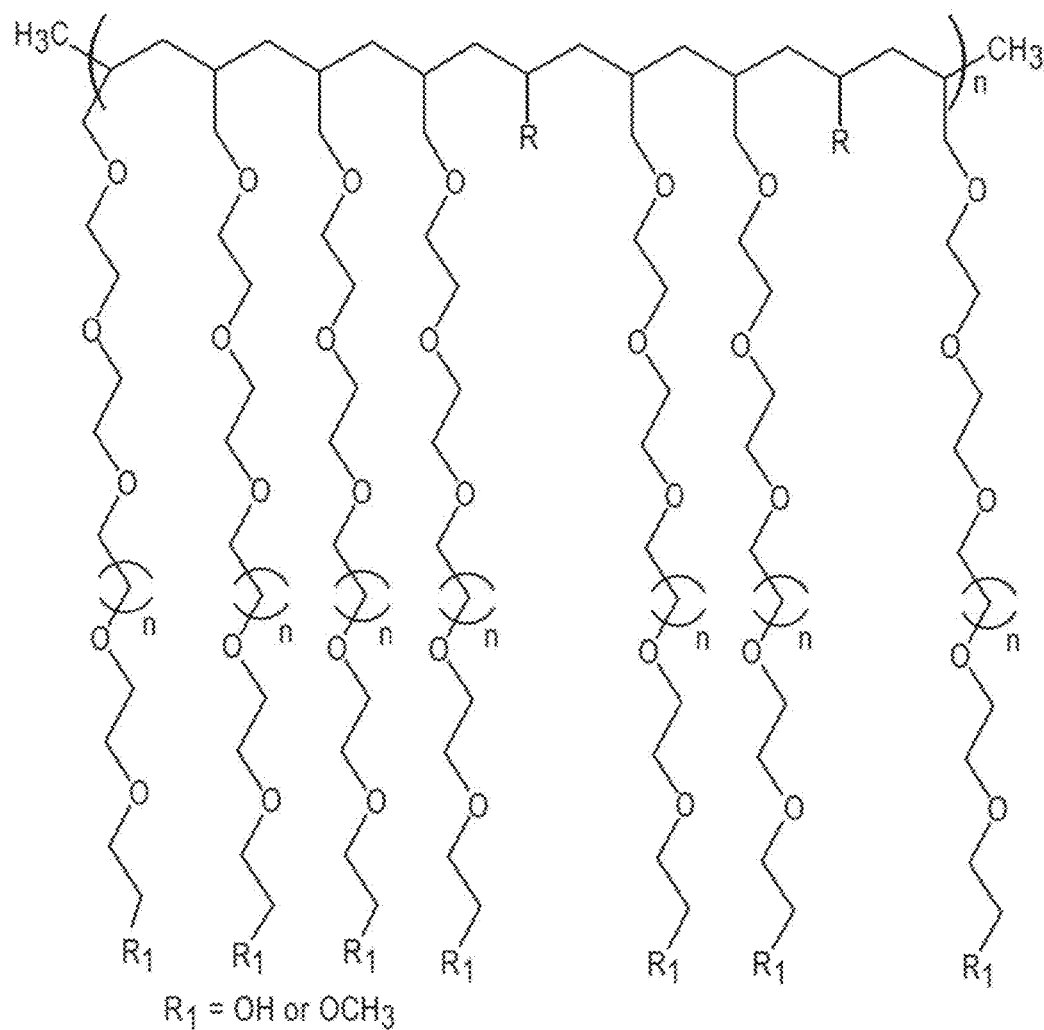

FIGS. 8A and 8B represent long chain glycol polyacrylates or polymethacrylates, where 8A is long chain glycol vinyl esters and 8B is long chain glycol vinyl ethers.

In FIGS. 7 and 8, R represents one or more of the reactive functions(s) described above. In those figures, the functions are drawn along the backbone, but that is only one option. As indicated above, the functions could also be placed at the end(s) of the backbone, on the side chains and any combination of those. Each fpPCM may have a single or multiple reactive functions. fpPCM may also carry multiple reactive functions of a similar chemical nature or a combination of reactive functions of different chemical nature. The length of the side chains may vary in different embodiments as shown by the variable chain length n.

Figure 9A:
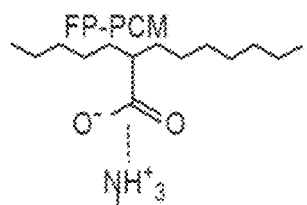
Figure 9B:
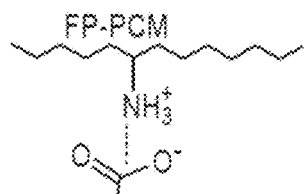
Figure 9C:
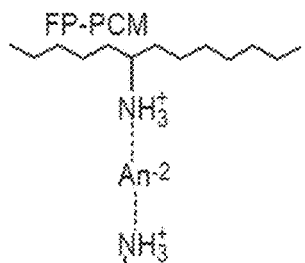
Figure 9D:
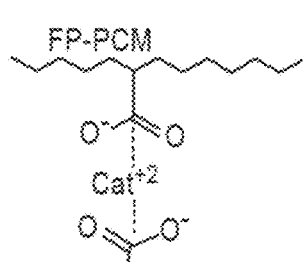
Figure 9E:
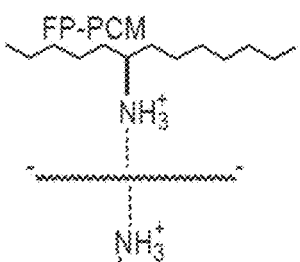
Figure 9F:
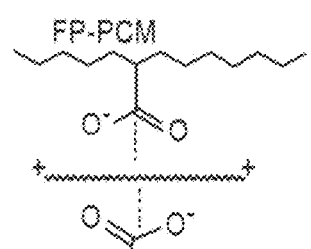

With reference to FIGS. 9A-9F, FIG. 9A drawing depicts an acidic or low pH carboxyl functional FP-PCM ionically interacting with a basic or high pH amino functional substrate. FIG. 9B depicts basic or high pH amino functional fpPCM ionically interacting with an acidic or low pH carboxyl functional substrate. FIG. 9C depicts basic or high pH amino functional fpPCM and a basic or high pH amino functional substrate being neutralized and ionically bound or "crosslinked" with an anion such as an amine. FIG. 9D depicts an acidic or low pH carboxyl functional fpPCM and an acidic or low pH carboxyl functional substrate being neutralized and ionically bound or "crosslinked" with a cation such as a metal salt. FIG. 9E depicts basic or high pH amino functional fpPCM and a basic or high pH amino functional substrate being neutralized and ionically bound or "crosslinked" with negatively charged organic compound such as dicarboxy functional polymer or dicarboxy functional fpPCM. FIG. 9F depicts an acidic or low pH carboxyl functional fpPCM and an acidic or low pH carboxyl functional substrate being neutralized and ionically bound or "crosslinked" with positively charged organic compound such as diamine functional polymer or diamine functional fpPCM.

Figure 10A:
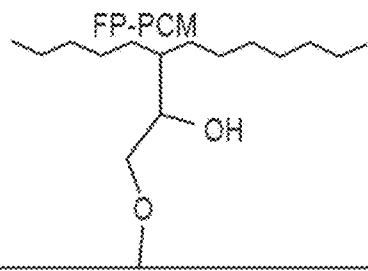
Figure 10B:
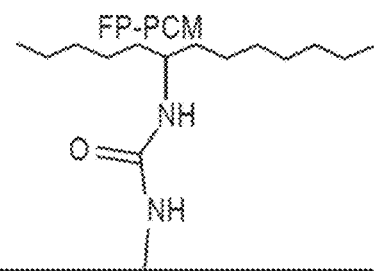
Figure 10C:
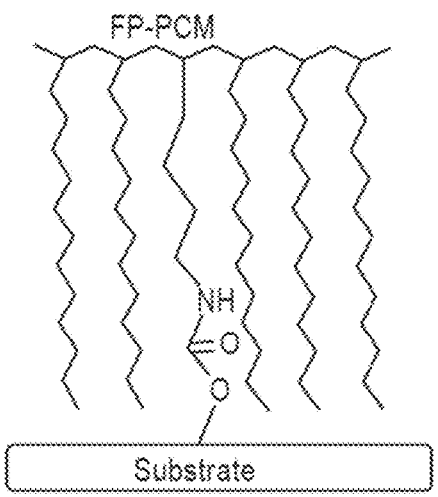
Figure 10D:
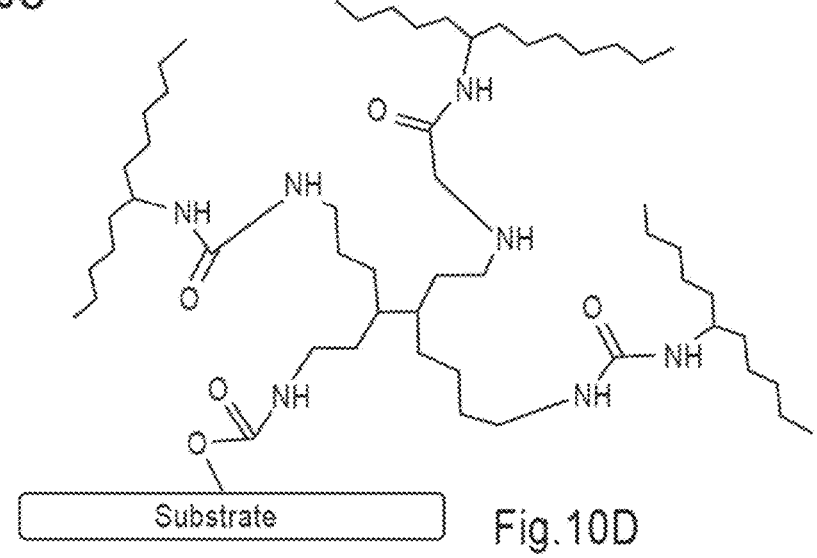

With reference to FIGS. 10A-10D, FIG. 10A depicts a covalent ether bond from the reaction of an fpPCM epoxy and hydroxyl on a cellulose substrate. FIG. 10B depicts a covalent urea bond from the reaction of an fpPCM isocyanate and amine from another material. FIG. 10C depicts a covalent urethane bond from the reaction of an fpPCM isocyanate on the end of a side chain and hydroxyl from a cellulose substrate. FIG. 10D depicts a covalent urea and urethane bonds from the reaction of amine function, fpPCMs, multifunctional isocyanate crosslinker/binder, and hydroxyl from a cellulose substrate.

Use of Precisely Branched fpPCMs

In addition to the above disclosure concerning functional polymeric phase change material application and the use with various substrates, the disclosure below focuses on how using a more precisely branched polymer can give more precise and repeatable control of a copolymer addition. It is contemplated that each of the embodiments shown in FIGS. 7-10 may be modified to utilize the precisely branched polymers disclosed and discussed below. One of skill in the art would readily recognize how to incorporate the precisely branched polymers into the examples above and into variations of the above examples.

Standard polymerizations do not give precise and repeatable control of the comonomer addition because the catalysts generally add co-monomers in a random fashion. As discussed above, many polymers currently available commercially have random monomer incorporation. Current catalysts and polymerization technologies produce polymers with "drifting copolymer" structures where polymer chains in the product have a wide range of compositions of the comonomers. Due to the randomness of this comonomer addition, less control can be exerted over the thermal properties of the copolymer such as melt/crystallization temperature and the amount of crystallization. The amount of crystallization can be expressed as a percentage crystallinity, latent heat, heat of fusion or Joules per gram.

Precise branching control as discussed below allows for greater latent heat content at a given melt temperature versus random comonomer incorporation which requires more comonomer to give the same melt temperature, leading to lower percentage crystallinity and lower latent heat.

Figure 11:
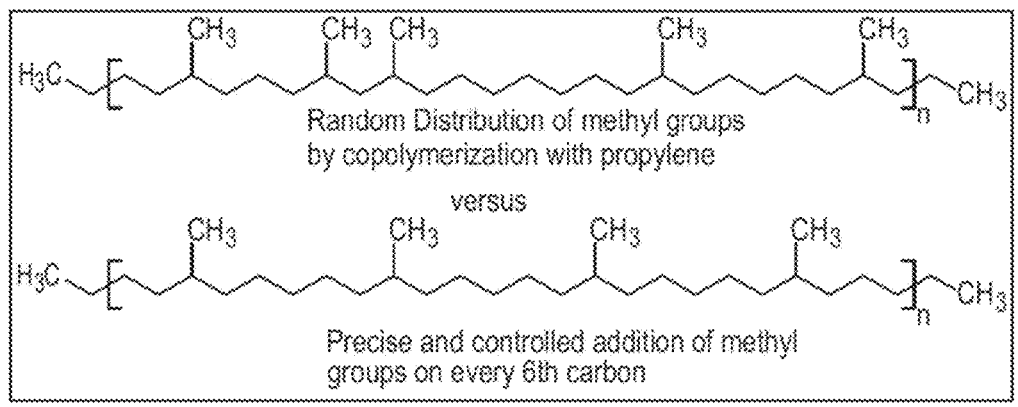
FIG. 11 shows one embodiment of the precisely branched polymers compared with randomly distributed polymers.
Figure 12:
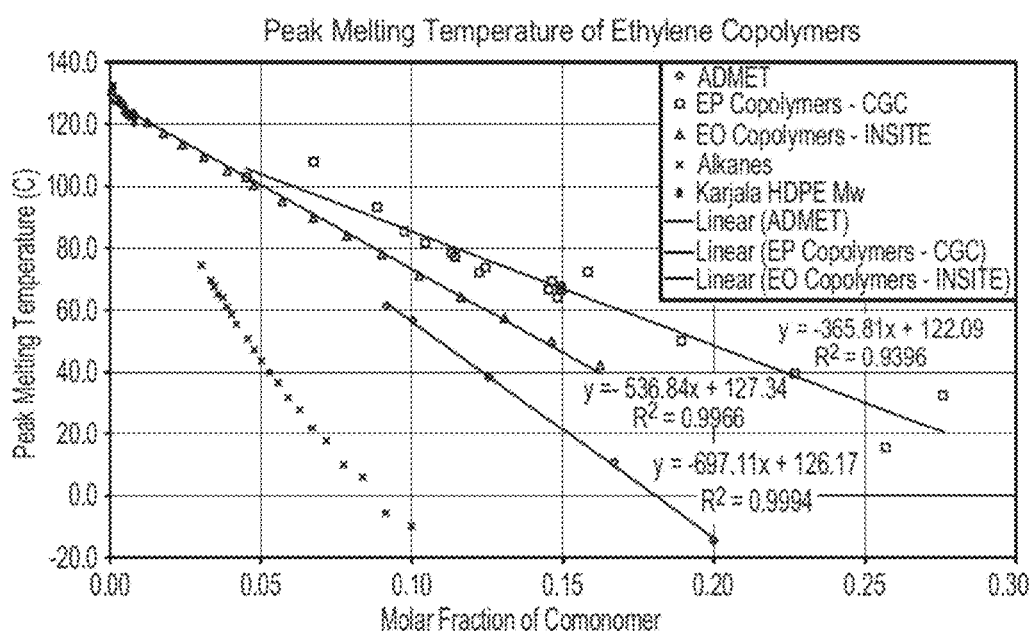
FIG. 12 is a graph depicting the peak melting point of various copolymers.
Figure 13:
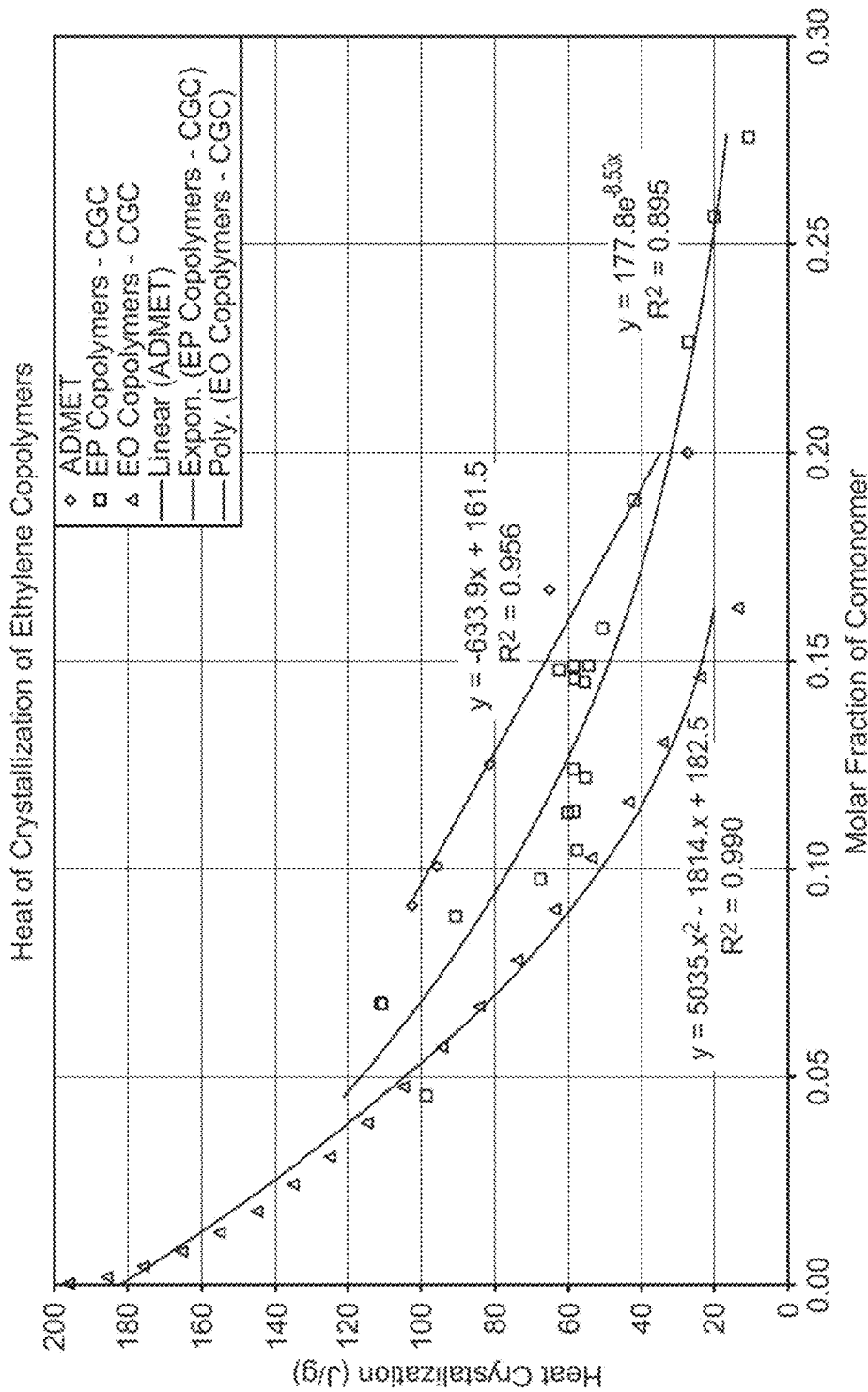
FIG. 13 is a graph depicting the heat of crystallization of various copolymers.

With general reference to FIGS. 11-13, various graphs are shown that illustrate the difference in both melt temperature and latent heat. In FIGS. 11-13 the precisely branched polymers are labeled as ADMET. In the various embodiments, figures and examples, ADMET stands for Acyclic Diene Metathesis Polymerization and generally represents polymers with precisely placed methyl branches.

It is well known in the industry, that for polyolefin polymers the melting temperature and latent heat are controlled by the longest carbon segments in the polyolefin backbone. For instance in polyethylene random copolymers, the distribution of ethylene sequences vary. In the case of polyethylene copolymers, thick crystal lamella can be formed from the longer ethylene sequences which will result in higher melting temperatures. The shorter ethylene sequences and/or branches will not be incorporated into these crystallites or lamella resulting in lowered heats of fusion or Joules per gram.

In accordance with one embodiment and example, a precisely branched polyethylene material having equal ethylene sequences yields the following features: a faster decrease in melting temperature at lower branch content; better control of the melting temperature; and an overall higher amount of ethylene sequences incorporated into the lamella or crystallite, yielding higher latent heats. Use of these precisely controlled copolymers yields materials with phase change materials exhibiting enhanced temperature regulating, heat absorbing, and heat releasing properties. In order to obtain an embodiment of a PCM with melting temperatures suitable for use in electrochemical device applications and as described below, many embodiments have PCMs with a latent heat of fusion of >10 Joules per gram and other specifically of >60 Joules per gram. PCMs have a latent heat of fusion of >25 Joules per gram in one embodiment, >5 Joules per gram in another embodiment, and between 5 and 150 Joules per gram in yet another embodiment, a PCM in one example has a structure with one or more of the following features:

The overall polymer molecular weight (n) is between 100-10,000,000, between 1000-1,000,000 or between 10,000-500,000 in various embodiments.

With the molecular weight distribution expressed as polydispersity or Pd=Mn/Mw, it is between 1-100, between 1-10, or between 1-5 in various embodiments.

The ethylene length between branches is between 5-500,000, between 10-400,000, or between 10-20 in various embodiments.

The length described above can be expressed in a number of ways such as number of m units in diagram 1 below, branches per 1000 carbons (branches/1000 C), mole % branches or weight % branches. The PCM structure also has the following characteristics in one or more embodiments:

The number of m units is between 0-500,000, between 0-200,000 or between 5-15,000 in different embodiments.

There are between 200-0, between 100-5 or between 100-0 branches per 1000 carbons (branches/1000 C) in different embodiments.

The mole % of the branches is 0-50% or between –30% in different embodiments.

The weight percentage of the branches is between 0-50% or between 10-30% in different embodiments.

In some embodiments the branches may be methyl branches from propylene as the comonomer and propylene may be 0-30 mole % of the polymer. In another embodiment, propylene may be 0-39 weight % of the polymer Diagram 1

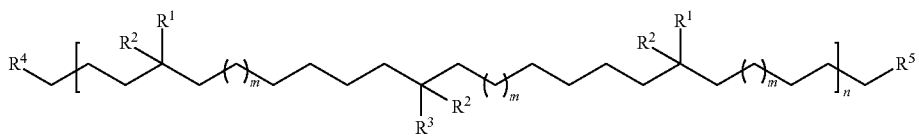

In diagram 1 above, illustrating one embodiment, $R^1$ may be any of $CH_3$, $C_2H_5$, $CnH_{2n+1}$, $OCH_3$, $OC_2H_5$, or any functional group, polar group, halogen group, their normal, branched or mixed group. In certain embodiments $R^2$ is selected from either $CH_3$ or $OCH_3$. In diagram 1, $R^2$=H, $CH_3$ and in certain specific embodiments, $R^2$ is limited to H.

In diagram 1, $R^3$=H, $CH_3$ or some concentration of a selected functional group, polar group or halogen group. In certain embodiments, $R^3$ is limited to $CH_3$ or to one or more concentrations of a functional group In diagram 1, $R^4$ and $R^5$ are polymer end groups and can be H, $CH_3$ or any functional group, polar group or halogen group, salt, metal, catalyst end, crosslinking group, another polymer chain to form copolymers (block, graft, etc.). In some embodiments, $R^4$, $R^5$ can be the same or different. In certain embodiments, $R^4$ and $R^5$ are limited to H, $CH_3$ or any functional group.

In accordance with other aspects $R^1$, $R^2$, $R^3$, $R^4$, and $R^5$ can have some degree of stereocontrol or stereochemistry associated with them. For example:

$R^1$, $R^2$, $R^3$ may be atactic, isotactic or syndiotactic.

$R^1$, $R^2$, $R^3$ may also be controlled for chirality to yield L- and D-chiral homo and copolymers (or another way of stating is R- and S- polymers).

Different polymer architectures based on the stereochemistry of the polymer chain can lead to various crystalline complexes. For example, syndiotactic homo- and copolymers can complex with isotactic homo- and copolymers. Polymers of opposite chirality can be mixed to form a racemic stereocomplex. In one embodiment, a certain amount of isotactic L-polymer can be mixed with an amount of isotactic D-polymer to yield a racemic stereocomplex with thermal and physical properties different than the L- or D-chiral homopolymers. (A polymer stereocomplex is defined as a stereoselective interaction between two complementing stereoregular polymers, that interlock and form a new composite, demonstrating altered physical and thermal properties different than the parent polymers.)

These syndiotactic, isotactic or L- and D-chiral segments can be in different polymer chains (homopolymer segments) or in the same polymer (stereoblock copolymers segments). The syndiotactic, isotactic or L- and D-chiral segments can make up anywhere between 1-100% of the polymer or copolymer as well as various intermediate percentage ranges.

The syndiotactic, isotactic or L- and D-chiral segments can be mixed in a ratio between 9:1 and 1:9 to give complete or partial stereocomplex formation and subsequent thermal and physical property adjustment. Other crystalline complexes may also be utilized such as complexes between different polymers such as polyamides and polyesters, cat-ionic/anionic, polyethers/polyacids, and triple helixes.

$R^3$, $R^4$, $R^5$ can be any functional group, polar group or halogen group, salt, metal, catalyst end, crosslinking group, or any of the following functional groups: acid anhydride groups, amino groups, N-substituted amino groups and their salts, amide groups, imine groups, imide groups, azide groups, azo groups, amine-formaldehyde groups, carbonyl groups, carboxy groups and their salts, cyclohexyl epoxy groups, epoxy groups, glycidyl groups, hydroxy groups, isocyanate groups, cyanate groups urea groups, aldehyde groups, ketone groups, ester groups, ether groups, alkenyl groups, alkynyl groups, thiol groups, disulfide groups, silyl or silane groups, halogenated leaving groups, peroxide groups, salt groups, groups based on glyoxals, groups based on aziridines, groups based on active methylene compounds or other b-dicarbonyl compounds (e.g., 2,4-pentandione, malonic acid, acetylacetone, ethylacetone acetate, malonamide, acetoacetamide and its methyl analogues, ethyl acetoacetate, and isopropyl acetoacetate), halo groups, hydrides, or other polar or H bonding groups and combinations thereof.

The crosslinking groups discussed above may also include the ability to reversibly or irreversibly change the crosslink by thermal, sonic, photon, pressure, or chemical (water, solvents, ions, etc.) energy.

Various other methods of functionalization are described shown in the following references, the details of which are incorporated by reference into the present application: Synthesis of Functional Polyolefins using Metallocenes: A Comprehensive Review; Atiqullah M., et. al.; Polymer Reviews, 50:178-230, 2010; Comprehensive Organometallic Chemistry III: 11.20-Polymerization of Alkenes; Elsevier Ltd.; Fujita T., Makio H.; Vol. 11, 691-734, 2007; Functionalized Ethylene Copolymers and Materials via Olefin Metathesis Polymerization; Baughman, T., Univ. of Florida Dissertation, 2006.

Figure 14:
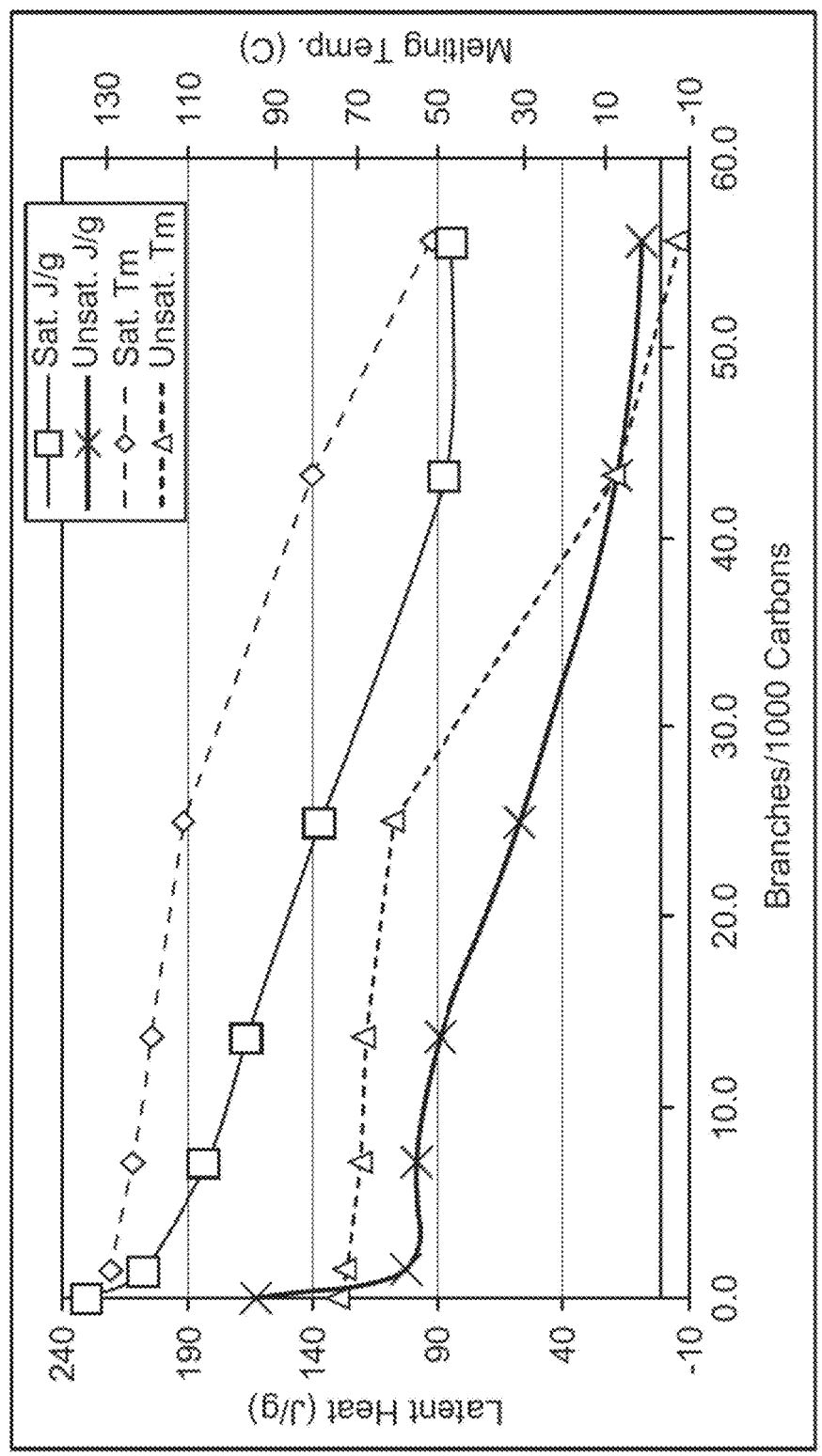
FIG. 14 is a graph depicting the latent heat and melting point of various copolymers.

In accordance with another aspect, the polymer may have a certain degree of unsaturation or include double and triple bonded atoms in the polymer. For instance, alkene or alkyne bonds. This unsaturation (not all valence electrons are "saturated" or reacted to other atoms) can be incorporated and controlled by the monomers used in the polymerization (isoprene, butadiene, α-olefins, etc.), hydride elimination (β-hydride elimination, etc.), various polymerization mechanisms (ring-opening metathesis polymerization (ROMP), acyclic diene metathesis (ADMET described herein, etc.) or controlled hydrogenation/dehydrogenation. For instance, as shown in Diagram 2 and FIG. 14, examples of making the disclosure by ADMET polymerization and subsequent hydrogenation are shown. FIG. 14 shows the effect of unsaturation on the thermal properties.

Diagram 2

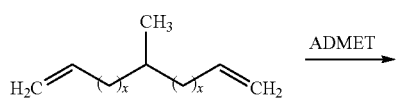

-continued

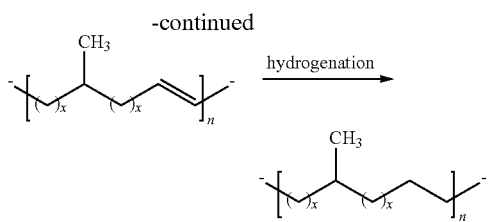

As can be seen, unsaturation causes a lower melting temperature and also slightly lower latent heat of fusion, but by controlling the level of unsaturation, one can also control the thermal properties. In some embodiments the unsaturation is 0-99 mole %. In other embodiments the unsaturation is 0-15 mole %. In various other embodiments, various intermediate ranges of mole % are utilized.

The isomeric orientation of the double bond can also have an effect on the properties of the unsaturated polymer. The cis/trans orientation of the double bond can also be controlled by the hydrogenation catalyst or the hydrogenation process conditions such as time, temperature, pressure, etc.

The isomer ratio, unsaturation and double bond orientation will vary depending on the comonomer composition, comonomer distribution and polymerization conditions. One goal of a composition in accordance with an aspect of the present disclosure is to maximize latent heat in the preferred temperature range.

Copolymer segments used in connection with aspects of the present disclosure can be copolymers or blended with any of the other polymers/copolymers disclosed herein. In addition, copolymer segments used in connection with aspects of the present disclosure can be high melt or low melt.

Use of Nucleating Agents

In order to improve the crystallinity of the PCM, pPCM and/or fpPCM and therefore the latent heat and thermal conductivity of these materials, nucleating agents can also be added. Nucleating agents can effect improved crystal growth, crystallization speed, crystal shape and size, amount of crystallization and number of crystallites of the materials.

Furthermore, the particle size of the nucleating agent and the mixing of these are important factors in ensuring optimal performance of the additives. Features of a good melt insensitive nucleating agent may be selected from one or more of the following:
  It contains both an organic group and a polar group
  It is well dispersed
  It is insoluble or can become insoluble in the polymer
  It has an epitaxial match with the PCM crystal
  The physical or chemical nature of nucleating agents can be diverse. A nucleating agent can be:
    An impurity, i.e. catalyst residue
    An organic compound like benzoic acid, hydrocarbons or fatty acid based materials
    An inorganic compound such as mineral or pigment
    A foreign polymer crystal, i.e. polyethylene for octadecane, etc.
    A diluent, i.e. a material that lowers the Tg or improves the chain mobility leading to improved chain packing.

Additional nucleating agents that may be utilized include those described in U.S. Pat. No. 7,569,630 β-Crystalline Polypropylene to Chemtura Corp., U.S. Pat. No. 7,879,933 Blending Nucleating Agents Composition and Methods to Milliken & Company, and Hyperform® products from Milliken & Company. Other examples are aliphatic hydrocarbons, aromatic hydrocarbons, alcohols, fatty acids, fatty acid salts, fatty acid esters, fatty amides, fatty amines, fatty alcohols, N-Phenyl-N'-stearylurea, zinc glycerolate, benzoic acid, salts and esters of benzoic acid, benzoic acid derivatives, Na benzoate, Li benzoate, Al hydroxy-4-tert.-butyl benzoate, phosphate esters, phosphate ester salts, sodium 2,2'-methylene-bis-(4,6-di-tert-butylphyenyl)phosphate, dibenzylidene sorbitol, derivatives of dibenzylidene sorbitol, linear or branched polyphenyls, salts of hydrogen phthalate, 1, 2-cyclohexanedicarboxylic acid and the mono or di neutralized salt (i.e. Na, K, Al, B, Ti, Zn, Ca, Li, Mg, etc.), cetyl alcohol, stearyl alcohol, eicosanol, myristic acid, palmitic acid, behenic acid, stearic acid amide, ethylenebisoleic acid amide, methylolbehenic acid amide, 1-octacosanol, 1-heptacosanol, 1-hexacosanol, 1-pentacosanol, 1-tetracosanol, 1-tricosanol, 1-docosanol, 1-heneicosanol, 1-eicosanol, 1-nonadecanol, 1-octadecanol, 1-heptadecanol, 1-hexadecanol, 1-pentadecanol, 1-tetradecanol, 1-tridecanol, tridecylamine, tetradecylamine, pentadecylamine, hexadecylamine, heptadecylamine, octadecylamine, nonadecylamine, eicocylamine, heneicocylamine, dococylamine, tricocylamine, tetracocylamine, pentacocylamine, hexacocylamine, heptacocylamine and octacocylamine, etc. Minerals such as talc, kaolin, calcium carbonate, $TiO_2$, salts, NaCl, and Na carbonate may also be used as nucleating agents. These compounds may be used singly or in combination of two or more thereof.

Microcapsules and Other Containment and/or Absorbing Structures for Phase Change Materials PCM can be contained in microcapsules or some other containment structure or particulate. Containment structures other than microcapsules are capable of carrying functional groups, either as a natural part of their structure or from their modified manufacturing. For instance, PCMs can be absorbed and stabilized into any number of particles including silica (fumed or precipitated), graphite, graphene, carbon nanoparticles, carbon or activated carbon, zeolites, organoclays, montmorillonite, bentonite, clay, talc, and vermiculite. Paraffin or hydrophobic PCMs can also be absorbed in any number of polymers, especially crosslinked polymers, similar to how a plasticizer will absorb into plastics. For instance PCM can be absorbed into any polyolefin and polyolefin copolymer such as polyethylene, polypropylene, salts of polyolefins and their copolymers, poly(meth)acrylates, salts of poly(meth)acrylates, polyvinyls, aliphatic polyesters, rubbers, copolymers (i.e. Kraton® copolymers, Elvaloy®) and mixtures, etc. PCMs based on glycols can be absorbed into any hydrophilic polymers such as polyvinyl alcohol, substituted cellulose (CMC, HMC, etc.) etc.

PCMs, pPCMs, fpPCMs can also be contained, absorbed or infused on any particle or fiber including the below described thermal conductive fillers, reinforcing materials, fire retardant additives, etc. These containment or absorbing particle can be any shape such as round, spherical, cylindrical, fiber, sheet, flake, powder, whiskers, tubular, platelets, foams, meshes, agglomerates of these shapes or any other irregular shape. Depending on the application, a single shape or mixture of shapes may be advantageous to provide the optimum packing and arrangement for particle contact. These containment or absorbing particles can be any size, but in certain embodiments of the present disclosure, may be 0.1 nm to 100 mm.

Other materials which can absorb or contain PCMs such as standard superabsorbent polymers based on cross-linked sodium polyacrylate. Other materials are also used to make a superabsorbent polymer, such as polyacrylamide copolymer, ethylene maleic anhydride copolymer, cross-linked carboxy-methyl-cellulose, polyvinyl alcohol copolymers, cross-linked polyethylene oxide, and starch grafted copolymer of polyacrylonitrile to name a few.

Microcapsules are implemented to contain a phase change material, which serves to absorb or release heat to reduce or eliminate heat transfer. In particular, the microcapsules are formed as shells that define internal compartments within which the phase change material is positioned. The shells can be formed of any suitable material that serves to contain the phase change material, thus offering a degree of protection to the phase change material against ambient or processing conditions or against loss or leakage during use. For example, the shells can be formed of a polymer or any other suitable encapsulation material.

The selection of a material forming the microcapsule shells can be dependent upon various considerations, such as its affinity for other materials in the TMM, affinity or adhesion to batteries, its reactivity or lack of reactivity with the phase change material, TMM materials or batteries its resistance to degradation under ambient or processing conditions, and its mechanical strength. In particular, for certain implementations, a material forming the shells can be selected so as to include a set of functional groups, acid anhydride groups, amino groups, N-substituted amino groups and their salts, amide groups, imine groups, imide groups, azide groups, azo groups, amine-formaldehyde groups, carbonyl groups, carboxy groups and their salts, cyclohexyl epoxy groups, epoxy groups, glycidyl groups, hydroxy groups, isocyanate groups, cyanate groups urea groups, aldehyde groups, ketone groups, ester groups, ether groups, alkenyl groups, alkynyl groups, thiol groups, disulfide groups, silyl or silane groups, halogenated leaving groups, peroxide groups, salt groups, groups based on glyoxals, groups based on aziridines, groups based on active methylene compounds or other b-dicarbonyl compounds (e.g., 2,4-pentandione, malonic acid, acetylacetone, ethylacetone acetate, malonamide, acetoacetamide and its methyl analogues, ethyl acetoacetate, and isopropyl acetoacetate), halo groups, hydrides, or other polar or H bonding groups and combinations thereof. At least some of these functional groups can be exposed on outer surfaces of the shells and can allow chemical bonding to a complementary set of functional groups included in either of, or both, the substrates or other TMM materials, thereby enhancing durability or adhesion. In such fashion, at least some of the microcapsules can be chemically bonded to other PCMs, pPCMs, fpPCMs or fillers. Thus, for example, a material forming the shells can include a set of carboxy groups, which can chemically bond to a set of hydroxy groups. As another example, those carboxy groups included in the shells can chemically bond to a set of amino groups.

Examples of polymers that can be used to form the shells include those listed under the "polymers" definition, including those with carboxy groups, such as polymers including monomeric units based on acrylic acid or methacrylic acid. For certain implementations, the shells can be formed of a polymer that includes from about 1 to about 100 molar percent of monomeric units that include carboxy groups, such as from about 20 to about 80 molar percent, from about 25 to about 60 molar percent, or from about 40 to about 50 molar percent of the monomeric units. In some instances, it can be desirable to adjust a molar percentage of the monomeric units based on sizes of the microcapsules. For example, as a size of an individual one of the microcapsules decreases, an outer surface area of that microcapsule also typically decreases. Thus, to maintain a desired amount of exposed functional groups for chemical bonding, it can be desirable to increase the molar percentage of the monomeric units as the size of that microcapsule decreases. As another example, as a size of an individual one of the microcapsules increases, a weight of that microcapsule also typically increases. Thus, to account for the increasing weight, it can be desirable to increase the molar percentage of the monomeric units as the size of that microcapsule increases. Table 1 provides examples of ranges of the molar percentages as a function of the sizes of the microcapsules. Referring to Table 1, the microcapsules are assumed to be spherical for ease of presentation. Similar considerations and molar percentages can also apply to polymers with other types of functional groups.

TABLE 1

| Radius - r ($\mu m$) | Surface area - $4\pi r^2$ ($\mu m^2$) | Molar percent of monomeric units with carboxy groups |
| --- | --- | --- |
| 0.5 | 3 | 50-60 |
| 1 | 13 | 45-55 |
| 2 | 50 | 40-50 |
| 3 | 113 | 40-50 |
| 4 | 201 | 35-45 |
| 5 | 314 | 35-45 |
| 6 | 452 | 30-40 |
| 7 | 616 | 30-40 |
| 8 | 804 | 25-35 |

Other examples of polymers that can be used to form the shells include those formed of monomers using any suitable polymerization technique. Table 2 below sets forth examples of such monomers that include different types of functional groups.

TABLE 2

| Functional Group | Monomers |
| --- | --- |
| Carboxy Group | acrylic acid, methacrylic acid, maleic acid, itaconic acid, citraconic acid, vinylacetic acid, p-vinylbenzoic acid, 2-acryloyloxyethylacidphosphate, β-acryloyloxyethyl hydrogen succinnate (or any other anhydride reacted or modified hydroxy group-containing monomer), and any other unsaturated polymerizable carboxylic acid |
| Isocyanate Group | isocyanato methacrylate, monomer supplied as TMI by Cytec Industries, 2-methacryloyloxyethyl isocyanate, acryloyloxyethyl isocyanate, blocked isocyanates such as 2-(i)-[1'-methylproplyideneamino]carboxyamino)ethyl methacrylate, and any other unsaturated polymerizable isocyanate |
| Anhydride Group | maleic anhydride, itaconic anhydride, citraconic anhydride, and any other unsaturated polymerizable anhydride |
| Hydroxy Group | $CH_2=CR'COO(CH_2)_nOH$, where R' = $CH_3$ or H, n = 2-4 (e.g., hydroxyethyl methacrylate, hydroxyethyl acrylate, hydroxypropyl methacrylate, hydroxypropyl acrylate, hydroxybutyl methacrylate, and hydroxybutyl acrylate); $CH_2=CR'COO((CH_2)_nO)_zOH$, where R' = $CH_3$ or H, n = 1-10, z = 1-1,000 (e.g., glycol based acrylates or methacrylates, such as ethyleneglycol methacrylate, ethyleneglycol |

TABLE 2-continued

| Functional Group | Monomers |
|---|---|
| | acrylate, polyethyleneglycol methacrylate, and polyethyleneglycol acrylate); allyl alcohol; α-ethylallyl alcohol; allylcarbinol; $CH_2=CH-(CH_2)_m-O-((CH_2)_nO)_zOH$, where m = 0-4, n = 1-10, z = 1-1000 (e.g., glycol based vinyl ethers, such as ethyleneglycol monovinyl ether and polyethyleneglycol monovinyl ether); $CH_2=CH-O-CO-((CH_2)_nO)_zOH$, where n = 1-10, z = 1-1000 (e.g., glycol based vinyl esters, such as ethyleneglycol monovinyl ester and polyethyleneglycol monovinyl ester); and any other unsaturated polymerizable hydroxy group-containing monomer |
| Epoxy Group | glycidyl methacrylate, glycidyl acrylate, allyl glycidyl ether, 2-vinyloxyethyl glycidyl ether, and any other unsaturated polymerizable epoxy-group containing monomer |
| Amino or N-Substituted Amino Group | acrylamide; methacrylamide; $CH_2=CR'CONHCH_2OX$, where R' = $CH_3$ or H, X = H, methoxy, ethoxy, propoxy, isopropoxy, butoxy, or isobutoxy; and vinylamine; and any other unsaturated polymerizable amino group-containing, monomer |
| Silyl Group | methacryloxypropyltrimethoxysilane, methacryloxypropyltriethoxysilane, methacryloxypropyltributoxysilane, triethoxyvinylsilane, trimethoxyvinylsilane, triacetoxyvinylsilane, triisopropoxyvinylsilane, tris(methoxyethoxy)vinylsilane, and any other unsaturated polymerizable silane |

Microcapsules can also be multi-walled or have multiple shell layers. The inner layer should provide the required strength, durability and containment while the outer layers provide compatibility or adhesive properties. The outer wall of the microcapsule can be a thermoplastic polymer which can melt or soften at desired temperatures to flow, act like a viscous liquid or fuse the microcapsules to substrates, other microcapsules or other TMM materials. The thermoplastic outer wall should have a melting or glass transition temperature (Tg) below the temperature which will damage the wall of an electrochemical cell, but above normal use temperatures. The outer wall can be made of any polymer that melts, softens or flows such as polyolefins, rubbers, polyvinyls, poly(meth)acrylates, polyurethanes, etc. or copolymers.

Microcapsules can have the same shape or different shapes, and can have the same size or different sizes. In some instances, the microcapsules can be substantially spheroidal or spherical, and can have sizes ranging from about 0.1 nm to about 1,000 microns, such as from about 0.1 nm to about 500 microns, from about 0.1 nm to about 100 microns, from about 1 to about 15 microns. For certain implementations, it can be desirable that a substantial fraction, such as at least 50 percent, or at least 80 percent of the microcapsules have sizes within a specified range, such as from about 1 to about 15 microns. It can also be desirable that the microcapsules are monodisperse with respect to either of, both, their shapes and sizes.

Figure 15A:
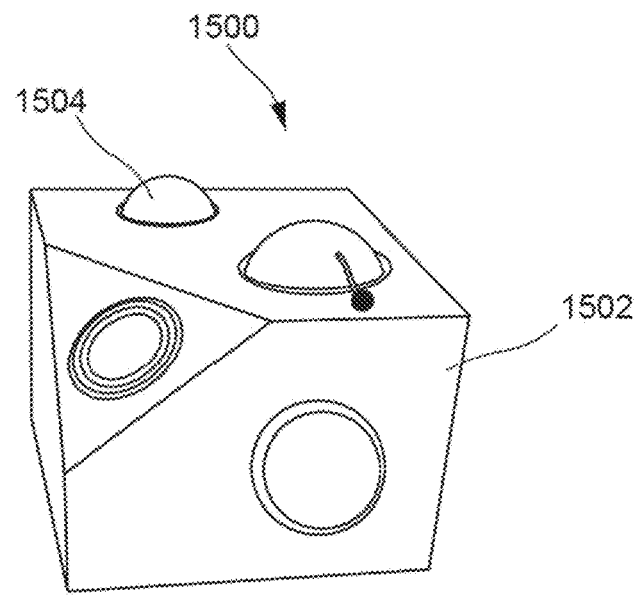
FIGS. 15A and 15B show details of a microcapsule as used in connection with various aspects of the present disclosure.
Figure 15B:
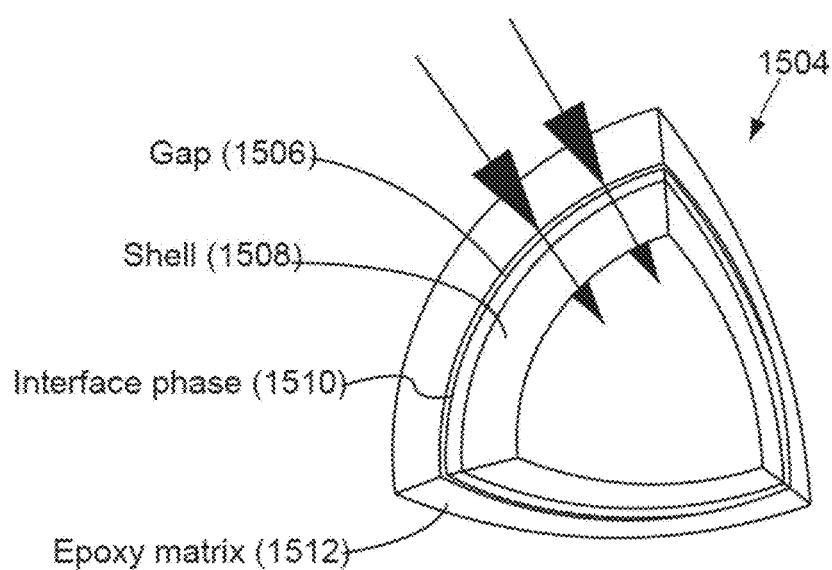

Microcapsules can be of a durable, breakable, or controlled release type. It can be advantageous to have the microcapsule core material permanently contained to prevent leakage or loss of core material during use or processing. It may also be advantageous to have the core material released thru either fast (breakable) or slow (controlled release) means. For instance, when microcapsules are added to composites, and the composites are cured at higher temperatures, small voids can be formed between the composite and microcapsule shell wall due to variables such as differential expansion between microcapsule and composite, incompatibility between microcapsule and composite or shape distortion, etc. Release of core material and allowing it to flow into and fill these voids allows for greatly improved thermal conductivity. This is shown in FIGS. 15A-15B.

Selection of a PCM Transition Temp.

The selection of a PCM is typically dependent upon the transition temperature that is desired for a particular application that is going to include the PCM. The transition temperature is the temperature or range of temperatures at which the PCM experiences a phase change from solid to liquid or liquid to solid. For example, a PCM having a transition temperature near the normal range of temperatures that batteries reach during multiple charge and discharge cycles can be desirable for battery applications to prevent overheating, thermal runaway, and fires. A phase change material according to some embodiments of the disclosure can have a transition temperature in the range of about 5° C. to about 120° C. In one embodiment, the transition temperature is about 10° C. to about 80° C. In another embodiment, the transition temperature is about 30° C. to about 70° C. In another embodiment, the PCM has a transition temperature of about 40° C. to about 60° C. In another embodiment, the PCM has a transition temperature between 25° C. and 140° C. In certain embodiments, such as embodiments where multiple layers of PCMs are used in one casing, for the dual purposes of protecting a cell from extreme cold and for absorbing excess heat during operation, one or more of the PCMs may have a transition temperature in the range of −60° C. to 60° C.

The transition temperature can be expanded or narrowed by modifying the purity of the PCM, molecular structure, blending of PCMs, blending of mPCM, blending of polymeric PCMs and any mixtures thereof.

In addition, the temperature control is dependent on the absorption and release of energy by changing phases, preferably by absorbing energy and melting or releasing/dissipating heat by solidifying or crystallization. These melting (Tm) and crystallization (Tp) temperatures for a single PCM material in embodiments of this disclosure is not widely spread ("supercooling"). This difference can be defined as the difference between peak melting temperature and peak crystallization temperature as measured by a DSC., i.e. ΔT (° C.)=Tm−Tc. In some embodiments this ΔT is <30° C., in others <15° C., in others <10° C., and in yet others <5° C.

Mixing and Layering of PCM Transition Temperatures

In some embodiments, it may be advantageous to have multiple or broad transition temperatures. If a single narrow transition temperature is used, this can cause thermal/energy buildup before the transition temperature is reached. Once the transition temperature is reached, then energy will be absorbed until the latent energy is consumed and the temperature will then continue to increase. Broad or multiple transition temperatures allow for temperature regulation and thermal absorption as soon the temperature starts to increase, thereby alleviating any thermal/energy buildup. Multiple or broad transition temperatures can also more efficiently help "bleed-off" or conduct heat away from a battery by overlapping or staggering thermal absorptions. For instance a TMM contains PCM1 which absorbs at 35-40° C. and PCM2 which absorbs at 38-45° C. PCM1 will start absorbing and controlling temperature until a majority of the latent heat is used, at which time PCM2 will start to absorb and conduct energy from PCM1 thereby rejuvenating PCM1 and allowing it to keep functioning. Alternatively, layering of multiple PCMs may be utilized to achieve both the dissipation of heat from an operating cell and protection of the cell from extremely cold ambient temperatures. The transition temperatures required for each function may differ greatly. This broadening or mixing of transition temps can be done by combining all materials or layering them as depicted in the various figures.

Selection of Latent Heat Values

The selection of the phase change material can be dependent upon a latent heat of the phase change material. A latent heat of the phase change material typically correlates with its ability to absorb and release energy/heat or modify the heat transfer properties of the article. In some instances, the phase change material can have a latent heat that is at least about 10 J/g, such as at least 20 J/g, as at least about 40 J/g, at least about 50 J/g, at least about 70 J/g, at least about 80 J/g, at least about 90 J/g, or at least about 100 J/g. Thus, for example, the phase change material can have a latent heat ranging from about 10 J/g to about 60 J/g, from about 20 J/g to about 400 J/g, such as from about 60 J/g to about 400 J/g, from about 80 J/g to about 400 J/g, or from about 100 J/g to about 400 J/g.

TMM Rheology, Viscosity, Elasticity, Crosslinking and Physical Properties of the PCM The rheology (i.e. viscosity or flow properties) of the TMM is important for many different processes of the application to electrochemical cells and packs Variables such as general application of the TMM to the cells or packs either by inserting the cell into a sleeve or casing, wrapping a cell with tape or film, or otherwise applying with spray, flow, coating, pressure adhesive or extrusion is controlled by the rheology. The application must balance rheology to achieve sufficient gap fill and reduction of air spaces for good thermal conductivity versus maintaining the structure and stability of the TMM on a cell or pack. That is, the material should not allow a tube, sleeve, casing, film, tape, or other surrounding material to slide off the cell.

TMM with phase change and/or polymeric properties are advantageous in solving the above problems since they can be formulated to be solid at low temperatures and deformable or flowable at phase change or higher temperatures. The phase change temperature can be lower, equal to or higher than the normal operating temperature of the battery cell or battery pack. These TMM embodiments of tubes, sleeves, and wrapped film and tape are also advantageous over greases or waxes alone in that improved physical properties such as tensile strength, elongation, flexibility, toughness can be improved.

Rheology, viscosity, elasticity, and flow of the TMM can be controlled by many different variables. These can include the characteristics of the pPCM/fpPCM such as type of polymer, the polymer structure, the polymer mol. wt., polymer branching (i.e. number of branches, length of branches, types of branches, etc.), polymer functionality (i.e. type and amount), copolymers, compatibility with other polymers, crosslinking of the polymer, type of crosslinking, entanglement of the polymer, compatibility with additives, etc.

One way in which the elasticity of the TMM can be controlled is through the section of polymer materials with elastomeric properties. Such elastomeric materials include polyolefin copolymers such as copolymers of polyethylene with any $C_3$-$C_{30}$ α-olefin, or vinyl acetate, other vinyl monomers such as styrene or its analogues, acrylate or methacrylate monomers, vinyl ether monomers, vinyl ester monomers, acrylonitriles, rubbers and copolymers made from isoprene, butyl, etc., or combinations, blends, mixtures thereof. Additionally, the TMM may be made of polymer elastomers such as polyesters, silicon rubbers or polyurethanes. Non-inclusive examples of these are Hytrel® polyesters from DuPont®, Spandex®-type polyurethanes and RTV or LTV type silicon rubbers.

An additional way that the elastomeric properties may be influenced is by crosslinking. In certain embodiments, the TMM and the PCM may be crosslinked with an average of 0.05-1 crosslinks per polymeric chain.

The polymer glass transition temperature (Tg, temperature at which a polymer changes from a glassy state to a rubbery state) can be controlled to allow for flow at or below operating temperatures. The Tg can be between −20° C. and 150° C., preferably between 15° C. and 90° C.

The polymer mol. wt. can be controlled to provide low or high viscosity with higher mol. wt. polymers providing low viscosity or no flow. The molecular weight of pPCM/fpPCM in some embodiments can be at least 500 Daltons, and in other embodiments can be at least 2000 Daltons. It is possible that in some embodiments, Mol. wts. can range from 500 Daltons to millions of Daltons, as exemplified by the use of ultrahigh mol. wt. polyethylene (UHMWPE)

The polymer branching can be controlled to provide for chain entanglement and rheology control. The polymer chain can have any number and length of chains. The polymer may have 0-1000 branches. The branches are at least 50 Daltons. The branches can be in any configuration such as random, comb, etc. The branches can be in a stereospecific configuration.

The polymer can be a copolymer or block copolymer in which there are "hard" segments and "soft" segments. The hard segments can be due to high Tg moieties or crystallizable moieties, whereas the soft segments can be due to low Tg moieties or amorphous segments. The hard segments can interact and create a crosslink, entanglement or interaction that creates a degree of fixation or high viscosity. The soft segment can be free to flow or rearrange due to heat or pressure.

In one embodiment, the weight of the crystallizable section forms at least 20%, in other embodiments at least 50%, and in yet other embodiments at least 70% of the total weight of the pPCM/fpPCM.

They type and amount of functionality can also effect the rheology, flow properties and setting of the TMM. For instance, the TMM can be applied to the electrochemical cell or pack, then fully cured and crosslinked through any of the previously described functionality, reactions or crosslinking mechanisms.

The functionality can be also be mixed to give different crosslinking reactions and different kinetics of the crosslinking reactions. As example, epoxy and amines can quickly cure at room temperature to provide for a fast set, tack free time, and use. This partial cure allows for slight flow or gap fill either over time or as the TMM warms up from battery cell charge and discharge cycles—at this time, a second set of crosslinking reactions can occur to fully crosslink and fully set the TMM. These second set of crosslinking reactions can be triggered either by oxidation, heat, UV etc. such as oxygen radical crosslinking of unsaturated groups, N-methylol ether crosslinking with hydroxyl or carboxyl, or UV initiated free radical reaction with unsaturated moieties.

The different crosslinking reactions and kinetics can be controlled by the use of different catalysts or initiators that react at different temperatures. For instance, two different free radical (FR) initiators (peroxide, azo, etc.) with different decomposition temperatures can be combined with a polymer containing various unsaturated groups. The first FR initiator can decompose at application temperatures creating a partial cure, crosslinking or set while allowing for some flow and gap fill. The second FR initiator can then decompose and react to further react at higher temperatures.

These various temperatures of reaction, application or use can also be controlled by external environments. For instance, room temperature crosslinking reactions can be controlled by preparing, shipping/storing and applying the TMM at lower than room temperature or at freezing temperatures, then allowing the reaction to proceed as batteries are installed in their devices or as battery packs are assembled. Likewise, crosslinking reactions can be controlled by the addition of heat, light or other forms of energy.

Rheology, viscosity, flow and gap fill can also be controlled by the use of reversible reactions or crosslinks. These are sometimes referred to as "self-healing" systems. For instance, the TMM can contain ionic crosslinks based $Zn^{+2}$ carboxyl salts or S—S disulfide bonds that can easily break, allow flow and recombine.

Examples of reversible reactions are hydrolysis of ester bonds, breaking and recombination of the urethane bond into hydroxyl and isocyanate, breaking and recombination of the urea bond into amine and isocyanate, Diels-Alder reaction based crosslinks, ionic bonds based on metals, metal coordination or organic salts, hydrogen bonding, metal coordination, hydrophobic forces, van der Waals forces, pi-pi interactions and electrostatic effects.

The above described phase changes or chemical associations can also be used as reversible crosslinks, i.e. the melting and recrystallization of polymer crystalline segments. Associations of hydrophobic/hydrophilic sections of copolymers or block copolymers. Copolymers or block copolymers with different Tg segments, hard/soft segments, etc.

Rheology, viscosity, flow and gap fill can also be controlled by the use or addition of rheology control agents, thickeners, etc. These materials are such things as silica, carbon particles, talc, ZnO, Calcium carbonate, partially crosslinked or gelled polymers, etc. The following described particles and fillers can also be used a rheology control or viscosity agents.

Fillers and Additives—Thermal Conductive Fillers

Aspects of the present disclosure pertain to using a thermal conductive filler in combination with the various phase change materials described herein. As described above, Thermal Conductivity, k (also denoted as λ or κ), is the property of a material's ability to conduct heat is measured in W/m·K.

Thermal conductivity is defined as the quantity of heat (Q) transmitted through a unit thickness (L) in a direction normal to a surface of unit area (A) due to a unit temperature gradient (ΔT) under steady state conditions and when the heat transfer is dependent only on the temperature gradient.

The TMM described herein can also have various conductive additives and fillers to improve the various properties. Materials to enhance the thermal conductivity can be added such as forms of carbon (graphene, graphite (synthetic or natural, expanded or exfoliated, etc.), graphite oxide, diamond (synthetic or natural), diamond aerogel, carbon fibers, carbon nanotubes (CNT or single walled (SWCNT)), multiwalled (MWCNT)), fullerenes (buckyballs), loonsdaleite, carbine, glassy carbon, amorphous carbon and their various forms of oxides or other functionalized forms. Other thermal conductive particles can include highly crystalline or highly oriented organic materials and polymers such as high density polyethylene (low mol. wt. or UHMWPE, such as Dyneema® fibers or Spectra® fibers), polybenzobisoxazole (PBO or Zylon®), poly(p-phenylene benzobisthiazole) (PBT), and any other liquid crystalline polymer (LCPs), metals, metal salts, metal carbides, metal oxides, metal nitrides, metal sulfate derivatives, metal phosphate derivatives, boron nitride (cubic and hexagonal), boron carbide, boron oxide, alumina, Al, Al oxide, $Al_2O_3$, Al nitride, Ag, Au, metallized glass, Sn, Zn, ZnO, Cu, Mg, MgO, wollastonite, silica (fused, fumed, precipitated, coated, colloidal, agglomerated), silicon carbide (SiC), silicone, silica coated particles and alloys (silica coated Al nitride), sapphire, quartz, polyhedral oligomeric silsesquioxane (POSS), Fe, Fe oxides, Pt, Pb, Ni, Ti, Ti oxides, Cr, Bi, In, Ga, Ge, Ce, La, W, WC, Li, Be, Be oxides, Ca, Rb, Sr, Cs, Ba, Fr, Ra, Sc, V, Mn, Co, As, Se, Y, Zr, Zr oxides Nb, Mo, Tc, Ru, Rh, Cd, In, Sb, Te, Hf, Ta, Re, Os, Ir, Hg, Tl, Po, Rf, Db, Sg, Bh, Hs, Mt, Ds, Rg, Pr, Nd, Pm, Sm, Eu, Gd, Tb, Dy, Ho, Er, Tm, Yb, Lu, Ac, Th, Pa, U, Np, Pu, Am, Cm, Bk, Cf, Es, Fm, Md, No, Lr, etc. and their blends, solders, eutectics and alloys.

Low melting or fusible materials and fillers can also be included for enhancement of rheology, gap fill, and conductivity (electrical and thermal). These may comprise Ga, In, Sn, or any alloy and oxide thereof. The low melting metal may optionally further comprise Ag, Bi, Cd, Cu, Pb, Zn, or a combination thereof. Examples of suitable low melting metals, alloys and their oxides include Ga, In—Ga alloys, In—Ag alloys, In—Bi alloys, In—Sn alloys, Bi—Sn alloys, Pb—Sn alloys, In—Pb alloys, In—Pb—Ag alloys, In—Bi—Sn alloys, Sn—In—Zn alloys, Sn—Bi—Zn alloys, Sn—In—Ag alloys, Sn—Ag—Bi alloys, Sn—Bi—Cu—Ag alloys, Sn—Ag—Cu—Sb alloys, Sn—Ag—Cu alloys, Sn—Ag alloys, Sn—Ag—Cu—Zn alloys, and combinations thereof. The low melting metal can have a melting point of up to 250° C., alternatively up to 225° C. The low melting metal can have a melting point of at least 50° C., alternatively at least 150° C. The low melting metal can be a eutectic alloy, a non-eutectic alloy, an oxide, or a pure metal. Low melting metals are commercially available. The low melting metal may comprise at least about 0.1 up to about 20% of the weight of the TMM. These alloys, oxides or metals can also be separate layers or segregated portions of the TMM.

The thermal conductive fillers work most efficiently if they are in close contact or touching other thermally conductive or crystalline materials in order to facilitate a direct conductive pathway. Therefore the concentration, impurities, crystallinity, shape, size, compatibility and distribution of the fillers and other thermal materials is important.

The fillers can be 2-95% of the TMM. The amount of filler will depend on many factors such as compatibility, effect on rheology, etc. The particle can be any shape such as round, spherical, cylindrical, fiber, sheet, flake, powder, whiskers, tubular, platelets, foams, meshes, agglomerates of these shapes or any other irregular shape. Depending on the application, a single shape or mixture of shapes may be advantageous to provide the optimum packing and arrangement for particle contact.

The particle can have any aspect ratio, from 1 for perfectly spherical particles to an infinite aspect ratio for nanomaterials. The particle size can be from 0.1 nanometer to 1 mm. The size and distribution of the particle will depend on the application such as nanometer sized particles allow for good dispersion, compatibility with good gap fill whereas large particles allow for lower concentration but provide for higher occurrence of contact between the particles for good thermal conductivity. Depending on the application, a single particle size or narrow particle size distribution may be advantageous for rheology optimization, whereas a mixture of particle sizes allows for most efficient packing distribution curve. For instance smaller average particles can fill the interstitial spaces between larger average particles to produce the optimum packing theory distribution curve which provides for efficient thermal transfer.

The particles can be of a monomolecular thickness, layer or size, such as the individual platelets or layers which make up bigger particles. As an example, graphene is one-atom-thick planar sheets of $sp^2$-bonded carbon atoms that are densely packed in a honeycomb crystal lattice. Graphene sheets stack to form graphite.

Thermal conductivity can be improved by using materials that will align or orient themselves to connect and provide a pathway from the electrochemical cell or pack to a cooler surface. For instance the use of fibers, whiskers, flakes, foams, or sheets can be used such that the materials when applied will align radially with respect to each cylindrical cell. Further examples are using fibers, flakes, foams, or sheets that have a length equal or greater than the TMM thickness so that the one end of the fiber, flake, foam, or sheet is touching the cell and the other end reaches to the surface or contacts the cooler surface, heat sink or heat spreader providing a constant unbroken single particle pathway. Alternatively, fibers, flakes, foams, or sheets could align longitudinally with multiple cells within a pack to move heat away from areas in between multiple cells. These types of fillers can also provide strength and reinforcement to the TMM to improve the tensile, adhesive or cohesive properties.

In order to provide optimum thermal conductivity, the fillers should have maximum purity with reduced included elemental materials. Purities greater than 95%, preferably >99% and most preferably >99.99999%. Higher purities also lead to higher material crystallinity with >50% crystallinity, preferably >90% and most preferably >99% crystalline. Reduced elemental impurities also means lower radioactive emissions with radioactive particle emissions lower than 0.001 counts/cm²·hr, (i.e. positively charged alpha particle ($\alpha$), a positively or negatively charged beta particle ($\beta$), a photon or gamma particle, ($\gamma$), or a neutron and neutrinos).

In order to improve filler or particle compatibility with the TMM, electrochemical cells, or matrix material, it can be advantageous to surface treat the particle. This can also improve the rheology, viscosity and flow characteristics of the TMM. Surface treated particles can have improved compatibility with the binder, polymers or matrix material of the TMM which allows for complete coverage or surface wetting of the particle and therefore less air space or voids around the particle providing for improved thermal conductivity. Particle surface treatments can be by reaction with coupling agents, oxidation, acid, base, flame, functionalizing, etc. plasma oxidation, plasma sulfonation, ozone treatments in the presence or absence of ultraviolet light, alkaline surface hydrolysis, silanation, silanization and plasma ammonia treatment.

Coupling or surface treating agents can be any functional material such as fpPCMs, fpPCM with salt functionality, nonionic molecules with hydrophilic or hydrophobic moieties (i.e. aliphatic ethoxylates, alkyl ethoxylates, alkylphenoxy ethoxylates and their branched analogues), anionic or cationic molecules or polymers such as those containing carboxyl groups, containing amine neutralized carboxy groups, containing amine groups, acid neutralized amine groups etc. anhydrides and unsaturated polymeric acids or their salts and analogues (i.e. maleinized polybutadiene, maleinized or acid functional polyolefins, maleinized or acid functional poly (meth)acrylates, maleinized or acid functional polyesters, including metal or amine salts), alkoxysilanes, alkoxy-functional oligosiloxanes, alkylthiols, fatty acids, fatty acid metal salts, fatty acid amine salts, fatty amines, fatty amine salts, titanates, titanate coupling agents, zirconates, zirconate coupling agents, aluminates, aluminate coupling agents or mixtures thereof. Coupling agents such as those supplied by Kenrich Petrochemicals, Inc., Capaute Chemical, or Tyzor™ products from Dupont Inc., Dynasylan® silanes and organofunctional silanes from Evonik Degussa GmbH Germany, Dow Corning® "Z" silanes or Xiameter® "OFS" silanes from Dow Corning Corp.

Treating agents and treating methods are known in the art, see for example, U.S. Pat. No. 6,169,142 (col. 4, line 42 to col. 5, line 2). The TMM may comprise at least about 0.05% of a treating agent. The TMM may comprise up to about 10%, alternatively up to about 5%, alternatively up to about 0.5%, of a treating agent. The treating agent can be an alkoxysilane having the formula: $R^5_x Si(OR^6)_{(4-x)}$, where x is 1, 2, or 3; alternatively x is 3. $R^5$ is a substituted or unsubstituted monovalent hydrocarbon group of at least about 1 carbon atom, alternatively at least about 8 carbon atoms. $R^5$ has up to about 50 carbon atoms, alternatively up to about 30 carbon atoms, alternatively up to about 18 carbon atoms. $R^5$ is exemplified by alkyl groups such as hexyl, octyl, dodecyl, tetradecyl, hexadecyl, and octadecyl; and aromatic groups such as benzyl and phenylethyl. $R^5$ can be saturated or unsaturated, branched or unbranched, and unsubstituted. $R^5$ can be saturated, unbranched, and unsubstituted.

$R^6$ is an unsubstituted, saturated hydrocarbon group of at least about 1 carbon atom. $R^6$ may have up to about 4 carbon atoms, alternatively up to about 2 carbon atoms. The treating agent is exemplified by hexyltrimethoxysilane, octyltriethoxysilane, decyltrimethoxysilane, dodecyltrimethyoxysilane, tetradecyltrimethoxysilane, phenylethyltrimethoxysilane, octadecyltrimethoxysilane, octadecyltriethoxysilane, a combination thereof, and others.

Alkoxy-functional oligosiloxanes can also be used as treatment agents. Alkoxy-functional oligosiloxanes and methods for their preparation are known in the art, see for example, EP 1,101,167 A2. For example, suitable alkoxy-functional oligosiloxanes include those of the formula $(R^6O)_a Si(OSi R^7_2 R^8)_{4-a}$. In this formula, a is 1, 2 or 3, alternatively a is 3. Each $R^6$ can be an alkyl group. Each $R^7$ is can be independently selected from unsaturated monovalent hydrocarbon groups of about 1 to about 10 carbon atoms. Each $R^8$ can be an unsaturated monovalent hydrocarbon group having at least about 11 carbon atoms.

Treatment agents for alumina or passivated aluminum nitride could include alkoxysilyl functional alkylmethyl polysiloxanes (e.g., partial hydrolysis condensate of $R^9{}_bR^{10}{}_cSi(O^{11})_{(4-b-c)}$ or cohydrolysis condensates or mixtures), similar materials where the hydrolyzable group would be silazane, acyloxy or oximo. In all of these, a group tethered to Si, such as $R^9$ in the formula above, is a long chain unsaturated monovalent hydrocarbon or monovalent aromatic-functional hydrocarbon. $R^{10}$ is a monovalent hydrocarbon group, and $R^{11}$ is a monovalent hydrocarbon group of about 1 to about 4 carbon atoms. In the formula above, b is 1, 2, or 3 and c is 0, 1, or 2, with the proviso that b+c is 1, 2, or 3. One skilled in the art could optimize a specific treatment to aid dispersion of the filler without undue experimentation.

Other specific examples of treating agents such as organo-functional silanes have the following typical molecular structure: $X-CH_2CH_2CH_2Si(OR)_{3-n}R'_n$ where n=0, 1, 2. Many combinations are possible, but these are characterized by the fact that they contain two different types of reactive groups. The OR groups are hydrolyzable groups such as methoxy, ethoxy or acetoxy groups. The group X is an organo-functional group, such as epoxy, amino, methacryloxy (shown below), or sulfido. The presence of some Si-alkyl groups ensures low surface tension and good wetting properties. A typical example for sulfido-silanes: $(OR)_3Si-(CH_2)_3-S_x-(CH_2)_3Si(OR)_3$ where x=2 to 8

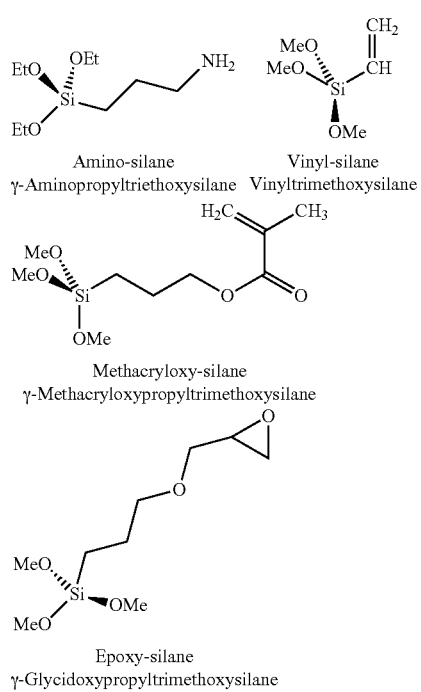

Use of Fire Retardant or Fire Resistant Additives

In order to reduce the likelihood of fire spreading from an electrochemical cell to the components of a device it is powering, or to prevent fire spreading within an electrochemical pack, or to prevent an external fire from igniting an electrochemical pack, a fire retardant or fire resistant additive can be added to prevent combustion. Materials such as Magnesium hydroxide, Al hydroxide, expanded graphite, ammonium polyphosphate, phosphate salts, polyphosphate salts, wherein the polyphosphate can be any mol. wt. or degree of polymerization, pentaerythritol, treated montmorillonite, halogenated compounds, ammonium bromide, chlorinated or brominated molecules, alkanes and polymers, antimony oxide, antimony trioxide, red phosphorous, magnesia cements, magnesium oxysulphate, magnesium phosphate, magnesium sulphate, boron compounds, borates, boric acid, silicon and silica compounds, melamine and melamine compounds, sol-gels, sodium carbonate, sodium silicate, tetrakis(hydroxymethyl)phosphonium salts, halocarbons, including chlorendic acid derivates, halogenated phosphorus compounds including tri-o-cresyl phosphate, tris(2,3-dibromopropyl)phosphate (TRIS), bis(2,3-dibromopropyl)phosphate, tris(1-aziridinyl)-phosphine oxide (TEPA), phosphoramides, triphenyl phosphate (TPP), resorcinol diphosphate (RDP), bisphenol-a-disphosphate (BPA-DP), organic phosphine oxides, halogenated epoxy resin (tetrabromobisphenol A), etc. including their blends or mixtures.

Additionally, fire retardant additives can include ceramic type treatments and coatings based on silica, quartz, or other ceramics, as disclosed in U.S. Pat. No. 6,921,431 to Evans, "Thermal Protective Coating for Ceramic Surfaces," U.S. Pat. No. 7,105,047, to Simmons, "Thermal Protective Coating," and non-patent publications by Rakotomalala et. al., entitled "Recent Developments in Halogen Free Flame Retardants for Epoxy Resins for Electrical and Electronic Applications," Materials 2010, 3, 4300-4327, the non-patent publication by the Phosphorous, Inorganic and Nitrogen Flame Retardants Association entitled "Innovative Flame Retardants in E&E Applications," June 2009, and the non-patent publication by Feldman, entitled "Polymer Nanocomposites: Flammability," Journal of Macromolecular Science, Part A: Pure and Applied Chemistry, 2013, which are incorporated herein by reference. They can also include ionic materials as disclosed in U.S. patent application Ser. Nos. 12/947,377 and 12/806,267 to Xu, both "Ionic Liquid Flame Retardants," and which are incorporated herein by reference.

Another example is to have the fire retardant material as part of the microcapsule shell. For instance, melamine or melamine compounds provide excellent microcapsule shells and also provide good fire retardant properties. Sol-gels can also be used as mPCM shells or secondary shells to give additional fire retardant protection. Any shell material, shell polymer or secondary shell layer can also incorporate any of the above fire retardant additives to infer improved fire retardant properties to the TMM.

Use of Electrically Conducting and Static Charging/Discharging Materials and Polymers.

In certain embodiments of the disclosure, it may also be advantageous to include materials designed to control electrical energy or static energy. This electrical energy can either be conducted, discharged, dissipated, stored or other means of moving this energy. As discussed earlier in this disclosure, electrical shorts can damage various components of a battery cell, and in some circumstances it may be desirable to keep electrical energy away from the walls of the cell. Metallic materials, such as previously described above, can include any metal, alloy, oxide, etc. These can also be in any shape or size as previously outlined. Many of the previously described thermal conductors can also be used as electrical conductors. Organic or organic doped materials can also be included in the TMM package. These materials can include the general polymer structures shown below:

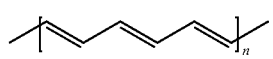

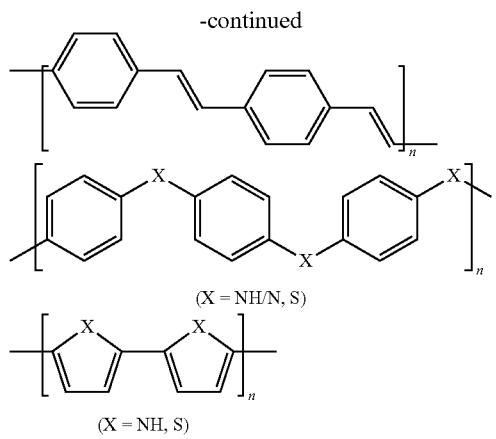

Chemical structures of some conductive polymers.
From top left clockwise: polyacetylene; polyphenylene vinylene;
polypyrrole (X = NH) and polythiophene (X = S); and
polyaniline (X = NH/N) and polyphenylene sulfide (X = S)

These and other general classes of conducting polymers can be broken down as in the below table:

|  | No heteroatom | Nitrogen-containing | Sulfur-containing |
| --- | --- | --- | --- |
| Aromatic main chain | Poly(fluorene)s Polyphenylenes Polypyrenes Polyazulenes polynaphthalenes | Poly(pyrroles)s (PPY) Poly(o-aminophenols) (POAP) Polycarbazoles Polyindoles Polyazepines Polypyridines Polyanilines (PANI) | Poly(thiophene)s (PT) Poly(3,4-ethylene-dioxythiophene) (PEDOT) Poly(p-phenylene sulfide) (PPS) |
| Double bonds in main chain | Poly(acetylene)s (PAC) |  |  |
| Aromatic and Double Bonds | Poly(p-phenylene vinylene) (PPV) |  |  |

More specifically, various materials, polymers and monomers can be further broken down into more specific charge or radiation conducting materials. The various combinations and mixtures of materials using below example materials is infinite and the below examples are not complete or inclusive. Infinite combinations can produce various polymers, copolymers, mixtures, etc. that can have electrically conducting and static dissipating properties. These polymers can be doped with any combination of the infinite number of salts or metallic salts to enhance the conductivity:

Photosensitizing and charge transport compounds such as 1,1,4,4-Tetraphenyl-1,3 butadiene, 4-[2-[5-[4-(Diethylamino)phenyl]-4,5-dihydro-1-phenyl-1H-pyrazol-3-yl]ethenyl]-N,N-diethylaniline, 5,12-Bis(phenylethynyl)naphthacene, 9,10-Bis(phenylethynyl)anthracene, 9,10-Di-p-tolylanthracene, 9,10-Phenanthrenequinone, Benzo[ghi]perylene, Coronene, Julolidine, Pentaphene-78, Perylene-66, Phenanthrene, Phenanthridine, Phenazine, Phenothiazine, Pyrazole-72, Quinacridonequinone, Quinolin-65, Thioxanthone-64, Triphenylene, Violanthrone-79, [4-[Bis(2-hydroxyethyl)amino]phenyl]-1,1,2-ethylenetricarbonitrile Light Emitters, Dopants, electron & hole transporting materials such as: 5,12-Dihydro-5,12-dimethylquino[2,3-b]acridine-7,14-dione, 8-Hydroxyquinoline zinc, Anthracene, Benz[b]anthracene, Coumarin 6, Dichlorotris(1,10-phenanthroline)ruthenium(II) hydrate, Lithium tetra(2-methyl-8-hydroxyquinolinato)boron, Perylene, Platinum octaethylporphyrin, Rubrene, Tris(2,2'-bipyridyl)dichlororuthenium (II) hexahydrate, Tris(2,2'-bipyridyl-d8)ruthenium(II) hexafluorophosphate, Tris(benzoylacetonato) mono (phenanthroline)europium(III), Tris(dibenzoylmethane) mono(1,10-phenanthroline)europium(111), Tris(dibenzoylmethane) mono(5-amino-1,10-phenanthroline)europium (111), Tris-(8-hydroxyquinoline)aluminum, Tris[1-phenylisoquinoline-C2,N]iridium(III), Tris[2-(4,6-difluorophenyl)pyridinato-C2,N]iridium(III), Tris[2-(benzo[b]thiophen-2-yl)pyridinato-C3,N]iridium(III), Tris[2-phenylpyridinato-C2,N]iridium(III), Metal and salt dopants.

Light Emitting Polymers such as: Cyano-Polyphenylene vinylene (CN-PPV) Polymers including: Poly(2,5-di(hexyloxy)cyanoterephthalylidene), Poly(2,5-di(octyloxy)cyanoterephthalylidene), Poly(2,5-di(3,7-dimethyloctyloxy)cyanoterephthalylidene), Poly(5-(2-ethylhexyloxy)-2-methoxy-cyanoterephthalylidene), Poly(5-(3,7-dimethyloctyloxy)-2-methoxy-cyanoterephthalylidene).

Nitrogen-Containing Polymers including: Poly(2,5 pyridine) and Poly(3,5 pyridine).

Poly(fluorenylene ethynylene) (PFE) Polymers including: Poly(9,9-dioctylfluorenyl-2,7-yleneethynylene), Poly[9,9-di (3',7'-dimethyloctyl)fluoren-2,7-yleneethynylene], Poly[9,9-di(2'-ethylhexyl)fluoren-2,7-yleneethynylene], Poly[9,9-di-dodecylfluroenyl-2,7-yleneethylnylene].

Poly(phenylene ethynylene) (PPE) Polymers including: Poly(2,5-di(3',7'-dimethyloctyl)phenylene-1,4-ethynylene), Poly(2,5-dicyclohexylphenylene-1,4-ethynylene), Poly(2,5-di(2'-ethylhexyl)-1,4-ethynylene), Poly(2,5-didodecylphenylene-1,4-ethynylene), and Poly(2,5-dioctylphenylene-1,4-ethynylene).

Polyfluorene (PFO) Polymers and Co-Polymers including: Poly(9,9-di-n-dodecylfluorenyl-2,7-diyl), Poly(9,9-di-n-hexylfluorenyl-2,7-diyl), Poly(9,9-di-n-octylfluorenyl-2,7-diyl), Poly(9,9-n-dihexyl-2,7-fluorene-alt-9-phenyl-3,6-carbazole), Poly[(9,9-di-n-octylfluorenyl-2,7-diyl)-alt-(benzo[2,1,3]thiadiazol-4,8-diyl)], Poly[(9,9-dihexylfluoren-2,7-diyl)-alt-(2,5-dimethyl-1,4-phenylene)], Poly[(9,9-dihexylfluoren-2,7-diyl)-co-(9-ethylcarbazol-2,7-diyl)], Poly[(9,9-dihexylfluoren-2,7-diyl)-co-(anthracen-9,10-diyl)], Poly[(9,9-dioctylfluorenyl-2,7-diyl)-co-bithiophene], Poly[9,9-bis-(2-ethylhexyl)-9H-fluorene-2,7-diyl].

Polyfluorene-Vinylene (PFV) Co-Polymers including: Poly((9,9-dihexyl-9H-fluorene-2,7-vinylene)-co-(1-methoxy-4-(2-ethylhexyloxy)-2,5-phenylenevinylene)), Poly(9,9-di-(2-ethylhexyl)-9H-fluorene-2,7-vinylene), Poly (9,9-di-n-hexylfluorenyl-2,7-vinylene), Poly[(9,9-di-(2-ethylhexyl)-9H-fluorene-2,7-vinylene)-co-(1-methoxy-4-(2-ethylhexyloxy)-2,5-phenylenevinylene)], and Poly[9-(2-ethylhexyl)-3,6-carbazolevinylene-alt-2,6-naphthalenevinylene].

Polyphenylene Vinylene (PPV) Polymers and Co-Polymers including: Poly(1-methoxy-4-(3-propyloxy-heptaisobutyl-PSS)-2,5-phenylenevinylene)-co-(1-methoxy-4-(2-ethylhexyloxy)-2,5-phenylenevinylene) (60:40), Poly(l-methoxy-4-(O-disperse Red 1))-2,5-phenylenevinylene, Poly(2,5-bis(1,4,7,10-tetraoxaundecyl)-1,4-phenylenevinylene), Poly(2,5-dihexyloxy-1,4-phenylenevinylene), Poly (2,5-dioctyl-1,4-phenylenevinylene), Poly(2,6-naphthalenevinylene), Poly(p-xylene tetrahydrothiophenium chloride), Poly[(m-phenylenevinylene)-alt-(2,5-dibutoxy-p-phenylenevinylene)], Poly[(m-phenylenevinylene)-alt-(2,5-dihexyloxy-p-phenylenevinylene)], Poly[(m-phenylenevinylene)-alt-(2-methoxy-5-(2-ethylhexyloxy)-p-phenylenevinylene)], Poly[(m-phenylenevinylene)-alt-(2- methoxy-5-octyloxy-p-phenylenevinylene)], Poly[(m-phenylenevinylene)-co-(2,5-dioctoxy-p-phenylenevinylene)], Poly[(o-phenylenevinylene)-alt-(2-methoxy-5-(2-ethylhexyloxy)-p-phenylenevinylene)], Poly [(p-phenylenevinylene)-alt-(2-methoxy-5-(2-ethylhexyloxy)-p-phenylenevinylene)], Poly[1-methoxy-4-(3-propyloxy-heptaisobutyl-PSS)-2,5-phenylenevinylene], Poly[1-methoxy-4-(3-propyloxy-heptaisobutyl-PSS)-2,5-phenylenevinylene]-co-[1-methoxy-4-(2-ethylhexyloxy)-2,5-phenylenevinylene] (30:70), Poly[2,5-bis(3',7'-dimethyloctyloxy)-1,4-phenylenevinylene], Poly[2,5-bisoctyloxy)-1,4-phenylenevinylene], Poly[2-(2',5'-bis(2"-ethylhexyloxy)phenyl)-1,4-phenylenevinylene], Poly[2-methoxy-5-(2-ethylhexyloxy)-1,4-phenylenevinylene], Poly[2-methoxy-5-(3',7'-dimethyloctyloxy)-1,4-phenylenevinylene], Poly[5-methoxy-2-(3-sulfopropoxy)-1,4-phenylenevinylene] potassium salt, Poly[tris(2,5-bis(hexyloxy)-1,4-phenylenevinylene)-alt-(1,3-phenylenevinylene)], and Poly{[2-[2',5'-bis(2"-ethylhexyloxy)phenyl]-1,4-phenylenevinylene]-co-[2-methoxy-5-(2'-ethylhexyloxy)-1,4-phenylenevinylene]}.

Polythiophene Polymers and Co-Polymers (regioregular or regiorandom stearic configurations) including: Poly(3-(2-methoxyethoxy)ethoxymethylthiophene-2,5-diyl), Poly(3,4-ethylenedioxythiophene), Poly(3-butylthiophene-2,5-diyl), Poly(3-cyclohexyl-4-methylthiophene-2,5-diyl), Poly(3-cyclohexylthiophene-2,5-diyl), Poly(3-decyloxythiophene-2,5-diyl), Poly(3-decylthiophene-2,5-diyl), Poly(3-dodecylthiophene-2,5-diyl), Poly(3-hexylthiophene-2,5-diyl), Poly(3-octylthiophene-2,5-diyl), Poly(3-octylthiophene-2,5-diyl-co-3-decyloxythiophene-2,5-diyl), Poly(thiophene-2,5-diyl), bromine terminated, Poly[(2,5-didecyloxy-1,4-phenylene)-alt-(2,5-thienylene)].

Water-Soluble light emitting polymers including: Poly(2,5-bis(3-sulfonatopropoxy)-1,4-phenylene, disodium salt-alt-1,4-phenylene), Poly[(2,5-bis(2-(N,N-diethylammonium bromide)ethoxy)-1,4-phenylene)-alt-1,4-phenylene], Poly [5-methoxy-2-(3-sulfopropoxy)-1,4-phenylenevinylene] potassium salt, Poly{[2,5-bis(2-(N,N-diethylamino)ethoxy)-1,4-phenylene]-alt-1,4-phenylene}

Polymer Hole Transport and Host Materials including Polyvinyl polymers such as: Poly(-vinylnaphthalene), Poly (2-vinylcarbazole), Poly(2-vinylnaphthalene), Poly(9-vinylcarbazole), and Poly(N-ethyl-2-vinylcarbazole).

Conducting polymers, copolymers and monomers including Polyacetylenes such as Poly[1,2-bis(ethylthio)acetylene], Poly(phenylene sulfides), Polyanilines, copolymers and Polyaniline Dopants including Camphor-10-sulfonic acid (β), Dinonylnaphthalenesulfonic acid, Dodecylbenzenesulfonic acid, Polyaniline (emeraldine base, emeraldine salt, leucoemeraldine base, nigraniline, or pernigraniline), o-ethoxyaniline, ortho & meta mono- and di-substituted anilines, ortho or meta-aminoacetophenone, and m-toluidine.

Polypyrroles and Pyrrole Monomers including: 1H-Pyrrole-1-propanoic acid, 3,4-Ethylenedioxypyrrole-2,5-dicarboxylic acid, 3,4-Ethylenedioxypyrrole, 3,4-Propylenedioxypyrrole, 4-(3-Pyrrolyl)butyric acid, Diethyl 1-benzyl-3,4-ethylenedioxypyrrole-2,5-dicarboxylate, and Polypyrrole (conductive, doped or undoped).

Polythiophenes and Thiophene Monomers including: 3,4-Ethylenedioxythiophene, Poly(3,4-ethylenedioxythiophene), bis-poly(ethyleneglycol), lauryl terminated, Poly(3,4-ethylenedioxythiophene), tetramethacrylate end-capped, Poly(3,4-ethylenedioxythiophene)-block-poly(ethylene glycol), Poly(3,4-ethylenedioxythiophene)-poly(styrenesulfonate), Poly(3,4-ethylenedioxythiophene), Poly(thiophene-3-[2-(2-methoxyethoxy)ethoxy]-2,5-diyl).

Sulfonated versions of Polyfluorenes, Poly(o-aminophenols) (POAP), Polytetrathiafulvalenes, Polynapthhthalenes, Poly (para-phenylene vinylene)s, natural or Biological Melanin pigment polymers.

Organic Photovoltaic materials including: Conducting Materials such as 5,5''''-Dihexyl-2,2':5',2'':5'',2''':5''',2'''':5'''',2'''''-sexithiophene, Copper(II) 1,2,3,4,8,9,10,11,15,16,17,18,22,23,24,25-hexadecafluoro-29H,31H-phthalocyanine, Copper(II) phthalocyanine, Fullerene-C60, Fullerene-C84, Pentacene, Perylene-3,4,9,10-tetracarboxylic dianhydride, Perylene, Poly(3-dodecylthiophene-2,5-diyl), Poly(3-hexylthiophene-2,5-diyl) regioregular, Poly(3-octylthiophene-2,5-diyl) regioregular, Poly[2-methoxy-5-(3',7'-dimethyloctyloxy)-1,4-phenylenevinylene], Tris[4-(5-dicyanomethylidenemethyl-2-thienyl)phenyl]amine, [5,6]-Fullerene-C70, [6,6]-Pentadeuterophenyl C61 butyric acid methyl ester, [6,6]-Phenyl C61 butyric acid methyl ester, [6,6]-Phenyl C71 butyric acid methyl ester, [6,6]-Phenyl C85 butyric acid methyl ester, [6,6]-Thienyl C61 butyric acid methyl ester, [6.6] Diphenyl C62 bis(butyric acid methyl ester), and α-Sexithiophene.

Dyes including 1,3-Bis[4-(dimethylamino)phenyl]-2,4-dihydroxycyclobutenediylium dihydroxide, bis(inner salt), 7-Methylbenzo[a]pyrene, 9,10-Dihydrobenzo[a]pyrene-7 (8H)-one, Benzo[e]pyrene, Coumarin 102, Coumarin 153, Coumarin 30, Coumarin 480 D, Coumarin 6, Merocyanine 540 and Pyrene.

Particles and their doped, undoped, various crystal forms, and mixtures with metals including: Titanium oxide, Titanium dioxide, Titanium$^{+4}$ oxides and dioxides, and Zinc oxide.

Organic Semi-conductors including n-Type Oligomers and Polymers such as 1,4,5,8-Naphthalenetetracarboxylic dianhydride, 2,3,5,6-Tetrafluoro-7,7,8,8-tetracyanoquinodimethane, 5,10,15,20-Tetrakis(pentafluorophenyl)-21H,23H-porphine palladium(II), 7,7,8,8-Tetracyanoquinodimethane, Copper(II) 1,2,3,4,8,9,10,11,15,16,17,18,22,23,24,25-hexadecafluoro-29H,31H-phthalocyanine, Fullerene-C60, Fullerene-C84, N,N'-Dioctyl-3,4,9,10-perylenedicarboximide, N,N'-Dipentyl-3,4,9,10-perylenedicarboximide, N,N'-Diphenyl-3,4,9,10-perylenedicarboximide, N,N'-Bis(2,5-di-tert-butylphenyl)-3,4,9,10-perylenedicarboximide, Perylene-3,4,9,10-tetracarboxylic dianhydride, [5,6]-Fullerene-C70, [6,6]-Phenyl C61 butyric acid methyl ester, [6,6]-Phenyl C71 butyric acid methyl ester, [6,6]-Phenyl C85 butyric acid methyl ester, [6,6]-Phenyl-C61 butyric acid butyl ester, [6,6]-Phenyl-C61 butyric acid octyl ester, [6,6]-Thienyl C61 butyric acid methyl ester, [6.6] Diphenyl C62 bis(butyric acid methyl ester), Poly(2,5-di(hexyloxy)cyanoterephthalylidene), Poly(2,5-di(octyloxy)cyanoterephthalylidene), Poly(2,5-di(3,7-dimethyloctyloxy)cyanoterephthalylidene), Poly(5-(2-ethylhexyloxy)-2-methoxycyanoterephthalylidene), Poly(5-(3,7-dimethyloctyloxy)-2-methoxy-cyanoterephthalylidene), Poly (benzimidazobenzophenanthroline), Poly[(1,4-divinylenephenylene)(2,4,6-triisopropylphenylborane)], and Poly[(2,5-didecyloxy-1,4-phenylene) (2,4,6-triisopropylphenylborane)], diphenyl terminated.

p-Type Oligomers and Polymers including: 13,6-N-Sulfinylacetamidopentacene, 2,2':5',2'':5'',2'''-Quaterthiophene, 3,3'''-Didodecyl-2,2':5',2'':5'',2'''-quaterthiophene, 3,3'''-Dihexyl-2,2':5',2'':5'',2'''-quaterthiophene, 5,5''''-Dihexyl-2,2':5',2'':5'',2''':5''',2'''':5'''',2'''''-sexithiophene, 5,5'-Di(4-biphenylyl)-2,2'-bithiophene, 5,5'-Dihexyl-2,2'-bithiophene, 6,13-Dihydro-6,13-methanopentacene-15-one, Benz[b] anthracene, Benz[b]anthracene, Bis(ethylenedithio) tetrathiafulvalene, Copper(II) phthalocyanine, Coronene purified by sublimation, Dibenzotetrathiafulvalene, Pentacene, Pentacene-N-sulfinyl-n-butylcarbamate, Pentacene-N-sulfinyl-tert-butylcarbamate, Platinum octaethylporphyrin, Rubrene, Tetrathiafulvalene, Tris[4-(5-dicyanomethylidenemethyl-2-thienyl)phenyl]amine, α-Sexithiophene, Poly(3-dodecylthiophene-2,5-diyl) regiorandom or regioregular, Poly(3-hexylthiophene-2,5-diyl) regiorandom or regioregular, Poly(3-octylthiophene-2,5-diyl) regiorandom or regioregular, Poly[(9,9-di-n-octylfluorenyl-2,7-diyl)-alt-(benzo[2,1,3]thiadiazol-4,8-diyl)], Poly[(9,9-dioctylfluorenyl-2,7-diyl)-co-bithiophene], Poly[2-methoxy-5-(2-ethylhexyloxy)-1,4-phenylenevinylene], Poly[2-methoxy-5-(3',7'-dimethyloctyloxy)-1,4-phenylenevinylene]

Use of Other Additives

Suitable antioxidants are known in the art and are commercially available. Suitable antioxidants include phenolic antioxidants and combinations of phenolic antioxidants with stabilizers. Phenolic antioxidants include fully sterically hindered phenols and partially hindered phenols. Stabilizers include organophosphorous derivatives such as trivalent organophosphorous compound, phosphites, phosphonates, and a combination thereof; thiosynergists such as organosulfur compounds including sulfides, dialkyldithiocarbamate, dithiodipropionates, and a combination thereof; and sterically hindered amines such as tetramethyl-piperidine derivatives. Suitable antioxidants and stabilizers are disclosed in Zweifel, Hans, "Effect of Stabilization of Polypropylene During Processing and Its Influence on Long-Term Behavior under Thermal Stress," Polymer Durability, Ciba-Geigy A G, Additives Division, CH-4002, Basel, Switzerland, American Chemical Society, vol. 25, pp. 375-396, 1996. Suitable antioxidants are supplied by BASF Corp. under the Irgafos® and Irganox® tradenames. Antioxidants supplied by Chemtura Corp. under the Naugalube® and Naugard® tradenames. Stabilizers and antioxidants supplied by Nanjing Union Rubber and Chemicals Co., Ltd.

Suitable phenolic antioxidants include vitamin E, IRGANOX B225 and IRGANOX 1010 from BASF Corp., IRGANOX 1010 comprises pentaerythriol tetrakis(3-(3,5-di-t-butyl-4-hydroxyphenyl)propionate).

Reaction catalyst inhibitors are known in the art and commercially available, see for example, U.S. Pat. No. 5,929,164 (col. 1, line 65 to col. 3, line 65). Inhibitors can be a phosphine, a diphosphine, an amine, a diamine, a triamine, an organic sulfide, an alkenyl-functional compound, an alkynyl-functional compound, a hydroxy-functional compound, a combination thereof, or any other transition metal catalyst poison.

Suitable phosphines include trialkyl phosphines and triaryl phosphines such as triphenyl phosphine. Suitable diphosphines include tetraphenylethylene diphosphine. Suitable amines include n-butyl amine and triethanolamine. Suitable diamines include tetramethylenediamine. Suitable organic sulfides include ethyl phenyl sulfide. Suitable alkenyl-functional compounds can be organic, organosilicones, or organosilanes. Suitable alkenyl-functional compounds include vinylsiloxanes and vinylsilanes. Suitable alkynyl functional compounds can be organic, such as acetylene, propyne, 1-butyne, 1-pentyne, 4,4-dimethyl-1-pentyne, 1-hexyne, 5-methyl-1-hexyne, and 1-decyne.

Methods of Manufacture of the PCM and TMM—Structure for Temperature Management and Heat Dissipation The TMM can be prepared by any convenient means such as mixing all components together at higher temperatures. In many embodiments, this temperature is higher than the phase change temperature of the PCM/pPCM/fpPCM. The TMM can be manufactured by addition of ingredients in a certain order to facilitate specific reactions or interactions such as the pretreatment of the fillers and particles with coupling agents or silanes. The TMM can be mixed at low, room temperature or higher temperatures. The TMM can be prepared in mixing vessels, reactors, extruders or the like.

The embodiments can be manufactured by a variety of known methods such as flow molding, reaction molding, reaction injection molding, vacuum molding, etc. The composite can be prepared by batch mixing of the ingredients, degassing, and pouring or injecting into the mold. The formulations can also be mixed using 2 component equipment where the ingredients are stored separately, then metered, into a mixing chamber or static mixing tube, then pumped or filled into molds. The mold can take the article, casing or battery block final shape, or the mold can be a generic shape then machined and formed into the final shape.

Formulation and Manufacturing of Films, Tapes, and Coatings of PCM-TMMs

As discussed previously with reference to FIG. 5A, in some embodiments of the disclosure, PCM-TMM may be shaped into a tube, sleeve, or similar casing. The tube, sleeve, or similar casing may be manufactured using a variety of methods, including injection molding, profile molding, tube molding, or hose molding. During the molding process, the PCM-TMM may be in a liquid state As discussed previously with reference to FIG. 5B, in some embodiments of the disclosure, a PCM-TMM may be formulated into a film or tape that can be wrapped around a battery cell to achieve a desired thickness or amount. In general, this film or tape can be made by casting or coating a substrate, or by skiving a larger amount of material. During the casting or coating process, the PCM-TMM (e.g., an elastomeric TMM containing one or more pPCMs) may be in a liquid state.

An alternative method of making film, tape or sheet is to form a billet, plug, cylinder, ingot, shaft, tube, wheel, cartridge, or bobbin of the PCM-TMM material and skive the material into film or sheet of various thicknesses. The skiving process entails continuously slicing thin layers of the PCM-TMM off the cylinder to form a sheet or film.

A substrate upon which a PCM-TMM may be cast or coated can be adhesive and/or conductive. Conductive substrates can be heat spreaders such as a metallic foil (e.g., copper, aluminum, gold, silver, etc.) or a carbon foil (e.g., graphite, graphene, diamond, etc.). These substrates could also comprise reflective insulation layers, such as for protecting from extreme cold. Any of the foils mentioned herein could have a separate adhesive backing made of either conductive or non-conductive adhesives. Alternatively, an adhesive itself could be the substrate of the PCM-TMM.

In certain embodiments of the disclosure, the formulation of the PCM-TMM used to coat the substrate to make the film or tape may have particularly high particulate loading with particulate loadings up to about 80% of PCM microcapsules and/or conductivity additives. Such conductivity additives will be described presently. Because of the high particulate loading, the coating formulations may be very thick and viscous, such that solvent is needed for application. It is very difficult to coat thick films, then dry and cure them by driving the solvent from the film, because the film that is applied may become too thick and trap the solvents. This trapping creates problems when trying to drive the solvent from the film, such as foaming, bubbling, and uneven surfaces.

One way to correct the problems created by using a solvent is to use a polymerizable or reactable molecule or monomer as the solvent. It would be desirable if this polymerizable monomer that is used as a solvent also can then polymerize into a polymeric PCM itself. One example of such a solvent is octadecyl methacrylate monomer. It can be combined with a TMM mixture containing microencapsulated or other contained PCMs to create a low viscosity coating. This coating can be casted or applied to a substrate, and when it is cured, the octadecyl methacrylate monomer will form a polyoctadecyl methacrylate (which has a melting point of ~30° C. and a latent heat of ~81 J/g) polymeric PCM which also contains other contained PCMs, (i.e. microencapsulated PCMs, silica absorbed PCM, etc.). Any such monomers, oligomers, and other chemicals discussed throughout this disclosure that also have the capability of being used as a solvent and then polymerizing into a polymeric PCM may be similarly utilized in this coating process.

The various film and tape embodiments discussed herein, as well as various sleeve embodiments, may be cured through known processes of UV and radiation curing. Such processes of UV and radiation coating are disclosed in the book "UV Coatings: Basics, Recent Developments, and New Applications," by Reinhold Schwalm, Elsevier, 2007, which is incorporated herein by reference. Such processes and techniques are also disclosed in the technical bulletin "Ultraviolet and Electron (UV/EB) Cured Coatings, Inks, and Adhesives," published by the United States Environmental Protection Agency, July 2001, which is incorporated herein by reference. For further disclosure of compositions and methods of manufacture for films according to embodiments of this disclosure, refer to the commonly owned and co-pending application entitled "Thermal Management Films Containing Phase Change Materials," U.S. application Ser. No. 14/614,236, filed on Feb. 4, 2015, previously incorporated by reference.

Additional Application Forms

The fpPCM, pPCM, mPCM, PCM, additives and finished TMM can be implemented as a tube, sleeve, casing, coating, laminate, infusion, treatment, gums, gels, film, sheets, greases, waxes or ingredient in a coating, laminate, infusion, treatment, caulks, gums, gels, film, sheets, tapes, greases, waxes that is formed adjacent to, on or within electrochemical cells or electrochemical cell components and materials using any suitable coating, laminating, layering, infusion, etc. technique. Application techniques and forms can include manually or mechanically sliding a tube, sleeve, or casing around a battery cell, using gels, greases or wax to assist the manual or mechanical application, manually or mechanically wrapping a film or tape one or more times, spray coating, air atomized spraying, airless atomized spraying, electrostatic spraying, slot die coating, contact slot coating, curtain coating, knife coating, roller coating, kiss coating, transfer coating, foam coating, brushing, screenprinting, padding, dipping or immersion, saturating, printing, pressure or gravity feed nozzles/guns, hot melt applicators, pump guns, manually operated guns, syringes, needle guns, various shape and size nozzles, molding, overmolding, injection molding, RIM, prepeg, Resin infusion process such as resin transfer molding (RTM), vacuum infusion process (VIP) and vacuum assisted RTM (VARTM), pultrusion, extrusion, plasma, etc. The TMM can be applied to release sheets or other temporary substrate surface for packaging/shipment then subsequently transferred to the batteries or battery packs, i.e. indirect transfer processes. The TMM may be manufactured as individual electrochemical-cell-sized tubes or sleeves for packaging/shipment and subsequent transfer by an end user. The TMM may also be manufactured in sheets of tape or film as described herein for wrapping around individual cells. Such sheets of tape or film may be manufactured in standard sizes that anticipate the number of times the sheet may be wrapped around an individual electrochemical cell, and the standard sizes and shapes can vary depending on anticipated applications.

The TMM can also be constructed as a unitary case with individual receptacles for individual electrochemical cells, such as those depicted in FIG. 4C. For example, certain electrochemical packs that house multiple cells, such as those for automobiles or airplanes, may be constructed such that the TMM comprises a honeycomb-like structure that fits a predetermined number of cells. The unitary cases can be formed such that multiple receptacles for individual electrochemical cells form a line, a square, a cube, a rectangle, a circle, stacks, or any other shape. Cases can comprise modular subunits of more than one, but less than all of the sleeves necessary for a particular battery pack. For example, an electrochemical pack comprising 32 cells may have four subunit rows of eight sleeves that are constructed unitarily.

The application process can be run cold, warm, hot or at room temperature, i.e. above or below room temperature, i.e. −100° C. to 400° C. Curing, crosslinking, drying or further reactions of the TMM or various layers to either cause bonding between or within the layers, or to facilitate the application of additional layers can be accomplished by any energy source. Examples are thermal, heat, light, UV, IR, radiation, solar, induction, pressure, sonic or sound waves, x-ray, radio waves, gamma waves, microwave, laser, e-beam, plasma, etc.

During use or application, the PCM-TMM can be positioned so that it is adjacent to an area in between an electrochemical cell or pack and a device that the cell or pack is powering, such that the cell or pack is protected from its own heat and the device components themselves are protected from the electrochemical device's heat. Additionally, the PCM-TMM may be positioned in between two or more electrochemical cells that each produce their own heat. It is also contemplated that the PCM-TMM can be positioned so that it is exposed to an outside environment, thus serving to facilitate temperature to the outside, protect internal cells packs from the outside environment or protect users from electrochemical device overheating.

The PCM-TMM may have a uniform thickness around the outside of any given individual electrochemical cell, or it may have varying degrees of thickness depending upon where the PCM-TMM is located in relation to an individual cell. For example, the PCM-TMM may be thicker in between two batteries of a battery pack than on the outside of one of the batteries of a battery pack, because the PCM-TMM in between two batteries must manage the temperature of two batteries instead of one. Alternatively, the PCM-TMM on the outside of a battery pack may be thicker than on the inside because the particular battery pack may be in an environment where the outside temperature is higher than that created by the cells or battery packs themselves. In some embodiments, the PCM-TMM may not cover the entire surface area of a cell. For example, one or both of the terminals of a battery may need to be exposed in order to contact the terminals on the device it powers or the terminals of other batteries in a pack. Additionally, in some embodiments, the PCM-TMM may be applied in a non-uniform thickness around a particular cell. For example, for certain applications, it may be desirable to apply the PCM-TMM more densely around a section of a cell that produces more heat than another section of the cell. The variety in thickness may allow for a more advantageous use of space.

In some embodiments, multiple layers of PCM-TMMs with different compositions are utilized. It is contemplated that any PCM-TMM article, such as a tube, sleeve, or wrapped tape, can include as few or as many layers as required for various implementations. In particular, it is contemplated that other layers of PCM-TMM can cover cells or packs in different orientations to main layers of PCM-TMM. For example, a battery pack constructed in a unitary fashion to receive individual cylindrical battery cells may have openings on the top and bottom to expose battery terminals, but additional PCM-TMM material may be added across the bottom or top to cover more of the surface area of the terminals once the batteries are inserted. For example, a battery pack may comprise multiple batteries that are each inserted into sleeves. Then each of the cells' terminals may be connected to each other, to the device terminals, or to a protection circuit. A layer of additional PCM-TMM may be applied after such connections are constructed. Such a layer can be implemented in a similar fashion as the first sleeve of PCM-TMM or can be implemented in another fashion to provide different functionality, such as shape-fitting, water repellency, stain resistance, stiffness, impact resistance, etc. The PCM-TMM can be applied to provide a continuous coating, encapsulant or complete coverage, or the PCM-TMM can be used in a discontinuous pattern.

It should be clearly understood that by providing examples of specific compositions, applicant does not intend to limit the scope of the claims to any of these specific composition. To the contrary, it is anticipated that any combination of the functional groups, polymeric phase change materials, and articles described herein may be utilized to achieve the novel aspects of the present disclosure. The claims are not intended to be limited to any of the specific compounds described in this disclosure, any disclosure incorporated herein or the example given above.

While the present disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, process step or steps, to the objective, spirit and scope of the present disclosure. All such modifications are intended to be within the scope of the claims appended hereto. In particular, while the methods disclosed herein have been described with reference to particular steps performed in a particular order, it will be understood that these steps may be combined, sub-divided, or re-ordered to form an equivalent method without departing from the teachings of the present disclosure. Accordingly, unless specifically indicated herein, the order and grouping of the steps is not a limitation of the present disclosure.

What is claimed is:

1. A method for making a casing for the thermal management of an electrochemical cell, the method comprising:
   combining one or more branching or crosslinking agents and a polyether polyol,
      wherein the branching or crosslinking agent changes a length of a chain of the polyether polyol and forms a composite crosslinked polyether polyol phase change material; and
      wherein the crosslinked polyether polyol phase change material: comprises crosslinks between two or more polymer side chains, the crosslinks having been formed by a dianhydrides or diisocyanate and polyether polyol in a ratio between approximately 0.5:1 and 1.5:1; and
   forming the composite crosslinked polyether polyol phase change material into a casing having an inner surface configured to surround at least a portion of an electrochemical cell,
      wherein the crosslinked polyether polyol phase change material has a transition temperature of between 25° C. and 140° C. and a latent heat of greater than 2 Joules per gram.

2. The method of claim 1, wherein the polyether polyol comprises polyethylene glycol.

3. The method of claim 1, wherein the branching or crosslinking agent comprises a branched crosslinking agent or chain extending agent.

4. A composite polymeric material for electrochemical cell thermal management, the composite polymeric material comprising:
   a crosslinked polyether polyol phase change material configured to be in physical contact with at least a portion of an electrochemical cell,
      wherein the crosslinked polyether polyol phase change material:
   comprises crosslinks between two or more polymer chains, the crosslinks having been formed by a dianhydrides or a diisocyanate and a polyether polyol in a ratio between approximately 0.5:1 and 1.5:1; and
   has a transition temperature of between 25° C. and 140° C. and a latent heat of greater than 2 Joules per gram.

5. The composite polymeric material of claim 4, wherein the polyol comprises a branched polyol.

6. The composite polymeric material of claim 4, wherein the material is machinable.

7. The composite polymeric material of claim 4, wherein the material is moldable.

8. The composite polymeric material of claim 4, wherein the material is a solid-solid phase change material.

9. The composite polymeric material of claim 4, wherein the material is fire retardant.

10. The composite polymeric material of claim 4, further comprising a thermal conductivity additive.

11. The composite polymeric material of claim 10, wherein the material has a thermal conductivity of greater than 1.5 times the thermal conductivity of the crosslinked polyether polyol alone.

12. The method of claim 1, wherein the polyol and the crosslinking agent or branching agent are reacted using a catalyst.

13. The composite polymer material of claim 4, further comprising one or more of:
   a water scavenger additive,
   an antioxidant additive, or
   a fire-retardant additive.

14. A casing for electrochemical cell thermal management, the casing comprising:
   a substantially homogeneous crosslinked polyether polyol phase change material
      wherein the crosslinked polyether polyol phase change material comprises crosslinks between two or more polymer chains, the crosslinks having been formed by a dianhydrides or a diisocyanate and a polyether polyol in a ratio between approximately 0.5:1 and 1.5:1; and has a transition temperature of between 25° C. and 140° C. and a latent heat of greater than 2 Joules per gram, and one or more receptacles configured to receive one or more electrochemical cells.

15. The casing of claim 14, wherein the casing, when used in conjunction with one or more electrochemical cells during a plurality of charge and discharge cycles of the one or more electrochemical cells, extends the discharge capacity life of the one or more electrochemical cells as compared to the original discharge capacity life of the one or more electrochemical cells.

16. The casing of claim 14, wherein an electrochemical cell, when retained within the casing, is capable of charging faster than a similar electrochemical cell that is not retained in the casing.

17. A casing for one or more electrochemical cells, the casing comprising:

a unitary structure comprised of a substantially homogeneous crosslinked polyether polyol phase change material, the unitary structure having one or more openings configured to retain the one or more electrochemical cells in thermal contact with the crosslinked polyether polyol phase change material, wherein the crosslinked polyether polyol phase change material comprises crosslinks between two or more polymer chains, the crosslinks having been formed by a dianhydrides or a diisocyanate and a polyether polyol in a ratio between approximately 0.5:1 and 1.5:1; and has a transition temperature of between 25° C. and 140° C. and a latent heat of greater than 2 Joules per gram.

18. The composite polymeric material of claim 4, wherein the polyether polyol is a copolymer.

19. The composite polymeric material of claim 4, wherein the polyether polyol is a block copolymer.

* * * * *